(12) United States Patent
 Tsukuba

(10) Patent No.: US 11,070,824 B2
(45) Date of Patent: Jul. 20, 2021

(54) IMAGE PROCESSING DEVICE AND METHOD

(71) Applicant: Sony Corporation, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/644,503

(22) PCT Filed: Aug. 31, 2018

(86) PCT No.: PCT/JP2018/032324
§ 371 (c)(1),
(2) Date: Mar. 5, 2020

(87) PCT Pub. No.: WO2019/054200
PCT Pub. Date: Mar. 21, 2019

(65) Prior Publication Data
US 2021/0092413 A1    Mar. 25, 2021

(30) Foreign Application Priority Data

Sep. 15, 2017 (JP) .............................. JP2017-177379

(51) Int. Cl.
*H04N 19/186* (2014.01)
*H04N 19/593* (2014.01)
(Continued)

(52) U.S. Cl.
CPC ......... *H04N 19/186* (2014.11); *H04N 19/117* (2014.11); *H04N 19/176* (2014.11); *H04N 19/182* (2014.11); *H04N 19/593* (2014.11)

(58) Field of Classification Search
CPC .. H04N 19/186; H04N 19/593; H04N 19/117; H04N 19/182; H04N 19/176
See application file for complete search history.

(56) References Cited

U.S. PATENT DOCUMENTS

| | | | |
|---|---|---|---|
| 2013/0223522 A1* | 8/2013 | Song | H04N 19/61 375/240.03 |
| 2014/0140401 A1* | 5/2014 | Lee | H04N 19/186 375/240.12 |

FOREIGN PATENT DOCUMENTS

| | | |
|---|---|---|
| JP | 2008-172599 A | 7/2008 |
| JP | 2012-095101 A | 5/2012 |

(Continued)

OTHER PUBLICATIONS

International Search Report and Written Opinion dated Nov. 27, 2018 for PCT/JP2018/032324 filed on Aug. 31, 2018, 9 pages including English Translation of the International Search Report.

(Continued)

*Primary Examiner* — Nam D Pham
(74) *Attorney, Agent, or Firm* — Xsensus, LLP

(57) ABSTRACT

The present disclosure relates to an image processing device and method that allow reduction in coding efficiency to be suppressed.
A pixel value of a chroma component is predicted by linear prediction from a pixel value of a reference image of a luma component whose pixel location is changed by using a filter, and a prediction image of the chroma component is generated. A chroma component of encoded data in which an image is encoded is decoded by using the generated prediction image. The filter is selected on a basis of information regarding a pixel location of the chroma component and information regarding a color format. The present disclosure is applicable, for example, to an image processing device, an image encoding device, an image decoding device, or the like.

20 Claims, 81 Drawing Sheets

(51) Int. Cl.
*H04N 19/176* (2014.01)
*H04N 19/117* (2014.01)
*H04N 19/182* (2014.01)

(56) References Cited

FOREIGN PATENT DOCUMENTS

| JP | 2014-534746 A | 12/2014 |
|---|---|---|
| WO | 2012/175646 A1 | 12/2012 |
| WO | 2016/115736 A1 | 7/2016 |

OTHER PUBLICATIONS

Chen, J., et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, JVET-F1001-v3, 6th Meeting, Hobart, AU, Mar. 31-Apr. 7, 2017, 49 pages.

Chen, J., et al., Algorithm Description of Joint Exploration Test Model 5 (JEM 5), Joint Video Exploration Team (JVET) of ITU-T SG 16 WP 3 and ISO/IEC JTC 1/SC 29/WG 11, JVET-E1001-v2, 5th Meeting, Geneva, CH, Jan. 12-20, 2017, 8 pages.

Zang, K., et al., "Enhanced Cross-component Linear Model Intra-prediction," Joint Video Exploration Team (JVET) of ITU-T SG 16 WP 3 and ISO/IEC JTC 1/SC 29/WG 11, JVET-D0110, 4th Meeting, Chengdu, CN, Oct. 15-21, 2016, pp. 1-6.

Francois (Canon) E et al: "Non-CE6a: Use of chroma phase in LM mode", 8. JCT-VC Meeting; Feb. 1, 2012-Feb. 10, 2012; San Jose; (Joint Collaborative Team on Video Coding of ISO/IEC JTC1/SC29/WG11 and ITU-T SG.16).No. JCTVC-H0177 Feb. 3, 2012 (Feb. 3, 2012), XP030232314.

Extended European Search Report dated Jun. 2, 2020 in European Application No. 18856263.1.

\* cited by examiner

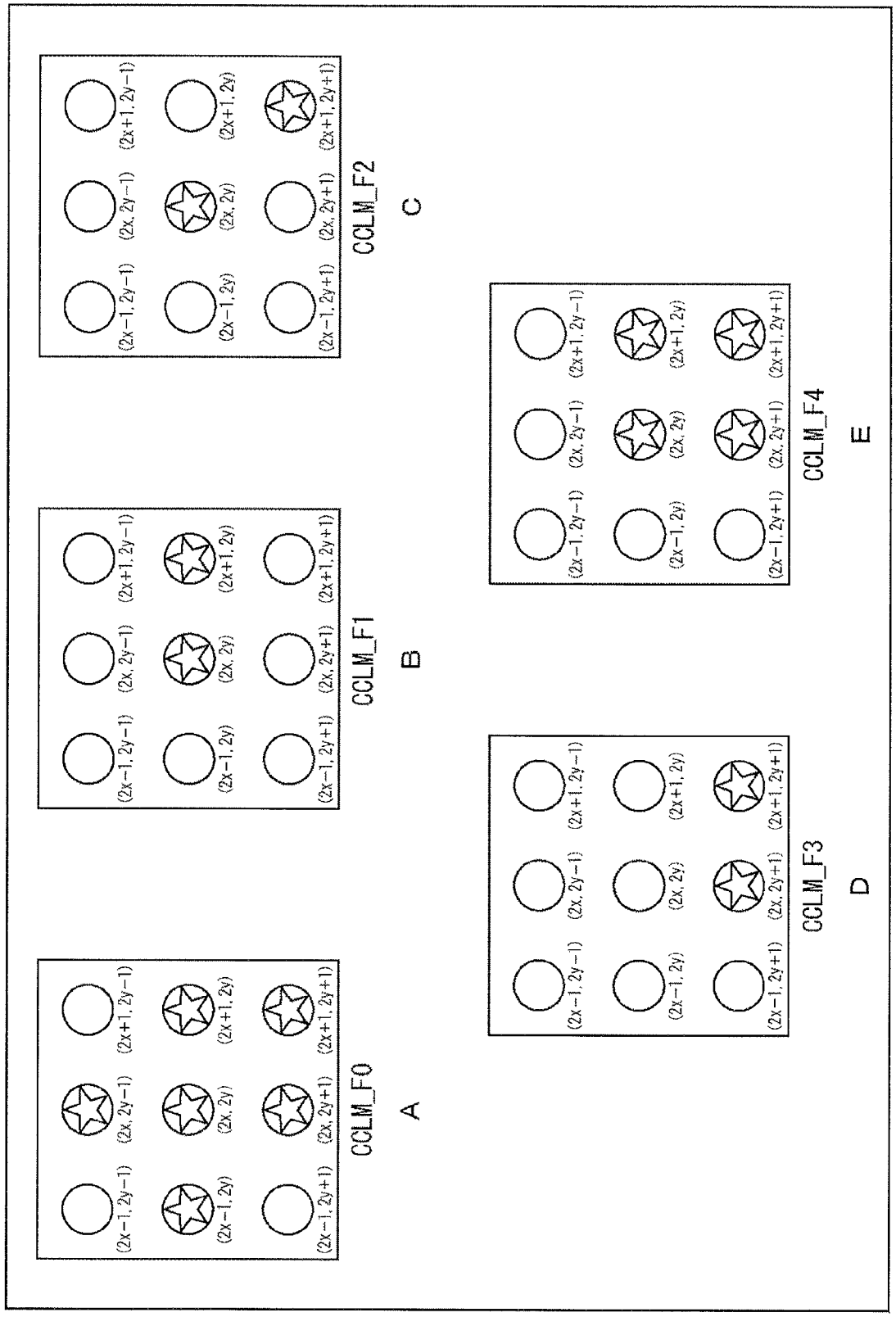

FIG. 5

| | Descriptor |
|---|---|
| coding_unit( x0, y0, log2CbWidth, log2CbHeight ) { | |
| ... // pcm_flag, syntaxes related to intra prediction mode | |
| } else { //!pcm_flag, syntaxes related to intra prediction mode | |
|   if ( isLuma ) { | |
|     prev_intra_luma_pred_flag[ x0 ][ y0 ] | ae(v) |
|     if( prev_intra_luma_pred_flag[ x0 ][ y0 ] ) | |
|       mpm_idx[ x0 + i ][ y0 + j ] | ae(v) |
|     else | |
|       rem_intra_luma_pred_mode[ x0 ][ y0 ] | ae(v) |
|   } | |
|   if( ChromaArrayType != CHROMA_400 && ( !isLuma \|\| sliceType != I ) ) { | |
|     if (cclmp_enabled_flag) | |
|       cclmp_flag[ x0 ][ y0 ] | ae(v) |
|     if(!cclmp_flag[x0][y0]) { // choose ipredC from the candidate list | |
|       intra_chroma_pred_mode[ x0 ][ y0 ] | ae(v) |
|     } else { // syntaxes related to cclmp mode | |
|       ipredC = LM_CHROMA_IDX | |
|       if( curBlkSize >= MCLMMinBlkSize) | |
|         mclm_flag[x0][y0]  //mclm_flag=1 : MCLM mode | ae(v) |
|       ipredC = LM_CHROMA_IDX + mclm_flag[x0][y0] | |
|       if (curBlkSize >= MFLMMinBlkSize) { | |
|         if (ipredC == LM_CHROMA_IDX) { | |
|           mflm_flag[x0][y0] | ae(v) |
|           if (mflm_flag[x0][y0]) { | |
|             mflm_idx[x0][y0] | ae(v) |
|             ipredC = LM_CHROMA_F1_IDX + mflm_idx[x0][y0] | |
|           } else { | |
|             ipredC = LM_CHROMA_IDX | |
|           } | |
|         } | |
|       } | |
|     } // if (!cclm_flag[x0][y0]) | |
|   } // end of if(ChromaArrayType != CHROMA_400 && ( !isLuma \|\| sliceType != I )) | |
| } else { // syntaxes related to inter prediction mode | |

CCLMP-RELATED SYNTAX GROUP (braces encompassing the cclmp-related block above)

FIG. 6

```
curBlkSize = log2CbW+log2CbH
        or
        (1<<log2CbW)*(1<<log2CbH)

LM_CHROMA_IDX      = 67
MMLM_CHROMA_IDX    = 68
LM_CHROMA_F1_IDX   = 69
...
LM_CHROMA_F4_IDX   = 72
```

FIG. 8

| | CONTENTS |
|---|---|
| 1 | IT IS NOT POSSIBLE TO APPLY MULTI-FILTER MODE IN SINGLE-CLASS MODE OR MULTI-CLASS MODE. CODING EFFICIENCY IS LOW. |
| 2 | IN CASE WHERE COLOR FORMAT IS 422 FORMAT, IT IS NOT POSSIBLE TO APPLY MULTI-FILTER MODE. CODING EFFICIENCY IS LOW. |
| 3 | IN CASE WHERE COLOR FORMAT IS 444 FORMAT, ENCODING/DECODING OF CONTROL SIGNAL IN MULTI-FILTER MODE IS REDUNDANT. |
| 4 | DECODING OF Cr SIGNAL HAS LARGE DELAY IN CROSS-COMPONENT PREDICTION BECAUSE OF Cb/Cr RESIDUAL PREDICTION. |

FIG. 14

- Block and unit names in JEM
  - CTB: Coding tree block(luma or chroma)—there are three CTBs per CTU in P/B slice, and one CTB per luma CTU and two CTBs per chroma CTU in I slice.
  - CTU: Coding tree unit(synonymous with LCU, containing both luma and chroma in P/B slice, containing only luma or chroma in I slice), with a size of 16x16, 32x32, 64x64, or 128x128 for the luma component.
  - CB: Coding block, a luma or chroma block in a CU.
  - CU: Coding unit(containing both luma and chroma in P/B slice, containing only luma or chroma in I slice), a leaf node of a QTBT. It's the level at which the prediction process and residual transform are performed in JEM. A CU can be square or rectangle shape.
  - PB: Prediction block, a luma or chroma block of a PU.
  - PU: Prediction unit, has the same size to a CU.
  - TB: Transform block, a luma or chroma block of a TU.
  - TU: Transform unit, has the same size to a CU.

FIG. 16

| | Descriptor |
|---|---|
| chroma_sample_loc_info (x0, y0) { | |
|   chroma_sample_loc_type_idx[x0][y0] | ae(v) |
| } | |

FIG. 20

| | Descriptor |
|---|---|
| coding_unit( x0, y0, log2CbWidth, log2CbHeight ) { | |
| ... // !pcm_flag, syntaxes related to intra prediction mode | |
| if ( isLuma ) { | |
| ... syntaxes related to luma intra prediction ... | |
| } | |
| if ( ChromaArrayType != CHROMA_400 && ( !isLuma \|\| sliceType != I ) ) { | |
| if (ccp_enabled_flag) | |
| ccp_flag[ x0 ][ y0 ] | ae(v) |
| if(!ccp_flag[x0][y0]) { // choose IntraPredModeC from the candidate list | |
| chroma_mpm_idx [ x0 ][ y0 ] | ae(v) |
| } else { // syntaxes related to cclmp mode | |
| if( width\*heightC >= MCLMMinBlkSize && width\*heightC <= MCLMMaxBlkSize) | |
| mclm_flag[x0][y0]//mclm_flag=1 : MCLM mode | ae(v) |
| if ( (ChromaArrayType==CHROMA_420 \|\| ChromaArrayType==CHROMA_422) ) { | |
| chroma_sample_loc_info() | |
| } | |
| } // if (!cclm_flag[x0][y0] | |
| } // end of if(ChromaArrayType != CHROMA_400 && ( !isLuma \|\| sliceType != I )) | |
| } else { // syntaxes related to inter prediction mode | |

CCP-RELATED SYNTAX GROUP

FIG. 23

| CHROMA ARRAY TYPE (ChromaArrayType) | CHROMA SAMPLE LOCATION TYPE IDENTIFIER (chroma_sample_loc_type_idx) | CHROMA SAMPLE LOCATION TYPE (ChromaSampleLocType) |
|---|---|---|
| CHROMA_420 | 0 | Type2 |
| | 1 | Type3 |
| | 2 | Type0 |
| | 3 | Type1 |
| CHROMA_422 | 0 | Type2 |
| | 1 | Type3 |
| CHROMA_444 | 0(inferred) | Type2 |

FIG. 24

| CHROMA ARRAY TYPE (ChromaArrayType) | MULTI-CLASS LINEAR PREDICTION MODE FLAG (mc_m_flag) | CHROMA SAMPLE LOCATION TYPE (ChromaSampleLocType) | intraPredModeC |
|---|---|---|---|
| CHROMA_420 | 0 | Type2 | 67 |
| | 0 | Type3 | 68 |
| | 0 | Type0 | 69 |
| | 0 | Type1 | 70 |
| | 1 | Type2 | 71 |
| | 1 | Type3 | 72 |
| | 1 | Type0 | 73 |
| | 1 | Type1 | 74 |
| CHROMA_422 | 0 | Type2 | 67 |
| | 0 | Type3 | 68 |
| | 1 | Type2 | 71 |
| | 1 | Type3 | 72 |
| CHROMA_444 | 0 | Type2 | 67 |
| | 1 | Type2 | 71 |

FIG. 25

| CHROMA ARRAY TYPE (ChromaArrayType) | MULTI-CLASS LINEAR PREDICTION MODE FLAG (mc_m_flag) | CHROMA SAMPLE LOCATION TYPE (ChromaSampleLocType) | intraPredModeC |
|---|---|---|---|
| CHROMA_420 | 0 | Type2 | 67 |
| | 0 | Type3 | 68 |
| | 0 | Type0 | 69 |
| | 1 | Type1 | 70 |
| | 1 | Type2 | 71 |
| | 1 | Type3 | 72 |
| | 1 | Type0 | 73 |
| | 1 | Type1 | 74 |
| CHROMA_422 | 0 | Type2 | 67 |
| | 0 | Type3 | 68 |
| | 1 | Type2 | 69 |
| | 1 | Type3 | 70 |
| CHROMA_444 | 0 | Type2 | 67 |
| | 1 | Type2 | 68 |

FIG. 26

| chroma_sample_loc_info( ) { | Descriptor |
|---|---|
|   default_chroma_sample_loc_type_flag[x0][y0] | ae(v) |
|   if (!default_chroma_sample_loc_type_flag[x0][y0]) | |
|     chroma_sample_loc_type_idx[x0][y0] | ae(v) |
| } | |

FIG. 27

| CHROMA ARRAY TYPE (ChromaArrayType) | DEFAULT CHROMA SAMPLE LOCATION TYPE FLAG (default_chroma_sample_loc_type_flag) | CHROMA SAMPLE LOCATION TYPE IDENTIFIER (chroma_sample_loc_type_idx) | CHROMA SAMPLE LOCATION TYPE (ChromaSampleLocType) |
|---|---|---|---|
| CHROMA_420 | 1 | — (not signalled) | Type2 |
|  | 0 | 0 | Type3 |
|  | 0 | 1 | Type0 |
|  | 0 | 2 | Type1 |
| CHROMA_422 | 1 | — (not signalled) | Type2 |
|  | 0 | 0 | Type3 |
| CHROMA_444 | 1 (inferred) | — (not signalled) | Type2 |

FIG. 28

| some_header = sps, pps, slice_header, ctu | Descriptor |
|---|---|
| some_header( ) { | |
| ... | |
| if ( ccp_enabled_flag ) | |
| chroma_sample_loc_info() | |
| ... | |
| } | |

A

| coding_unit( x0, y0, log2CbWidth, log2CbHeight ) { | Descriptor |
|---|---|
| ... // else { //!pcm_flag, syntaxes related to intra prediction mode | |
| if ( isLuma ) { | |
| ... syntaxes related to luma intra prediction ... | |
| } | |
| if( ChromaArrayType != CHROMA_400 && ( !isLuma \|\| sliceType != I ) ) { | |
| if (ccp_enabled_flag) | |
| ccp_flag[ x0 ][ y0 ] | ae(v) |
| if(!ccp_flag[x0][y0]) { // choose IntraPredModeC from the candidate list | |
| chroma_mpm_idx [ x0 ][ y0 ] | ae(v) |
| } else { // syntaxes related to cclmp mod | |
| if( width*heightC >= MCLMMinBlkSize && width*heightC <= MCLMMaxBlkSize) | |
| mclm_flag[x0][y0]//mclm_flag=1 : MCLM mode | ae(v) |
| if (!cclm_flag[x0][y0] | |
| } // end of if(ChromaArrayType != CHROMA_400 && ( !isLuma \|\| sliceType != I )) | |
| } else { // syntaxes related to inter prediction mode | |

B

CCP-RELATED SYNTAX GROUP

FIG. 37

| CHROMA ARRAY TYPE (ChromaArrayType) | CHROMA SAMPLE LOCATION (ChromaSampleLocType) | EXAMPLE OF DOWNSAMPLING FILTER |
|---|---|---|
| CHROMA_420 | Type2 | FILTER TYPE 1 |
| | Type3 | FILTER TYPE 2 |
| | Type0 | FILTER TYPE 3 |
| | Type1 | FILTER TYPE 4 |
| CHROMA_422 | Type2 | FILTER TYPE 5 |
| | Type3 | FILTER TYPE 6 |
| CHROMA_444 | Type2 | FILTER TYPE 7 |

FIG. 39

|   |   |   |
|---|---|---|
| 0 | 1 | 0 |
| 1 | 4 | 1 |
| 0 | 1 | 0 |

IN CASE OF SEPARABLE FILTER
HORIZONTAL DIRECTION F={1, 2, 1}//4
VERTICAL DIRECTION F={1, 2, 1}//4

FIG. 41

|   |   |   |
|---|---|---|
| 0 | 1 | 0 |
| 0 | 1 | 0 |
| 0 | 0 | 0 |

IN CASE OF SEPARABLE FILTER
HORIZONTAL DIRECTION F={1, 1}//2

FIG. 43

IN CASE OF SEPARABLE FILTER
VERTICAL DIRECTION F={1, 1}//2

| 0 | 0 | 0 |
|---|---|---|
| 0 | 1 | 1 |
| 0 | 0 | 0 |

FIG. 45

| 0 | 0 | 0 |
|---|---|---|
| 0 | 1 | 1 |
| 0 | 1 | 1 |

IN CASE OF SEPARABLE FILTER
HORIZONTAL DIRECTION F={1, 1}//2
VERTICAL DIRECTION F={1, 1}//2

FIG. 47

|   |   |   |
|---|---|---|
| 0 | 0 | 0 |
| 1 | 2 | 1 |
| 0 | 0 | 0 |

IN CASE OF SEPARABLE FILTER
HORIZONTAL DIRECTION F={1, 2, 1}//4

FIG. 49

|   |   |   |
|---|---|---|
| 0 | 0 | 0 |
| 0 | 1 | 1 |
| 0 | 1 | 0 |

IN CASE OF SEPARABLE FILTER
HORIZONTAL DIRECTION F={1, 1}//2

| | Descriptor |
|---|---|
| some_header( ) { | |
| ////if/(/ccp/enabled/flag/)///////////////// | |
| /////chroma/resi/pred/enabled/flag///////// | ae(v) |
| ... | |
| } | |

B

| | Descriptor |
|---|---|
| coding_unit( x0, y0, log2CbWidth, log2CbHeight ) { | |
| // else { //!pcm_flag, syntaxes related to intra prediction mode | |
| if ( isLuma ) { | |
| ... syntaxes related to luma intra prediction ... | |
| } | |
| if( ChromaArrayType != CHROMA_400 && ( !isLuma \|\| sliceType != I )) { | |
| if (ccp_enabled_flag) | |
|   ccp_flag[ x0 ][ y0 ] | ae(v) |
| if(!ccp_flag[x0][y0]) { // choose IntraPredModeC from the candidate list | |
|   chroma_mpm_idx [ x0 ][ y0 ] | ae(v) |
| } else { // syntaxes related to ccimp mode | |
| if( width*heightC >= MCLMMinBlkSize | |
| && width*heightC <= MCLMMaxBlkSize) | |
|   mclm_flag[x0][y0] //mclm_flag=1 : MCLM mode | ae(v) |
| if ( (ChromaArrayType==CHROMA_420 \|\| ChromaArrayType==CHROMA_422) ) { | |
|   chroma_sample_loc_info() | |
| } | |
| ////if/(ChromaArrayType/!=/CHROMA/400/&&/(/!isLuma/\|\|/sliceType/!=/I/))/ | |
| /////chroma/resi/pred/flag/[x0]/[y0]/////////////////////////////////// | ae(v) |
| } // if (!cclm_flag[y0]) | |
| } // end of if(ChromaArrayType != CHROMA_400 && ( !isLuma \|\| sliceType != I )) | |
| } else { // syntaxes related to inter prediction mode | |

CCP-RELATED SYNTAX GROUP

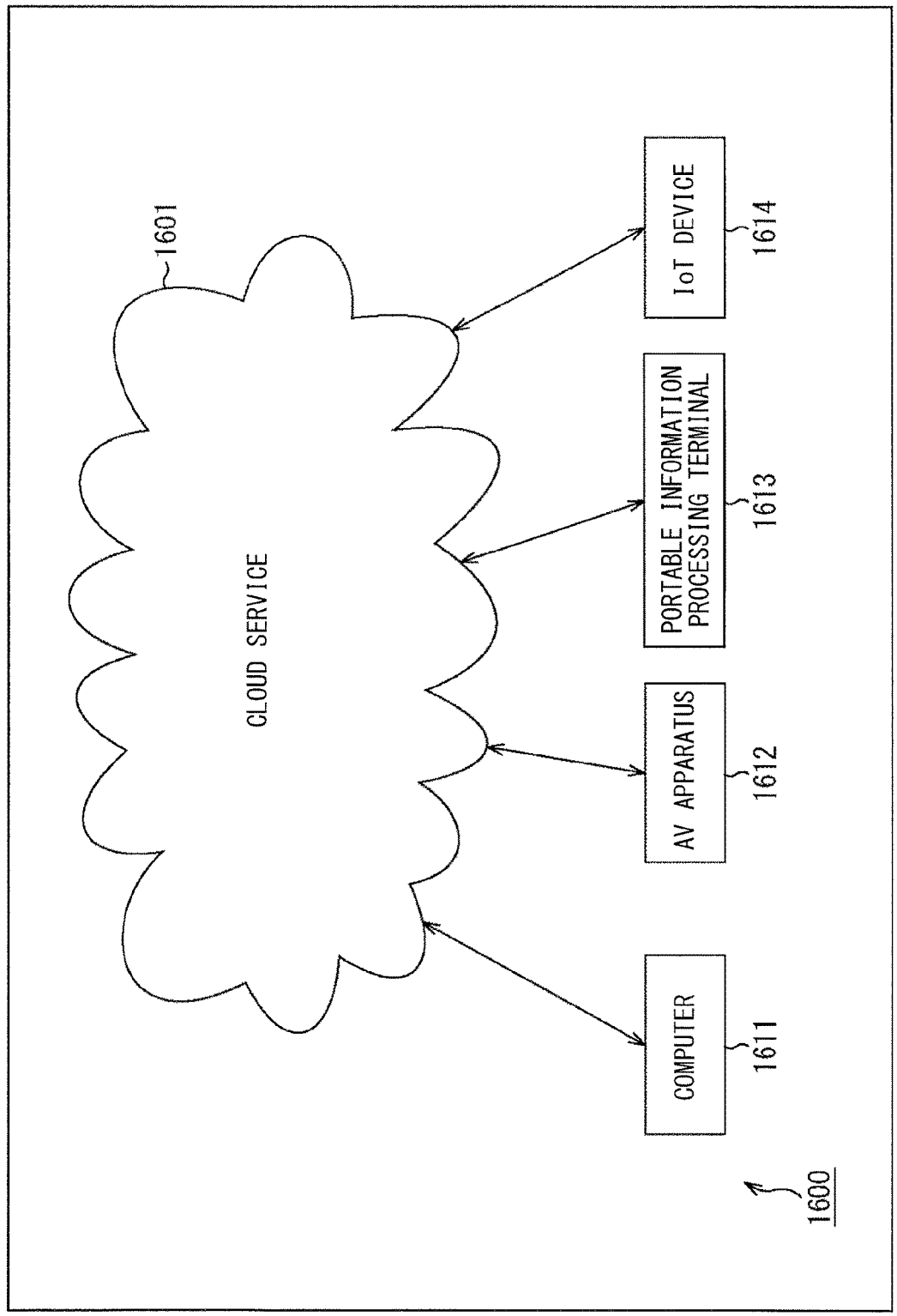

IMAGE PROCESSING DEVICE AND METHOD

CROSS-REFERENCE TO RELATED APPLICATIONS

The present application is based on PCT filing PCT/JP2018/032324, filed Aug. 31, 2018, which claims priority to JP 2017-177379, filed Sep. 15, 2017, the entire contents of each are incorporated herein by reference.

TECHNICAL FIELD

The present disclosure relates to an image processing device and method, and particularly to an image processing device and method that make it possible to suppress reduction in coding efficiency.

BACKGROUND ART

Conventionally, to improve the prediction performance of chroma intra prediction, there has been a technology called cross-component linear prediction (see, for example, NPL 1). In addition, to improve the prediction performance of the cross-component linear prediction, there has been proposed a technology called multi-filter linear model prediction in which a downsampling filter to be used for generating a luma component to be referred to is selected from among four downsampling filters.

CITATION LIST

Patent Literature

NPL 1: Jianle Chen, ElenaAlshina, Gary J. Sullivan, Jens-Rainer, Jill Boyce, "Algorithm description of Joint Exploration Test Model 6", JVET-F1001, Joint Video Exploration Team (JVET) of ITU-T SG 16 WP 3 and ISO/IEC JTC 1/SC 29/WG 11 6th Meeting: Hobart, AU, 2017 Jun. 30

SUMMARY OF THE INVENTION

Problems to be Solved by the Invention

However, in a case of the method described in NPL 1, the application of the multi-filter mode presupposes the 420 format as the chroma format. Therefore, it is not possible to apply this multi-filter mode described in NPL 1 to a chroma format, for example, the 422 format or the like, other than the 420 format. This may cause the coding efficiency to be reduced in a case where the chroma format is other than the 420 format.

The present disclosure has been devised in view of such circumstances, and makes it possible to suppress reduction in coding efficiency.

Means for Solving the Problems

An image processing device according to an aspect of the present technology includes an image processing device including: a prediction unit that predicts a pixel value of a chroma component by linear prediction from a pixel value of a reference image of a luma component whose pixel location is changed by using a filter, and generates a prediction image of the chroma component; and a decoding unit that decodes, by using the prediction image, a chroma component of encoded data in which an image is encoded. The filter is selected on the basis of information regarding a pixel location of the chroma component and information regarding a color format. The prediction image is generated by the prediction unit.

An image processing method according to an aspect of the present technology includes an image processing method including: predicting a pixel value of a chroma component by linear prediction from a pixel value of a reference image of a luma component whose pixel location is changed by using a filter, and generating a prediction image of the chroma component; and decoding, by using the generated prediction image, a chroma component of encoded data in which an image is encoded. The filter is selected on the basis of information regarding a pixel location of the chroma component and information regarding a color format.

An image processing device according to another aspect of the present technology includes an image processing device including: a prediction unit that predicts a pixel value of a chroma component by linear prediction from a pixel value of a reference image of a luma component whose pixel location is changed by using a filter, and generates a prediction image of the chroma component; and an encoding unit that encodes, by using the prediction image, a chroma component of an image. The filter is selected on the basis of information regarding a pixel location of the chroma component and information regarding a color format. The prediction image is generated by the prediction unit.

An image processing method according to another aspect of the present technology includes an image processing method including: predicting a pixel value of a chroma component by linear prediction from a pixel value of a reference image of a luma component whose pixel location is changed by using a filter, and generating a prediction image of the chroma component; and encoding, by using the generated prediction image, a chroma component of an image. The filter is selected on the basis of information regarding a pixel location of the chroma component and information regarding a color format.

In the image processing device and method according to an aspect of the present technology, a pixel value of a chroma component is predicted by linear prediction from a pixel value of a reference image of a luma component whose pixel location is changed by using a filter, and a prediction image of the chroma component is generated, and a chroma component of encoded data in which an image is decoded is decoded by using the generated prediction image. The filter is selected on the basis of information regarding a pixel location of the chroma component and information regarding a color format.

In the image processing device and method according to another aspect of the present technology, a pixel value of a chroma component is predicted by linear prediction from a pixel value of a reference image of a luma component whose pixel location is changed by using a filter, and a prediction image of the chroma component is generated, and a chroma component of an image is encoded by using the generated prediction image. The filter is selected on the basis of information regarding a pixel location of the chroma component and information regarding a color format.

Effects of the Invention

According to the present disclosure, it is possible to process an image. It is possible in particular to suppress reduction in coding efficiency.

BRIEF DESCRIPTION OF DRAWING

FIG. 4 is a diagram illustrating a pixel location of a luma component of multi-filter linear model prediction.

FIG. 5 is a diagram illustrating an example of syntax related to the cross-component linear prediction.

FIG. 6 is a diagram illustrating an example of the syntax related to the cross-component linear prediction.

FIG. 8 is a diagram for describing a problem with cross-component linear prediction in a conventional technology.

FIG. 14 is a diagram illustrating an example of semantics regarding a block.

FIG. 16 is a diagram illustrating an example of syntax of chroma sample location information.

FIG. 20 is a diagram illustrating an example of the syntax related to the cross-component linear prediction.

FIG. 23 is a diagram for describing setting of a chroma sample location type.

FIG. 24 is a diagram for describing setting of a chroma intra prediction mode.

FIG. 25 is a diagram for describing the setting of the chroma intra prediction mode.

FIG. 26 is a diagram illustrating an example of the syntax of the chroma sample location information.

FIG. 27 is a diagram for describing the setting of the chroma sample location type.

FIG. 28 is a diagram illustrating an example of the syntax related to the cross-component linear prediction.

FIG. 37 is a diagram for describing an example of a state in which a downsampling filter is selected.

FIG. 39 is a diagram illustrating an example of a filter factor of the downsampling filter.

FIG. 41 is a diagram illustrating an example of the filter factor of the downsampling filter.

FIG. 43 is a diagram illustrating an example of the filter factor of the downsampling filter.

FIG. 45 is a diagram illustrating an example of the filter factor of the downsampling filter.

FIG. 47 is a diagram illustrating an example of the filter factor of the downsampling filter.

FIG. 49 is a diagram illustrating an example of the filter factor of the downsampling filter.

FIG. 66 is a diagram illustrating an example of the syntax related to the cross-component linear prediction.

FIG. 82 is a block diagram illustrating an example of a schematic configuration of a network system.

MODES FOR CARRYING OUT THE INVENTION

Modes (referred to as embodiments below) for carrying out the present disclosure are described below. It should be noted that description is given in the following order.
1. Cross-Component Linear Prediction
2. First Embodiment (Image Decoding Device and Cross-Component Prediction)
3. Second Embodiment (Image Encoding Device and Cross-Component Prediction)
4. Third Embodiment (Image Decoding Device and Execution Control of Cross-Chroma Residual Prediction)
5. Fourth Embodiment (Image Encoding Device and Execution Control of Cross-Chroma Residual Prediction)
6. Conclusion
7. Others

1. Cross-Component Linear Prediction

<Cross-Component Linear Prediction (CCLMP)>

NPL 1 has the technology called cross-component linear prediction (CCLMP (Cross Component Linear Model Prediction)) to improve the prediction performance of chroma intra prediction. It should be noted that this cross-component linear prediction (CCLMP) is also referred to as cross-component prediction (CCP (Cross Component Prediction)). In addition, the following also refers to a luma signal or a luma component as luma component. In addition, a chroma signal or a chroma component is also referred to as chroma component.

Figure 1:
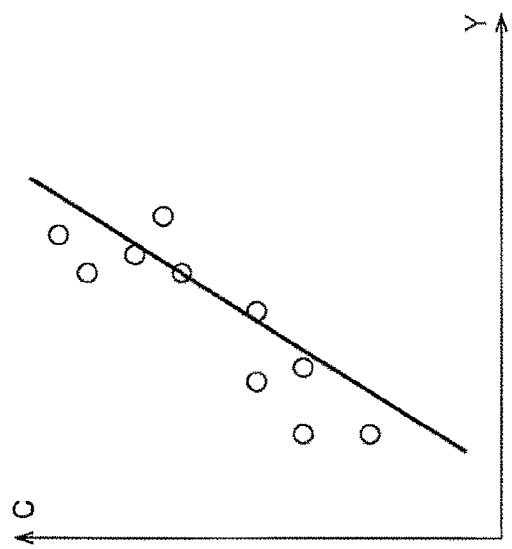
FIG. 1 is a diagram illustrating an example of a state of cross-component linear prediction.

The CCLMP (CCP) is an intra prediction technology that predicts a pixel value of a prediction target block on a component A (chroma component C) from a pixel value of a component B (luma component Y) in the collocate location of the prediction target block on the component A (chroma component C), for example, in accordance with the linear model represented by the following expression (1), assuming that the components have a linear relationship as illustrated in FIG. 1.

$$\text{Pred}_C[x,y] = \alpha \times \text{Rec}_L'[x,y] + \beta \quad (1)$$

Figure 2:
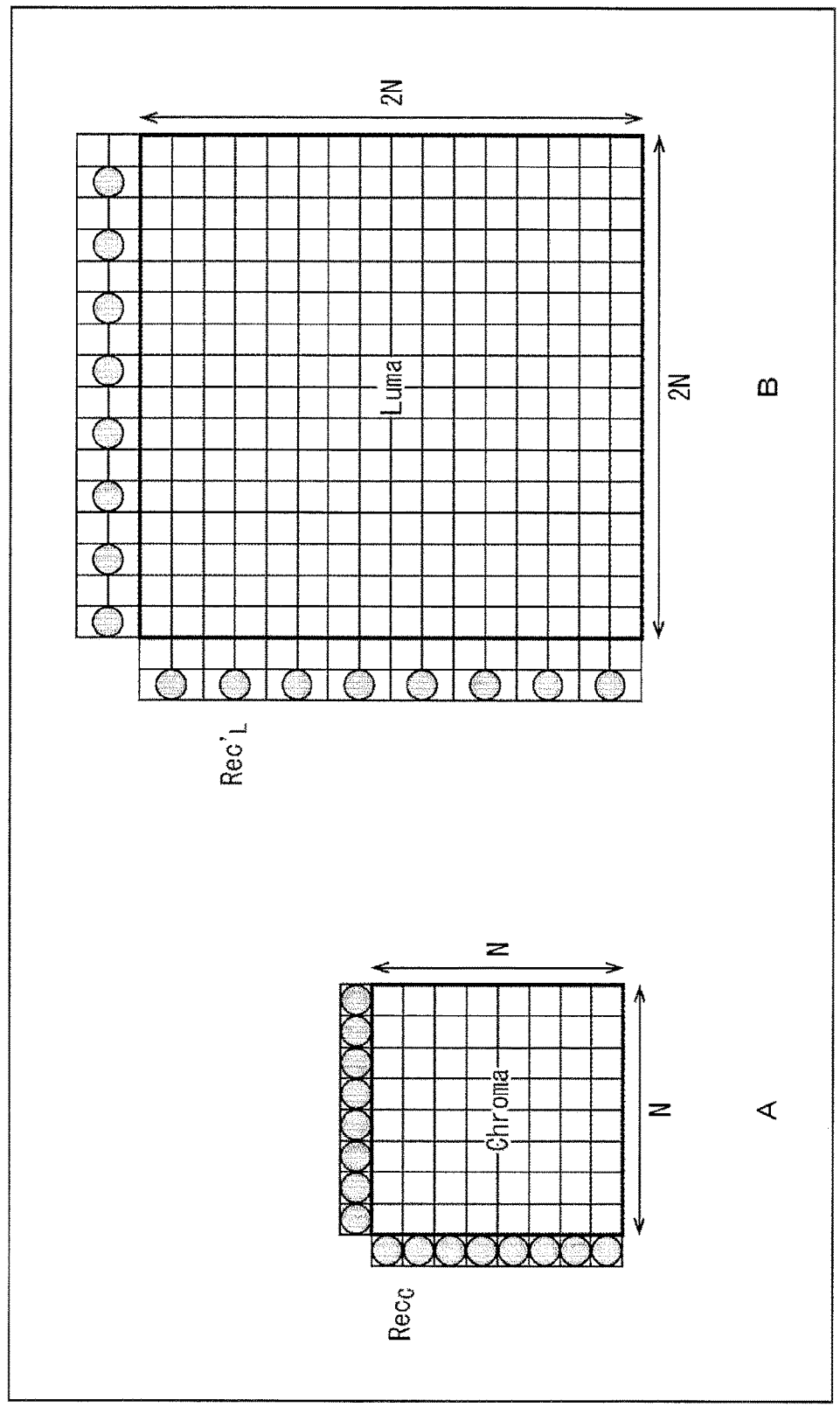
FIG. 2 is a diagram illustrating examples of a pixel to be processed and a reference pixel.
Figure 3:
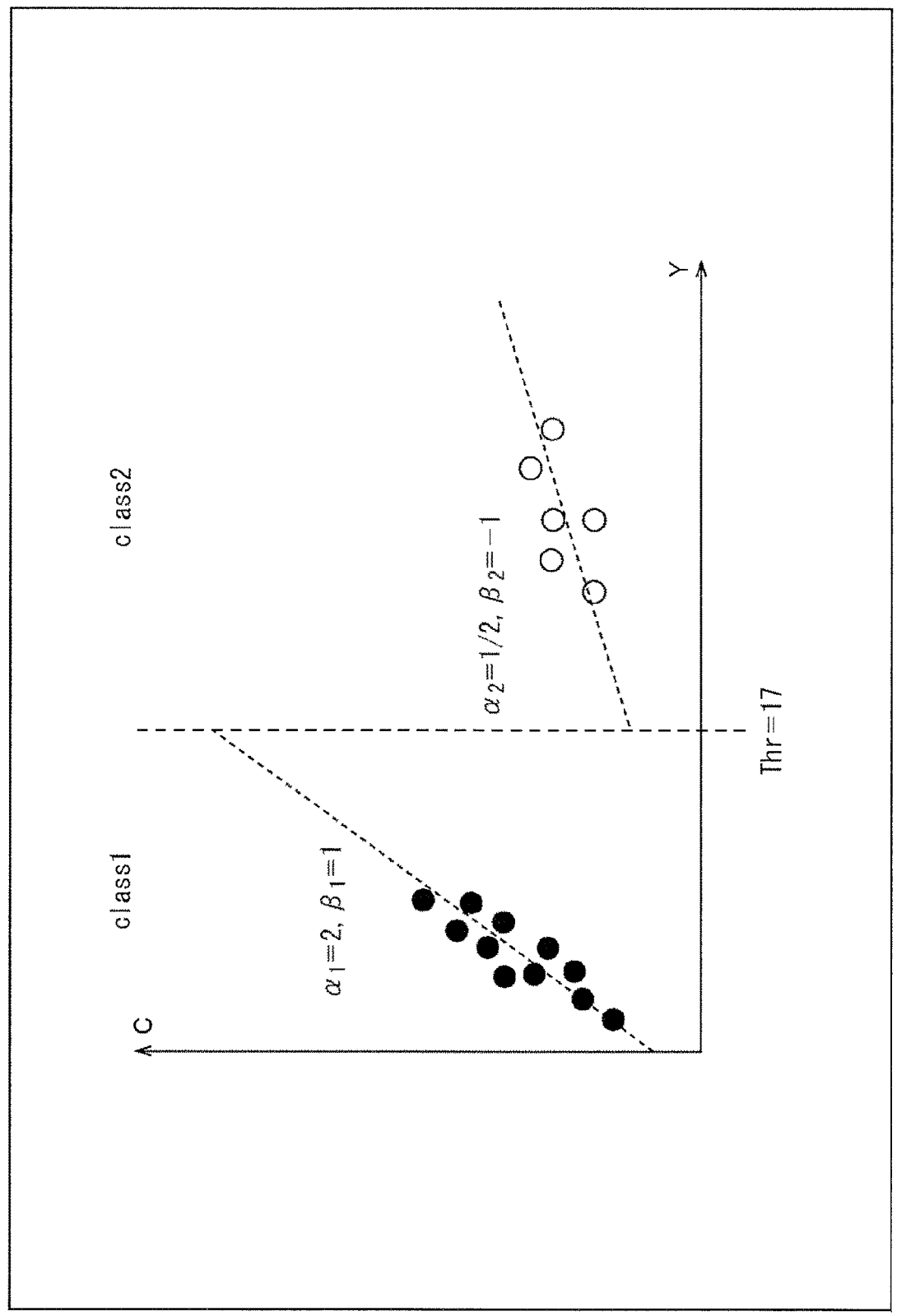
FIG. 3 is a diagram illustrating an example of a state of multi-class linear prediction.

In expression (1), parameters $\alpha$ and $\beta$ of the linear model are derived from the adjacent decoded pixel group of the prediction target block of the component A (chroma component C) illustrated in A of FIG. 2 and the decoded pixel group of the component B (luma component Y in the example of B of FIG. 2) in the collocate location illustrated in B of FIG. 2 in accordance with the linear regression (or least square method). For example, $\alpha$ is derived in accordance with the following expression (2), and $\beta$ is derived in accordance with the following expression (3). It should be noted that the following also refers to a component to be predicted as a prediction target component, and also refers to a component to be referred to at the time of prediction as reference component.

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad (2)$$

$$\beta = \frac{\sum C(n) - \alpha \cdot \sum L(n)}{N} \quad (3)$$

In expression (2) and expression (3), N represents the number of samples of the adjacent decoded pixel group (or reduced decoded pixel group (reduced luma decoded pixel group) of the luma component Y corresponding to the chroma component C) of the chroma component C.

In addition, C(n) represents the n-th sample of the adjacent decoded pixel group of the chroma component C, and L(n) represents the n-th sample of the reduced luma decoded pixel group corresponding to the chroma component C.

In a case where the chroma format (also referred to as chroma array type ChromaArrayType) is the 420 format, a luma component signal $\text{Rec}_L'[x,y]$ of the reduced resolution corresponding (in the collocate location) to the chroma component signal in the (x, y) location is derived by applying, for example, the downsampling filter in expression (4) below around a decoded pixel group $\text{Rec}_L[2x,2y]$ of the luma component at the original resolution.

$$\text{Rec}_L'[x,y] = (2 \times \text{Rec}_L[2x,2y] + 2 \times \text{Rec}_L[2x,2y+1] + \text{Rec}_L[2x-1,2y] + \text{Rec}_L[2x+1,2y] + \text{Rec}_L[2x-1,2y+1] + \text{Rec}_L[2x+1,2y+1] + 4) << 3 \quad (4)$$

<Multi-Class Mode (MCLMP)>

To further improve the prediction accuracy of the CCLMP, there is a technology called multi-class linear prediction (MCLMP (Multi-Class Linear Model Prediction) or MMLMP (Multi Model Linear Model Prediction)) in which a reference component (luma component) referred to in predicting a prediction target component (chroma component) is divided into N classes (N=2), and the prediction target component is subjected to linear prediction from the reference component for each class. For example, the following expression (5) represents an example of a linear model formula with N=2.

$$\begin{cases} Pred_c[x, y] = \alpha_1 \cdot Rec'_L[x, y] + \beta_1, & \text{if } Rec'_L[x, y] \leq Thr \text{ (class 1)} \\ Pred_c[x, y] = \alpha_2 \cdot Rec'_L[x, y] + \beta_2, & \text{if } Rec'_L[x, y] > Thr \text{ (class 2)} \end{cases} \quad (5)$$

In a case where the pixel value of the (reduced) decoded pixel group $Rec_L'[x,y]$ of the luma component is less than or equal to a certain threshold Thr, it is categorized into class 1. In a case where the pixel value is greater than the threshold Thr, it is categorized into class 2. A prediction signal $Pred_C[x,y]$ of the chroma component is derived in accordance with the linear prediction formula corresponding to each class. The threshold Thr is, for example, the average value of the reduced luma decoded pixel group $Rec_L'[x,y]$.

<Multi-Filter Mode (MFLMP)>

To improve the prediction performance of the CCLMP when the chroma format (chroma array type ChromaArray-Type) is the 420 format, a technology called multi-filter linear model prediction (MFLMP (Multi-Filter Linear Model Prediction)) is proposed in which the downsampling filter used to generate the luma signal $Rec_L'[x,y]$ that refers to the chroma signal in the (x, y) location at the time of linear prediction is switched for CCLMP to the four downsampling filters in the following expressions (6) to (9) in addition to expression (4) described above.

It should be noted that the pixel locations (sample location) of the luma components in the downsampling filters corresponding to expression (4) and expressions (6) to (9) are respectively as illustrated in FIGS. 4A to 4E. That is, A of FIG. 4 corresponds to expression (4), B of FIG. 4 corresponds to expression (6), C of FIG. 4 corresponds to expression (7), D of FIG. 4 corresponds to expression (8), and E of FIG. 4 corresponds to expression (9). In FIG. 4, circles represent the pixel locations of the luma components, and stars represent the pixel locations of the luma components used in the downsampling filters.

$$Rec'_L[x,y]=(Rec_L[2x,2y]+Rec_L[2x+1,2y]+1)>>1 \quad (6)$$

$$Rec'_L[x,y]=(Rec_L[2x+1,2y]+Rec_L[2x+1,2y+1]+1)>>1 \quad (7)$$

$$Rec'_L[x,y]=(Rec_L[2x,2y+1]+Rec_L[2x+1,2y+1]+1)>>1 \quad (8)$$

$$Rec'_L[x,y]=(Rec_L[2x,2y]+Rec_L[2x,2y+1]+Rec_L[2x+1,2y]+Rec_L[2x+1,2y+1]+2)>>2 \quad (9)$$

<Cb-To-Cr Residual Prediction>

The CCLMP includes technology called Cb/Cr residual prediction (Cb-to-Cr Residual Prediction) in which the prediction residual is linearly predicted between two chroma components (prediction residual is linearly predicted from a Cb component to a Cr component (from the U component to the V component)).

The linear model formula representing the CCLMP including the Cb/Cr residual prediction is expressed by the following expression (10).

$$pred^*_{Cr}[x,y]=pred_{Cr}[x,y]+\alpha \cdot resi_{Cb}[x,y] \quad (10)$$

In expression (10), $pred_{Cr}[x,y]$ represents a Cr prediction image that is predicted from the luma component by CCLMP expressed by expression (1) or expression (6). $pred_{Cr}^*[x,y]$ represents a Cr prediction image, that is, a corrected Cr prediction image obtained by correcting a Cr prediction image $pred_{Cr}[x,y]$ by adding $\alpha \cdot resi_{Cb}[x,y]$. The Cr prediction image $pred_{Cr}[x,y]$ is obtained from the luma component. $\alpha \cdot resi_{Cb}[x,y]$ is obtained by multiplying a prediction residual $resi_{Cb}[x,y]$ by a weighting coefficient $\alpha$. The prediction residual $resi_{Cb}[x,y]$ is obtained by inversely quantizing/inversely transforming a transformation coefficient $coef_{Cb}$ of the Cb component.

In expression (10), the parameter $\alpha$ of the linear model is derived from the adjacent decoded pixel group of the prediction target block of the Cr component and the decoded pixel group of the Cb component in the collocate location thereof in accordance with the linear regression (or least square method). For example, a is determined in accordance with expression (11).

$$\alpha = \frac{N \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \quad (11)$$

In expression (11), N represents the number of samples of the adjacent decoded pixel group of the Cr component. In addition, Cr(n) represents the n-th sample of the adjacent decoded pixel group of the Cr component, and Cb(n) represents the n-th sample of the adjacent decoded pixel group of the Cb component in the collocate location of the adjacent decoded pixel group of the Cr component. Here, $\lambda$ in expression (11) is a value of $\Sigma/(Cb(n) \cdot Cb(n))>>9$.

<Syntax of Cross-Component Linear Prediction and Extended Modes Thereof>

FIGS. 5 and 6 illustrate examples of syntax tables related to the CCLMP in NPL 1 and extended modes (multi-class mode (MCLMP) and multi-filter mode (MFLMP)) thereof.

In FIGS. 5 and 6, the main syntax related to the cross-component linear prediction is as follows.

cclmp_enabled_flag: Cross-component linear prediction enabled flag. For example, "0" indicates unavailability, and "1" indicates availability.

cclmp_flag: Cross-component linear prediction flag. For example, "0" indicates that no cross-component linear prediction is used, and "1" indicates that cross-component linear prediction is used.

intra_chroma_pred_mode: An identifier for identifying a mode number in a chroma intra prediction mode candidate list intraPredCandListC.

mclmp_flag: Multi-class mode flag (MCLMPflag). For example, "0" indicates a 1-class mode (single-class mode), and "1" indicates a 2-class mode (multi-class mode).

mflmp_flag: Multi-filter mode flag (MFLMP flag). For example, "0" indicates that the MFLMP mode is off, and "1" indicates that the downsampling filter is changed.

mflmp_idx: Multi-filter mode identifier (MFLMP identifier). Control information specifies which downsampling filter is used.

LM_CHROMA_IDX: A mode number indicating CCLMP prediction with cclmp_flag==1, mclmp_flag==0, and mflm_flag==0.

MMLM_CHROMA_IDX: A mode number indicating CCLMP prediction with cclmp_flag==1 and mclmp_flag==1.

LM_CHROMA_FX_IDX: A mode number indicating CCLMP prediction cclmp_flag==1, mclmp_flag==0, mflm_flag==1, and mflm_idx=(X−1)(X==1.4).

<Characteristics of Multi-Filter Mode>

The multi-filter mode described in NPL 1 has, for example, the following characteristics.

For example, in NPL 1, the application of the multi-filter mode presupposes the 420 format as the chroma format, and nothing is taken into consideration about the other chroma formats (e.g., 422 format). Therefore, it is difficult to apply the multi-filter mode described in NPL 1 to the 422 format. Therefore, there is the risk that the coding efficiency is reduced.

In addition, in a case where the chroma format is the 444 format, the luma component and the chroma component have the same resolution. This eliminates the necessity to generate the luma component signal RecL'[x,y] with a downsampling filter, and allows the decoded pixel group RecL[x,y] of the luma component at the original resolution to be used as it is. The luma component signal RecL'[x,y] is referred to when the chroma component signal is linearly predicted. Thus, in a case where the chroma format is the 444 format, the encoding/decoding of control information regarding the multi-filter mode is redundant. Therefore, there is the risk that the coding efficiency is reduced.

In addition, in NPL 1, the multi-filter mode in which downsampling filters are switched is applied only to the multi-class mode (mclmp_flag==1), and is not applied to the single-class mode (mclmp_flag==0). Therefore, there is the risk that the coding efficiency is reduced.

<Characteristics of Cb/Cr Residual Prediction>

The example of the flow of the cross-component linear prediction (CCLMP) process described in NPL 1 that is executed by a decoder (not illustrated) is described with reference to the flowchart of FIG. 7.

When the cross-component linear prediction process is started, the decoder parses a syntax group related to CU (also referred to as current CU) to be decoded from encoded data in step S11.

In step S12, the decoder generates a prediction image of a luma component.

In step S13, the decoder performs inverse quantization/inverse transformation to transform a transformation coefficient of the luma component into a prediction residual.

In step S14, the decoder restores the decoded image from the prediction residual and prediction image of the luma component.

In step S15, the decoder generates a prediction image of a chroma component (Cb) from the decoded image of the luma component.

In step S16, the decoder performs inverse quantization/inverse transformation to transform a transformation coefficient of the chroma component (Cb) into a prediction residual.

In step S17, the decoder restores the decoded image from the prediction residual and prediction image of the chroma component (Cb).

In step S18, the decoder generates a prediction image of a chroma component (Cr) from the decoded image of the luma component.

In step S19, the decoder performs inverse quantization/inverse transformation to transform a transformation coefficient of the chroma component (Cr) into a prediction residual.

In step S20, the decoder corrects the prediction image of the chroma component (Cr) by using the prediction residual of the chroma component (Cb) (Cb/Cr residual prediction).

In step S21, the decoder restores the decoded image from the prediction residual and corrected prediction image of the chroma component (Cr).

Figure 7:
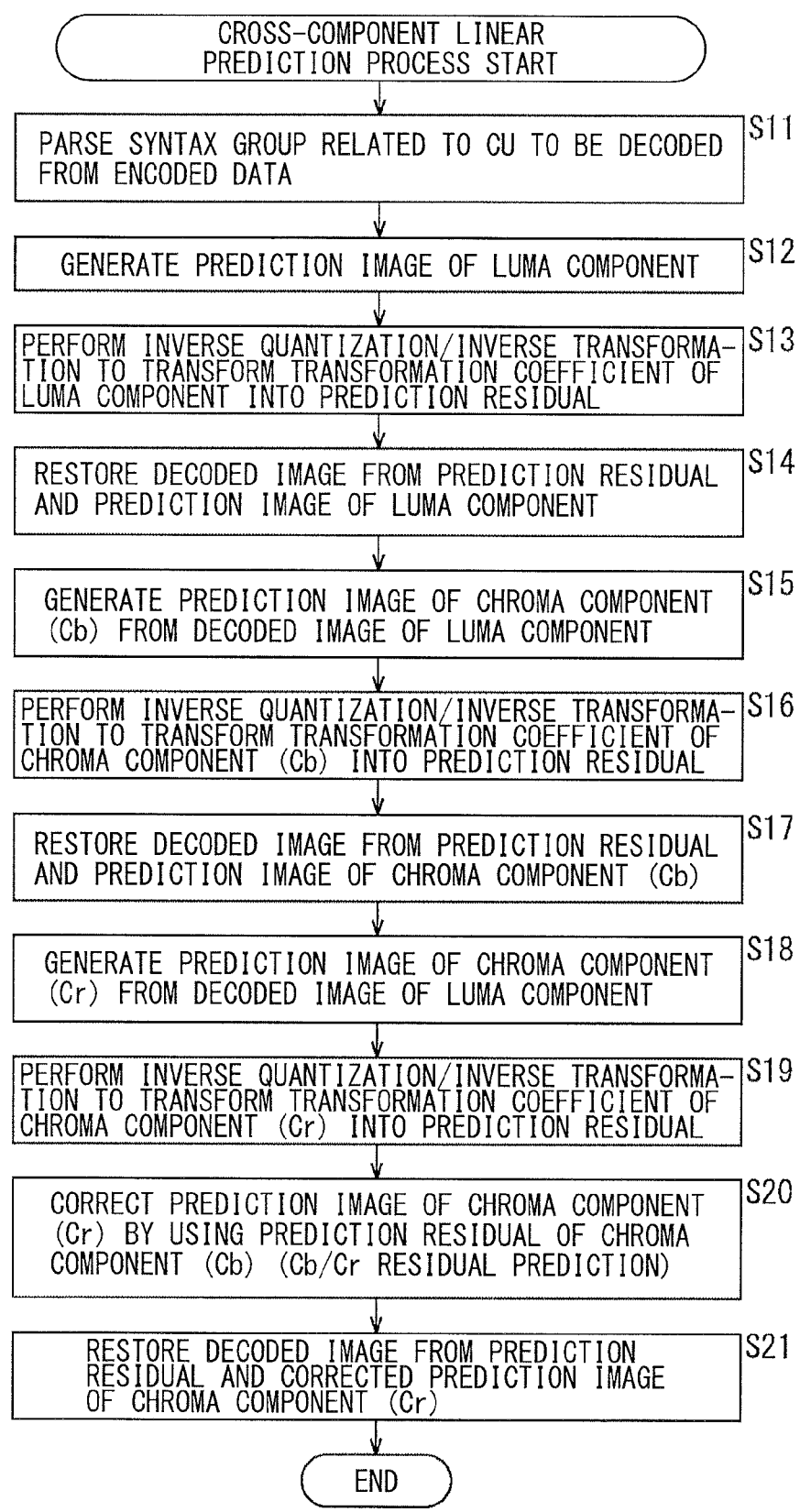
FIG. 7 is a flowchart describing an example of a flow of a cross-component linear prediction process.

As illustrated in FIG. 7, in a case where the cross-component linear prediction is performed in a coding unit to be processed, it is not possible to generate the prediction image of the Cb component (step S15) before the decoding of the luma component is finished. Similarly, it is not also possible to generate the prediction image of the Cr component (step S18) before the decoding of the luma component is finished. Furthermore, it is not possible to correct the prediction image of the Cr component (step S20) before the generation of the prediction residual of the Cr component (step S16) is finished.

As described above, the dependence between components occurs in the cross-component prediction. Especially the Cr component depends on both the luma component and the Cb component, and the delay may be thus further increased as compared with the decoding of the Cb component.

In summary, the cross-component linear prediction described in NPL 1 has the problem as illustrated in FIG. 8.

<Filter Selection Based on Chroma Sample Location Information and Chroma Array Type>

Therefore, the pixel value of a chroma component is predicted by linear prediction from the pixel value of a reference image of a luma component whose pixel location is changed by using a filter selected on the basis of information regarding the pixel location of a chroma component and information (chroma array type) regarding a color format, and a prediction image of the chroma component is generated. This makes it possible to suppress reduction in the encoding efficiency.

<Block Partition>

Incidentally, in an old-fashioned image encoding scheme such as MPEG2 (Moving Picture Experts Group 2 (ISO/IEC 13818-2)) or MPEG-4 Part 10 (Advanced Video Coding, hereinafter referred to as AVC), an encoding process is executed in processing units called macro-blocks. A macro-block is a block having a uniform size of 16×16 pixels. In contrast, in HEVC (High Efficiency Video Coding), a coding process is executed in processing units (coding units) called CUs (Coding Units). CU is a block whose size is variable, and is formed by recursively partitioning LCU (Largest Coding Unit) that is a maximum coding unit. The selectable maximum size of CU is 64×64 pixels. The selectable minimum size of CU is 8×8 pixels. CU having the minimum size is called SCU (Smallest Coding Unit). It should be noted that the maximum size of CU is not limited to 64×64 pixels, but may be a larger block size such as 128×128 pixels or 256×256 pixels.

In this manner, CU having variable size is adopted, and as a result, in HEVC, image quality and coding efficiency are adaptively adjustable in accordance to the contents of an image. A prediction process for predictive coding is executed in processing units (prediction units) called PUs (Prediction Units). PU is formed by partitioning CU in one of the several partition patterns. In addition, PU includes a processing unit (prediction block) called PB (Prediction Block) per luma (Y) and chroma (Cb or Cr). Further, an orthogonal transformation process is executed in processing units (transformation unit) called TUs (Transform Units). TU is formed by partitioning CU or PU up to certain depth. In addition, TU includes a processing unit (transformation block) called TB (Transform Block) per luma (Y) and chroma (Cb or Cr).

<Recursive Partition of Block>

Figure 9:
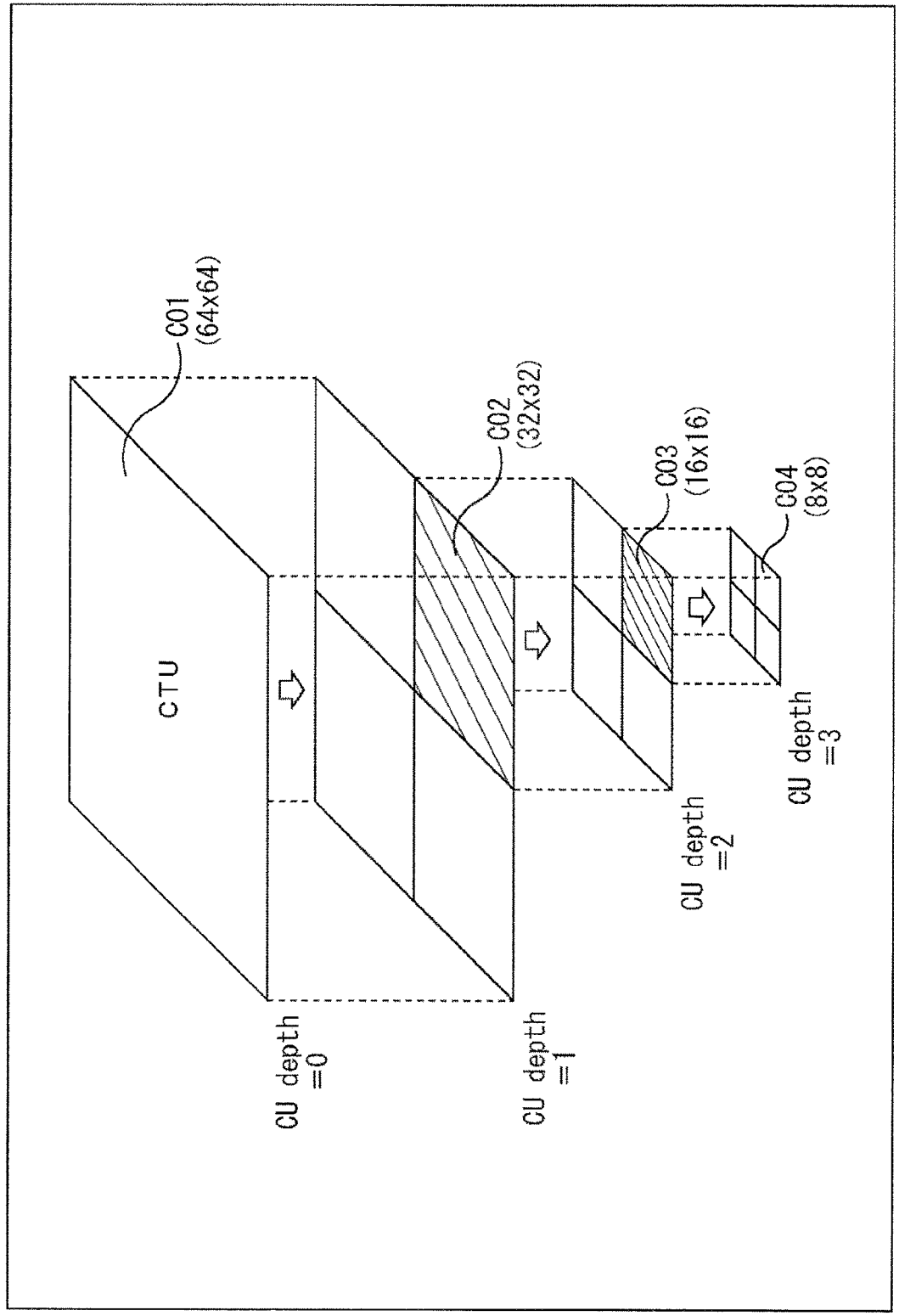
FIG. 9 is an explanatory diagram for describing an outline of recursive block partition for CU.

FIG. 9 is an explanatory diagram for describing an outline of recursive block partition on CU in HEVC. The block partition of CU is performed by recursively repeating the partition from one block into four (=2×2) subblocks, and as a result, a quadtree-shaped (Quad-Tree) tree structure is formed. The whole of one quadtree is referred to as CTB (Coding Tree Block), and a logical unit corresponding to CTB is referred to as CTU (Coding Tree Unit).

The upper portion of FIG. 9 illustrates, as an example, C01 that is CU having a size of 64×64 pixels. The partitioning depth of C01 is equal to zero. This means that C01 is a route of the CTU and corresponds to the LCU. The LCU size may be designated by a parameter encoded in SPS (Sequence Parameter Set) or PPS (Picture Parameter Set). C02 that is CU is one of four CUs obtained by partitioning C01 and has a size of 32×32 pixels. The partitioning depth of C02 is equal to 1. C03 that is CU is one of four CUs obtained by partitioning C02 and has a size of 16×16 pixels. The partitioning depth of C03 is equal to 2. C04 that is CU is one of four CUs obtained by partitioning C03 and has a size of 8×8 pixels. The partitioning depth of C04 is equal to 3. As described above, the CU is formed by recursively partitioning an image to be encoded. The partitioning depth is variable. For example, CU that is larger in size (i.e., smaller in depth) may be set for a flat image region such as the blue sky. In contrast, CU that is smaller in size (i.e., larger in depth) may be set for a steep image region having many edges. Each of the set CUs is then used as the processing unit of the encoding process.

<Setting of PU to CU>

Figure 10:
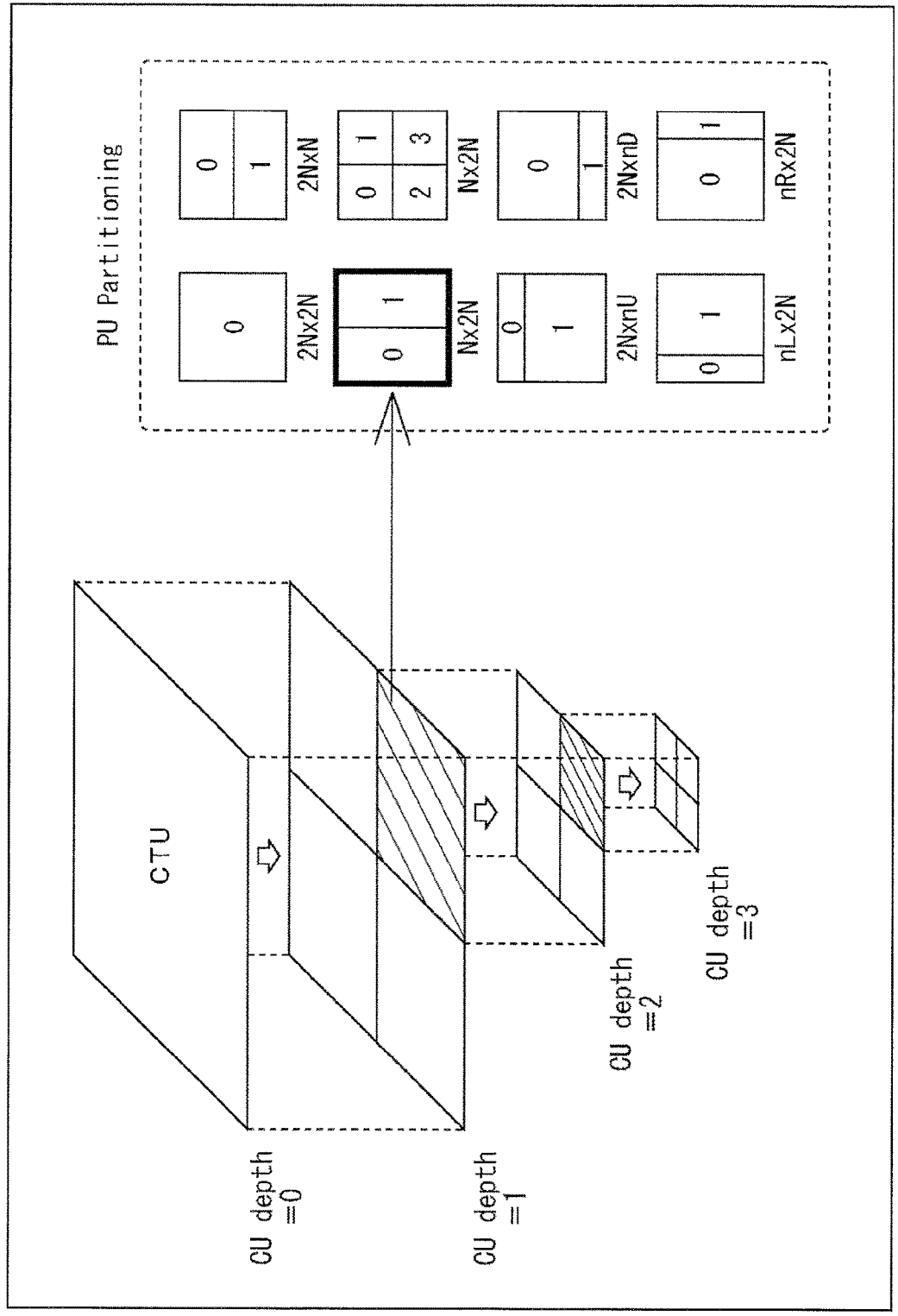
FIG. 10 is an explanatory diagram for describing setting of PU to the CU illustrated in FIG. 9.

PU is a processing unit of a prediction process including intra prediction and inter prediction. PU is formed by partitioning CU in one of the several partition patterns. FIG. 10 is an explanatory diagram for describing the setting of PU to the CU illustrated in FIG. 9. The right of FIG. 2 illustrates eight types of partition patterns: 2N×2N, 2N×N, N×2N, N×N, 2N×nU, 2N×nD, nL×2N, and nR×2N. Of these partition patterns, it is possible to select two types of partition patterns in intra prediction: 2N×2N and N×N (N×N is selectable only in the SCU). In contrast, in a case where asymmetrical motion partition is enabled, all the eight types of partition patterns are selectable in inter prediction.

<Setting of TU to CU>

Figure 11:
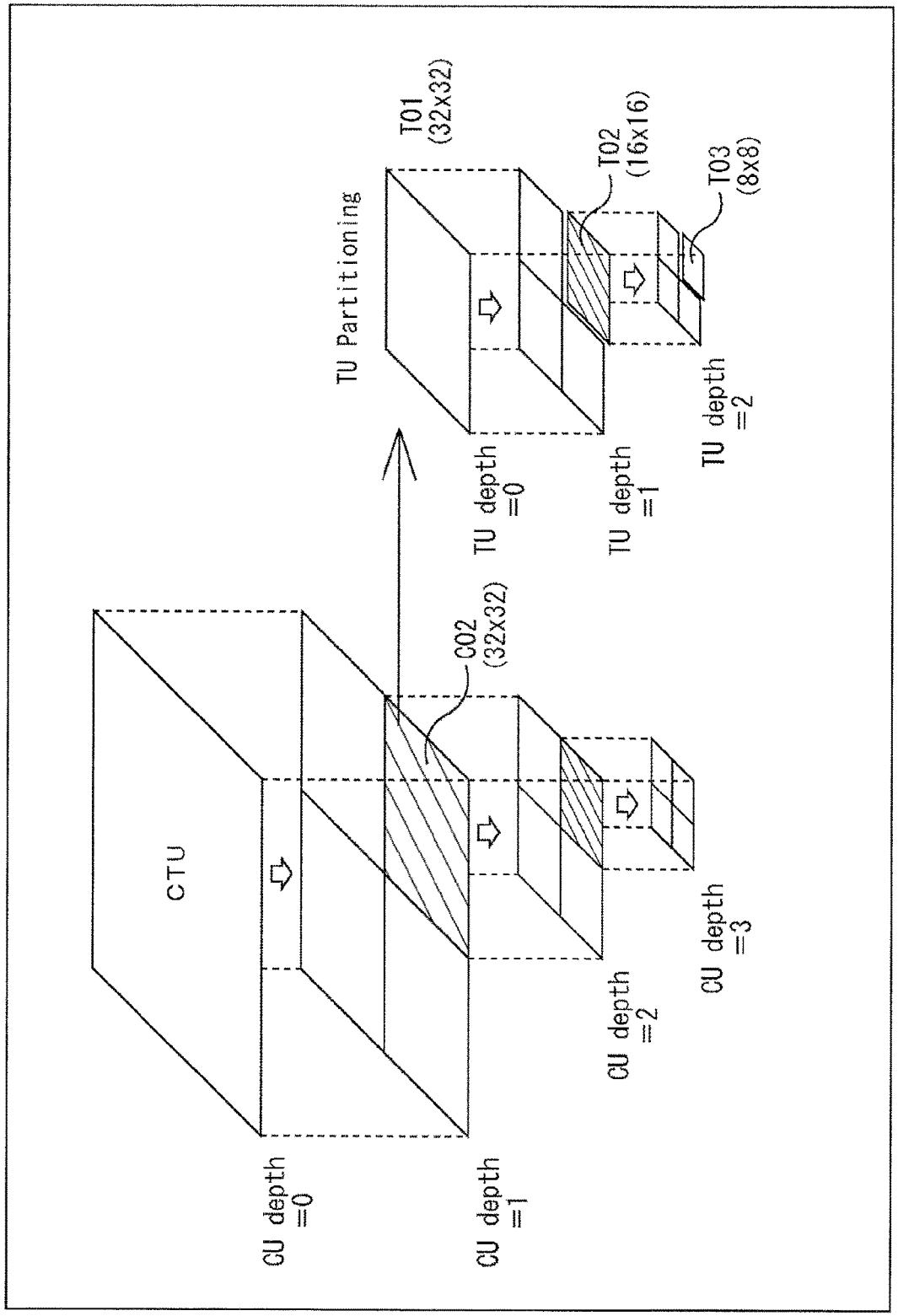
FIG. 11 is an explanatory diagram for describing setting of TU to the CU illustrated in FIG. 9.

TU is a processing unit of an orthogonal transformation process. TU is formed by partitioning CU (each PU in CU for intra-CU) up to certain depth. FIG. 11 is an explanatory diagram for describing the setting of TU to the CU illustrated in FIG. 10. The right of FIG. 11 illustrates one or more TUs that may be set in C02. For example, T01 that is TU has a size of 32×32 pixels, and the TU partitioning depth thereof is equal to zero. T02 that is TU has a size of 16×16 pixels, and the TU partitioning depth thereof is equal to 1. T03 that is TU has a size of 8×8 pixels, and the TU partitioning depth thereof is equal to 2.

What block partition is performed to set a block such as the CU, PU, or TU described above in an image is typically determined on the basis of a comparison of the costs influencing the coding efficiency. The encoder, for example, compares the costs between one CU of 2M×2M pixels, and four CUs of M×M pixels. If the coding efficiency is higher when the four CUs of M×M pixels are set, the encoder determines that the CU of 2M×2M pixels is partitioned into the four CUs of M×M pixels.

<Scan Order of CU and PU>

Figure 12:
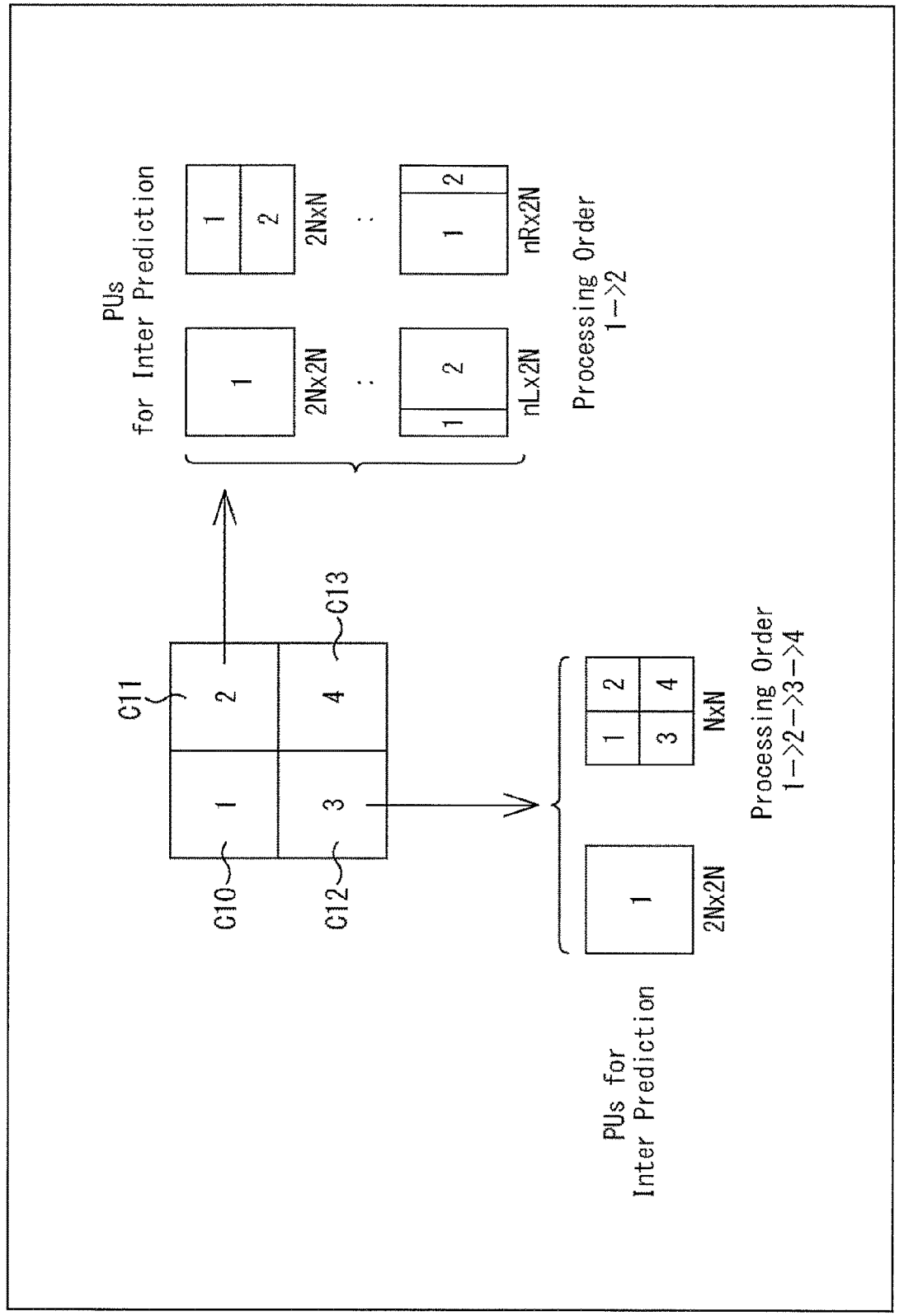
FIG. 12 is an explanatory diagram for describing scan order of CU/PU.

When an image is encoded, CTBs (or LCUs) set in a lattice form in an image (or a slice or a tile) are scanned in a raster scan order. In one CTB, CUs are scanned to trace the quadtree from left to right and from top to bottom. When the current block is processed, information of upper and left adjacent blocks is used as input information. FIG. 12 is an explanatory diagram for describing the scan order of CU and PU. The upper left portion of FIG. 12 illustrates C10, C11, C12, and C13 as four CUs that may be included in one CTB. The number in the frame of each CU indicates a place in the processing order. The encoding process is executed in the order of C10 as the upper left CU, C11 as the upper right CU, C12 as the lower left CU, and C13 as the lower right CU. The right of FIG. 12 illustrates one or more PUs for inter prediction that may be set in C11 that is CU. The lower portion of FIG. 12 illustrates one or more PUs for intra prediction that may be set in C12 that is CU. As indicated by the numbers in the frames of these PUs, the PUs are also scanned from left to right and from top to bottom.

The following sometime makes description by using a "block" (not the block in the processing unit) as a partial region of an image (picture) or a processing unit. The "block" in this case indicates any partial region within a picture, and the size, shape, characteristics, and the like thereof are not limited. That is, the "block" in this case, for example, includes any partial region (processing unit) such as TB, TU, PB, PU, SCU, CU, LCU (CTB), subblock, macro-block, tile, or slice.

<Shapes of CU, PU, and TU>

It should be noted that the encoding/decoding of image data has any block structure, and is not limited to the example described above. For example, the following QTBT (Quad tree plus binary tree) structure may be applied.

Figure 13:
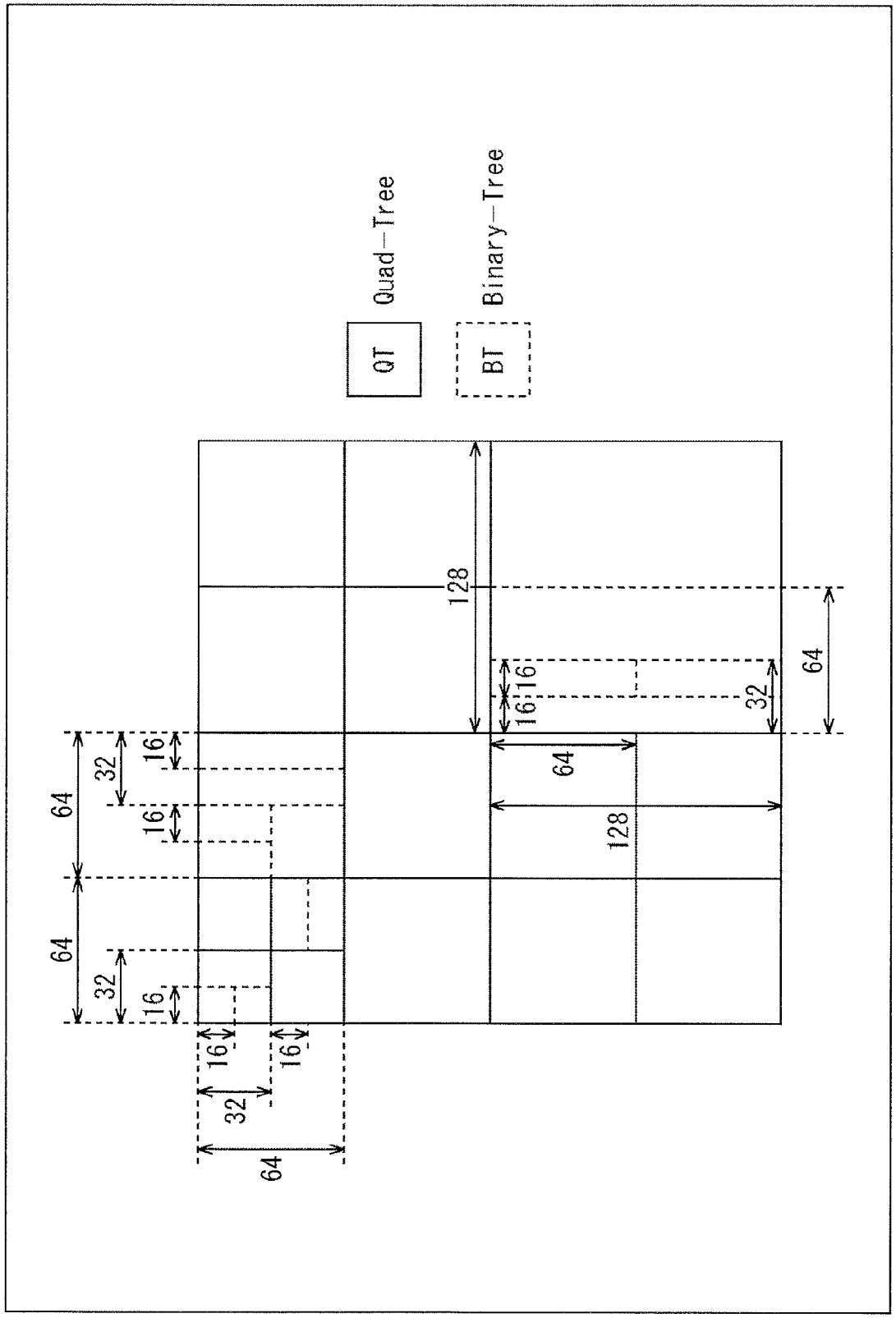
FIG. 13 is a diagram describing shapes of CU, PU, and TU.

For example, the CU, PU, and TU (Transform Unit) illustrated in FIG. 13 are the CU, PU, and TU of the QTBT described in JVET-00024, "EE2.1: Quadtree plus binary tree structure integration with JEM tools." Specifically, it is possible in block partition of CU to partition one block into not only four (=2×2) subblocks, but also two (=1×2 or 2×1) subblocks. In other words, block partition of CU is performed by recursively repeating partitioning of one block into four or two subblocks, and as a result, a tree structure in a quadtree (Quad-Tree) shape or a binary tree (Binary-Tree) shape in a horizontal direction or a vertical direction is formed.

As a result, CU may have not only a square shape, but also a rectangular shape. For example, in a case where the size of LCU (Largest Coding Unit) is 128×128, the size of CU (size w in the horizontal direction x size h in the vertical direction) may be not only square size such as 128×128, 64×64, 32×32, 16×16, 8×8, or 4×4, but also rectangular size such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, or 4×8 as illustrated in FIG. 13. It should be noted that the same as CU applies to PU and TU.

Furthermore, TU includes a luma (Y) transformation block and a chroma (Cb/Cr) transformation block. In a case where the color format is 4:2:0 (e.g., YUV420), the proportion of the chroma picture size to the luma picture size with respect to both vertical width and horizontal width is ½. Thus, if the size of a luma transformation block is 8×4, the size of the corresponding chroma transformation block is 4×2. In addition, in a case where the color format is 4:2:2 (e.g., YUV422), the proportion of the chroma picture size to the luma picture size with respect to the vertical width is ½, and the proportion of the chroma picture size to the luma picture size with respect to the horizontal width is 1. Thus, if the size of a luma transformation block is 8×4, the size of the corresponding chroma transformation block is 8×2. In addition, in a case where the color format is 4:4:4 (e.g., YUV444), the proportion of the chroma picture size to the luma picture size with respect to the vertical width is 1, and the proportion of the chroma picture size to the luma picture size with respect to the horizontal width is 1. Thus, if the size of a luma transformation block is 8×4, the size of the corresponding chroma transformation block is 8×4.

It should be noted that, with respect to I-slices, encoding may be performed as different CUs between luma (Y) and chroma (Cb/Cr). It is possible in this case to adopt different CU partition structures between luma and chroma, and an effect of increasing the coding efficiency of I-slices is exhibited. Although the following describes that information of luma and chroma is included in the same CU for the sake of convenience, this is not limitative.

FIG. 14 illustrates an example of the semantics of information regarding these blocks in JEM. The present technology is also applicable to the image encoding and image decoding of the QTBT structure as described above.

2. First Embodiment

<Image Decoding Device>

Figure 15:
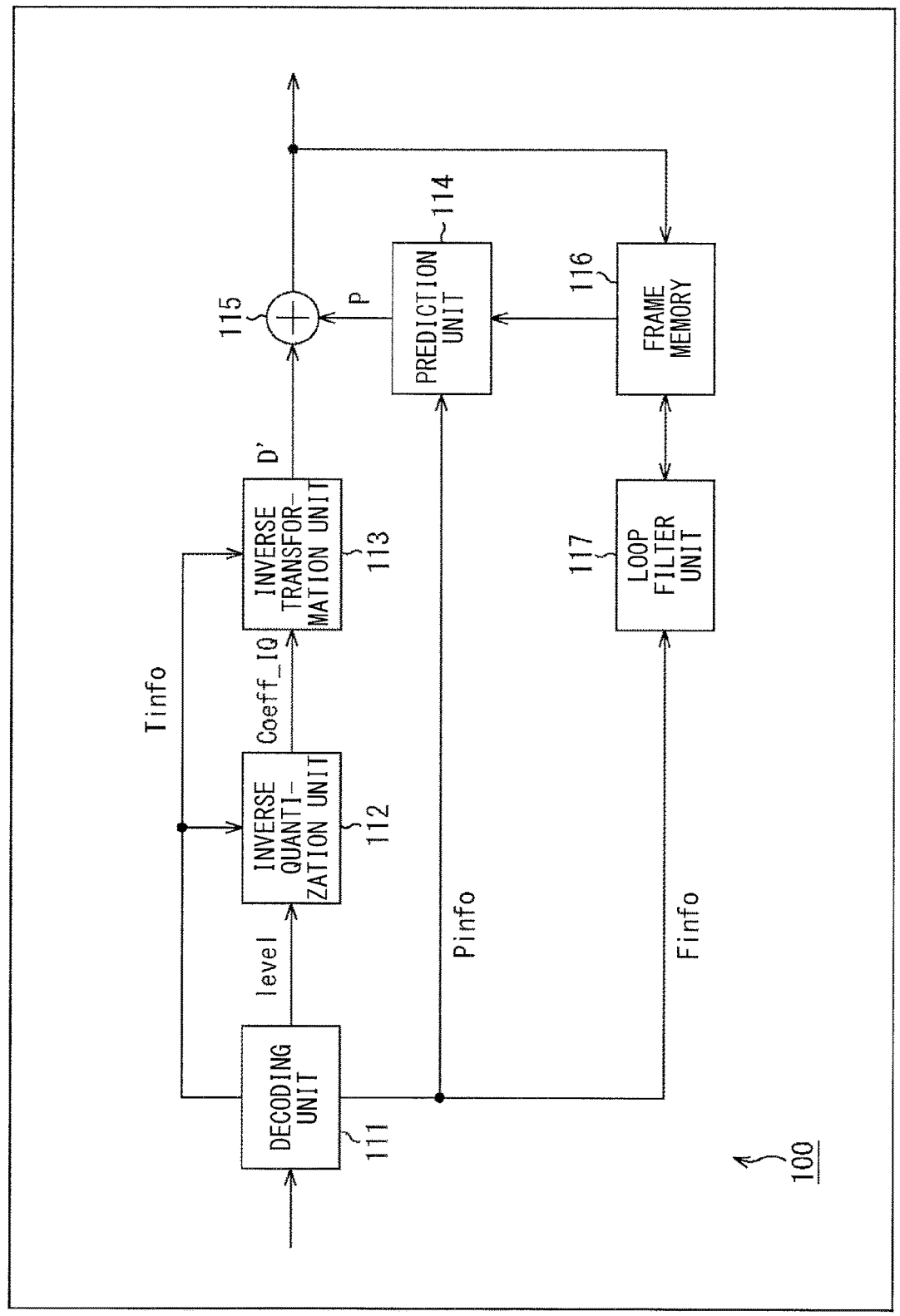
FIG. 15 is a block diagram illustrating an example of a main component of an image decoding device.

FIG. 15 is a block diagram illustrating an example of a configuration of an image decoding device that is a mode of the image processing device to which the present technology is applied. The image decoding device 100 illustrated in FIG. 15 is a device that decodes encoded data obtained by encoding a prediction residual of an image and a prediction image as in AVC or HEVC. The image decoding device 100 implements, for example, the technology proposed to HEVC or the technology proposed to JVET (Joint Video Exploration Team).

In FIG. 15, the image decoding device 100 includes a decoding unit 111, an inverse quantization unit 112, an inverse transformation unit 113, a prediction unit 114, a calculation unit 115, a frame memory 116, and a loop filter unit 117. The image decoding device 100 is a device for generating a moving image #2 by decoding inputted encoded data #1 (bitstream).

<Decoding Unit>

The decoding unit 111 performs a process for decoding an image. For example, the decoding unit 111 is configured to use the encoded data #1 as input, perform variable length decoding on the syntax value of each of syntax elements from a bit string of the encoded data #1 in accordance with the definition of the syntax table, and derive a parameter.

A parameter derived from a syntax element and the syntax value of the syntax element includes, for example, information such as header information Hinfo, prediction mode information Pinfo, transformation information Tinfo, residual information Rinfo, and filter information Finfo. These kinds of information is described below.

<Header Information Hinfo>

The header information Hinfo includes, for example, header information such as VPS (Video Parameter Set)/SPS (Sequence Parameter Set)/PPS (Picture Parameter Set)/SH (slice header). The header information Hinfo includes, for example, information for defining image size (horizontal width PicWidth and vertical width PicHeight), bit depth (luma bitDepthY and chroma bitDepthC), a chroma array type ChromaArrayType, a maximum value MaxCUSize/minimum value MinCUSize of CU size, maximum depth MaxQTDepth/minimum depth MinQTDepth of quad-tree partition (also referred to as Quad-tree partition), maximum depth MaxBTDepth/minimum depth MinBTDepth of binary-tree partition (Binary-tree partition), a maximum value MaxTSSize (also referred to as maximum transformation skip block size) of a transformation skip block, an on/off flag (also referred to as enabled flag) of each encoding tool, and the like.

Examples of the on/off flag of an encoding tool included in the header information Hinfo include on/off flags for transformation and quantization processes described below. It should be noted that the on/off flag of the encoding tool is also interpretable as a flag indicating whether or not syntax for the encoding tool is present in encoded data. In addition, in a case where the value of the on/off flag is 1 (true), it indicates that the encoding tool is available, and in a case where the value of the on/off flag is 0 (false), it indicates that the encoding tool is unavailable. It should be noted that the interpretation of the value of the flag may be reversed.

cross-component prediction enabled flag (ccp_enabled_flag): flag information indicating whether or not the cross-component prediction (also referred to as CCP (Cross-Component Prediction) or CC prediction) is available. For example, in a case where this flag information is "1" (true), it indicates availability. In a case of "0" (false), it indicates unavailability.

It should be noted that this CCP is also referred to as cross-component linear prediction (CCLM or CCLMP).

<Prediction Mode Information Pinfo>

The prediction mode information Pinfo includes, for example, information such as size information PBSize (prediction block size), intra prediction mode information IPinfo, and motion prediction information MVinfo of PB (prediction block) to be processed.

The intra prediction mode information IPinfo includes, for example, prev_intra_luma_pred_flag, mpm_idx, rem_intra_pred_mode, luma intra prediction mode IntraPredModeY derived from the syntax thereof, and the like in JCTVC-W1005, 7.3.8.5 Coding Unit syntax.

In addition, the intra prediction mode information IPinfo includes, for example, a cross-component prediction flag (ccp_flag (cclmp_flag)), a multi-class linear prediction mode flag (mclm_flag), a chroma sample location type identifier (chroma_sample_loc_type_idx), a chroma MPM identifier (chroma_mpm_idx), a luma intra prediction mode (IntraPredModeC) derived from the syntax thereof, and the like.

The cross-component prediction flag (ccp_flag (cclmp_flag)) is flag information indicating whether or not the cross-component linear prediction is applied. For example, when ccp_flag=1, it indicates that the cross-component prediction is applied. When ccp_flag=0, it indicates that the cross-component prediction is not applied.

The multi-class linear prediction mode flag (mclm_flag) is information (linear prediction mode information) regarding a mode of linear prediction. More specifically, the multi-class linear prediction mode flag (mclm_flag) is flag information indicating whether or not the multi-class linear prediction mode is set. For example, in a case of "0," it indicates a 1-class mode (single-class mode) (e.g., CCLMP). In a case of "1," it indicates a 2-class mode (multi-class mode) (e.g., MCLMP).

The chroma sample location type identifier (chroma_sample_loc_type_idx) is an identifier for identifying the type (also referred to as chroma sample location type) of the pixel location of a chroma component. For example, in a case where the chroma array type (ChromaArrayType) that is information regarding a color format indicates the 420 format, the chroma sample location type identifier is allocated in the following manner.

> chroma_sample_loc_type_idx==0:Type2
>
> chroma_sample_loc_type_idx==1:Type3
>
> chroma_sample_loc_type_idx==2:Type0
>
> chroma_sample_loc_type_idx==3:Type1

It should be noted that this chroma sample location type identifier (chroma_sample_loc_type_idx) is transmitted (stored in) as information (chroma_sample_loc_info( ))

regarding the pixel location of a chroma component, for example, like the syntax illustrated in FIG. 16.

The chroma MPM identifier (chroma_mpm_idx) is an identifier indicating which prediction mode candidate in a chroma intra prediction mode candidate list (intraPredModeCandListC) is designated as the chroma intra prediction mode.

The motion prediction information MVinfo includes, for example, information such as merge_idx, merge_flag, inter_pred_idc, ref_idx_LX, mvp_1X_flag, X={0, 1}, and mvd (see, for example, JCTVC-W1005, 7.3.8.6 Prediction Unit Syntax).

Needless to say, the prediction mode information Pinfo may include any information, and information other than these kinds of information may be included.

<Transformation Information Tinfo>

The transformation information Tinfo includes, for example, the following information. Needless to say, the transformation information Tinfo may include any information, and information other than these kinds of information may be included.

Horizontal width size TBWidth and vertical width TBHeight (or logarithmic values log 2TBWidth and log 2TBHeight of TBWidth and TBHeight each having 2 as the base) of a transformation block to be processed.

transformation skip flag (ts_flag): flag indicating whether or not to skip (inverse) primary transformation and (inverse) secondary transformation.

scan identifier (scanIdx)

quantization parameter (qp)

quantization matrix (scaling_matrix (e.g., JCTVC-W1005, 7.3.4 Scaling list data syntax))

<Residual Information Rinfo>

The residual information Rinfo (see, for example, 7.3.8.11 Residual Coding syntax of JCTVC-W1005) includes, for example, the following syntax.

cbf (coded_block_flag): Residual data presence/absence flag last_sig_coeff_x_pos: last non-zero coefficient X coordinate last_sig_coeff_y_pos: last non-zero coefficient Y coordinate coded_sub_block_flag: subblock non-zero coefficient presence/absence flag sig_coeff_flag: non-zero coefficient presence/absence flag gr1_flag: flag (also referred to as GR1 flag) indicating whether the level of a non-zero coefficient is greater than 1 gr2_flag: flag (also referred to as GR2 flag) indicating whether the level of a non-zero coefficient is greater than 2 sign_flag: plus sign or minus sign (also referred to as sign) of a non-zero coefficient coeff_abs_level_remaining: remaining level (also referred to as non-zero coefficient remaining level) of a non-zero coefficient, etc.

<Filter Information Finfo>

The filter information Finfo includes, for example, control information regarding each filter process described below, and includes a picture to which each filter is applied, information for designating a region in a picture, filter On/Off control information in units of CUs, filter On/Off control information regarding boundaries of slices and tiles, and the like.

control information regarding deblocking filter (DBF)

control information regarding pixel adaptive offset (SAO)

control information regarding adaptive loop filter (ALF)

control information the other linear/non-linear filter

<Operation of Decoding Unit>

The decoding unit 111 derives the quantized transformation coefficient level level of each coefficient location in each transformation block with reference to the residual information Rinfo. In addition, the decoding unit 111 supplies the header information Hinfo, prediction mode information Pinfo, quantized transformation coefficient level level, transformation information Tinfo, and filter information Finfo resulting from the decoding to the respective blocks. The details are as follows.

The header information Hinfo is supplied to the inverse transformation unit 113, the inverse quantization unit 112, the prediction unit 114, and the loop filter unit 117.

The prediction mode information Pinfo is supplied to the prediction unit 114.

The quantized transformation coefficient level level is supplied to the inverse quantization unit 112.

The transformation information Tinfo is supplied to the inverse transformation unit 113 and the inverse quantization unit 112.

The filter information Finfo is supplied to the loop filter unit 117.

For example, the decoding unit 111 parses and decodes the information about the cross-component linear prediction included in the encoded data, and acquires the information. This information regarding the cross-component linear prediction may be any information as long as the information relates to the cross-component linear prediction. For example, control information for controlling a process related to the cross-component linear prediction may be included.

This control information regarding the cross-component linear prediction may be any control information as long as the control information relates to the cross-component linear prediction. For example, the above-described information such as the cross-component prediction enabled flag (ccp_enabled_flag), the cross-component prediction flag (ccp_flag (cclmp_flag)), the multi-class linear prediction mode flag (mclm_flag), the chroma array type (ChromaArrayType), and the chroma sample location type identifier (chroma_sample_loc_type_idx) may be included. Needless to say, information other than the information may be included.

The decoding unit 111 supplies the acquired information regarding the cross-component linear prediction to the prediction unit 114. This allows the prediction unit 114 to execute the process for the cross-component linear prediction on the basis of the information.

<Inverse Quantization Unit>

The inverse quantization unit 112 performs a process for inverse quantization. For example, the inverse quantization unit 112 is configured to use the transformation information Tinfo and quantized transformation coefficient level level supplied from the decoding unit 111 as input, scale (inversely quantize) the value of the quantized transformation coefficient level level on the basis of the transformation information Tinfo, and output an inversely quantized transformation coefficient Coeff_IQ to the inverse transformation unit 113.

<Inverse Transformation Unit>

The inverse transformation unit 113 performs a process for inverse transformation. For example, the inverse transformation unit 113 is configured to use the transformation coefficient Coeff_IQ and the transformation information Tinfo as input, apply inverse transformation to a transformation coefficient Coeff_IQ on the basis of transformation information Tinfo, derive a prediction residual D', and output the prediction residual D' to the calculation unit 115.

<Calculation Unit>

The calculation unit 115 performs a process for adding information regarding an image. For example, the calculation unit 115 is configured to use the prediction residual D' supplied from the inverse transformation unit 113 and the prediction image P supplied from the prediction unit 114 as input, add the prediction residual D' and the prediction image P (prediction signal) corresponding to the prediction residual D' together as in the following expression (12), derives a local decoded image $R_{local}$, and output the local decoded image $R_{local}$.

$$R_{local}=D'+P \qquad (12)$$

<Prediction Unit>

The prediction unit 114 performs a process for generating a prediction image. For example, the prediction unit 114 is configured to use the prediction mode information Pinfo as input, generate the prediction image P in a prediction method designated by the prediction mode information Pinfo by using, as a reference image, a filtered decoded image R' (or a decoded image R that has not yet been subjected to filtering) that is designated by the prediction mode information Pinfo and stored in the frame memory 116, and output the prediction image P to calculation unit 115.

<Loop Filter Unit>

The loop filter unit 117 performs a process for a loop filter process. For example, the loop filter unit 117 reads the decoded image R from the frame memory 116, and generates the filtered decoded image R' in the loop filter process designated by the filter information Finfo. In addition, the loop filter unit 117 supplies the filtered decoded image R' to the frame memory 116. It should be noted that the loop filter process performed by the loop filter unit 117 includes a deblocking filter (DBF (DeBlocking Filter)), a pixel adaptive offset (SAO (Sample Adaptive Offset)), an adaptive loop filter (ALF (Adaptive Loop Filter)), and the other linear/non-linear filters (such as a Wiener filter and a bilateral filter).

<Frame Memory>

The frame memory 116 performs a process for storing data regarding an image. For example, the frame memory 116 uses the local decoded image $R_{local}$ supplied from the calculation unit 115 as input, reconstructs the decoded image R in each picture unit, and stores the reconstructed decoded image R in the frame memory 116. The frame memory 116 reads the decoded image R from the buffer, and supplies the loop filter unit 117.

The frame memory 116 stores the decoded image R' that is supplied from the loop filter unit 117 and has been subjected to the loop filter process in the buffer in the frame memory 116. The frame memory 116 reads the decoded image R designated by the prediction mode information Pinfo of the prediction unit 114 or the filtered decoded image R' from the buffer as a reference image, and supplies the prediction unit 114. In addition, the frame memory 116 may store the header information Hinfo, prediction mode information Pinfo, transformation information Tinfo, filter information Finfo, and the like for generating the decoded image in the buffer inside the frame memory. The frame memory 116 is configured to perform the processes as described above.

That is, the decoding unit 111 to the calculation unit 115 serve as a decoding unit that decodes a chroma component of encoded data in which an image is encoded by using a prediction image generated by the prediction unit 114.

<Flow of Image Decoding Process>

Next, a process that is executed by the image decoding device 100 configured as described above is described. The image decoding device 100 executes an image decoding process, thereby performing a process for decoding encoded data in which, for example, data regarding an image supplied from an encoding side is encoded.

When the image decoding process is started, the decoding unit 111 decodes the inputted encoded data (bit stream), and acquires data regarding an image in step S101. This data regarding an image is quantized. That is, a quantization coefficient is acquired. In step S102, the inverse quantization unit 112 performs, on the quantization coefficient acquired in step S101, inverse quantization that is the inverse process of the quantization performed on the encoding side, and acquires the transformation coefficient Coeff_IQ.

In step S103, the inverse transformation unit 113 performs, on the transformation coefficient Coeff_IQ acquired in the process of step S102, an inverse transformation process that is the inverse process of the transformation process performed on the encoding side, and acquires the prediction residual D'. In step S104, the prediction unit 114 executes a prediction process, refers to the reference image stored in the frame memory 116, and generates the prediction image P in the prediction method designated by the encoding side.

In step S105, the calculation unit 115 adds the prediction residual D' acquired in the process of step S103 and the prediction image P acquired in the process of step S104 together as in expression (12) to derive the local decoded image $R_{local}$. The calculation unit 115 outputs this local decoded image $R_{local}$ as a decoded image.

In addition, in step S106, the frame memory 116 stores the local decoded image $R_{local}$ obtained in the process of step S105. In step S107, the loop filter unit 117 performs a predetermined filter process on the local decoded image stored in the frame memory 116. It should be noted that the filtered local decoded image is stored in the frame memory 116.

When the process of step S107 is finished, the image decoding process is finished <Flow of Decoding Process>

Figure 18:
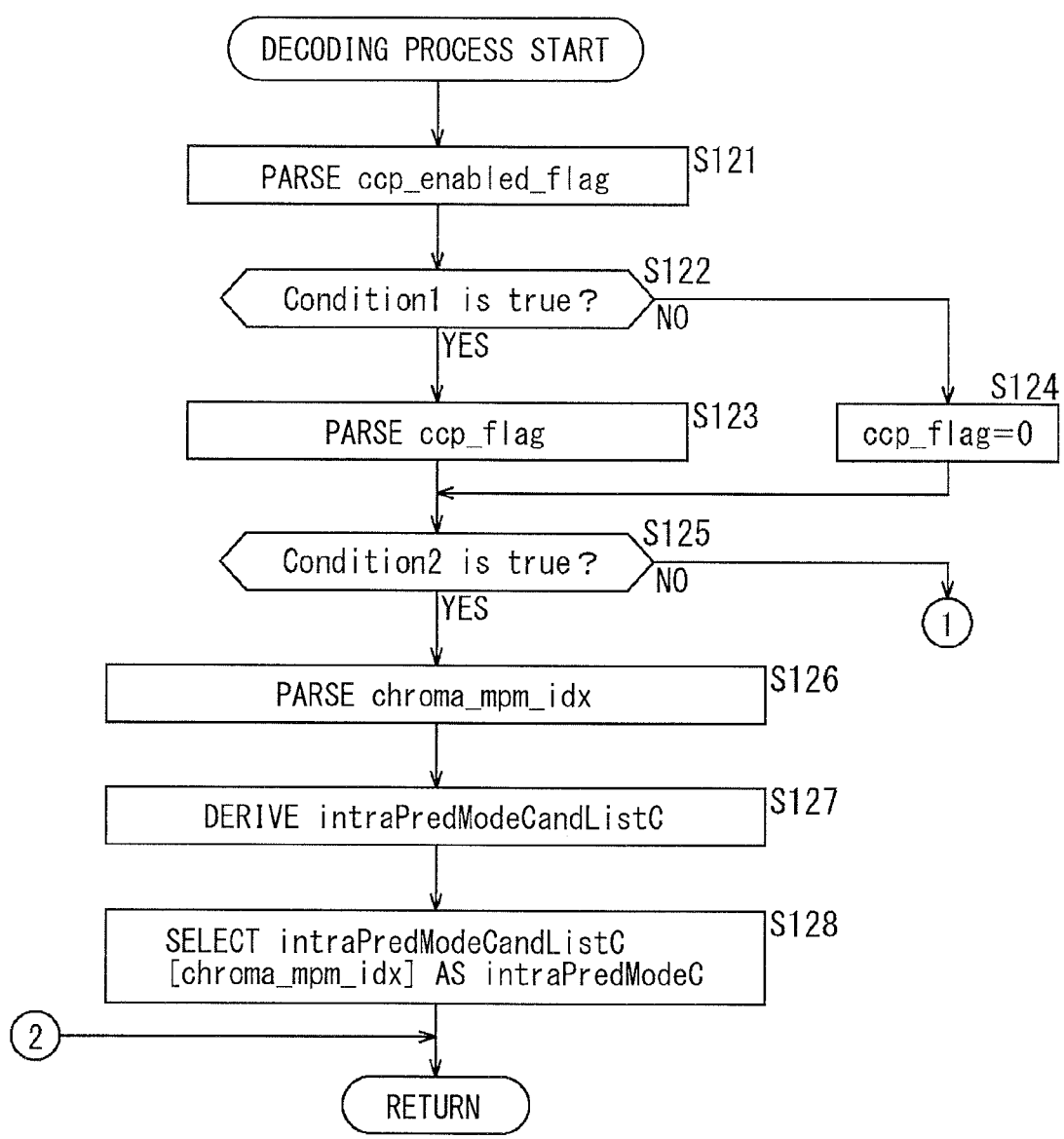
FIG. 18 is a flowchart describing an example of a flow of a decoding process.
Figure 19:
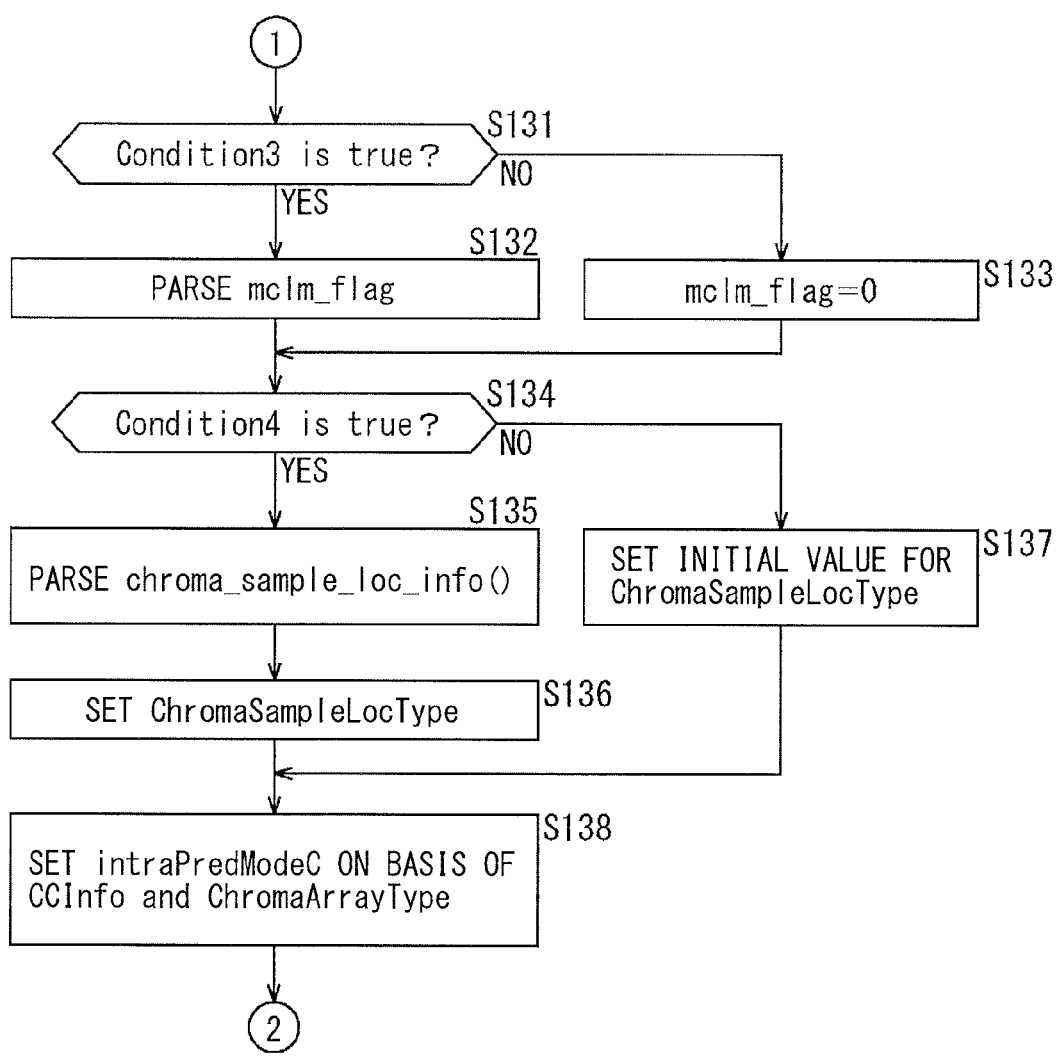
FIG. 19 is a flowchart describing an example of a flow of a decoding process subsequent to FIG. 18.

With reference to the flowcharts of FIGS. 18 and 19, examples of the flows of a decoding process of control information (cross-component prediction information CCInfo) and a chroma intra prediction mode IntraPredModeC of cross-component prediction, and a decoding process of the related syntax and the like (coding_unit ( )) are described. It should be noted that FIG. 20 is an example of the syntax table of coding_unit( ) corresponding to the flowcharts of FIGS. 18 and 19.

When the decoding process is started, the decoding unit 111 parses a cross-component prediction enabled flag ccp_enabled_flag from the encoded data and decodes the parsed cross-component prediction enabled flag ccp_enabled_flag (acquires the cross-component prediction enabled flag ccp_enabled_flag from the encoded data) in step S121.

In step S122, the decoding unit 111 determines whether or not condition 1 in the following expression (13) is satisfied.

Condition 1: ccp_enabled_flag==1 (13)

That is, the decoding unit 111 determines whether or not the cross-component prediction enabled flag ccp_enabled_flag is 1 (true). In a case where it is determined that expression (13) above is satisfied (in a case where it is determined that ccp_enabled_flag is 1 (true)), the process proceeds to step S123.

In step S123, the decoding unit 111 parses the cross-component prediction flag ccp_flag included in the encoded data and decodes the parsed the cross-component prediction flag ccp_flag (acquires the cross-component prediction flag ccp_flag from the encoded data). When the process of step S123 is finished, the process proceeds to step S125.

In addition, it is determined in step S122 that expression (13) above is not satisfied (in a case where it is determined that ccp_enabled_flag is 0 (false)), the process proceeds to step S124.

In step S124, the decoding unit 111 does not parse the cross-component prediction flag ccp_flag (does not acquire the cross-component prediction flag ccp_flag from the encoded data), but sets 0 (false) (ccp_flag=0). When the process of step S124 is finished, the process proceeds to step S125.

In step S125, the decoding unit 111 determines whether or not condition 2 in the following expression (14) is satisfied.

$$\text{Condition 2: } ccp\_\text{flag}==0 \qquad (14)$$

That is, the decoding unit 111 determines whether or not the cross-component prediction flag ccp_flag is 0 (false). In a case where it is determined that expression (14) above is satisfied (in a case where it is determined that ccp_flag is 0 (false)), the process proceeds to step S126.

It should be noted that expression (14) above may be exchanged with another determination formula as long as it is possible to acquire an equivalent result. For example, the following expression (15) may be used instead.

$$\text{Condition 2}a: !ccp\_\text{flag} \qquad (15)$$

In step S126, the decoding unit 111 parses a chroma MPM identifier chroma_mpm_idx included in the encoded data and decodes the parsed chroma MPM identifier chroma_mpm_idx (acquires the chroma MPM identifier chroma_mpm_idx from the encoded data).

In step S127, the decoding unit 111 refers to the decoded prediction mode information PInfo of the luma block (collocate luma block) in the collocate location of a chroma block of a coding unit to be processed and an adjacent luma (sub)block, and derives a chroma intra prediction mode candidate list intraPredModeCandListC applied to the chroma block of the coding unit to be processed.

Figure 21:
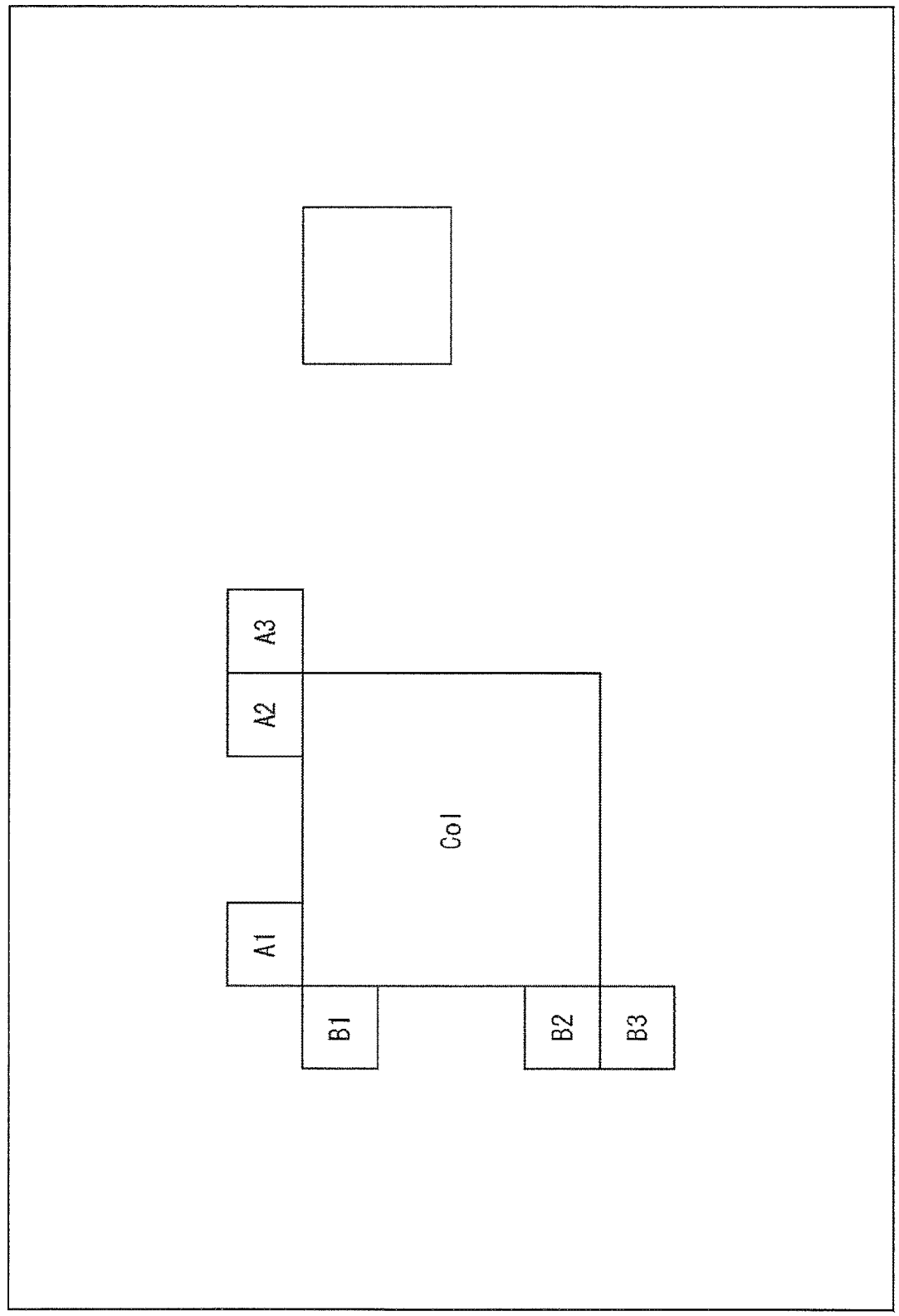
FIG. 21 is a diagram illustrating an example of a collocate block of a luma component.
Figure 22:
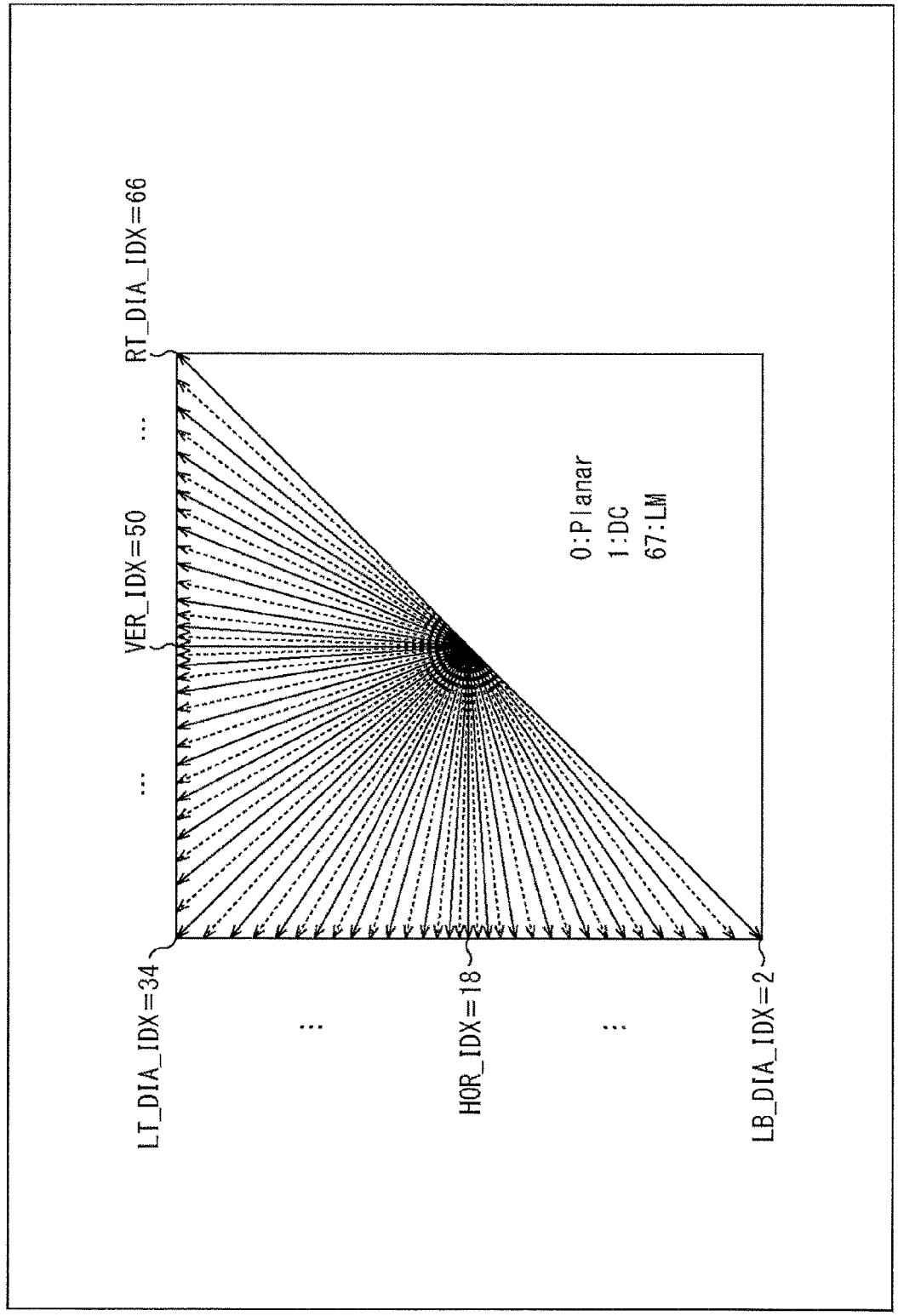
FIG. 22 is a diagram illustrating an example of a state of Angular prediction.

For example, it is sufficient if luma intra prediction modes that do not overlap among respective luma intra prediction modes intraPredModeL of the luma subblocks illustrated in FIG. 21 are added to the chroma intra prediction mode candidate list intraPredModeCandListC in order.

collocate luma block Col luma subblock A1 located at the left end of the upper side of a collocate luma block luma subblock A2 located at the right end of the upper side of the collocate luma block luma subblock A3 located on the upper right of the collocate luma block luma subblock B1 located at the upper end of the left side of the collocate luma block luma subblock B2 located at the lower end of the left side of the collocate luma block luma subblock B3 located on the lower left of the collocate luma block It should be noted that, in addition to the intra prediction modes of these Col, A1 to A3, and B1 to B3, the chroma intra prediction mode candidate list intraPredModeCandList C may include only the non-overlapping intra prediction modes after adding the main intra prediction modes (four intra prediction modes of horizontal prediction (HOR_IDX=18) and vertical prediction (VER_IDX=50), for example, among Planar prediction, DC prediction, and Angular prediction in FIG. 22).

In addition, the chroma intra prediction mode candidate list intraPredModeCandListC may be configured with reference to all the six luma (sub)blocks of these Col, A1 to A3, and B1 to B3, or the chroma intra prediction mode candidate list intraPredModeCandListC may be configured with reference to some blocks thereof.

In step S128, the decoding unit 111 selects a candidate intra prediction mode intraPredModeCandListC[chroma_mpm_idx] designated by the chroma MPM identifier chroma_mpm_idx from the chroma intra prediction mode candidate list intraPredModeCandListC as the chroma intra prediction mode intraPredModeC as in the following expression (16).

$$\text{intraPredModeC=intraPredCandListC[chroma\_mpm\_idx]} \qquad (16)$$

Figure 17:
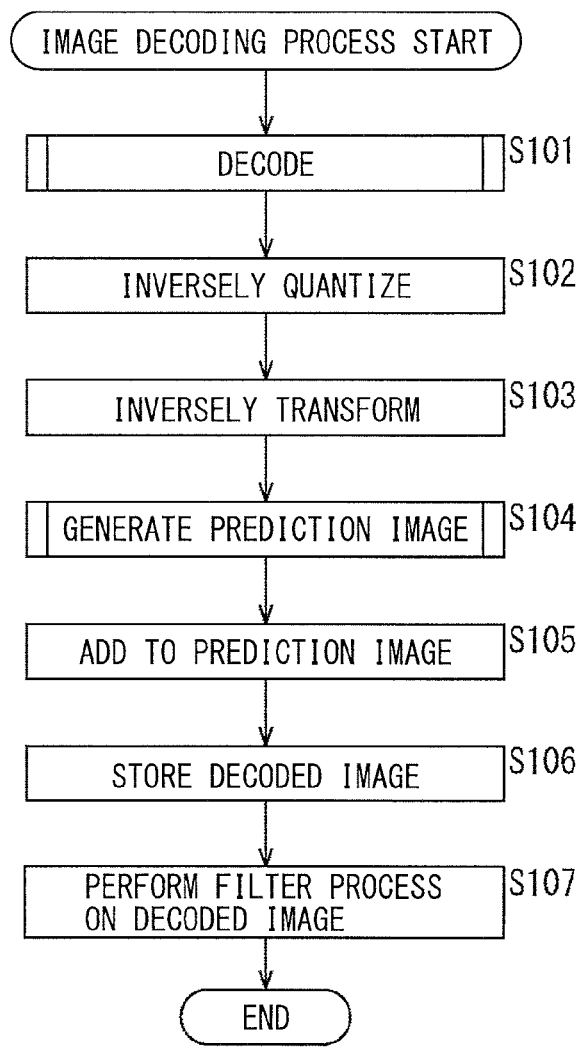
FIG. 17 is a flowchart describing an example of a flow of an image decoding process.

When the process of step S128 is finished, the decoding process is finished and the process returns to FIG. 17.

In addition, in a case where it is determined in step S125 of FIG. 18 that expression (14) above is not satisfied (in a case where it is determined that ccp_flag is 1 (true)), the process proceeds to step S131 of FIG. 19.

In step S131, the decoding unit 111 determines whether or not condition 3 in the following expression (17) is satisfied.

$$\text{Condition 3: } (widthC*heightC>=MCLM\text{MinBlkSize}) \\ \&\&(widthC*heightC<=MCLM\text{MaxBlkSize}) \qquad (17)$$

That is, the decoding unit 111 determines whether or not the size (widthC*heightC) of a chroma encoded block is greater than or equal to the MCLM minimum block size MCLMMinBlkSize and less than or equal to the MCLM maximum block size MCLMMaxBlkSize.

It should be noted that a portion of expression (17) above for comparing the size of the chroma block and the threshold may be replaced with the logarithmic expression in the following expression (18).

$$\text{Condition3}a: (\log 2CbWidthC+\log 2CbHeightC>=\log 2MCLM\text{MinBlkSize})\&\&(\log 2CbWidthC+\log 2CbHeightC>=\log 2MCLM\text{MaxBlkSize}) \qquad (18)$$

Here, the value of log 2MCLMMinBlkSize is, for example, 4. The value of log 2MCLMMinBlkSize is not limited thereto. For example, the value of log 2MCLMMinBlkSize may be set with a parameter for defining log 2MCLMMinBlkSize that is reported in the header information. In addition, the value of log 2MCLMMaxBlkSize is, for example, 32. The value of log 2MCLMMinBlkSize is not limited thereto. For example, the value of log 2MCLMMaxBlkSize may be set with a parameter for defining log 2MCLMMaxBlkSize that is reported in the header information.

Controllability of the minimum block size MCLMMinBlkSize and the MCLM maximum block size MCLMMaxBlkSize in the header information offers the following effects.

It is possible to omit the decoding (encoding) of syntax related to an MCLM mode in block size in which the MCLM mode has no effects. That is, it is possible to improve the coding efficiency.

It is possible to omit the execution of the MCLM mode, and it is thus possible to reduce the amount of processes.

In a case where it is determined that expression (17) is satisfied (in a case where it is determined that the size (widthC*heightC) of the chroma encoded block is greater than or equal to the MCLM minimum block size MCLM-MinBlkSize and less than or equal to the MCLM maximum block size MCLMMaxBlkSize), the process proceeds to step S132.

In step S132, the decoding unit 111 parses a multi-class linear prediction mode flag mclm_flag included in the encoded data and decodes the parsed multi-class linear prediction mode flag mclm_flag (acquires the multi-class linear prediction mode flag mclm_flag from the encoded data). When the process of step S132 is finished, the process proceeds to step S134.

In addition, in a case where it is determined in step S131 that expression (17) is not satisfied (in a case where it is determined that the size (widthC*heightC) of the chroma encoded block is less than the MCLM minimum block size MCLMMinBlkSize or greater than the MCLM maximum block size MCLMMaxBlkSize), the process proceeds to step S133.

In step S133, the decoding unit 111 does not parse the multi-class linear prediction mode flag mclm_flag (does not acquire the multi-class linear prediction mode flag mclm_flag from the encoded data), but sets 0 (false) (mclm_flag=0). When the process of step S133 is finished, the process proceeds to step S134.

In step S134, the decoding unit 111 determines whether or not condition 4 in the following expression (19) is satisfied.

$$\text{Condition 4: (ChromaArrayType=CHROMA\_420)}\|$$
$$\text{(ChromaArrayType=CHROMA\_422)} \quad (19)$$

That is, the decoding unit 111 determines whether or not the chroma array type ChromaArrayType is CHROMA_420 or CHROMA_422.

In a case where it is determined that expression (19) is satisfied (in a case where the chroma array type ChromaArrayType is CHROMA_420 or CHROMA_422), the process proceeds to step S135.

In step S135, the decoding unit 111 parses chroma sample location information chroma_sample_loc_info( ) included in the encoded data in accordance with the definition of the syntax table, and decodes the parsed chroma sample location information chroma_sample_loc_info( ) (acquires the chroma sample location information chroma_sample_loc_info( ) from the encoded data).

For example, the decoding unit 111 decodes a bin sequence bin of chroma sample location type identifier information chroma_sample_loc_type_idx from the encoded data in accordance with the definition of the syntax table illustrated in FIG. 16. Further, the bin sequence is inversely binarized to offer the value of the chroma sample location type identifier information chroma_sample_loc_type_idx.

The chroma sample location type identifier information chroma_sample_loc_type_idx is an identifier indicating a chroma sample location type (ChromaSampleLocType) determined for each chroma array type ChromaArrayType. FIG. 23 illustrates an example of a table of the relationship of the chroma sample location types ChromaSampelLocType associated with the chroma array types ChromaArrayType and the chroma sample location type identifier information chroma_sample_loc_type_idx.

In step S136, the decoding unit 111 sets a chroma sample location type ChromaSampleLocType on the basis of the chroma array type ChromaArrayType and the chroma sample location type identifier information chroma_sample_loc_type_idx, for example, with reference to FIG. 24.

When the process of step S136 is finished, the process proceeds to step S138. In addition, in a case where it is determined in step S134 that expression (19) above is satisfied (in a case where it is determined that the chroma array type ChromaArrayType is not CHROMA_420 or CHROMA_422), the process proceeds to step S137.

In step S137, the decoding unit 111 does not parse the chroma sample location type ChromaArrayType, but sets a predetermined type (DefaultType). This predetermined type DefaultType is any type, but, for example, "Type2" is desirable in which a chroma sample location agrees with a luma sample location. When the process of step S137 is finished, the process proceeds to step S138.

In step S138, the decoding unit 111 sets the chroma intra prediction mode intraPredModeC on the basis of the decoded cross-component prediction information CCInfo (ccp_flag, mclm_flag, and ChromaSampleLocType) and the chroma array type ChromaArrayType with reference to FIG. 24.

It should be noted that the association with the chroma intra prediction mode intraPredModeC from the cross-component prediction information CCInfo and the chroma array type ChromaArrayType is not limited to the example of FIG. 24. For example, allocation may be performed with numbers put in order as in the example illustrated in FIG. 25.

When the process of step S138 is finished, the decoding process is finished and the process returns to FIG. 17.

It should be noted that the chroma intra prediction mode in a variable length code decoding unit 21 and the decoding process for the cross-component prediction information have been described, but these may have the order of the processes of the respective steps changed or have the contents of the processes changed within a practicable range.

This causes the decoding unit 111 to decode the chroma sample location information indicating the sample location of the chroma component for a sample of a luma component as a portion of the cross-component prediction information CCInfo.

Thus, it is possible in a Luma/Chroma prediction section 141 described below to select a downsampling filter that reduces a phase shift between a chroma component and a luma component, on the basis of the chroma array type and the chroma sample location information. This allows for cross-component prediction with the phase shift reduced, making it possible to suppress reduction in the coding efficiency.

<Another Example of Chroma Sample Location Information>

The example of the syntax of the chroma sample location information chroma_sample_loc_info( ) has been described with reference to FIG. 16, but the syntax of the chroma sample location information chroma_sample_loc_info( ) is not limited to this example. For example, the configuration as illustrated in FIG. 26 may be adopted. That is, the chroma sample location type may have an initial value (default_chroma_sample_loc_type), and only in a case where the chroma sample location type has a value other than the initial value, the chroma sample location type identifier information chroma_sample_loc_type_idx may be transmitted.

In step S135 (FIG. 19), the decoding unit 111 decodes the following syntax included in the encoded data in accordance with the definition of the syntax table illustrated in FIG. 26.

default chroma sample location type flag default_chroma_sample_loc_type_flag chroma sample location type identifier information chroma_sample_loc_type_idx That is, the decoding unit 111 parses the default chroma sample location type flag default_chroma_sample_loc_type_flag included in the encoded data and decodes the parsed default chroma sample location type flag default_chroma_sample_loc_type_flag (acquires the default chroma sample location type flag default_chroma_sample_loc_type flag from the encoded data).

In a case where that default chroma sample location type flag default_chroma_sample_loc_type_flag is then false (0) (i.e., in a case where the type of the pixel location of the chroma component does not have the initial value), the bin sequence bin of the chroma sample location type identifier information chroma_sample_loc_type_idx included in the encoded data is further parsed and decoded (the bin sequence bin of the chroma sample location type identifier information chroma_sample_loc_type_idx is acquired from the encoded data). Further, the bin sequence is inversely binarized to offer the value of the chroma sample location type identifier information chroma_sample_loc_type_idx.

Here, the definition of each syntax is as follows.

The default chroma sample location type flag default_chroma_sample_loc_type flag is a flag indicating whether or not the chroma sample location type is a default type (initial value). For example, in a case where this flag is "0," it is indicated that the chroma sample location type is not the default type. In addition, for example, in a case where this flag is "1," it is indicated that the chroma sample location type is the default type. For example, the default chroma sample location type may be Type2.

The chroma sample location type identifier information chroma_sample_loc_type_idx is an identifier indicating a chroma sample location type ChromaSampleLocType determined for each chroma array type ChromaArrayType excluding the default type.

FIG. 27 illustrates an example of a table of the relationship of chroma sample location types associated with ChromaSampelLocType, the chroma array type ChromaArrayType, the default chroma sample location type flag default_chroma_sample_loc_type flag, and the chroma sample location type identifier information chroma_sample_loc_type_idx.

In step S136, the decoding unit 111 sets the chroma sample location type ChromaSampleLocType on the basis of the chroma array type ChromaArrayType, the default chroma sample location type flag default_chroma_sample_loc_type flag, and the chroma sample location type identifier information chroma_sample_loc_type_idx, for example, with reference to FIG. 27.

Configuring the syntax table of the chroma sample location information chroma_sample_loc_type( ) as illustrated in FIG. 26 allows a predetermined type (e.g., Type2) frequently used as the chroma sample location type to be decoded/encoded with one bin. It is thus possible to decode/encode the chroma sample location information with a smaller code amount than in the syntax table configured in a case of FIG. 16. That is, it is possible to suppress reduction in coding efficiency.

<Storage Place of Chroma Sample Location Information>

In the flowcharts of FIGS. 18 and 19, and the syntax table of FIG. 20, a configuration example is illustrated in which the chroma sample location information chroma_sample_loc_info( ) is decoded for each coding unit. However, the storage place of the chroma sample location information chroma_sample_loc_info( ) is not limited thereto.

Basically, the chroma sample location type is determined for each sequence, and the chroma sample location information chroma_sample_loc_info( ) may be decoded in the header information (VPS/SPS/PPS/SH/CTU) higher than the coding unit as illustrated in A of FIG. 28. That is, the chroma sample location information chroma_sample_loc_info( ) may be stored in the header information (VPS/SPS/PPS/SH/CTU) higher than the coding unit.

In that case, the other syntax related to the cross-component linear prediction may also be decoded in the header information of the coding unit as illustrated in B of FIG. 28. That is, the other syntax related to the cross-component linear prediction may be stored in the header information of the coding unit.

This makes it possible to reduce the code amount of the chroma sample location information chroma_sample_loc_info( ) for each coding unit. That is, it is possible to suppress reduction in coding efficiency.

<Prediction Unit>

Figure 29:
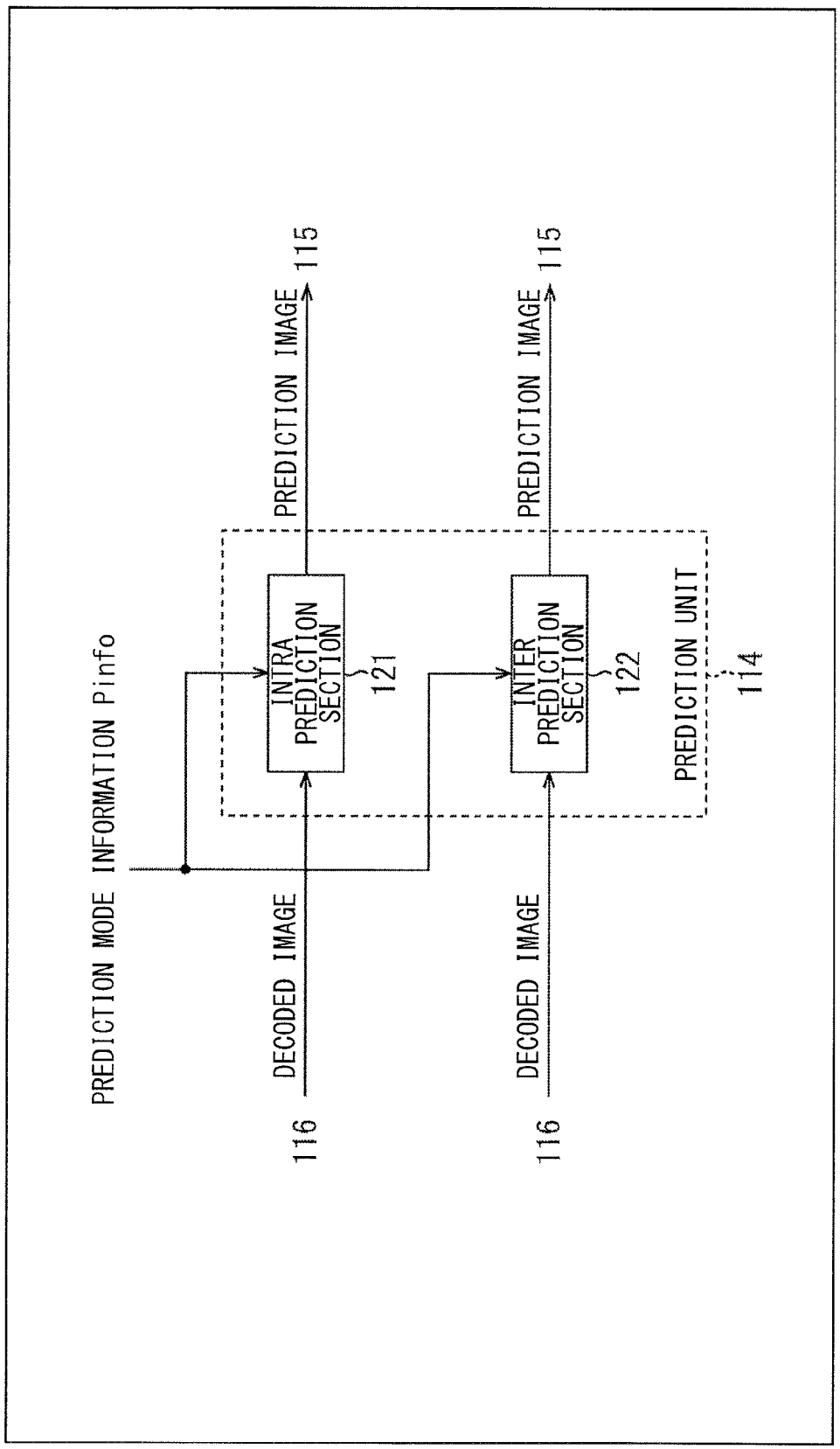
FIG. 29 is a block diagram illustrating an example of a main component of a prediction unit.

FIG. 29 is a block diagram illustrating an example of main components of the prediction unit 114 of the image decoding device 100. As illustrated in FIG. 29, the prediction unit 114 includes an intra prediction section 121 and an inter prediction section 122.

The intra prediction section 121 performs a process for intra prediction. For example, the intra prediction section 121 acquires a decoded image from the frame memory 116 as a reference image, uses the decoded image to perform intra prediction in the intra prediction mode (i.e., optimal prediction mode adopted by the encoding side) designated by the prediction mode information Pinfo, and generates a prediction image. The intra prediction section 121 supplies the generated prediction image to the calculation unit 115.

The inter prediction section 122 performs a process for inter prediction. For example, the inter prediction section 122 acquires a decoded image from the frame memory 116 as a reference image, uses the decoded image to perform inter prediction in the inter prediction mode (i.e., optimal prediction mode adopted by the encoding side) designated by the prediction mode information Pinfo, and generates a prediction image. The inter prediction section 122 supplies the generated prediction image to the calculation unit 115.

<Intra Prediction Section>

Figure 30:
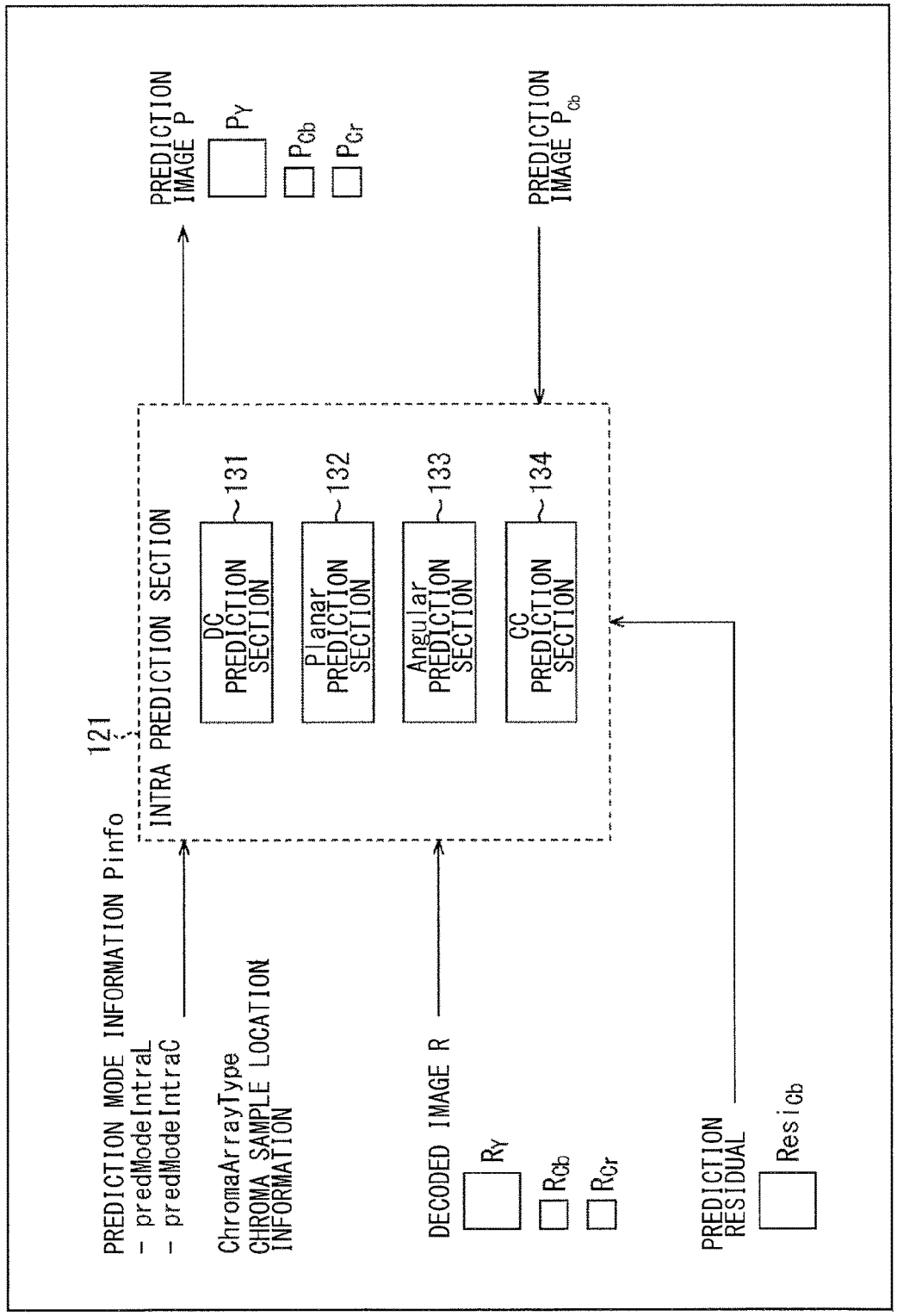
FIG. 30 is a block diagram illustrating an example of a main component of an intra prediction section.

FIG. 30 is a block diagram illustrating an example of main components of the intra prediction section 121. As illustrated in FIG. 30, the intra prediction section 121 includes a DC prediction section 131, a Planar prediction section 132, an Angular prediction section 133, and a CC prediction section 134.

The DC prediction section 131 performs a process for DC prediction. The Planar prediction section 132 performs a process for Planar prediction. The Angular prediction section 133 performs a process for Angular prediction. In addition, the CC prediction section 134 performs a process for cross-component linear prediction.

The intra prediction section 121 generates and outputs a prediction image $Pred_X$ (X=Y, Cb, or Cr) in accordance with the prediction mode information Pinfo, the chroma array type ChromaArrayType, and a decoded image $Rec_X$ (X=Y, Cb, or Cr) of each component X (X=Y, Cb, or Cr) of a frame to be processed that is supplied from the frame memory 116 in a prediction method corresponding to an intra prediction mode predModeIntraX (X=L or C) for each component.

In a case where the intra prediction mode predModeIntraX of the component X indicates DC prediction, the DC prediction section 131 generates a DC prediction image with reference to the decoded image $Rec_X$ of the component X, and outputs the generated DC prediction image as the prediction image $Pred_X$.

In a case where the intra prediction mode predModeIntraX of the component X indicates Planar prediction, the Planar prediction section 132 generates a Planar prediction image with reference to the decoded image $Rec_X$ of the component X, and outputs the generated Planar prediction image as the prediction image $Pred_X$.

In a case where the intra prediction mode predModeIntraX of the component X indicates Angular prediction, the Angular prediction section 133 generates an Angular prediction image with reference to the decoded image $Rec_X$ of the component X, and outputs the generated Angular prediction image as the prediction image $Pred_X$.

In a case where the intra prediction mode predModeIntraX of the component X indicates cross-component prediction, the CC prediction section 134 generates a CC prediction image (cross-component linear prediction image) with reference to the decoded image $Rec_X$ of the component X and a decoded image $Rec_Z$ of a reference component Z, and outputs the generated CC prediction image as the prediction image $Pred_X$.

<CC Prediction Section>

Figure 31:
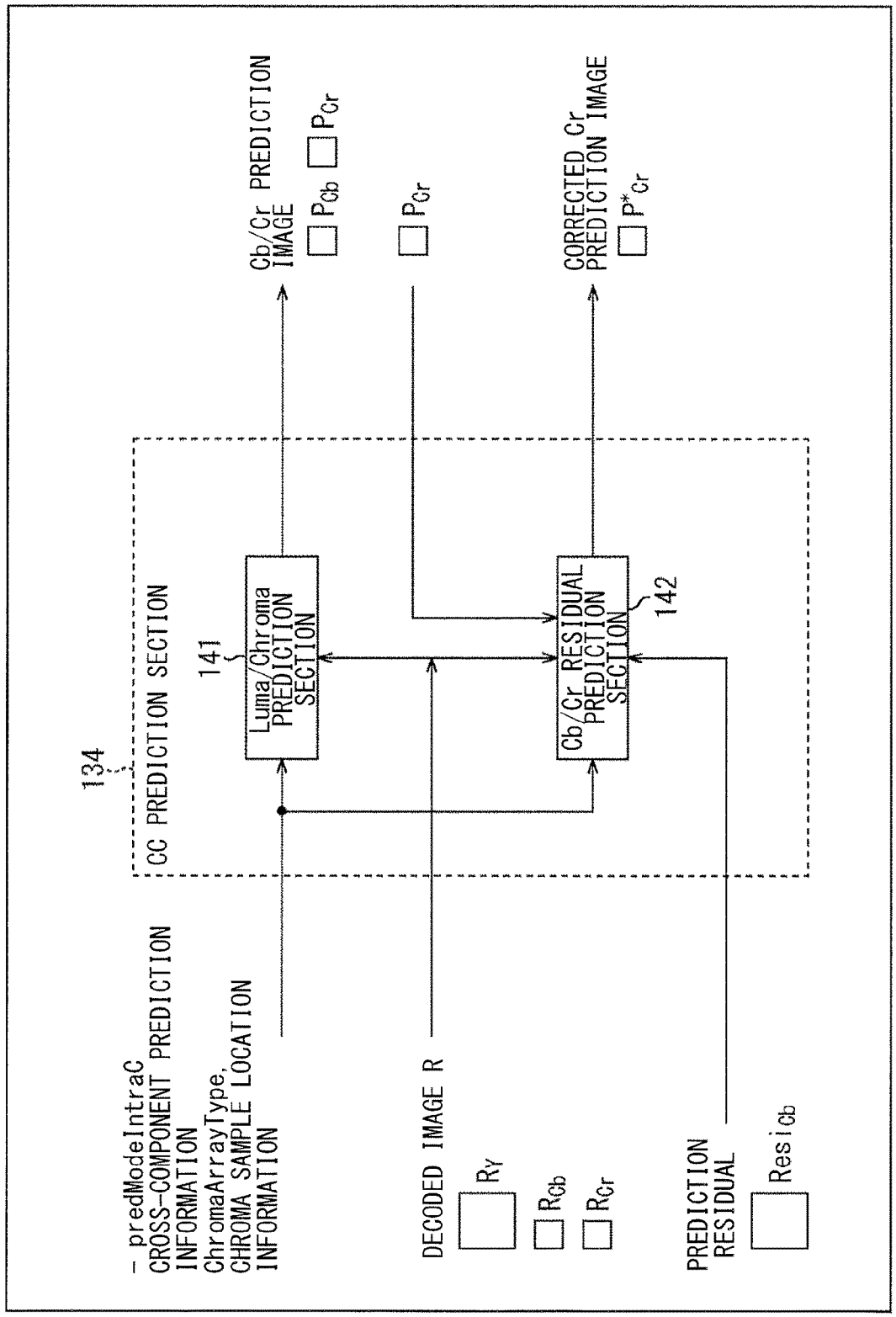
FIG. 31 is a block diagram illustrating an example of a main component of a CC prediction section.

FIG. 31 is a block diagram illustrating an example of main components of the CC prediction section 134. As illustrated in FIG. 31, the CC prediction section 134 includes the Luma/Chroma prediction section 141 (also referred to as luma/chroma prediction section), and a Cb/Cr residual prediction section 142 (also referred to as cross-chroma residual prediction section).

For example, in a case where a prediction image of a chroma component (Cb/Cr) is predicted from a luma component (Y), the CC prediction section 134 brings the Luma/Chroma prediction section 141 into operation to generate a prediction image PredX (X=Cb or Cr) of the chroma component. The Luma/Chroma prediction section 141 performs a process for linear prediction between a luma component and a chroma component.

In addition, for example, in a case where the prediction image $Pred_{Cr}$ of the Cr component is corrected by Cb/Cr residual prediction, the CC prediction section 134 brings the Cb/Cr residual prediction section 142 into operation to generate a corrected Cr prediction image $Pred*_{Cb}$. The Cb/Cr residual prediction section 142 performs a process for correcting the prediction image $Pred_{Cr}$ of the Cr component by Cb/Cr residual prediction.

<Luma/Chroma Prediction Section 141>

Figure 32:
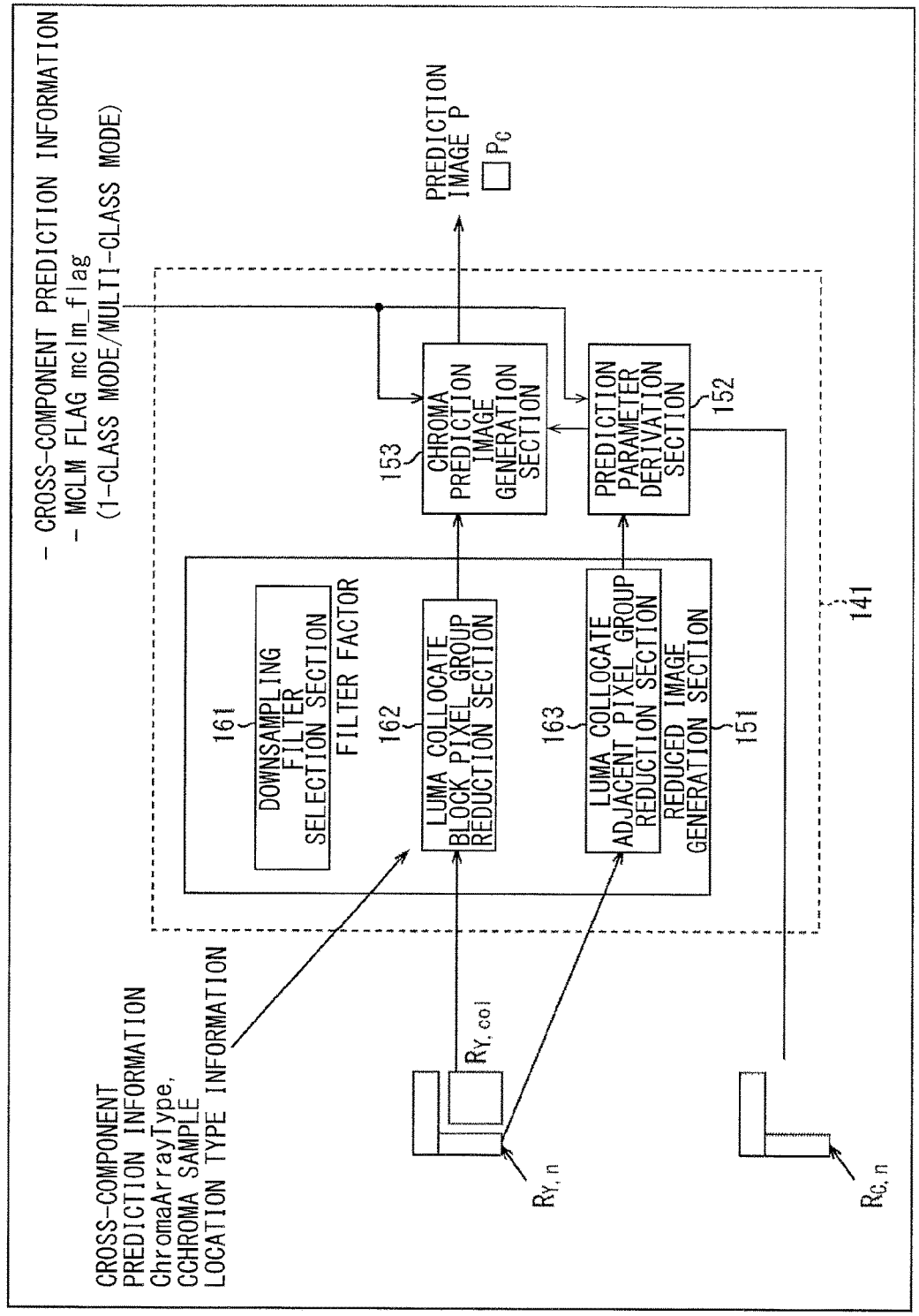
FIG. 32 is a block diagram illustrating an example of a main component of a Luma/Chroma prediction section.

FIG. 32 is a block diagram illustrating an example of main components of the Luma/Chroma prediction section 141. As illustrated in FIG. 32, the Luma/Chroma prediction section 141 includes a reduced image generation section 151, a prediction parameter derivation section 152, and a chroma prediction image generation section 153.

The reduced image generation section 151 performs a process for generating (i.e., downsampling) a reduced image. The prediction parameter derivation section 152 performs a process for deriving a prediction parameter (linear prediction parameter) used for the linear prediction of a luma component for generating a prediction image of a chroma component. The chroma prediction image generation section 153 performs a process for generating a prediction image of a chroma component.

The reduced image generation section 151 includes a downsampling filter selection section 161, a luma collocate block pixel group reduction section 162, and a luma collocate adjacent pixel group reduction section 163.

The downsampling filter selection section 161 performs a process for selecting a downsampling filter. For example, the downsampling filter selection section 161 selects a downsampling filter used to downsample a collocate block of the luma component corresponding to a block of a chroma component that is to be processed. In addition, for example, the downsampling filter selection section 161 selects a downsampling filter used to downsample the adjacent pixel group adjacent to the collocate block of the luma component.

The downsampling filter selection section 161 selects these downsampling filters on the basis of information (e.g., chroma array type ChromaArrayType) regarding a color format and information (e.g., chroma sample location type (ChromaSampleLocType)) regarding the pixel location of a chroma component (i.e., cross-component prediction information).

The downsampling filter selection section 161 supports a plurality of color formats. That is, the downsampling filter selection section 161 selects a candidate corresponding to a color format that is a format designated by the information regarding a color format, and the information regarding the pixel location of a chroma component in a candidate group supporting a plurality of color formats as a downsampling filter.

For example, the candidate group may include a candidate supporting the color format of the 420 format, and a candidate supporting the color format of the 422 format. In a case where the information regarding a color format designates the color format of the 420 format, the downsampling filter selection section 161 selects, as a downsampling filter, a candidate that is also compliant with the information regarding the pixel location of a chroma component among candidates supporting the color format of the 420 format that are included in the candidate group. In addition, in a case where the information regarding a color format designates the color format of the 422 format, the downsampling filter selection section 161 selects, as a downsampling filter, a candidate that is also compliant with the information regarding the pixel location of a chroma component among candidates supporting the color format of the 422 format that are included in the candidate group.

Further, for example, the candidate group may also include a candidate supporting the color format of the 444 format. In a case where the information regarding a color format designates the color format of the 444 format, the downsampling filter selection section 161 selects, as a downsampling filter, a candidate that is also compliant with the information regarding the pixel location of a chroma component among candidates supporting the color format of the 444 format that are included in the candidate group.

It should be noted that the downsampling filter selection section 161 is also able to select a downsampling filter on the basis of linear prediction mode information (e.g., multi-class linear prediction mode flag (mclm_flag)) that is information regarding a mode of linear prediction, the above-described information regarding the pixel location of a chroma component, and the above-described information regarding a color format.

For example, the downsampling filter selection section 161 may select, as a downsampling filter, a candidate corresponding to a mode designated by the linear prediction mode information in a candidate group supporting a plurality of modes of linear prediction, the information regarding the pixel location of a chroma component, and the information regarding a color format.

Further, for example, the candidate group may include a candidate supporting the single-class mode and a candidate supporting the multi-class mode. In a case where the linear prediction mode information designates the single-class mode as a mode of linear prediction, the downsampling filter selection section 161 selects, as a downsampling filter, a candidate that is also compliant with the information regarding the pixel location of a chroma component and the information regarding a color format among candidates supporting linear prediction in the single-class mode. In addition, in a case where the linear prediction mode information designates the multi-class mode as a mode of linear prediction, a candidate is selected, as a downsampling filter, that is also compliant with the information regarding the pixel location of a chroma component and the information regarding a color format among candidates supporting linear prediction in the multi-class mode.

The downsampling filter selection section 161 supplies the selected downsampling filter to the luma collocate block pixel group reduction section 162 and the luma collocate adjacent pixel group reduction section 163.

The luma collocate block pixel group reduction section 162 performs a process for downsampling the collocate block of the luma component corresponding to a block of a chroma component that is to be processed. For example, the luma collocate block pixel group reduction section 162 acquires the collocate block of the luma component corresponding to a block of a chroma component that is to be processed from the frame memory 116. In addition, the luma collocate block pixel group reduction section 162 uses the downsampling filter supplied from the downsampling filter selection section 161 to perform a filter process on the acquired collocate block of the luma component, and generates a reduced image. The luma collocate block pixel group reduction section 162 supplies the generated reduced image of the collocate block of the luma component to the chroma prediction image generation section 153.

The luma collocate adjacent pixel group reduction section 163 performs a process for downsampling the adjacent pixel group of the collocate block of the luma component corresponding to a block of a chroma component that is to be processed. For example, the luma collocate adjacent pixel group reduction section 163 acquires the adjacent pixel group of the collocate block of the luma component corresponding to a block of a chroma component that is to be processed from the frame memory 116. In addition, the luma collocate adjacent pixel group reduction section 163 uses the downsampling filter supplied from the downsampling filter selection section 161 to perform a filter process on the acquired adjacent pixel group of the collocate block of the luma component, and generates a reduced image. The luma collocate adjacent pixel group reduction section 163 supplies the generated reduced image of the adjacent pixel group of the collocate block of the luma component to the prediction parameter derivation section 152.

That is, the luma collocate block pixel group reduction section 162 and the luma collocate adjacent pixel group reduction section 163 use the filters selected by the downsampling filter selection section 161 to change the pixel location of a reference image of a luma component.

The prediction parameter derivation section 152 acquires an adjacent pixel group of a block of a chroma component that is to be processed, for example, from the frame memory 116. The prediction parameter derivation section 152 uses the adjacent pixel group of the block of the chroma component that is to be processed and the reduced image of the adjacent pixel group of the collocate block of the luma component supplied from the luma collocate adjacent pixel group reduction section 163 to derive linear prediction parameters ($\alpha$ and $\beta$). The prediction parameter derivation section 152 supplies the derived linear prediction parameters ($\alpha$ and $\beta$) to the chroma prediction image generation section 153.

The chroma prediction image generation section 153 uses the reduced image of the luma collocate block supplied from the luma collocate block pixel group reduction section 162 and the linear prediction parameters ($\alpha$ and $\beta$) supplied from the prediction parameter derivation section 152 to perform linear prediction, and generates a prediction image of the block of the chroma component that is to be processed.

That is, the chroma prediction image generation section 153 predicts the pixel values of chroma components (e.g., Cb component and Cr component) by linear prediction from the pixel value (e.g., reduced image of a luma collocate block) of a reference image of a luma component whose pixel location is changed by using a filter (e.g., downsampling filter) selected on the basis of the information (e.g., chroma sample location information) regarding the pixel location of a chroma component and the information (e.g., chroma array type) regarding a color format, and generates prediction images of the chroma components. The chroma prediction image generation section 153 supplies the generated prediction images to the calculation unit 115.

<Flow of Prediction Process>

Next, an example of the flow of a prediction process executed by the prediction unit 114 is described with reference to the flowchart of FIG. 33.

When the prediction process is started, the prediction unit 114 determines, in step S151, whether or not to perform intra prediction. In a case where the prediction mode information Pinfo designates intra prediction and it is determined that a prediction image of a block of a chroma component that is to be processed is generated by intra prediction, the process proceeds to step S152.

In step S152, the intra prediction section 121 performs intra prediction to generate a prediction image. When the process of step S152 is finished, the prediction process is finished and the process returns to FIG. 17.

Figure 33:
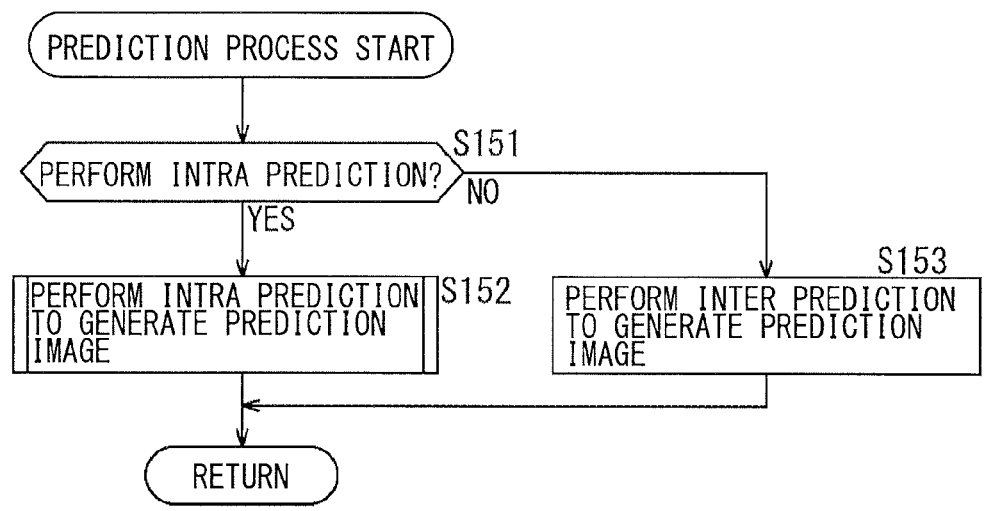
FIG. 33 is a flowchart describing an example of a flow of a prediction process.

In addition, in a case where the prediction mode information Pinfo designates inter prediction and it is determined in step S151 of FIG. 33 that no intra prediction is performed, the process proceeds to step S153.

In step S153, the inter prediction section 122 performs inter prediction to generate a prediction image. When the process of step S153 is finished, the prediction process is finished and the process returns to FIG. 17.

<Flow of Intra Prediction Process>

Next, an example of the flow of an intra prediction process that is executed in step S152 of FIG. 33 is described with reference to the flowchart of FIG. 34.

When the intra prediction process is started, the DC prediction section 131, the Planar prediction section 132, the Angular prediction section 133, and the CC prediction section 134 of the intra prediction section 121 each perform intra prediction in the mode corresponding to predModeIntraX for each component in step S161 to generate a prediction image. For example, in a case where CC prediction is designated in predModeIntraX, the CC prediction section 134 generates a prediction image of a chroma component by cross-component linear prediction.

When the process of step S161 is finished, the intra prediction process is finished and the process returns to FIG. 33.

<Flow of Cross-Component Linear Prediction Process>

Figure 34:
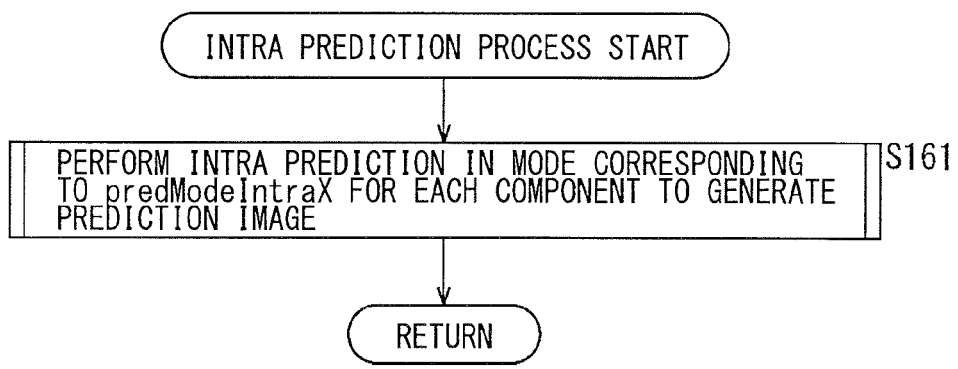
FIG. 34 is a flowchart describing an example of a flow of an intra prediction process.

Next, an example of the flow of the cross-component linear prediction process executed in step S161 of FIG. 34 is described with reference to the flowchart of FIG. 35.

When the cross-component linear prediction process is started, the Luma/Chroma prediction section 141 performs a luma-to-chroma prediction process in step S171 to predict a prediction image of a chroma component from a decoded image of a luma component.

In step S172, the Cb/Cr residual prediction section 142 performs a cross-chroma residual prediction process to correct a prediction image of a Cr component by using a prediction residual of a Cb component.

When the process of step S172 is finished, the cross-component linear prediction process is finished and the process returns to FIG. 34.

<Flow of Luma-to-Chroma Prediction Process>

Figure 35:
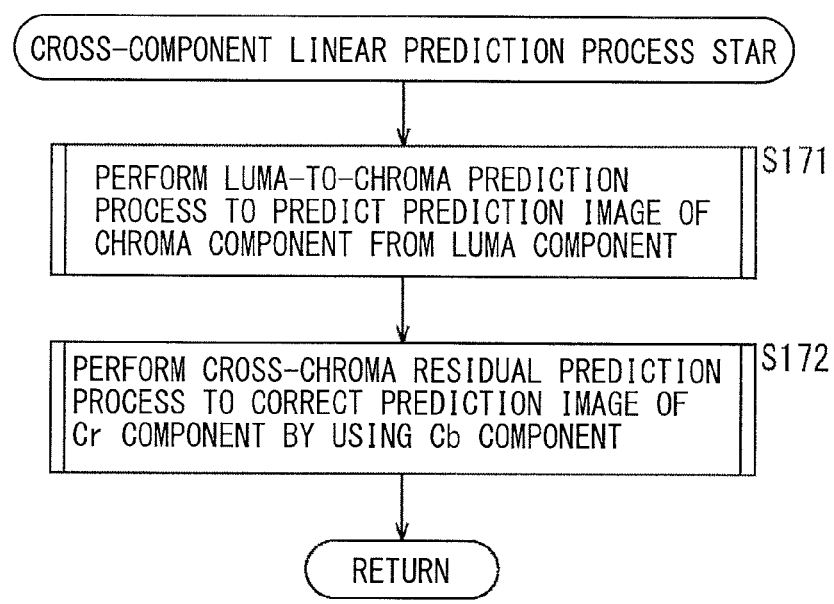
FIG. 35 is a flowchart describing an example of the flow of the cross-component linear prediction process.
Figure 36:
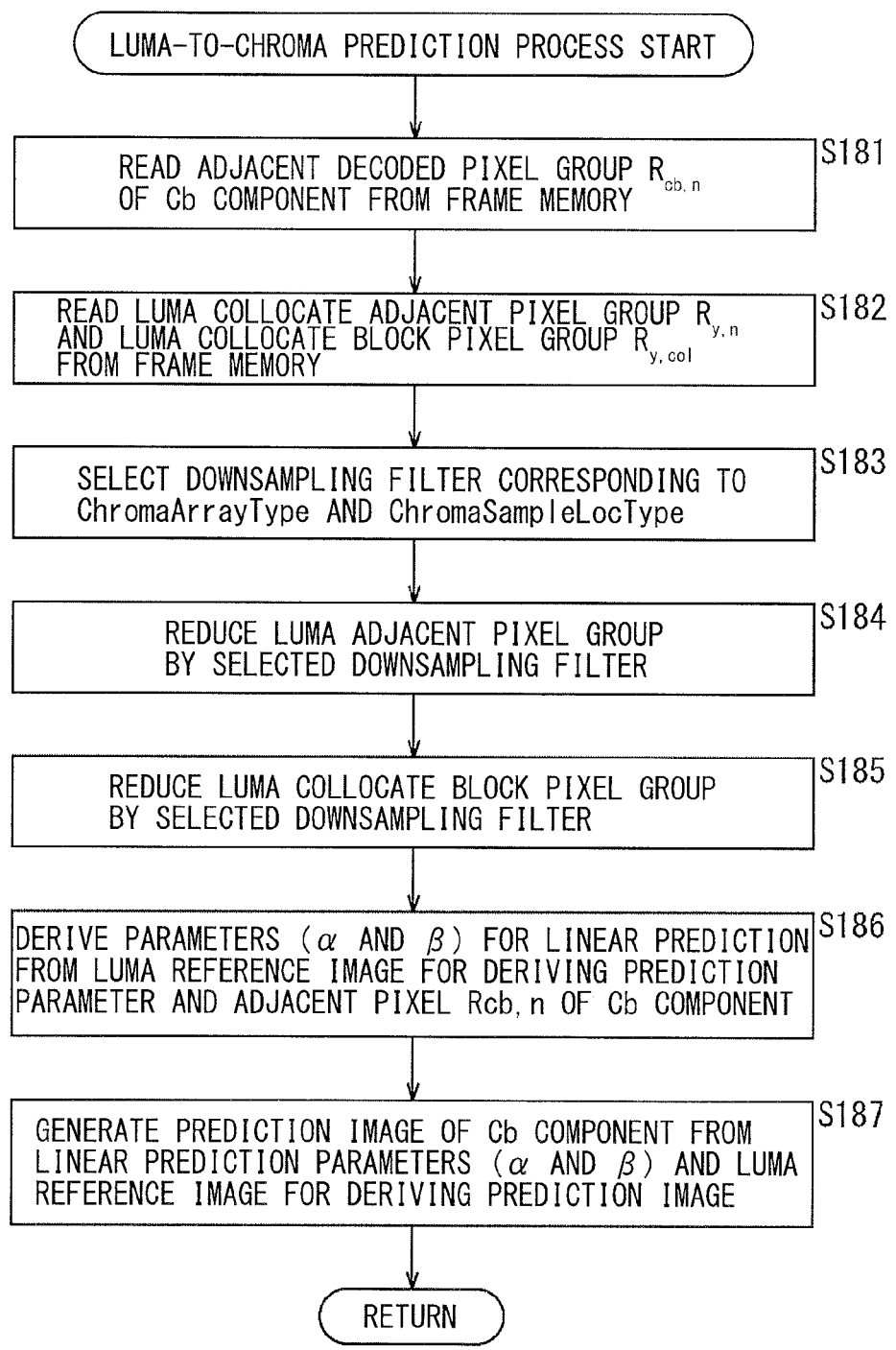
FIG. 36 is a flowchart describing an example of a flow of a luma-to-chroma prediction process.

Next, an example of the flow of a luma-to-chroma prediction process that is executed in step S171 of FIG. 35 is described with reference to the flowchart of FIG. 36.

When the luma-to-chroma prediction process is started, the prediction parameter derivation section 152 reads, in step S181, an adjacent decoded pixel group $R_{C,n}$ (A of FIG. 2) (referred to as chroma adjacent pixel group $R_{C,n}$ below) of a prediction target block of the chroma component (Cb component) from the frame memory 116.

In step S182, the reduced image generation section 151 reads a decoded pixel group $R_{Y,col}$ (B of FIG. 2) (referred to as luma collocate block pixel group $R_{Y,col}$ below) of the luma component in the collocate location of the chroma prediction target block, and an adjacent decoded pixel group $R_{Y,n}$ (referred to as luma collocate adjacent pixel group $R_{Y,n}$ below) of the luma component in the collocate location of the chroma adjacent pixel group from the frame memory 116.

That is, the luma collocate block pixel group reduction section 162 acquires the luma collocate block pixel group $R_{Y,n}$ from the frame memory 116. In addition, the luma collocate adjacent pixel group reduction section 163 acquires the luma collocate adjacent pixel group $R_{Y,n}$ from the frame memory 116.

In step S183, the downsampling filter selection section 161 selects a downsampling filter for each chroma array type ChromaArrayType and each chroma sample location type ChromaSampleLocType, for example, as in the table illustrated in FIG. 37.

More specifically, the downsampling filter selection section 161 selects a downsampling filter on the basis of the chroma array type ChromaArrayType and the chroma sample location type ChromaSampleLocType. The downsampling filter generates a luma sample having the same coordinates as the chroma sample location. <ChromaArrayType==CHROMA_420 && ChromaSample Loc- Type==Type2>

Figure 38:
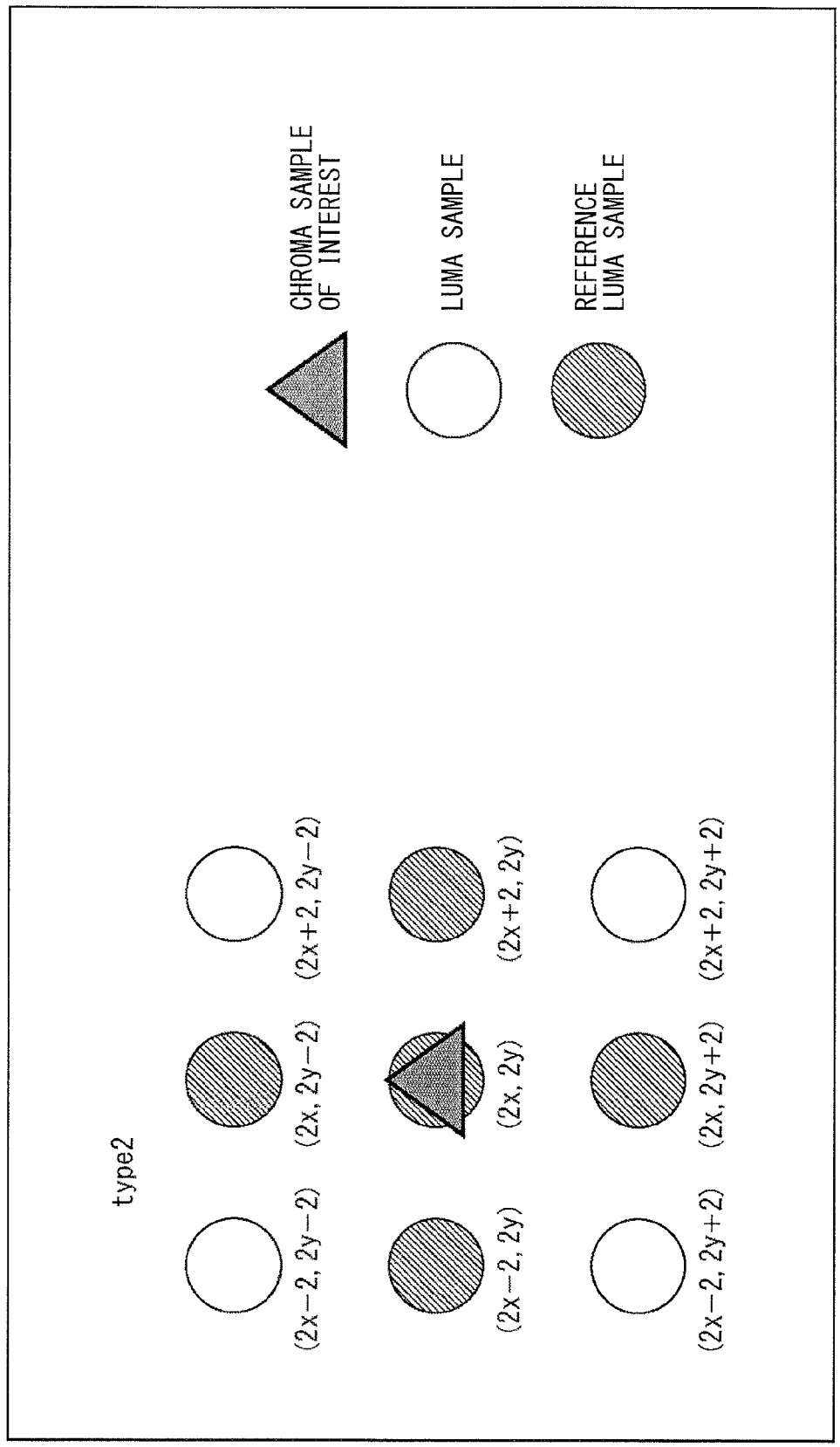
FIG. 38 is a diagram illustrating an example of a reference pixel location of the downsampling filter.

A downsampling filter is selected that generates a luma sample having the same coordinates as those of the chroma sample (chroma sample of interest) in the (2x, 2y) location, for example, as illustrated in FIG. 38.

A downsampling filter is selected that refers to the luma samples in the location of (2x, 2y) and the four locations of ((2x, 2y−2), (2x−2, 2y), (2x+2, 2y), and (2x, 2y+2)) near (2x, 2y), for example, as illustrated in FIG. 38.

A filter factor corresponding to each luma sample location is, for example, as illustrated in FIG. 39.

<ChromaArrayType==CHROMA_420 && ChromaSampleLocType==Type3>

Figure 40:
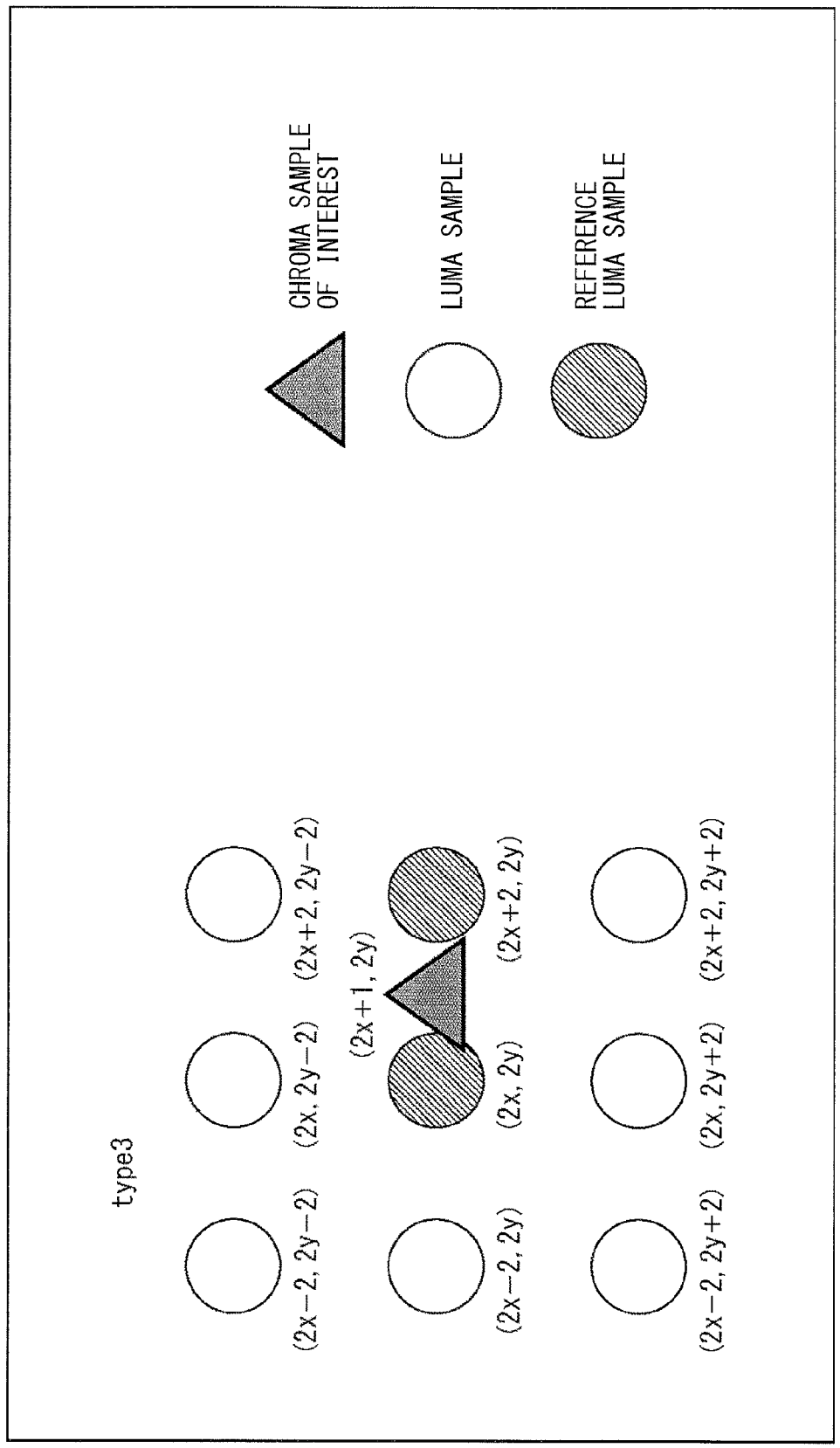
FIG. 40 is a diagram illustrating an example of the reference pixel location of the downsampling filter.

A downsampling filter is selected that generates a luma sample having the same coordinates as those of the chroma sample (chroma sample of interest) in the (2x+1, 2y) location, for example, as illustrated in FIG. 40.

A downsampling filter is selected that refers to the luma samples in the locations of (2x, 2y) and (2x+2, 2y), for example, as illustrated in FIG. 40.

A filter factor corresponding to each luma sample location is, for example, as illustrated in FIG. 41.

<ChromaArrayType=CHROMA_420 && ChromaSampleLocType=Type0>

Figure 42:
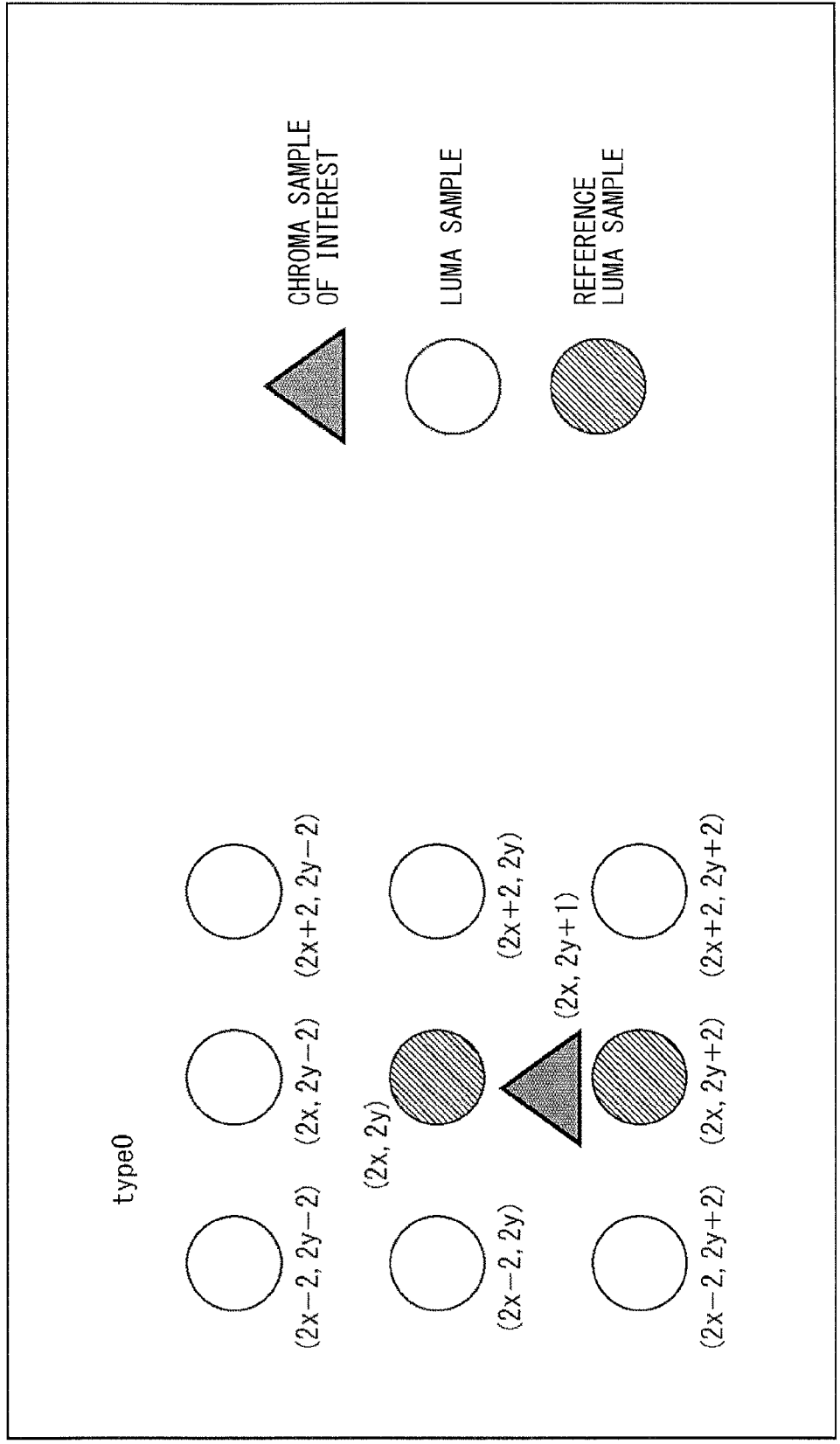
FIG. 42 is a diagram illustrating an example of the reference pixel location of the downsampling filter.

A downsampling filter is selected that generates a luma sample having the same coordinates as those of the chroma sample (chroma sample of interest) in the (2x, 2y+1) location, for example, as illustrated in FIG. 42.

A downsampling filter is selected that refers to the luma samples in the locations of (2x, 2y) and (2x, 2y+2), for example, as illustrated in FIG. 42.

A filter factor corresponding to each luma sample location is, for example, as illustrated in FIG. 43.

<ChromaArrayType=CHROMA_420 && ChromaSampleLocType=Type2>

Figure 44:
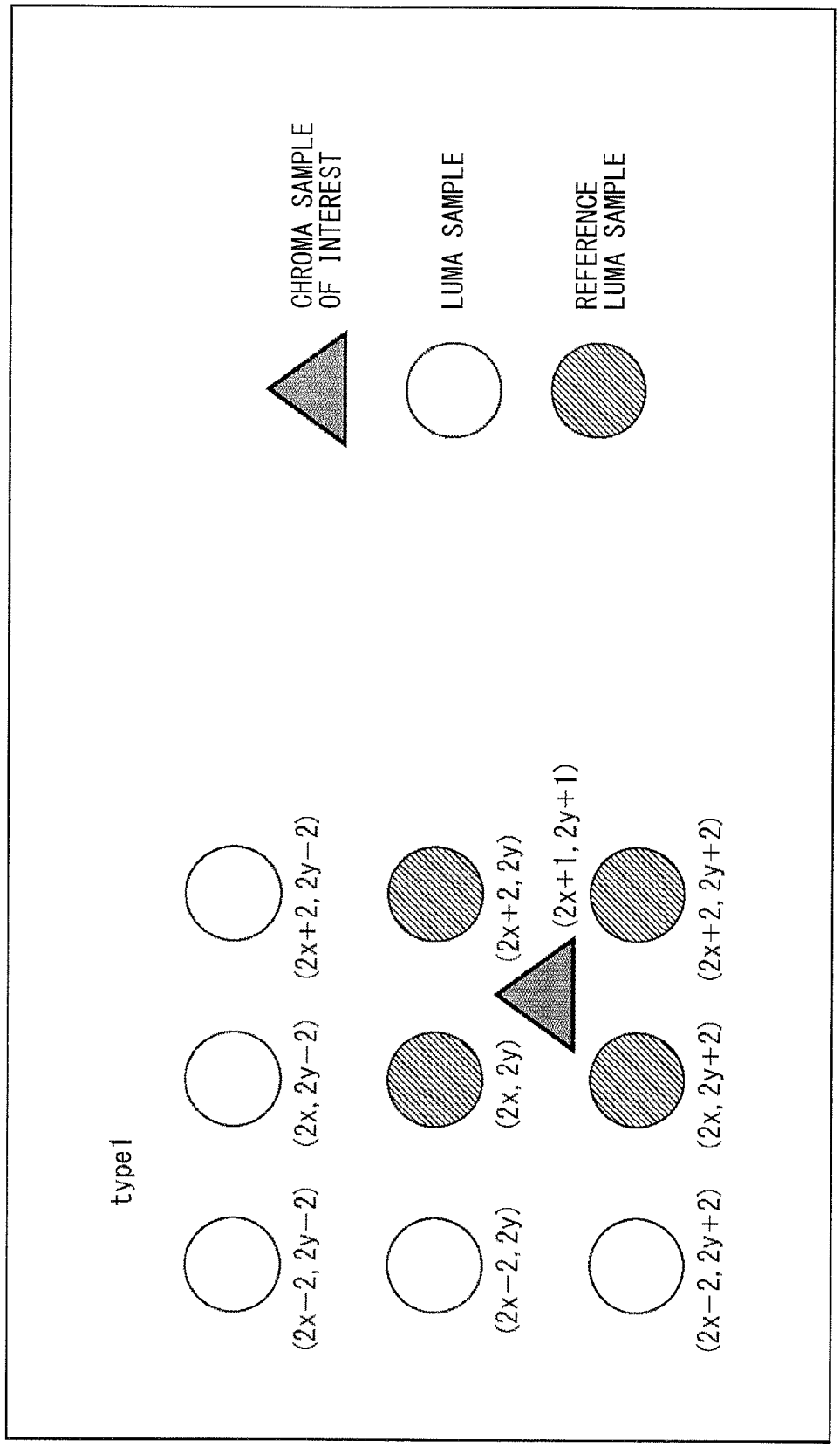
FIG. 44 is a diagram illustrating an example of the reference pixel location of the downsampling filter.

A downsampling filter is selected that generates a luma sample having the same coordinates as those of the chroma sample (chroma sample of interest) in the (2x+1, 2y+1) location, for example, as illustrated in FIG. 44.

A downsampling filter is selected that refers to the luma samples in the locations of (2x, 2y), (2x+2, 2y), (2x, 2y+2), and (2x+2, 2y+2), for example, as illustrated in FIG. 44.

A filter factor corresponding to each luma sample location is, for example, as illustrated in FIG. 45.

<ChromaArrayType=CHROMA_422 && ChromaSampleLoc- Type=Type2>

Figure 46:
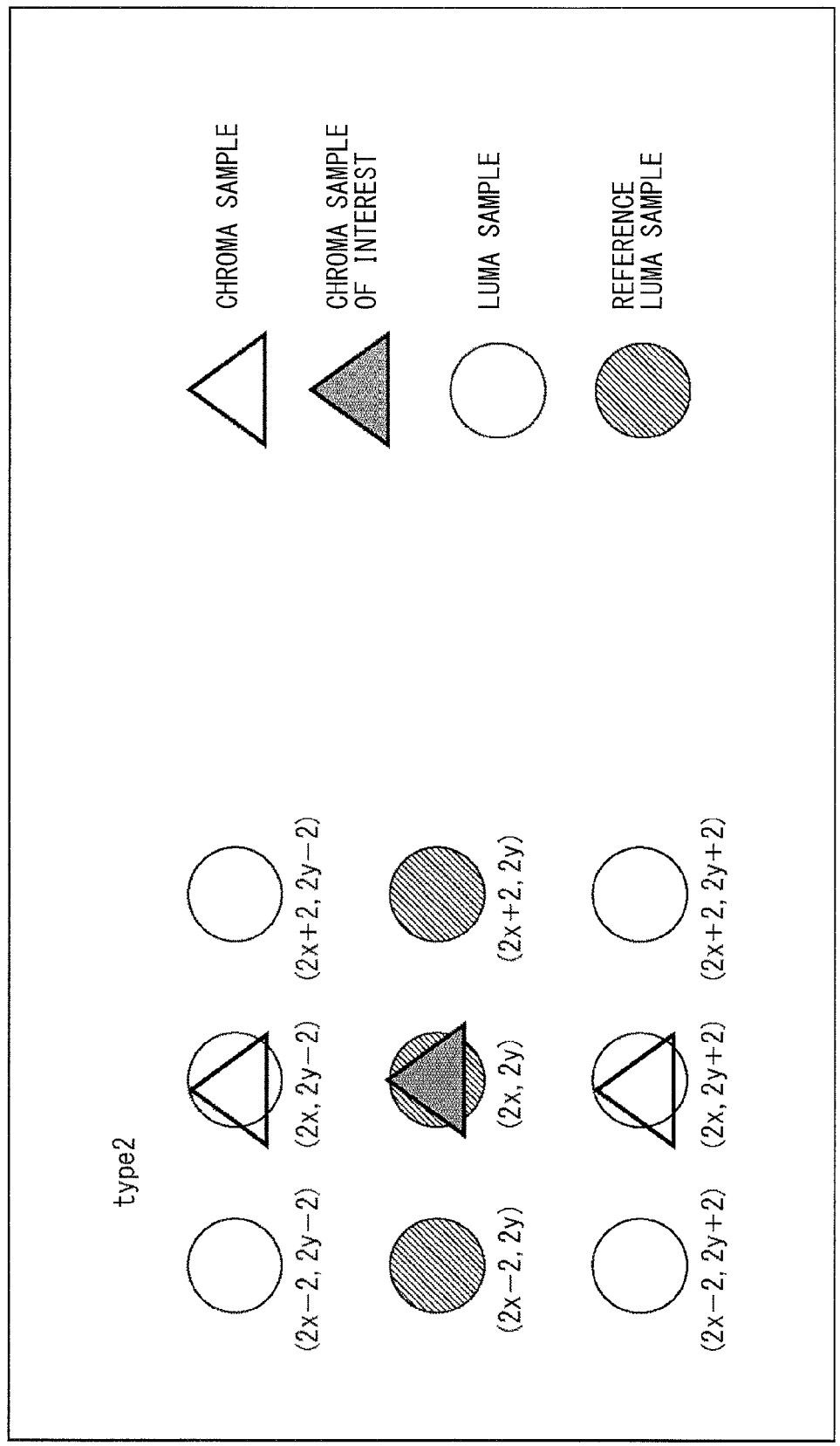
FIG. 46 is a diagram illustrating an example of the reference pixel location of the downsampling filter.

A filter is selected that generates a luma sample having the same coordinates as those of the chroma sample (chroma sample of interest) in the (2x, 2y) location, for example, as illustrated in FIG. 46.

A filter is selected that refers to the luma samples in the locations of (2x, 2y), and (2x−2, 2y) and (2x+2, 2y) on the right and left, for example, as illustrated in FIG. 46.

A filter factor corresponding to each luma sample location is, for example, as illustrated in FIG. 47.

<ChromaArrayType=CHROMA_422 && ChromaSampleLocType=Type3>

Figure 48:
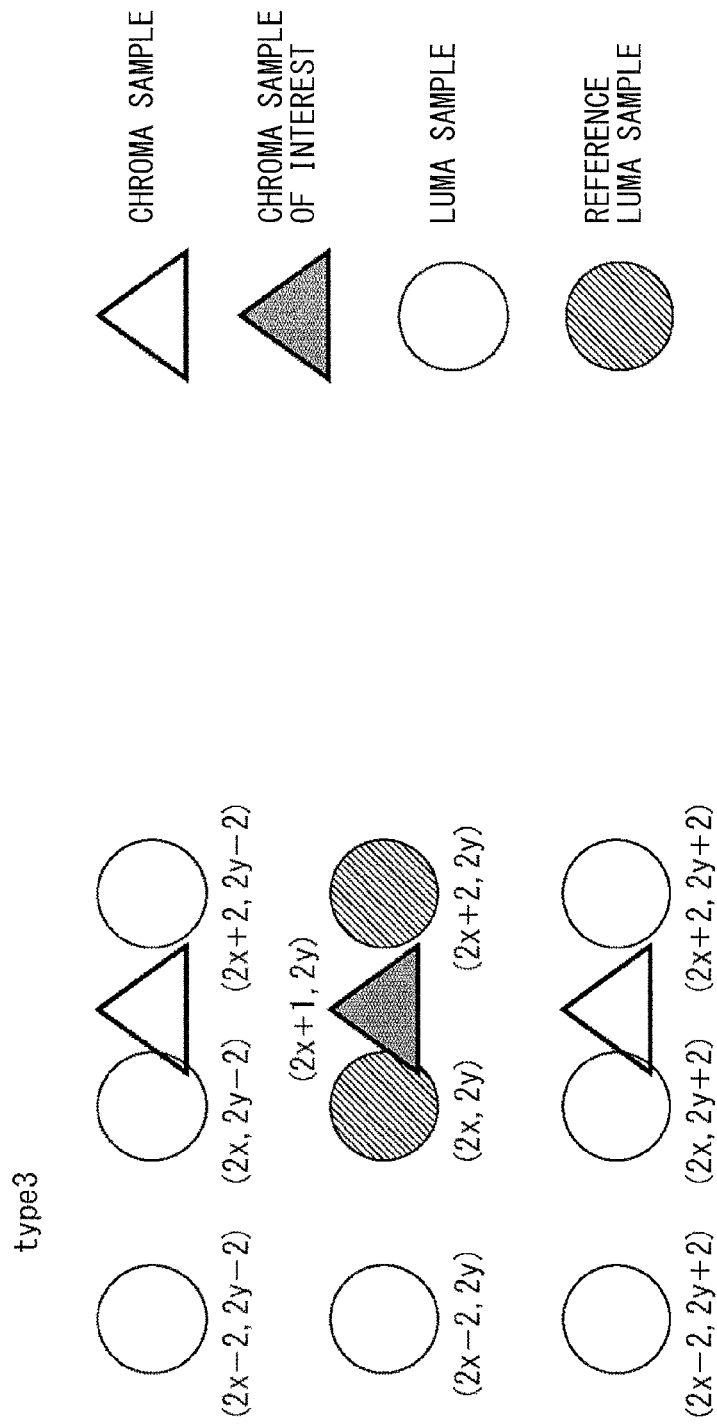
FIG. 48 is a diagram illustrating an example of the reference pixel location of the downsampling filter.

A downsampling filter is selected that generates a luma sample having the same coordinates as those of the chroma sample (chroma sample of interest) in the (2x+1, 2y) location, for example, as illustrated in FIG. 48.

A downsampling filter is selected that refers to the luma samples in the locations of (2x, 2y) and (2x+2, 2y), for example, as illustrated in FIG. 48.

A filter factor corresponding to each luma sample location is, for example, as illustrated in FIG. 49.

<ChromaArrayType=CHROMA_444 && ChromaSampleLoc- Type=Type2>

Figure 50:
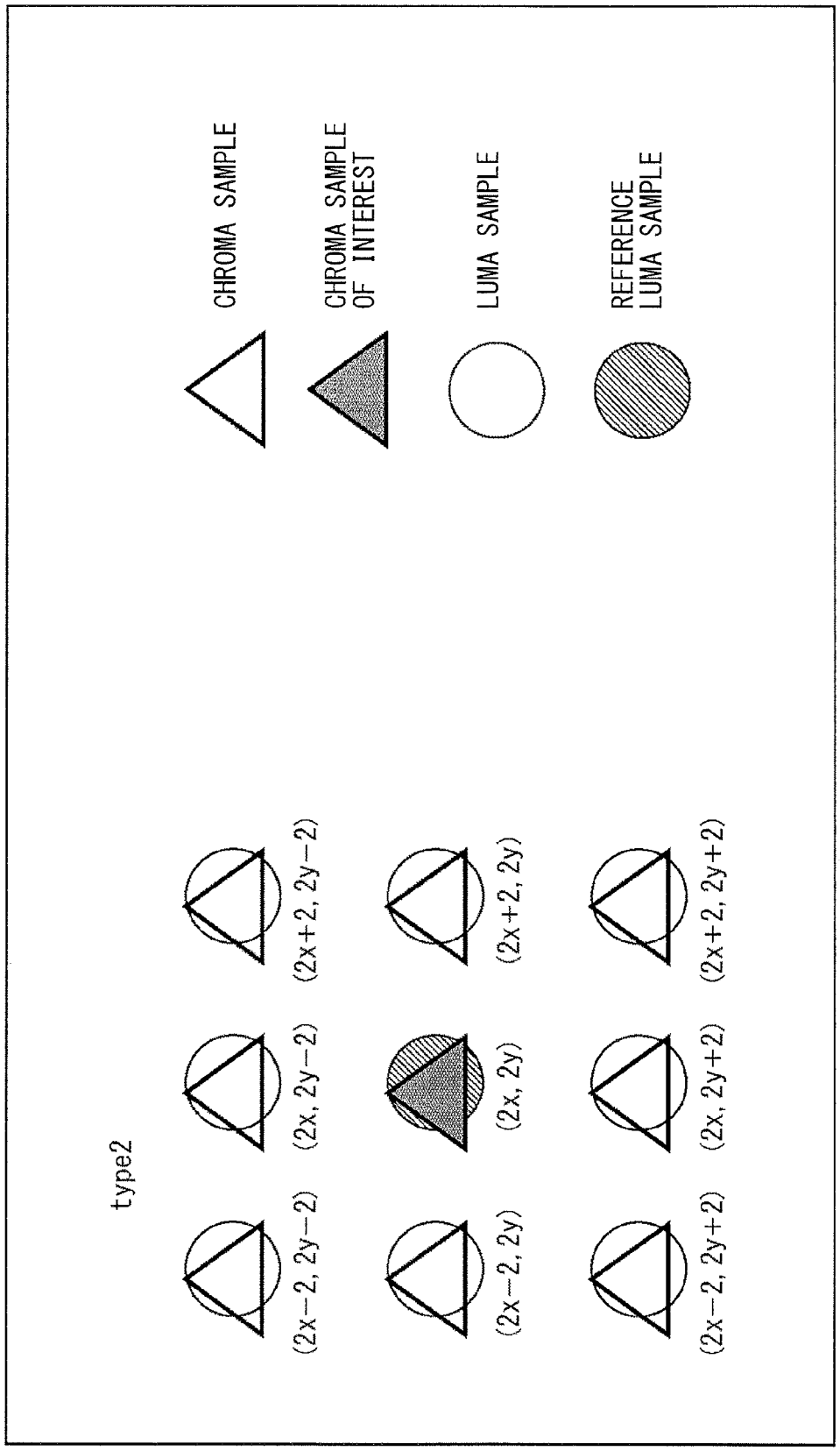
FIG. 50 is a diagram illustrating an example of the reference pixel location of the downsampling filter.

A downsampling filter is selected that generates a luma sample having the same coordinates as those of the chroma sample (chroma sample of interest) in the (2x, 2y) location, for example, as illustrated in FIG. 50.

A downsampling filter is selected that refers to the luma sample in the location of (2x, 2y), for example, as illustrated in FIG. 50.

Figure 51:
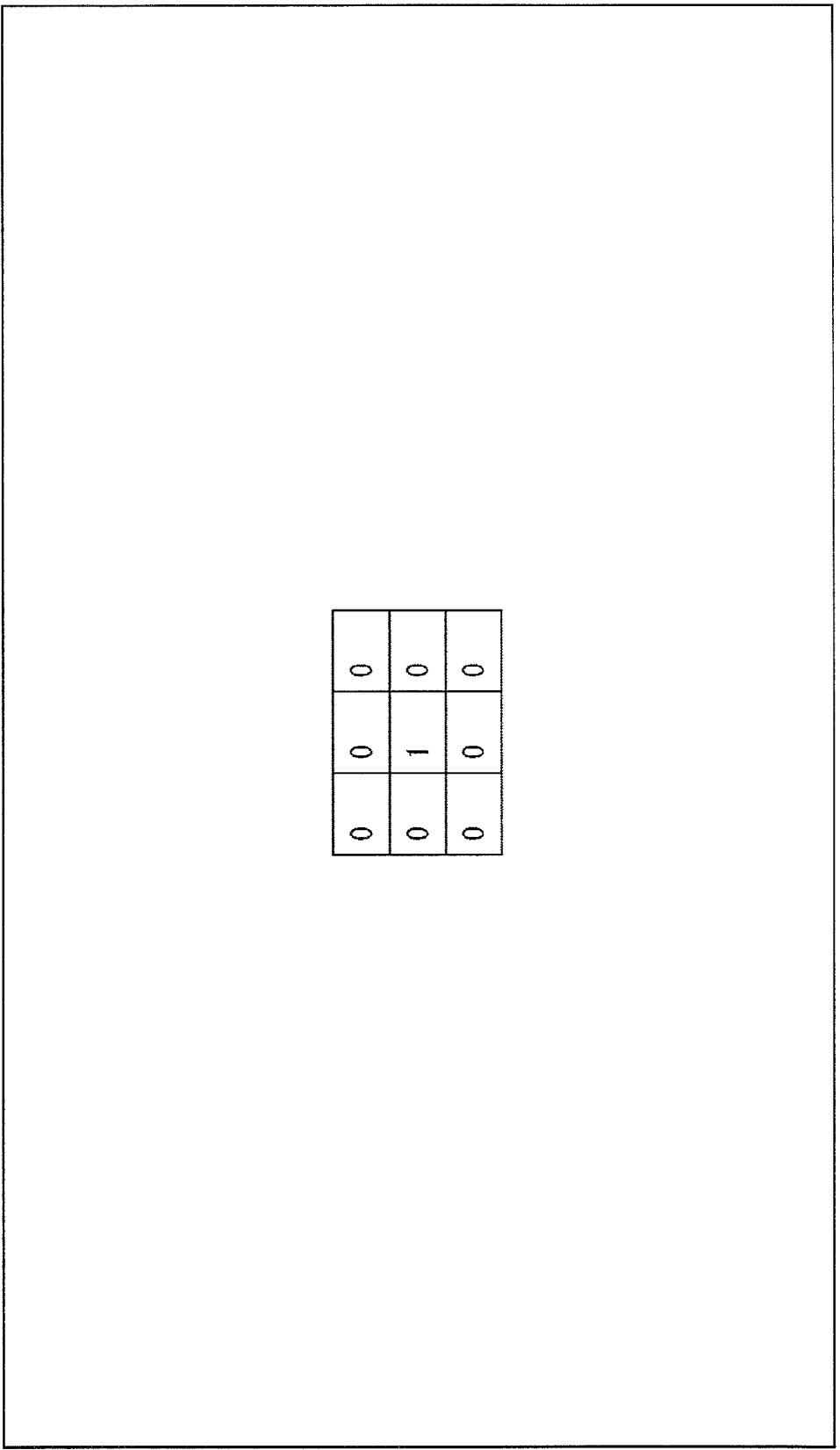
FIG. 51 is a diagram illustrating an example of the filter factor of the downsampling filter.

A filter factor corresponding to each luma sample location is, for example, as illustrated in FIG. 51.

<Supplement>

It should be noted that it is possible to adopt any downsampling filter that generates a luma sample having the same coordinates as a chroma sample location, and the examples described above are not limitative. For example, the number of reference samples may be increased or decreased. In addition, it is possible to change the value of a filter factor within a practicable range.

Further, this downsampling filter may be a separable filter or a non-separable filter. In addition, instead of the downsampling filter described above, for example, any filter such as a linear interpolation filter, a bicubic filter, or a Lanczos filter (Lanczos filter) may be applied.

The flowchart of FIG. 36 is referred to again. In step S184, the luma collocate adjacent pixel group reduction section 163 applies the selected downsampling filter to the luma collocate adjacent pixel group $R_{Y,n}$, and generates a reduced luma collocate adjacent pixel group $R'_{Y,n}$. The luma collocate adjacent pixel group reduction section 163 supplies the reduced luma collocate adjacent pixel group $R'_{Y,n}$ to the prediction parameter derivation section 152.

In step S185, the luma collocate block pixel group reduction section 162 applies the selected downsampling filter to the luma collocate block pixel group $R_{Y,col}$, and generates a reduced luma collocate block pixel group $R'_{Y,col}$. The luma collocate block pixel group reduction section 162 supplies the reduced luma collocate block pixel group $R'_{Y,col}$ to the chroma prediction image generation section 153.

In step S186, the prediction parameter derivation section 152 derives the linear prediction parameters ($\alpha_i$ and $\beta_i$) for each class i on the basis of the supplied reduced luma collocate adjacent pixel group $R'_{Y,n}$ and the chroma adjacent pixel group $R_{C,n}$. The linear prediction parameters ($\alpha_i$ and $\beta_i$) are used for Luma/Chroma prediction.

More specifically, the prediction parameter derivation section 152 refers to (the multi-class linear prediction mode flag mclm_flag of) the cross-component prediction information to derive prediction parameters for a corresponding number of classes.

For example, in a case of the multi-class linear prediction mode flag mclm_flag==0 (false) (in a case of the single-class mode), the prediction parameter derivation section 152 derives a prediction parameter $\alpha_1$ (scaling argument $\alpha$ in expression (1)) and a prediction parameter $\beta_1$ (offset argument $\beta$ in expression (1)) on the basis of expression (2) above.

In addition, for example, in a case of the multi-class linear prediction mode flag mclm_flag==1 (true) (in a case of the multi-class (2-class here) mode, the prediction parameter derivation section 152 obtains the threshold Thr from each reduced luma collocate adjacent pixel group $R'_{Y,n}$. This threshold Thr is determined in any method. For example, the threshold Thr may be an average value.

Next, the prediction parameter derivation section 152 allocates a class label j (j=1 or 2) to the reduced luma collocate adjacent pixel group $R'_{Y,n}$ on the basis of the obtained threshold Thr. The same class label j (j=1 or 2) is allocated to the chroma adjacent pixel group $R_{C,n}$ located at the same coordinates as those of each reduced luma collocate adjacent pixel group $R'_{Y,n}$.

The prediction parameter derivation section 152 then refers to a reduced luma collocate adjacent pixel group $R'_{Y,n,j}$ and the reduced luma collocate adjacent pixel group $R'_{Y,n,j}$ belonging to each class j, and derives prediction parameters $\alpha_j$ and $\beta_j$ for each class j in accordance with expression (2).

<Supplement>

It should be noted that the number of classes is not limited to 2 in the multi-class mode, but the number of classes may be assumed as 3 or more and a prediction parameter for each class may be derived. When the number of classes is 2 or more, for example, K-means clustering may be used as a method of categorizing classes.

The flowchart of FIG. 36 is referred to again. In step S187, the chroma prediction image generation section 153 refers to the prediction parameters ($\alpha_j$ and $\beta_j$) for each class j that are derived as described above, and generates a chroma prediction image $Pred_C$ from the reduced luma collocate block pixel group $R'_{Y,col}$.

For example, in a case of the multi-class linear prediction mode flag mclm_flag==0 (false) (in a case of the single-class mode), the chroma prediction image generation section 153 refers to the prediction parameter ($\alpha_1$ and $\beta_1$), and generates the chroma prediction image $Pred_C$ on the basis of expression (1).

In addition, for example, in a case of the multi-class linear prediction mode flag mclm_flag==1 (true) (in a case of the multi-class (2-class here) mode, the chroma prediction image generation section 153 refers to the threshold Thr derived by the prediction parameter derivation section 152 and the prediction parameters ($\alpha_j$ and $\beta_j$) for each class j, and generates the chroma prediction image $Pred_C$ on the basis of expression (5).

That is, for example, in a case where the value of a certain reduced luma collocate block pixel group RecL'[x,y] is less than or equal to the threshold Thr, the chroma prediction image generation section 153 categorizes it into class 1, and uses the prediction parameters ($\alpha_1$ and $\beta_1$) corresponding to class 1 to perform linear prediction, thereby deriving a predicted value $Pred_C[x,y]$ of the chroma component having the same coordinates.

In addition, for example, in a case where the value of the certain reduced luma collocate block pixel group $Rec_L'[x,y]$ is greater than the threshold Thr, the chroma prediction image generation section 153 categorizes it into class 2, and uses prediction parameters ($\alpha_2$ and $\beta_2$) corresponding to class 2 to perform linear prediction, thereby deriving the predicted value $Pred_C[x,y]$ of the chroma component having the same coordinates.

<Supplement>

It should be noted the processes of the respective steps may be changed within a practicable range. In addition, the order of steps may also be changed within a practicable range.

The flowchart of FIG. 36 is referred to again. When the process of step S187 is finished, the process returns to FIG. 35.

As described above, the Luma/Chroma prediction section 141 is able to derive the prediction image $Pred_C$ of a chroma component. As described above, on the basis of the chroma array type and the chroma sample location information in both the single-class mode and the multi-class mode, the Luma/Chroma prediction section 141 selects a downsampling filter that generates a luma sample having the same coordinates as the chroma sample location, thereby making it possible to generate the reduced luma collocate adjacent pixel group $R'_{Y,n}$ in which a phase shift from the chroma component of the luma collocate adjacent pixel group $R_{Y,n}$ is reduced. A reduced phase shift thus makes it possible to derive more accurate prediction parameters ($\alpha$ and $\beta$). Thus, it is possible to suppress reduction in coding efficiency.

In addition, on the basis of the chroma array type and the chroma sample location information in both the single-class mode and the multi-class mode, the Luma/Chroma prediction section 141 selects a downsampling filter that generates a luma sample having the same coordinates as the chroma sample location, thereby making it possible to generate the reduced luma collocate block pixel group $R'_{Y,Col}$ in which a phase shift from the chroma component of the luma collocate block pixel group $R_{Y,Col}$ is reduced. This makes it possible to generate, in both the single-class mode and the multi-class mode, a more accurate prediction image as compared with the conventional technology from the reduced luma collocate block pixel group $R'_{Y,Col}$ in which a phase shift is reduced by using more accurate prediction parameters ($\alpha$ and $\beta$). That is, the coding efficiency is improved.

Further, the chroma format is not limited to the 420 format, but it is possible to perform Luma/Chroma prediction compliant with the 422 format and the 444 format. That is, it is possible to apply Luma/Chroma prediction in the 422 format and the 444 format, and the coding efficiency is thus improved.

<Cb/Cr Residual Prediction Section>

Figure 52:
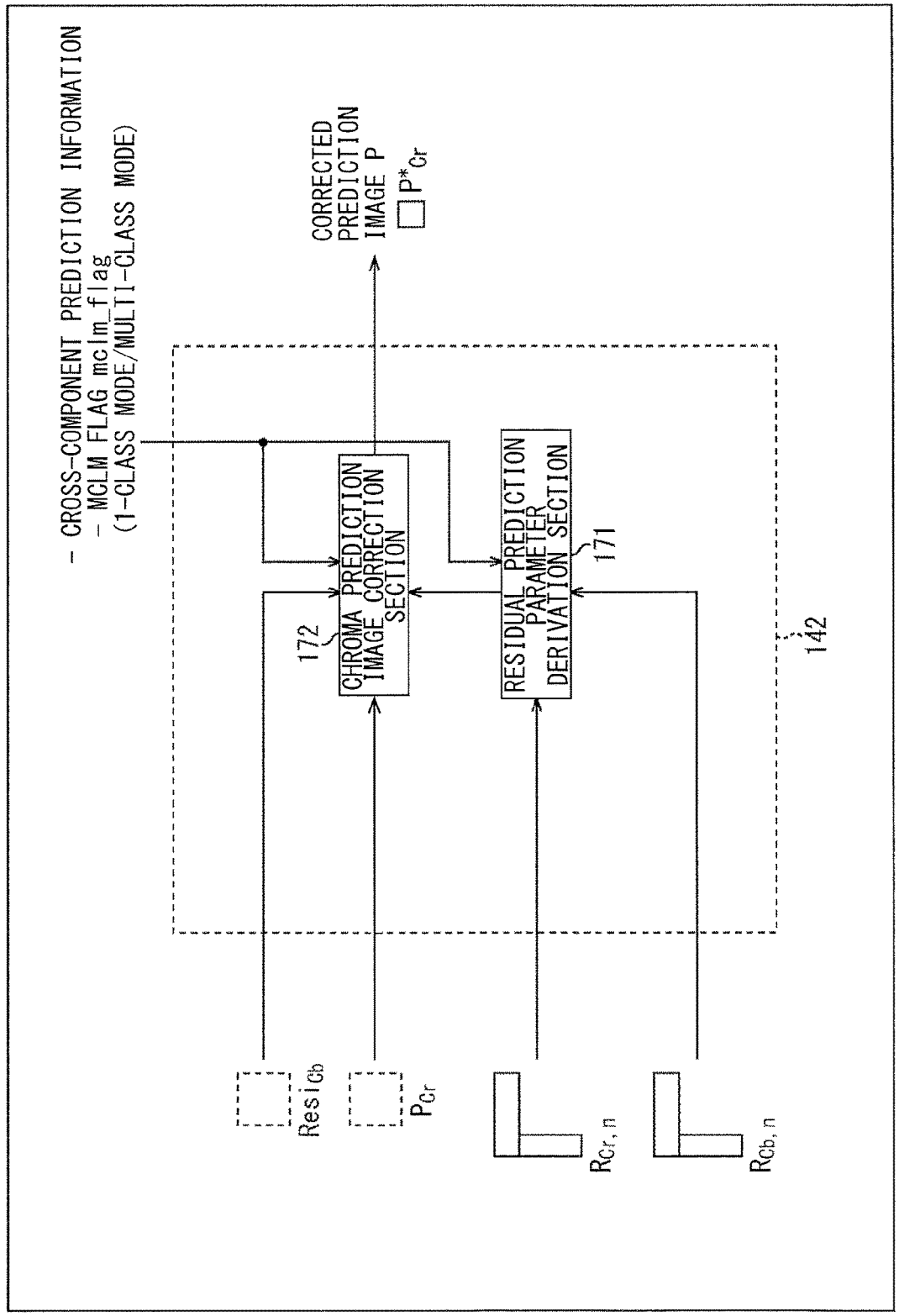
FIG. 52 is a block diagram illustrating an example of a main component of a Cb/Cr residual prediction section.

Next, Cb/Cr residual prediction is described. As described with reference to FIG. 31, the CC prediction section 134 includes the Cb/Cr residual prediction section 142. FIG. 52 is a block diagram illustrating an example of main components of the Cb/Cr residual prediction section 142.

As illustrated in FIG. 52, the Cb/Cr residual prediction section 142 includes a residual prediction parameter derivation section 171 and a chroma prediction image correction section 172. The residual prediction parameter derivation section 171 performs a process for deriving a residual prediction parameter that is a parameter used for cross-chroma residual prediction (Cr/Cb residual prediction) performed to correct a prediction image of a Cr component. The chroma prediction image correction section 172 performs a process for correcting a prediction image of a Cr component.

That is, the chroma prediction image correction section 172 corrects a prediction image of a Cr component generated by the chroma prediction image generation section 153 by using the prediction residual of the collocate block of the Cb component corresponding to the prediction image of the Cr component (of the current CU).

In addition, the residual prediction parameter derivation section 171 derives a residual prediction parameter that is a parameter used to correct the prediction image of the Cr component on the basis of an adjacent pixel adjacent to the prediction image of the Cr component and an adjacent pixel adjacent to the collocate block of the Cb component. The chroma prediction image correction section 172 uses the derived residual prediction parameter to perform chroma residual prediction, and corrects the prediction image of the Cr component.

<Flow of Cross-Chroma Residual Prediction Process>

Figure 53:
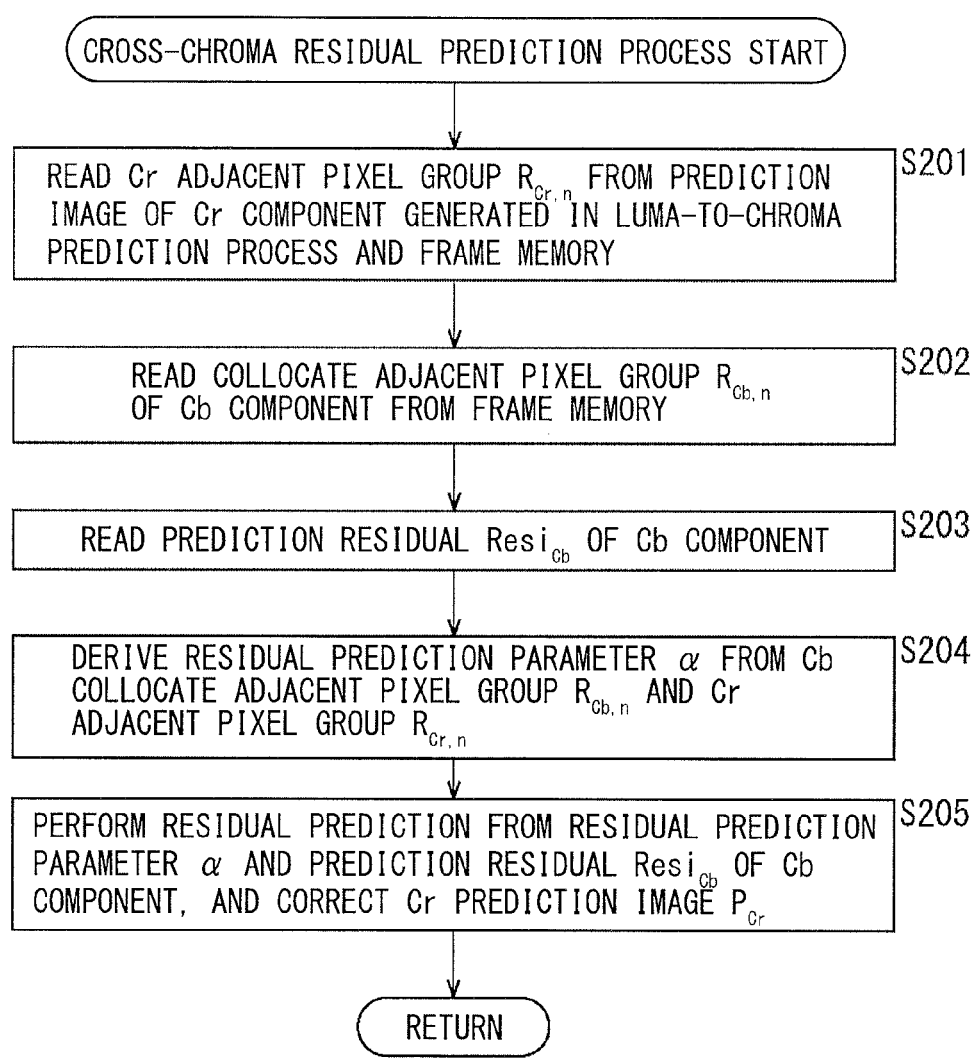
FIG. 53 is a flowchart describing an example of a flow of a cross-chroma residual prediction process.

Next, the flow of the cross-chroma residual prediction process executed by this Cb/Cr residual prediction section 142 in step S172 of the cross-component linear prediction process described with reference to the flowchart of FIG. 35 is described with reference to the flowchart of FIG. 53.

When the cross-chroma residual prediction process is started, the Cb/Cr residual prediction section 142 reads, in step S201, a prediction image $P_{Cr}$ (also referred to as Cr prediction image $P_{Cr}$ below) of a prediction target block of a Cr component that is generated by the Luma/Chroma prediction section 141 and an adjacent decoded pixel group $R_{Cr,n}$ (also referred to as Cr adjacent pixel group $R_{Cr,n}$ below) stored in the frame memory 116.

The Cb/Cr residual prediction section 142 supplies the Cr adjacent pixel group $R_{Cr,n}$ to the residual prediction parameter derivation section 171. In addition, the Cb/Cr residual prediction section 142 supplies the Cr prediction image $P_{Cr}$ to the chroma prediction image correction section 172.

In step S202, the Cb/Cr residual prediction section 142 reads an adjacent decoded pixel group $R_{Cb,n}$ (also referred to as Cb collocate adjacent pixel group $R_{Cb,n}$ below) of the Cb component in the collocate location of the Cr adjacent pixel group $R_{Cr,n}$ from the frame memory 116. The Cb/Cr residual prediction section 142 supplies the Cb collocate adjacent pixel group $R_{Cb,n}$ to the residual prediction parameter derivation section 171.

In step S203, the Cb/Cr residual prediction section 142 reads a prediction residual Resi (referred to as Cb collocate prediction residual $Resi_{Cb}$ below) obtained by inversely quantizing/inversely transforming a transformation coefficient Coeff of the collocate block of the Cb component in the collocate location of the prediction target block (Cr prediction image $P_{Cr}$) of the Cr component. The Cb/Cr residual prediction section 142 supplies the Cb collocate prediction residual $Resi_{Cb}$ to the chroma prediction image correction section 172.

In step S204, the residual prediction parameter derivation section 171 derives a residual prediction parameter $\alpha$ used for Cb/Cr residual prediction on the basis of the supplied Cr adjacent pixel group $R_{Cr,n}$ and the Cb collocate adjacent pixel group $R_{Cb,n}$.

More specifically, the residual prediction parameter derivation section 171 derives the residual prediction parameter $\alpha$ (scaling argument $\alpha$ in expression (10) above) on the basis of expression (11) above.

In step S205, the chroma prediction image correction section 172 uses the residual prediction parameter $\alpha$ and the supplied Cb collocate prediction residual $Resi_{Cb}$ to perform residual prediction, and corrects the Cr prediction image $P_{Cr}$.

More specifically, the chroma prediction image correction section 172 adds $\alpha \cdot Resi_{Cb}$ obtained by multiplying the Cb collocate prediction residual $Resi_{Cb}$ by the prediction parameter $\alpha$ to the Cr prediction image $P_{Cr}$ on the basis of expression (10) above, and generates a corrected Cr prediction image $P^*_{Cr}$.

When the corrected Cr prediction image $P^*_{Cr}$ obtained by correcting the Cr prediction image $P_{Cr}$ as described above is obtained, the cross-chroma residual prediction process is finished and the process returns to FIG. 35.

As described above, the Cb/Cr residual prediction section 142 is able to correct the prediction image $Pred_{Cr}$ of a Cr component.

<Supplement>

It should be noted the above-described processes of the respective steps may be changed within a practicable range. In addition, the order of steps may also be changed within a practicable range.

<Flow of CU-Level Decoding Process>

The flow of the image decoding process (CU-level decoding process) as described above on one CU is described with reference to the flowchart of FIG. 54.

When the CU-level decoding process is started, the decoding unit 111 parses a syntax group related to CU to be decoded (also referred to as current CU) from encoded data, and acquires the parsed syntax group in step S221.

In step S222, the prediction unit 114 generates a prediction image of a luma component.

In step S223, the inverse quantization unit 112 and the inverse transformation unit 113 perform inverse quantization/inverse transformation to transform the quantized transformation coefficient of the luma component of the current CU obtained by decoding the encoded data by decoding unit 111 into a prediction residual.

In step S224, the calculation unit 115 uses the prediction residual of the luma component obtained in the process of step S223 and the prediction image of the luma component obtained in the process of step S222 to restore the decoded image of the luma component of the current CU.

In step S225, the prediction unit 114 performs cross-component linear prediction process, and generates a prediction image of the chroma component (Cb) for the current CU from the decoded image of the luma component obtained in the process of step S224.

In step S226, the inverse quantization unit 112 and the inverse transformation unit 113 perform inverse quantization/inverse transformation to transform the quantized transformation coefficient of the chroma component (Cb) of the current CU obtained by decoding the encoded data by decoding unit 111 into a prediction residual.

In step S227, the calculation unit 115 uses the prediction residual of the chroma component (Cb) obtained in the process of step S226 and the prediction image of the chroma component (Cb) obtained in the process of step S225 to restore the decoded image of the chroma component (Cb) of the current CU.

In step S228, the prediction unit 114 performs cross-component linear prediction process, and generates a prediction image of the chroma component (Cr) for the current CU from the decoded image of the luma component obtained in the process of step S224.

In step S229, the prediction unit 114 performs cross-chroma residual prediction (Cb/Cr residual prediction), and corrects the prediction image of the chroma component (Cr) of the current CU obtained in the process of step S228 by using the prediction residual of the chroma component (Cb).

In step S230, the inverse quantization unit 112 and the inverse transformation unit 113 perform inverse quantization/inverse transformation to transform the quantized transformation coefficient of the chroma component (Cr) of the current CU obtained by decoding the encoded data by decoding unit 111 into a prediction residual.

In step S231, the calculation unit 115 uses the prediction residual of the chroma component (Cr) obtained in the process of step S229 and the corrected prediction image of the chroma component (Cr) obtained in the process of step S230 to restore the decoded image of the chroma component (Cr) of the current CU.

When the process of step S231 is finished, the CU-level decoding process is finished.

Executing the CU-level decoding process as described above for each CU allows the image decoding device 100 to acquire a decoded image of each CU by using the cross-component linear prediction process and the cross-chroma residual prediction.

As described above, the image decoding device 100 that is an embodiment of an image processing device to which the present technology is applied includes a prediction unit that predicts the pixel value of a chroma component by linear prediction from the pixel value of a reference image of a luma component whose pixel location is changed by using a filter selected on the basis of information regarding the pixel location of the chroma component and information regarding a color format, and generates a prediction image of the chroma component, and a decoding unit that decodes, by using the prediction image generated by the prediction unit, a chroma component of encoded data in which an image is encoded.

That is, the image decoding device 100 predicts the pixel value of a chroma component by linear prediction from the pixel value of a reference image of a luma component whose pixel location is changed by using a filter, and generates a prediction image of the chroma component, and decodes a chroma component of encoded data in which an image by using the generated prediction image. The filter is selected on the basis of information regarding a pixel location of the chroma component and information regarding a color format.

The image decoding device 100 is thus able to suppress reduction in the coding efficiency as described above.

3. Second Embodiment

<Image Encoding Device>

Figure 55:
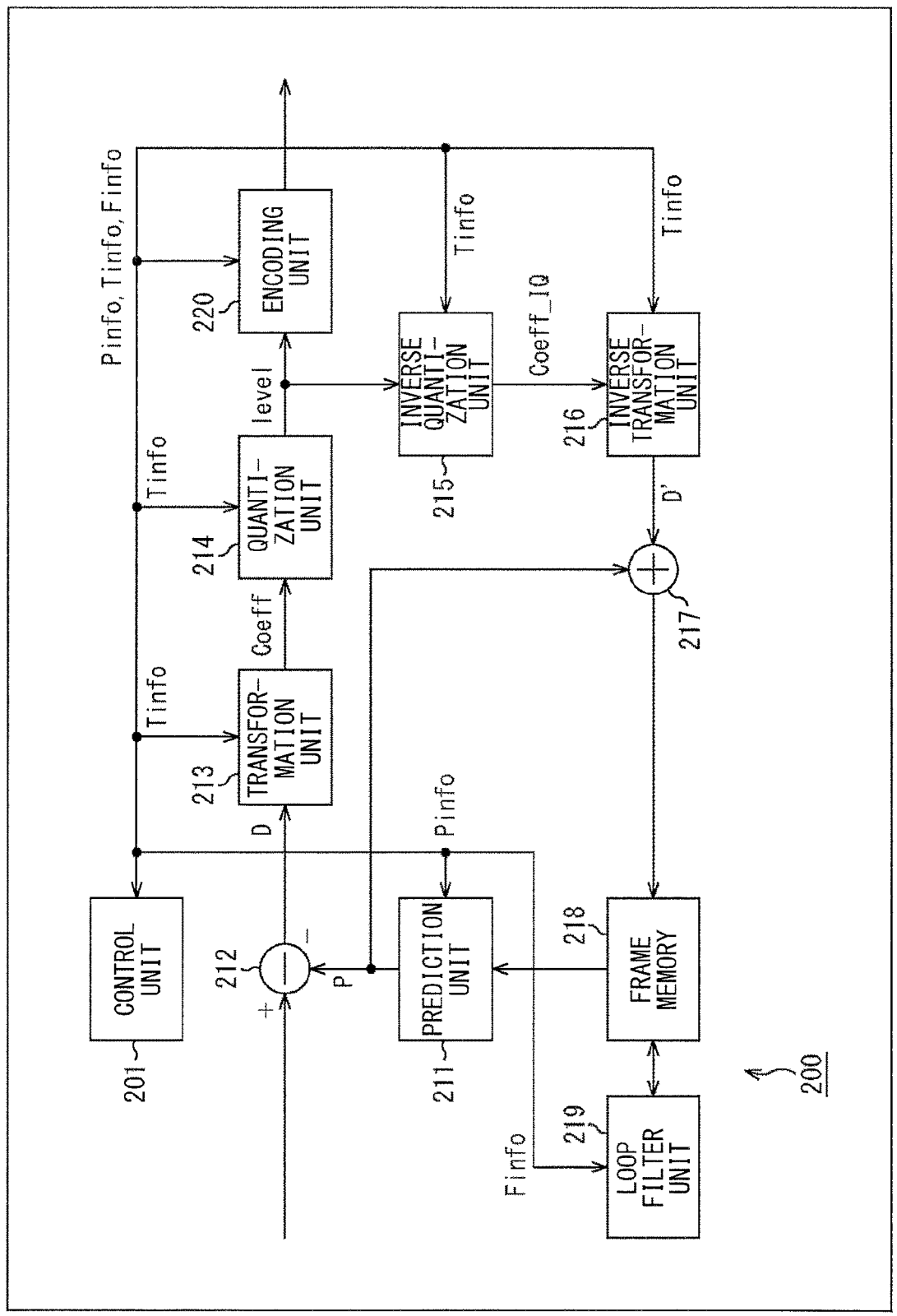
FIG. 55 is a block diagram illustrating an example of a main component of an image encoding device.

Next, encoding for generating encoded data to be decoded as described above is described. FIG. 55 is a block diagram illustrating an example of a configuration of an image encoding device that is a mode of the image processing device to which the present technology is applied. The image encoding device 200 illustrated in FIG. 55 is an image encoding device corresponding to the image decoding device 100 of FIG. 15, and generates encoded data (bit stream) by encoding an image in an encoding method corresponding to a decoding method used by the image decoding device 100. The encoded data (bit stream) is decoded by the image decoding device 100. The image encoding device 200 implements, for example, the technology proposed to HEVC or the technology proposed to JVET.

It should be noted that FIG. 55 illustrates main components such as a processing unit, the flow of data, and the like, but FIG. 55 does not illustrate all the components. That is, there may be processing units in the image encoding device 200 that are not illustrated as blocks in FIG. 55 or flows of processes and data that are not illustrated as arrows and the like in FIG. 55.

As illustrated in FIG. 55, the image encoding device 200 includes a control unit 201, a prediction unit 211, a calculation unit 212, a transformation unit 213, a quantization unit 214, an inverse quantization unit 215, an inverse transformation unit 216, a calculation unit 217, a frame memory 218, a loop filter unit 219, and an encoding unit 220.

<Control Unit>

The control unit 201 partitions a moving image #2 into blocks (CUs, PUs, transformation blocks, etc.) that are processing units on the basis of the block size of the processing units designated from the outside or in advance, and inputs an image I corresponding to the partitioned blocks to the calculation unit 212. In addition, the control unit 201 determines encoding parameters (header information Hinfo, prediction mode information Pinfo, transformation information Tinfo, etc.) to be supplied to each of the blocks, for example, on the basis of RDO (Rate-Distortion Optimization). The determined encoding parameters are supplied to each of the blocks. The details are as follows.

The header information Hinfo is supplied to each of the blocks.

The prediction mode information Pinfo is supplied to the encoding unit 220 and the prediction unit 211.

The transformation information Tinfo is supplied to the encoding unit 220, the transformation unit 213, the quantization unit 214, the inverse quantization unit 215, and the inverse transformation unit 216.

The filter information Finfo is supplied to the loop filter unit 219.

<Prediction Unit>

The prediction unit 211 performs a process for generating a prediction image similarly to the prediction unit 114 of the image decoding device 100. For example, the prediction unit 211 is configured to use the prediction mode information Pinfo supplied from the control unit 201 as input, generate the prediction image P in a prediction method designated by the prediction mode information Pinfo by using, as a reference image, a filtered decoded image R' (or a decoded image R that has not yet been subjected to filtering) that is designated by the prediction mode information Pinfo and stored in the frame memory 218, and output the prediction image P to calculation unit 212.

<Calculation Unit>

The calculation unit 212 uses the image I corresponding to a block that is a processing unit and the prediction image P supplied from the prediction unit 211 as input, subtracts the prediction image P from the image I as in the following expression (20), derives the prediction residual D, and outputs the derived prediction residual to the transformation unit 213.

$$D = I - P \qquad (20)$$

<Transformation Unit>

The transformation unit 213 is the inverse process of the inverse transformation unit 113, uses the prediction residual D and the transformation information Tinfo as input, applies transformation to the prediction residual D on the basis of the transformation information Tinfo, derives the transformation coefficient Coeff, and outputs the derived transformation coefficient Coeff to the quantization unit 214.

<Quantization Unit>

The quantization unit 214 is the inverse process of the inverse quantization unit 112, uses the transformation information Tinfo and the transformation coefficient Coeff as input, scales (quantizes) the transformation coefficient Coeff on the basis of the transformation information Tinfo, and outputs the quantized transformation coefficient, that is, the quantized transformation coefficient level level to the encoding unit 220.

<Inverse Quantization Unit>

The inverse quantization unit 215 includes a component similar to that of the inverse quantization unit 112, and performs a similar process. That is, the inverse quantization unit 215 performs the inverse process of the quantization unit 214.

<Inverse Transformation Unit>

The inverse transformation unit 216 includes a component similar to that of the inverse transformation unit 113, and performs a similar process. That is, the inverse transformation unit 216 performs the inverse process of the transformation unit 213.

<Calculation Unit>

The calculation unit 217 adds the prediction residual D' and the prediction image P corresponding to the prediction residual D' together, and derives the local decoded image $R_{local}$.

<Frame Memory>

The frame memory 218 performs a process for storing data regarding an image. For example, the frame memory 218 uses the local decoded image $R_{local}$ supplied from the calculation unit 217 as input, reconstructs the decoded image R in each picture unit, and stores the reconstructed decoded image R in the frame memory 218. The frame memory 218 reads the decoded image R from the buffer, and supplies the loop filter unit 219.

<Loop Filter Unit>

The loop filter unit 219 performs a process for a loop filter process. For example, the loop filter unit 219 reads the decoded image R from the frame memory 218, and generates the filtered decoded image R' in the loop filter process designated by the filter information Finfo. In addition, the loop filter unit 219 supplies the filtered decoded image R' to the frame memory 218. It should be noted that the loop filter process performed by the loop filter unit 219 includes a deblocking filter (DBF (DeBlocking Filter)), a pixel adaptive offset (SAO (Sample Adaptive Offset)), an adaptive loop filter (ALF (Adaptive Loop Filter)), and the other linear/non-linear filters (such as a Wiener filter and a bilateral filter).

<Encoding Unit>

The encoding unit 220 performs encoding that is the inverse process of decoding performed by the decoding unit 111. For example, the encoding unit 220 uses the encoding parameters (header information Hinfo, prediction mode information Pinfo, transformation information Tinfo, filter information Finfo, and the like) supplied from the control unit 201, transforms the quantized transformation coefficient level level supplied from the quantization unit 2143 into the syntax value of each syntax element, performs variable length encoding (e.g., arithmetic encoding) on each syntax value, and generates a bit string (encoded data) in accordance with the definition of a syntax table.

It should be noted that the encoding unit 220 derives the residual information Rinfo from the quantized transformation coefficient level level, encodes the residual information Rinfo, and generates a bit string. In addition, the encoding unit 220 multiplexes the bit strings of the respective syntax elements subjected to the variable length encoding, and generates and outputs the encoded data #1.

That is, the calculation unit 212 to the quantization unit 214, and the encoding unit 220 serve as an encoding unit that encodes a chroma component of an image by using a prediction image generated by the prediction unit 211.

<Flow of Image Encoding Process>

Next, a process that is executed by the image encoding device 200 configured as described above is described. The image encoding device 200 performs a process for encoding, for example, an image by executing an image encoding process.

When the image encoding process is started, the control unit 201 performs an encoding control process, and performs block partition, setting of an encoding parameter, and the like in step S241. In step S242, the prediction unit 211 performs a prediction process, and generates a prediction image and the like of an optimum prediction mode.

In step S243, the calculation unit 212 calculates the difference between the input image and the prediction image of the optimum mode selected in the prediction process of step S242. That is, the calculation unit 212 generates the prediction residual D between the input image and the prediction image. The data amount of the prediction residual D obtained in this manner is reduced as compared with that of the original image data. Therefore, it is possible to compress the data amount as compared with a case where the image is encoded with no change.

In step S244, the transformation unit 213 performs a transformation process on the prediction residual D generated in the process of step S243 and derives the transformation coefficient Coeff. It should be noted that this transformation process is the inverse process to the inverse transformation process of step S103, and the inverse process of the inverse transformation process executed in the image decoding process described above.

In step S245, the quantization unit 214 quantizes the transformation coefficient Coeff obtained in the process of step S244, for example, by using a quantization parameter calculated by the control unit 201, and derives the quantized transformation coefficient level level.

In step S246, the inverse quantization unit 215 inversely quantizes the quantized transformation coefficient level level generated in the process of step S245 by using characteristics corresponding to those of the quantization, and derives the transformation coefficient Coeff_IQ.

In step S247, the inverse transformation unit 216 inversely transforms the transformation coefficient Coeff_IQ obtained in the process of step S246 in a method corresponding to the transformation process of step S244, and derives the prediction residual D'. It should be noted that this inverse transformation process is executed similarly to the inverse transformation process executed in the image decoding process described above.

In step S248, the calculation unit 217 generates a decoded image that has been locally decoded by adding the prediction image obtained in the prediction process of step S242 to the prediction residual D' derived in the process of step S247.

In step S249, the frame memory 218 stores the decoded image that has been locally decoded, which is obtained in the process of step S248.

In step S250, the encoding unit 220 encodes the quantized transformation coefficient level level obtained in the process of step S245. For example, the encoding unit 220 encodes the quantized transformation coefficient level level by using arithmetic encoding or the like, and generates encoded data. The quantized transformation coefficient level level is information regarding an image. In addition, at this time, the encoding unit 220 encodes various encoding parameters (header information Hinfo, prediction mode information Pinfo, and transformation information Tinfo). Further, the encoding unit 220 derives the residual information Rinfo from the quantized transformation coefficient level level, and encodes the residual information Rinfo.

In step S251, the loop filter unit 219 performs a predetermined filter process on the local decoded image stored in the frame memory 218. When the process of step S251 is finished, the image encoding process is finished. It should be noted that a filtered local decoded image is stored in the frame memory 218 in step S251.

When the process of step S251 is finished, the image encoding process is finished.

<Flow of Encoding Process>

Figure 56:
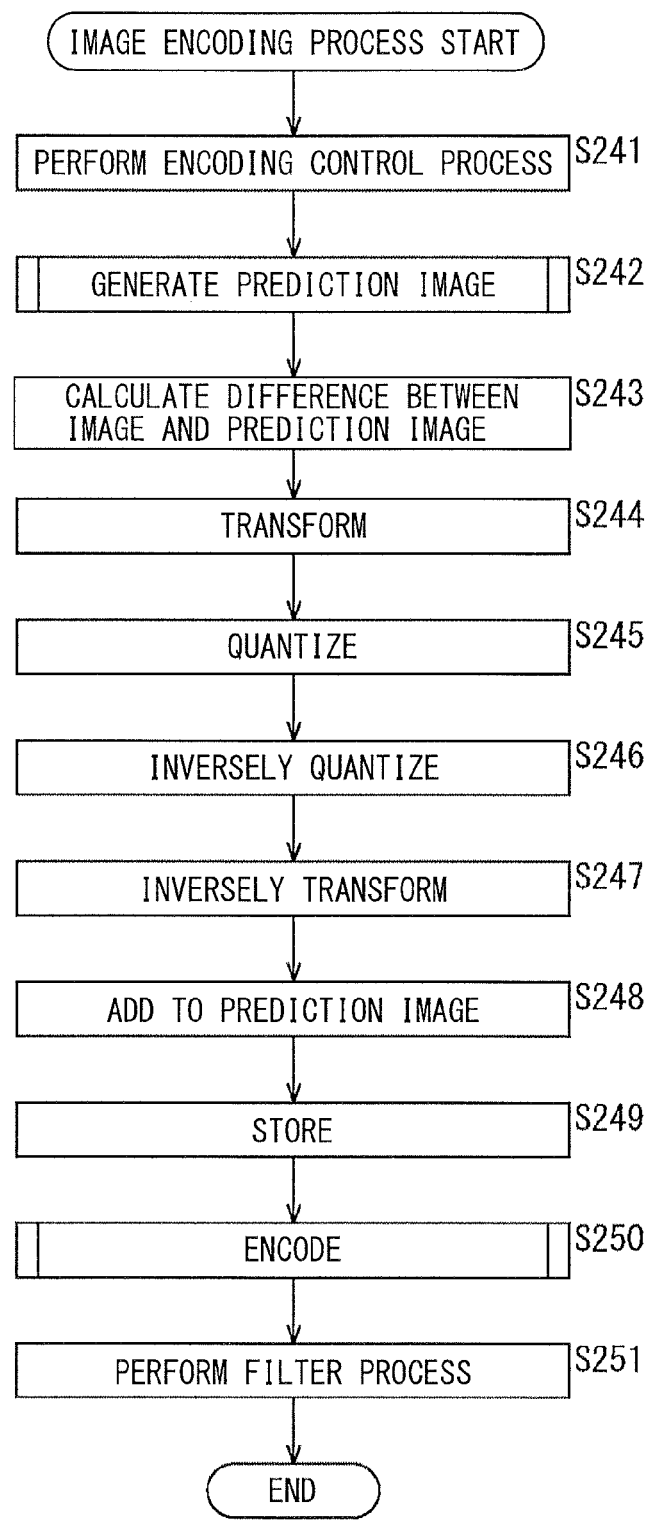
FIG. 56 is a flowchart describing an example of a flow of an image encoding process.
Figure 57:
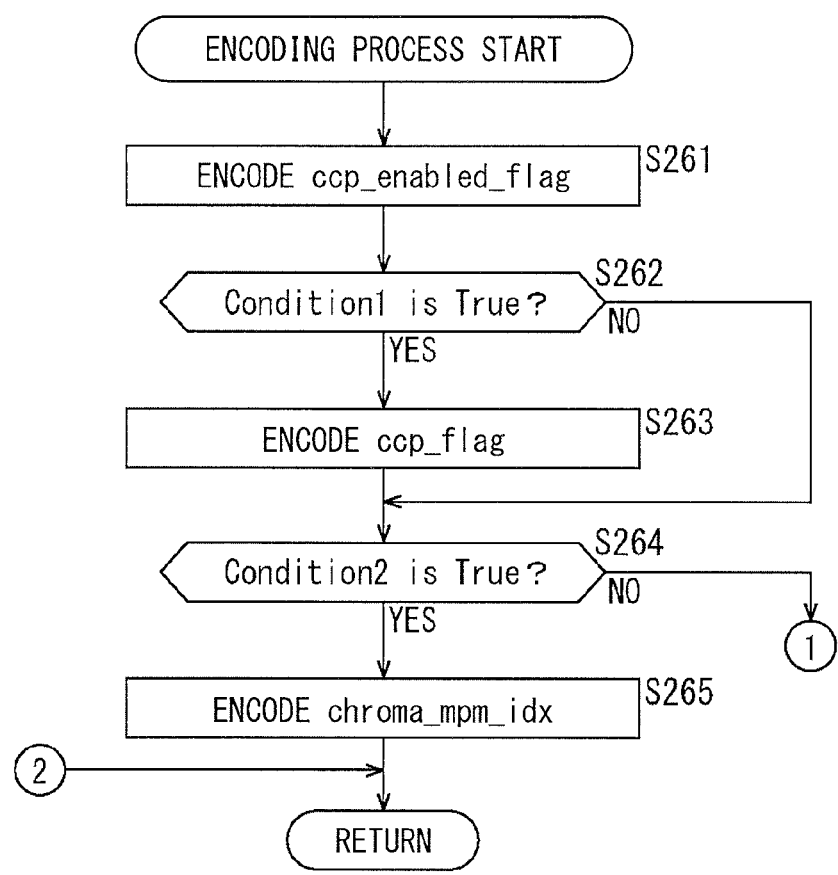
FIG. 57 is a flowchart describing an example of a flow of an encoding process.
Figure 58:
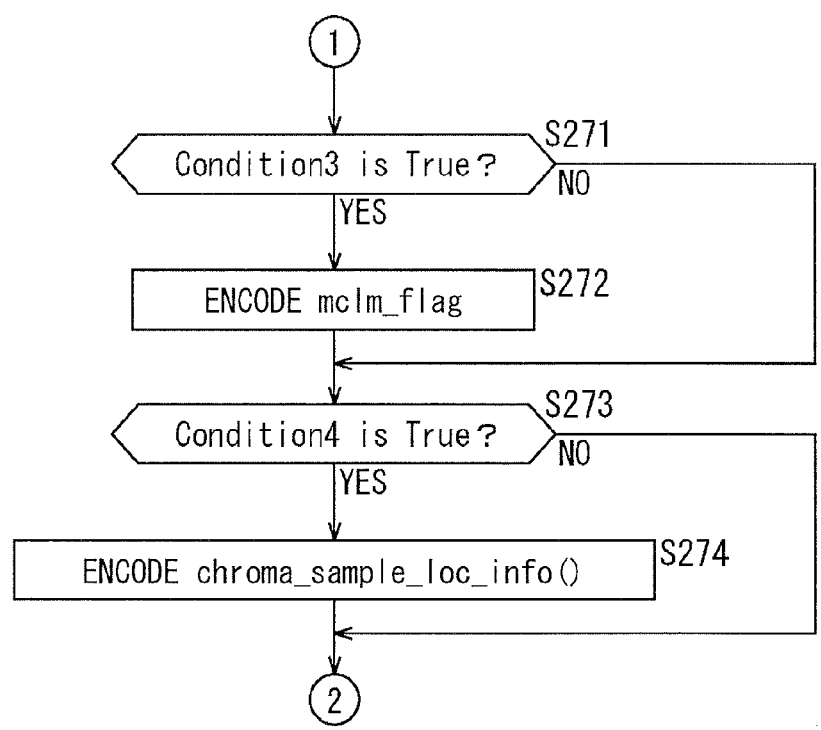
FIG. 58 is a flowchart describing an example of a flow of an encoding process subsequent to FIG. 57.

With reference to the flowcharts of FIGS. 57 and 58, examples of the flows of an encoding process of control information (cross-component prediction information CCInfo) and a chroma intra prediction mode IntraPredModeC of cross-component prediction, and an encoding process of the related syntax and the like (coding_unit ( )) that are executed in step S250 of FIG. 56 are described. It should be noted that FIG. 20 is an example of the syntax table of coding_unit( ) corresponding to the flowcharts of FIGS. 57 and 58.

When the decoding process is started, the encoding unit 220 encodes the cross-component prediction enabled flag ccp_enabled_flag under the control of the control unit 201, and adds the encoded cross-component prediction enabled flag ccp_enabled_flag to encoded data in step S261.

In step S261, the encoding unit 220 determines whether or not condition 1 in expression (13) above is satisfied. That is, the encoding unit 220 determines whether the cross-component prediction enabled flag ccp_enabled_flag is 1 (true).

In a case where it is determined that expression (13) above is satisfied (in a case where it is determined that ccp_enabled_flag is 1 (true)), the process proceeds to step S263.

In step S263, the encoding unit 220 encodes the cross-component prediction flag ccp_flag under the control of the control unit 201, and adds the encoded cross-component prediction flag ccp_flag to the encoded data. When the process of step S263 is finished, the process proceeds to step S264. In addition, in a case where it is determined in step S262 that expression (13) above is not satisfied (in a case where it is determined that ccp_enabled_flag is 0 (false)), the process of step S263 is skipped (omitted) and the process proceeds to step S264.

In step S264, the encoding unit 220 determines whether or not condition 2 in expression (14) above is satisfied. That is, the encoding unit 220 determines whether or not the cross-component prediction flag ccp_flag is 0 (false). In a case where it is determined that expression (14) above is satisfied (in a case where it is determined that ccp_flag is 0 (false)), the process proceeds to step S265.

It should be noted that expression (14) above may be exchanged with another determination formula as long as it is possible to acquire an equivalent result. For example, expression (15) above may be used instead.

In step S265, the encoding unit 220 encodes the chroma MPM identifier chroma_mpm_idx, and adds the encoded chroma MPM identifier chroma_mpm_idx to the encoded data. When the process of step S265 is finished, the encoding process is finished and the process returns to FIG. 56.

In addition, in a case where it is determined in step S264 of FIG. 57 that expression (14) above is not satisfied (in a case where it is determined that ccp_flag is 1 (true)), the process proceeds to FIG. 58.

In step S271 of FIG. 58, the encoding unit 220 determines whether or not condition 3 in expression (17) above is satisfied. That is, the encoding unit 220 determines whether or not the size (widthC*heightC) of a chroma encoded block is greater than or equal to the MCLM minimum block size MCLMMinBlkSize and less than or equal to the MCLM maximum block size MCLMMaxBlkSize. It should be noted that a portion of expression (17) above for comparing the size of the chroma block and the threshold may be replaced with the logarithmic expression in expression (18) above.

In a case where it is determined that expression (17) is satisfied (in a case where it is determined that the size (widthC*heightC) of the chroma encoded block is greater than or equal to the MCLM minimum block size MCLM-MinBlkSize and less than or equal to the MCLM maximum block size MCLMMaxBlkSize), the process proceeds to step S272.

In step S272, the encoding unit 220 encodes the multi-class linear prediction mode flag mclm_flag, and adds the encoded multi-class linear prediction mode flag mclm_flag to the encoded data. When the process of step S272 is finished, the process proceeds to step S273. In addition, in a case where it is determined in step S271 that expression (17) is not satisfied (in a case where it is determined that the size (widthC*heightC) of the chroma encoded block is less than the MCLM minimum block size MCLMMinBlkSize or greater than the MCLM maximum block size MCLMMaxBlkSize), the process of step S272 is skipped and the process proceeds to step S273.

In step S273, the encoding unit 220 determines whether or not condition 4 in expression (19) above is satisfied, that is, whether or not the chroma array type ChromaArrayType is CHROMA_420 or CHROMA_422.

In a case where it is determined that expression (19) is satisfied (in a case where the chroma array type ChromaArrayType is CHROMA_420 or CHROMA_422), the process proceeds to step S274.

In step S274, the encoding unit 220 encodes the chroma sample location information chroma_sample_loc_info( ) in accordance with the definition of the syntax table under the control of the control unit 201, and includes the encoded chroma sample location information chroma_sample_loc_info( ) in the encoded data.

For example, the encoding unit 220 encodes a bin sequence bin of chroma sample location type identifier information chroma_sample_loc_type_idx in accordance with the definition of the syntax table illustrated in FIG. 16. It should be noted that the chroma sample location type identifier information chroma_sample_loc_type_idx is binarized to offer the bin sequence.

When the process of step S274 is finished, the process returns to FIG. 57, the encoding process is finished, and the process returns to FIG. 56.

In addition, in a case where it is determined in step S273 of FIG. 58 that expression (19) is not satisfied (in a case where it is determined that the chroma array type ChromaArrayType is not CHROMA_420 or CHROMA_422), the process of step S274 is skipped, the process returns to FIG. 57, the encoding process is finished, and the process returns to FIG. 56.

It is to be noted that the image encoding process or encoding process described above may have the processing order of the respective steps or the contents of the processes changed within a practical range.

As described above, the encoding unit 220 encodes the chroma sample location information chroma_sample_loc_info( ) indicating the sample location of the chroma component for a sample of a luma component as a portion of the cross-component prediction information CCInfo. This allows the Luma/Chroma prediction section 141 (intra prediction section 231) to select a downsampling filter that reduces the phase shift between a chroma component and a luma component, on the basis of the chroma array type ChromaArrayType and the chroma sample location information chroma_sample_loc_info( ). This allows the image encoding device 200 to perform cross-component prediction with the phase shift reduced, making it possible to suppress reduction in the coding efficiency.

<Another Example of Chroma Sample Location Information>

The example of the syntax of the chroma sample location information chroma_sample_loc_info( ) has been described with reference to FIG. 16, but the syntax of the chroma sample location information chroma_sample_loc_info( ) is not limited to this example. For example, the configuration as illustrated in FIG. 26 may be adopted. That is, the chroma sample location type may have an initial value (default_chroma_sample_loc_type), and only in a case where the chroma sample location type has a value other than the initial value, the chroma sample location type identifier information chroma_sample_loc_type_idx may be transmitted.

In step S274 (FIG. 58), the encoding unit 220 encodes the syntax in accordance with the definition of the syntax table illustrated in FIG. 26.

default chroma sample location type flag default_chroma_sample_loc_type_flag chroma sample location type identifier information chroma_sample_loc_type_idx That is, the encoding unit 220 encodes the default chroma sample location type flag default_chroma_sample_loc_type_flag. Then, in a case where this flag is false (0), the encoding unit 220 further encodes the bin sequence bin of the chroma sample location type identifier information chroma_sample_loc_type_idx. It should be noted that the value of the chroma sample location type identifier information chroma_sample_loc_type_idx is binarized to offer this bin sequence.

In chroma sample location information chroma_sample_loc_type( ) based on the definition of the syntax table of FIG. 26, it is possible to encode a predetermined type (e.g., Type2) frequently used as a chroma sample location type with one bin. It is thus possible to encode the chroma sample location information with a smaller code amount than in the syntax table configured in a case of FIG. 16. That is, it is possible to suppress reduction in coding efficiency.

<Storage Place of Chroma Sample Location Information>

In the flowcharts of FIGS. 57 and 58, and the syntax table of FIG. 20, a configuration example is illustrated in which the chroma sample location information chroma_sample_loc_info( ) is encoded for each coding unit. However, the storage place of the chroma sample location information chroma_sample_loc_info( ) is not limited thereto.

Basically, the chroma sample location type is determined for each sequence, and the chroma sample location information chroma_sample_loc_info( ) may be encoded in the header information (VPS/SPS/PPS/SH/CTU) higher than the coding unit as illustrated in A of FIG. 28. That is, the chroma sample location information chroma_sample_loc_info( ) may be stored in the header information (VPS/SPS/PPS/SH/CTU) higher than the coding unit.

In that case, the other syntax related to the cross-component linear prediction may also be encoded in the header information of the coding unit as illustrated in B of FIG. 28. That is, the other syntax related to the cross-component linear prediction may be stored in the header information of the coding unit.

This makes it possible to reduce the code amount of the chroma sample location information chroma_sample_loc_info( ) for each coding unit. That is, it is possible to suppress reduction in coding efficiency.

<Prediction Unit>

Figure 59:
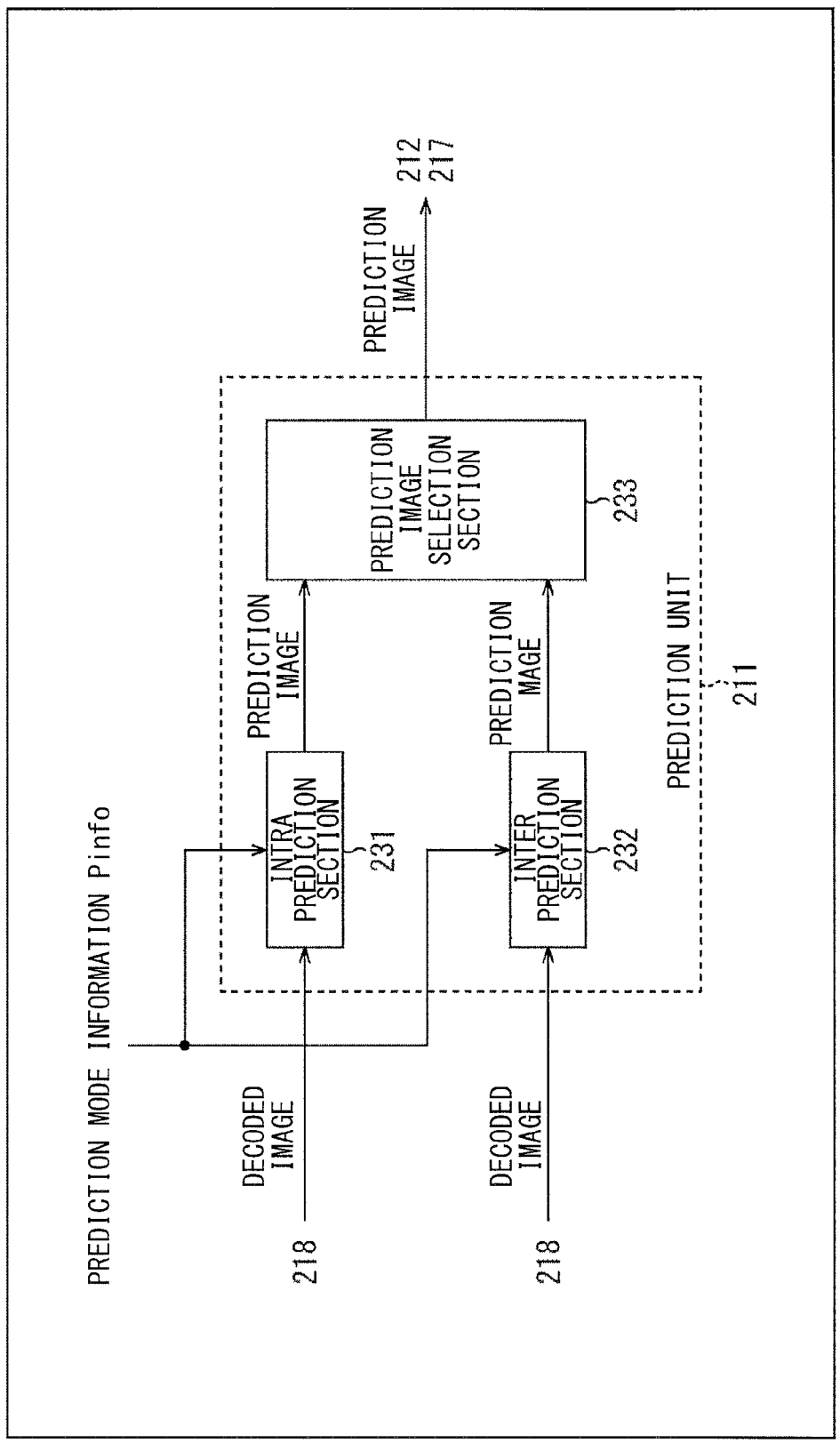
FIG. 59 is a block diagram illustrating an example of a main component of the prediction unit.

FIG. 59 is a block diagram illustrating an example of main components of the prediction unit 211 of the image encoding device 200. As illustrated in FIG. 59, the prediction unit 211 includes an intra prediction section 231, an inter prediction section 232, and a prediction image selection section 233.

The intra prediction section 231 performs a process for intra prediction. For example, the intra prediction section 231 acquires a decoded image from the frame memory 218 as a reference image, performs intra prediction based on the prediction mode information Pinfo by using the decoded image, and generates a prediction image. The intra prediction section 231 performs intra prediction in each intra prediction mode, and calculates each cost function (also referred to as cost). The intra prediction section 231 supplies the generated prediction image of each intra prediction mode to the prediction image selection section 233 along with the prediction mode information Pinfo and the like.

The inter prediction section 232 performs a process for inter prediction. For example, the inter prediction section 232 acquires a decoded image from the frame memory 116 as a reference image, performs inter prediction based on the prediction mode information Pinfo by using the decoded image, and generates a prediction image. The inter prediction section 232 performs inter prediction in each inter prediction mode, and calculates each cost function. The inter prediction section 232 supplies the generated prediction image of each inter prediction mode to the prediction image selection section 233 along with the prediction mode information Pinfo and the like.

The prediction image selection section 233 selects a prediction image of the optimal prediction mode from the intra prediction image supplied from the intra prediction section 231 and the inter prediction image supplied from the inter prediction section 232, for example, on the basis of the cost function or the like. The prediction image selection section 233 supplies the selected prediction image to the calculation unit 212 and the calculation unit 217.

<Flow of Intra Prediction Process>

An example of the flow of the prediction process executed by the prediction unit 211 configured in this way in step S242 of FIG. 56 is described with reference to the flowchart of FIG. 60.

When the prediction process is started, the intra prediction section 231 performs intra prediction to generate a prediction image in step S291. When the process of step S291 is finished, the process proceeds to step S292.

In step S292, the inter prediction section 232 performs inter prediction to generate a prediction image. When the process of step S292 is finished, the process proceeds to step S293.

In step S293, the intra prediction section 231 calculates the cost function of each intra prediction mode, the inter prediction section 232 calculates the cost function of each inter prediction mode, and the prediction image selection section 233 selects (a prediction image of) the optimal prediction mode on the basis of the cost functions.

When the process of step S293 is finished, the prediction process is finished and the process returns to FIG. 56.

This allows the prediction unit 211 to encode a prediction image of the optimal prediction mode. Thus, it is possible to suppress reduction in coding efficiency.

<Intra Prediction Section>

Incidentally, this intra prediction section 231 includes a component that is basically similar to that of the intra prediction section 121 of the image decoding device 100, and performs similar intra prediction. That is, the description of intra prediction section 121 described above in the first embodiment is basically applicable to this intra prediction section 231. For example, the intra prediction section 231 includes a component as illustrated in FIG. 30. That is, the intra prediction section 231 also includes the DC prediction section 131 to the CC prediction section 134.

However, different from the intra prediction section 121 of the image decoding device 100, this intra prediction section 231 performs intra prediction in all the prediction modes as described above. In addition, a parameter used for CC prediction such as the prediction mode information Pinfo is not extracted from encoded data, but provided, for example, from another processing unit of the image encoding device 200 such as the control unit 201 or the encoding unit 220.

<Flow of Intra Prediction Process>

Figure 60:
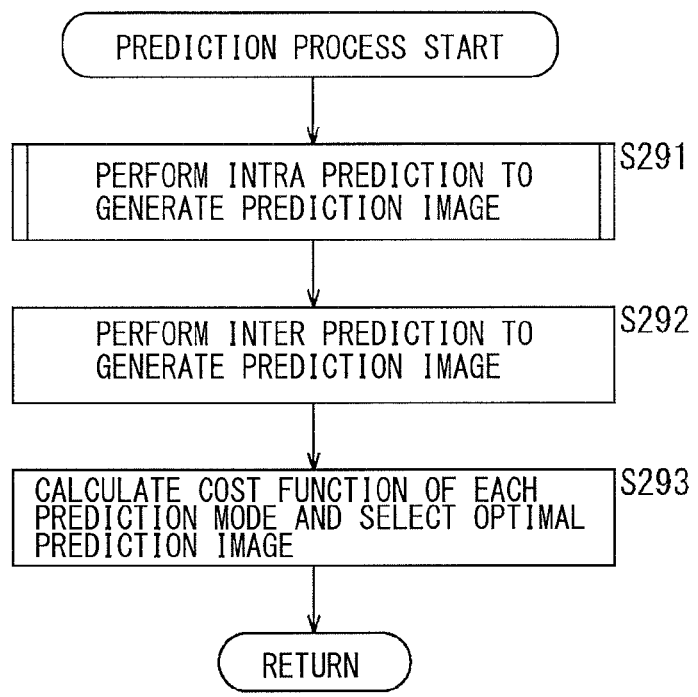
FIG. 60 is a flowchart describing an example of the flow of the prediction process.
Figure 61:
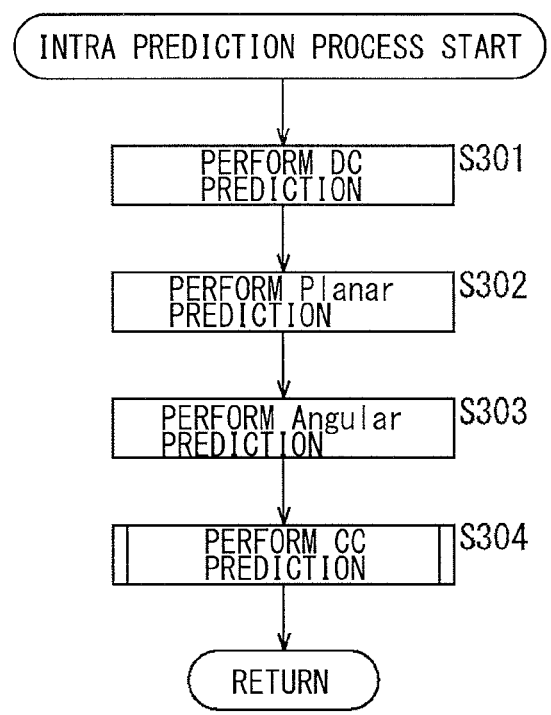
FIG. 61 is a flowchart describing an example of the flow of the intra prediction process.

An example of the flow of the intra prediction process executed by the intra prediction section 231 in step S291 of FIG. 60 is described with reference to the flowchart of FIG. 61.

When this intra prediction process is started, the DC prediction section 131 performs DC prediction and generates a prediction image in step S301. In step S302, the Planar prediction section 132 performs Planar prediction and generates a prediction image. In step S303, the Angular prediction section 133 performs Angular prediction and generates a prediction image. In step S304, the CC prediction section 134 performs CC prediction (cross-component prediction process) and generates a prediction image.

When the process of step S304 is finished, the intra prediction process is finished and the process returns to FIG. 60.

In this way, the intra prediction section 231 generates a prediction image in each prediction mode. This allows the prediction unit 211 to select a prediction image of the optimal mode. That is, it is possible to suppress reduction in coding efficiency.

<CC Prediction Section>

It should be noted that the CC prediction section 134 also includes a component basically similar to a component in a case of the first embodiment, and performs a similar process in this case. That is, the description of the CC prediction section 134 described above in the first embodiment is also basically applicable to this case. For example, the CC prediction section 134 includes a component as illustrated in FIG. 30, and executes the cross-component linear prediction process as described with reference to the flowchart of FIG. 35.

Similarly, the Luma/Chroma prediction section 141 includes a component as illustrated in FIG. 32, and executes the luma-to-chroma prediction process as described with reference to the flowchart of FIG. 36. In addition, the Cb/Cr residual prediction section 142 includes a component as illustrated in FIG. 52, and executes the cross-chroma residual prediction process as described with reference to the flowchart of FIG. 53.

This allows the CC prediction section 134 (Luma/Chroma prediction section 141 and Cb/Cr residual prediction section 142) to each obtain the effects similar to the effects in a case of the first embodiment. Thus, it is possible to suppress reduction in coding efficiency.

<Flow of CU-Level Encoding Process>

Examples of the flow of the image encoding process (CU-level encoding process) as described above on one CU are described with reference to the flowcharts of FIGS. 62 and 63.

Figure 62:
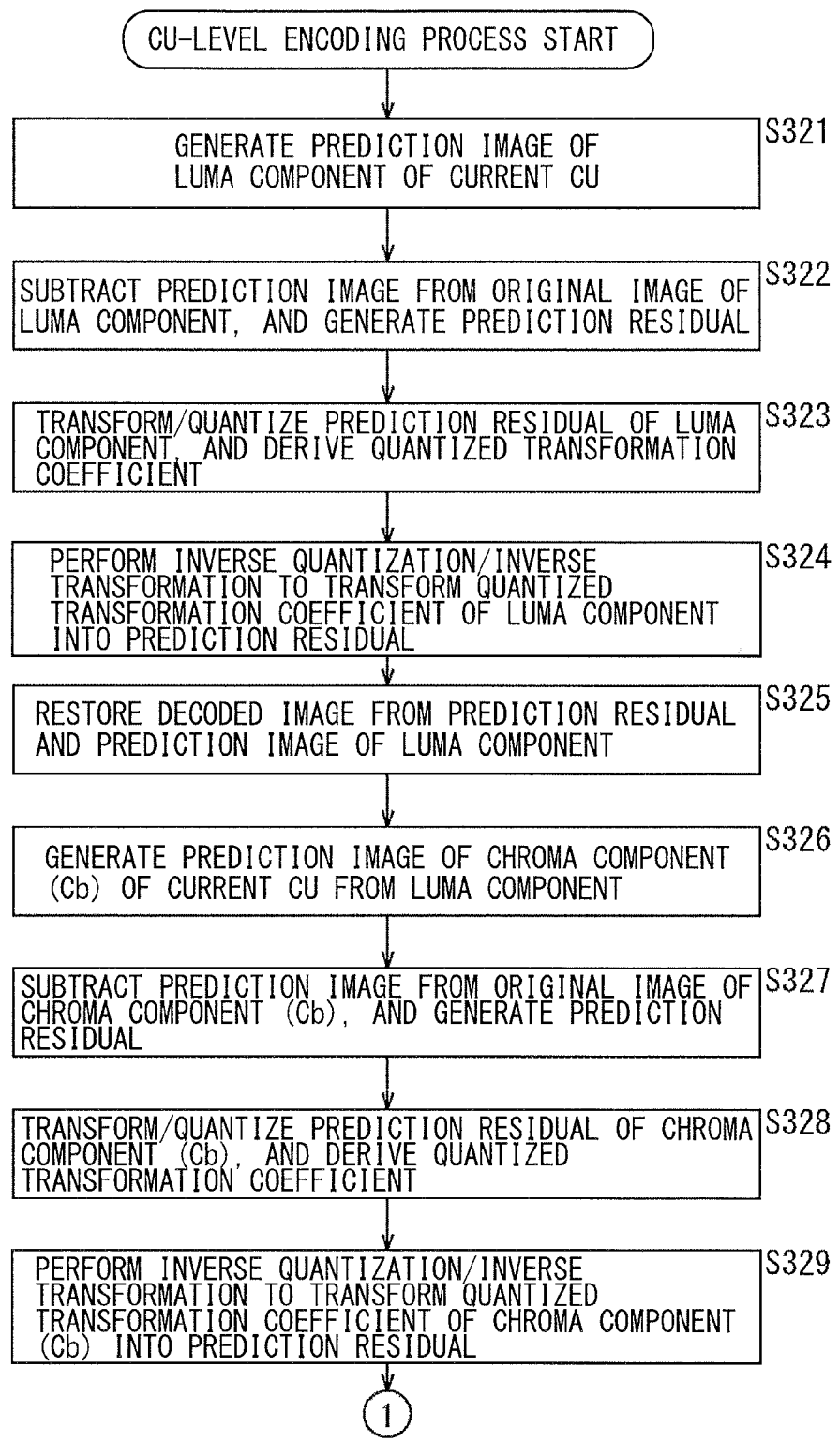
FIG. 62 is a flowchart describing an example of a flow of a CU-level encoding process.

When the CU-level encoding process is started, the prediction unit 211 generates a prediction image of the luma component of the CU to be encoded (current CU) in step S321 of FIG. 62.

In step S322, the calculation unit 212 subtracts the prediction image of the luma component of the current CU generated in the process of step S321 from the original image of the luma component of the current CU, and generates a prediction residual of the luma component of the current CU.

In step S323, the transformation unit 213 and the quantization unit 214 transform/quantize the prediction residual of the luma component of the current CU obtained in the process of step S322, and derive the quantized transformation coefficient of the luma component of the current CU.

In step S324, the inverse quantization unit 215 and the inverse transformation unit 216 perform inverse quantization/inverse transformation to transform the quantized transformation coefficient of the luma component of the current CU obtained in the process of step S323 into a prediction residual.

In step S325, the calculation unit 217 adds the prediction residual of the luma component of the current CU obtained in the process of step S324 and the prediction image of the luma component of the current CU generated in the process of step S321 together to restore the decoded image of the luma component of the current CU.

In step S326, the prediction unit 211 (Luma/Chroma prediction section 141) generates a prediction image of the chroma component (Cb) of the CU to be encoded (current CU).

In step S327, the calculation unit 212 subtracts the prediction image of the chroma component (Cb) of the current CU generated in the process of step S326 from the original image of the chroma component (Cb) of the current CU, and generates a prediction residual of the chroma component (Cb) of the current CU.

In step S328, the transformation unit 213 and the quantization unit 214 transform/quantize the prediction residual of the chroma component (Cb) of the current CU obtained in the process of step S327, and derive the quantized transformation coefficient of the chroma component (Cb) of the current CU.

In step S329, the inverse quantization unit 215 and the inverse transformation unit 216 perform inverse quantization/inverse transformation to transform the quantized transformation coefficient of the chroma component (Cb) of the current CU obtained in the process of step S328 into a prediction residual. When the process of step S329 is finished, the process proceeds to FIG. 63.

Figure 63:
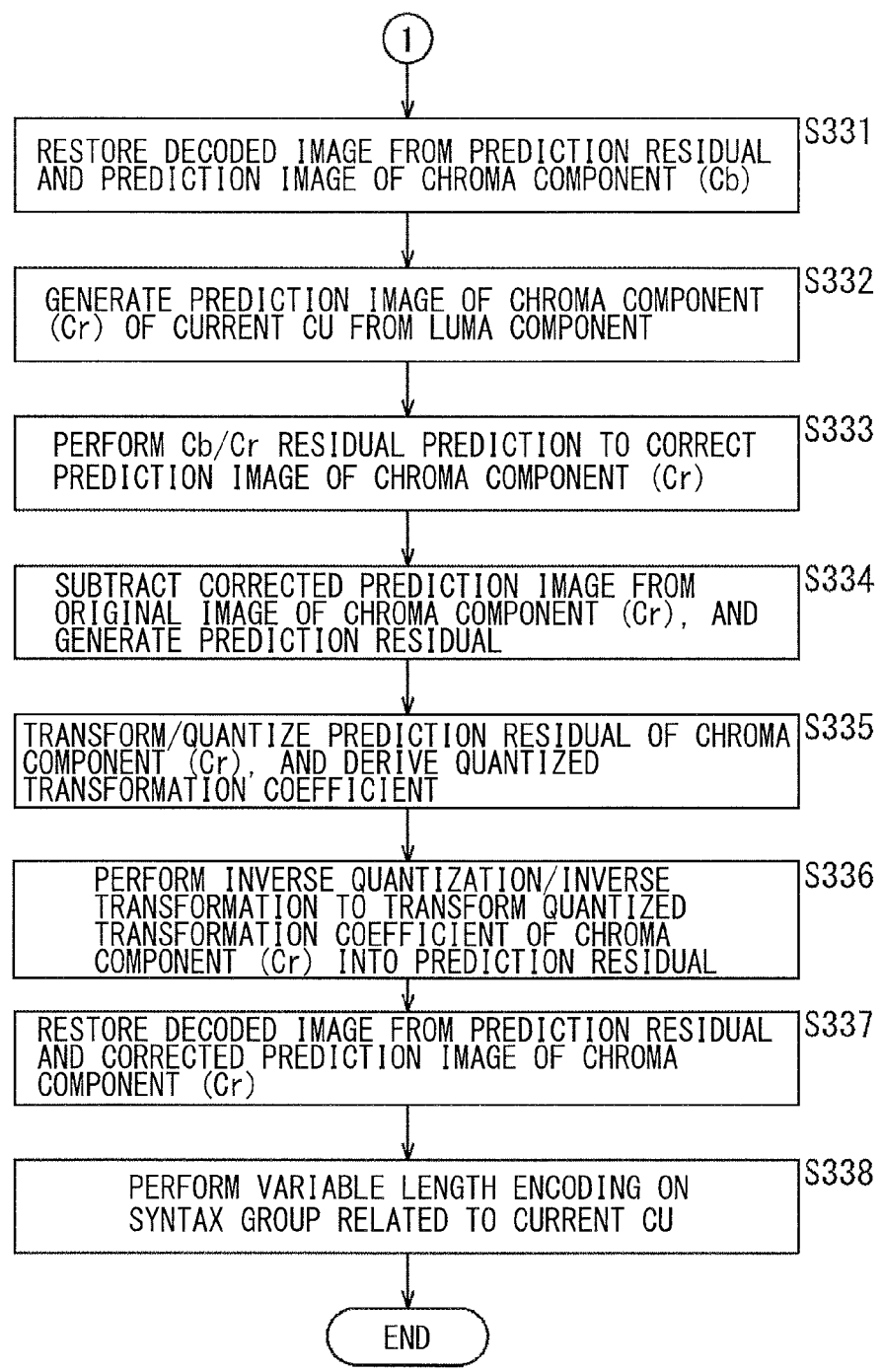
FIG. 63 is a flowchart describing an example of a flow of a CU-level encoding process subsequent to FIG. 62.

In step S331 of FIG. 63, the calculation unit 217 adds the prediction residual of the chroma component (Cb) of the current CU obtained in the process of step S329 and the prediction image of the chroma component (Cb) of the current CU obtained in the process of step S326 together to restore the decoded image of the chroma component (Cb) of the current CU.

In step S332, the prediction unit 211 (Luma/Chroma prediction section 141) generates a prediction image of the chroma component (Cr) of the CU to be encoded (current CU).

In step S333, the prediction unit 211 (Cb/Cr residual prediction section 142) performs cross-chroma residual prediction (Cb/Cr residual prediction) to correct the prediction image of the chroma component (Cr) of the current CU obtained in the process of step S332 by using the prediction residual of the chroma component (Cb) of the current CU.

In step S334, the calculation unit 212 subtracts the corrected prediction image of the chroma component (Cr) of the current CU obtained in the process of step S333 from the original image of the chroma component (Cr) of the current CU, and generates a prediction residual of the chroma component (Cr) of the current CU.

In step S335, the transformation unit 213 and the quantization unit 214 transform/quantize the prediction residual of the chroma component (Cr) of the current CU obtained in the process of step S334, and derive the quantized transformation coefficient of the chroma component (Cr) of the current CU.

In step S336, the inverse quantization unit 215 and the inverse transformation unit 216 perform inverse quantization/inverse transformation to transform the quantized transformation coefficient of the chroma component (Cr) of the current CU obtained in the process of step S335 into a prediction residual.

In step S337, the calculation unit 217 adds the prediction residual of the chroma component (Cr) of the current CU obtained in the process of step S336 and the corrected prediction image of the chroma component (Cr) of the current CU obtained in the process of step S333 together to restore the decoded image of the chroma component (Cr) of the current CU.

In step S338, the encoding unit 220 performs variable length encoding on a syntax group related to the CU to be encoded.

When the process of step S338 is finished, the CU-level encoding process is finished.

Executing the CU-level encoding process as described above for each CU allows the image encoding device 200 to acquire an encoded image of each CU by using the cross-component linear prediction process and the cross-chroma residual prediction.

As described above, the image encoding device 200 that is an embodiment of an image processing device to which the present technology is applied includes a prediction unit that predicts the pixel value of a chroma component by linear prediction from the pixel value of a reference image of a luma component whose pixel location is changed by using a filter selected on the basis of information regarding the pixel location of the chroma component and information regarding a color format, and generates a prediction image of the chroma component, and an encoding unit that encodes, by using the prediction image generated by the prediction unit, a chroma component of an image.

That is, the image encoding device 200 predicts the pixel value of a chroma component by linear prediction from the pixel value of a reference image of a luma component whose pixel location is changed by using a filter, and generates a prediction image of the chroma component, and encodes a chroma component of an image by using the generated prediction image. The filter is selected on the basis of information regarding a pixel location of the chroma component and information regarding a color format.

The image encoding device 200 is thus able to suppress reduction in the coding efficiency as described above.

4. Third Embodiment

<Control of Cross-Chroma Residual Prediction>

The execution of the correction of a prediction image of a Cr component by cross-chroma residual prediction may be controlled. For example, control information for controlling the cross-chroma residual prediction may be transmitted from the image encoding device 200 to the image decoding device 100. As this control information, for example, a cross-chroma residual prediction flag chroma_resi_pred_flag may be transmitted.

The cross-chroma residual prediction flag chroma_resi_pred_flag is flag information for designating whether or not to perform cross-chroma residual prediction. For example, in a case where the value is "0" (false), the cross-chroma residual prediction process is skipped (omitted). In addition, for example, in a case where the value is "1" (true), the cross-chroma residual prediction process is executed.

The use of such flag information makes it possible to control whether or not to execute cross-chroma residual prediction. This makes it possible to suppress the unnecessary execution of cross-chroma residual prediction, and it is thus possible to suppress increase in encoding/decoding loads and process time.

Further, as control information, a cross-chroma residual prediction enabled flag chroma_resi_pred_enabled_flag may be transmitted.

The cross-chroma residual prediction enabled flag chroma_resi_pred_enabled_flag is flag information indicating whether or not the cross-chroma residual prediction flag chroma_resi_pred_flag is enabled. That is, the use of this flag information makes it possible to control whether or not to permit the control of whether or not to execute cross-chroma residual prediction.

For example, in a case where the value of the cross-chroma residual prediction enabled flag chroma_resi_ pred_enabled_flag is "0" (false), the cross-chroma residual prediction flag chroma_resi_pred_flag is disabled and is not transmitted. In addition, for example, in a case where the value of the cross-chroma residual prediction enabled flag chroma_resi_pred_enabled_flag is "1" (true), the cross-chroma residual prediction flag chroma_resi_pred_flag is enabled and transmitted.

That is, only in a case where the value of the cross-chroma residual prediction enabled flag chroma_resi_pred_enabled_flag is "1" (true), it is possible to control whether or not to execute cross-chroma residual prediction.

However, in a case where the value of the cross-chroma residual prediction enabled flag chroma_resi_pred_enabled_flag is "0" (false), the image decoding device 100 skips parsing the cross-chroma residual prediction flag chroma_resi_pred_flag and sets the value at "0" (false). That is, cross-chroma residual prediction is skipped. This makes it possible to paraphrase the cross-chroma residual prediction enabled flag chroma_resi_pred_enabled_flag as flag information for controlling whether or not to permit the execution of cross-chroma residual prediction.

The use of this flag information makes it possible to suppress the unnecessary transmission of the cross-chroma residual prediction flag chroma_resi_pred_flag, and it is thus possible to suppress reduction in the coding efficiency. In addition, it is possible to suppress increase in loads and process time caused by the process for acquiring the cross-chroma residual prediction flag chroma_resi_pred_flag.

<Flow of Decoding Process>

Examples of the flows of a decoding process of control information (cross-component prediction information CCInfo) and chroma intra prediction mode IntraPredModeC of cross-component prediction, and a decoding process of related syntax and the like (coding_unit( )) in a case where these kinds of control information is applied are described with reference to the flowcharts of FIGS. 64 and 65. It should be noted that FIG. 66 is an example of the syntax table of coding_unit( ) corresponding to the flowcharts of FIGS. 64 and 65.

Figure 64:
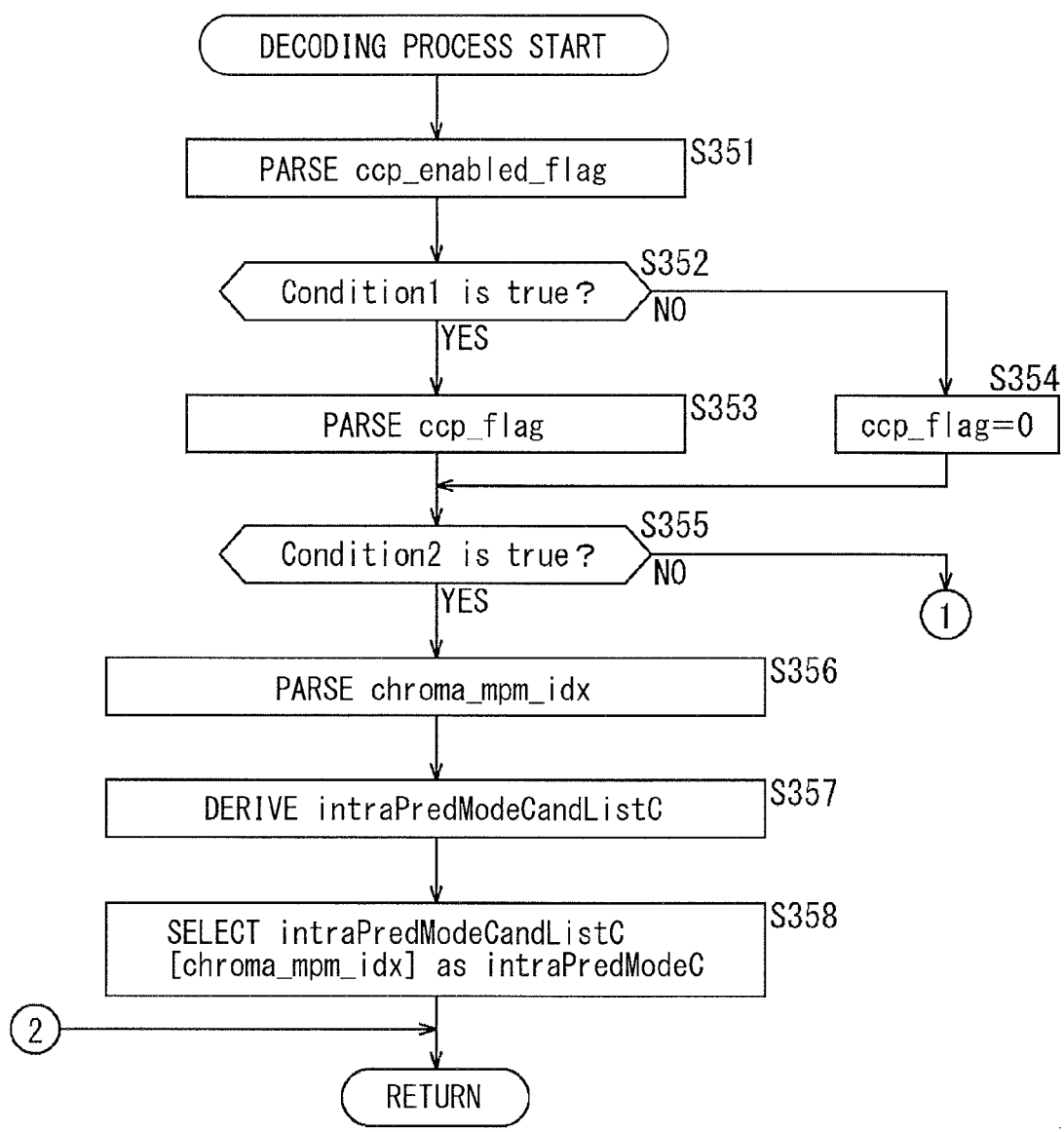
FIG. 64 is a flowchart describing an example of the flow of the decoding process.

When the decoding process is started, the decoding unit 111 executes the respective processes of steps S351 to S358 of FIG. 64 similarly to the respective processes of steps S121 to S128 of FIG. 18.

Figure 65:
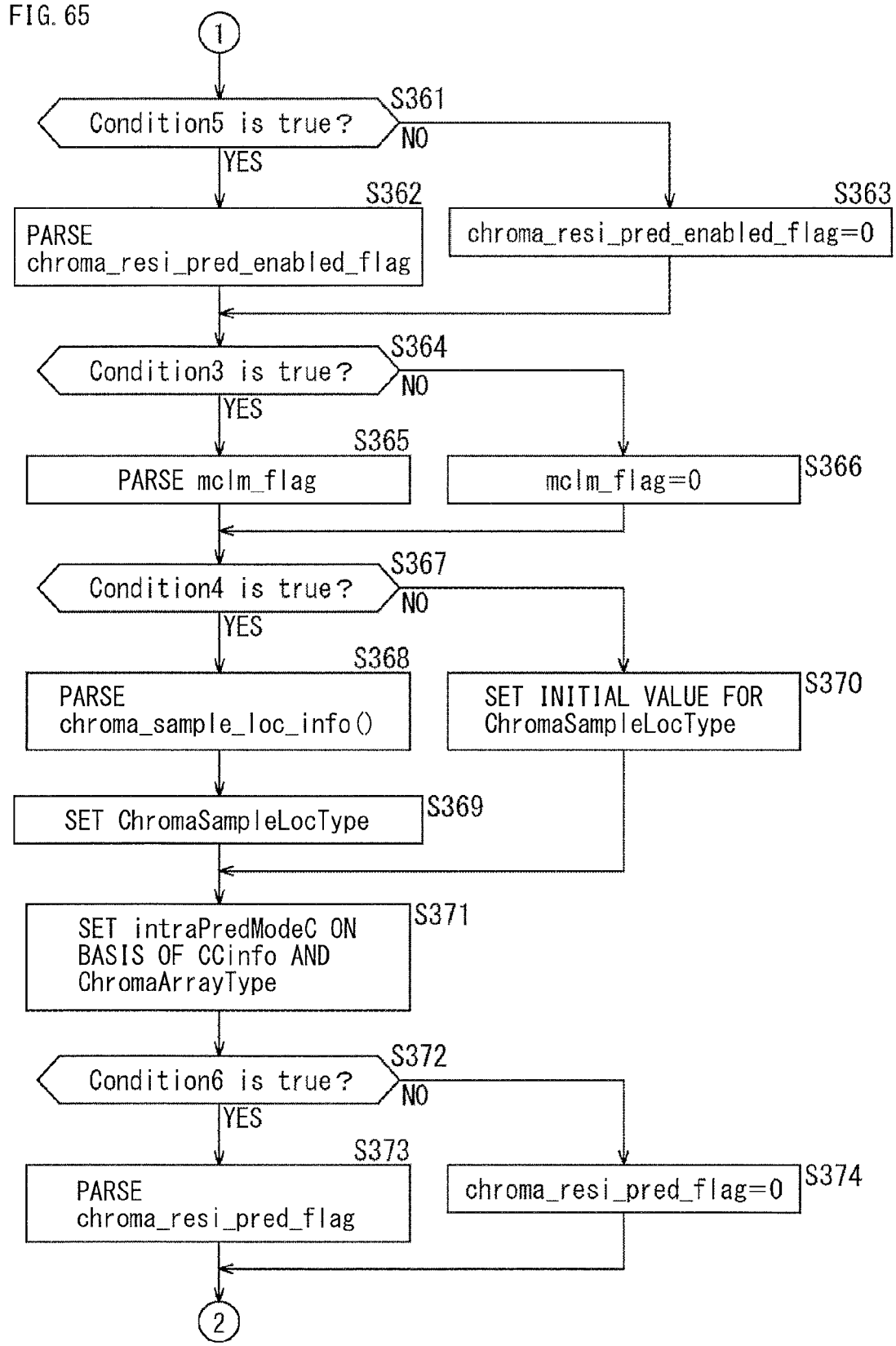
FIG. 65 is a flowchart describing an example of a flow of a decoding process subsequent to FIG. 64.

In a case where it is determined in step S355 that expression (14) above is not satisfied (in a case where it is determined that ccp_flag is 1 (true)), the process proceeds to FIG. 65.

In step S361, the decoding unit 111 determines whether or not condition 5 in the following expression (21) is satisfied.

Condition 5: ccp_enabled_flag==1 (21)

That is, it is determined whether the cross-component prediction enabled flag ccp_enabled_flag is "1" (true). In a case where it is determined that expression (21) is satisfied (i.e., the cross-component prediction enabled flag ccp_enabled_flag is "1" (true)), the process proceeds to step S362.

In step S362, the decoding unit 111 parses the cross-chroma residual prediction enabled flag chroma_resi_pred_enabled_flag included in encoded data, and decodes the parsed parses the cross-chroma residual prediction enabled flag chroma_resi_pred_enabled_flag. When the cross-chroma residual prediction enabled flag chroma_resi_pred_enabled_flag is acquired, the process proceeds to step S364.

In addition, in a case where it is determined in step S361 that expression (21) is not satisfied (i.e., the cross-component prediction enabled flag ccp_enabled_flag is "0" (false)), the process proceeds to step S363.

The decoding unit 111 skips parsing the cross-chroma residual prediction enabled flag chroma_resi_pred_enabled_flag, and sets the value "0" (false) (chroma_resi_pred_enabled_flag=0) in step S363. When the process of step S363 is finished, the process proceeds to step S364.

That is, as in the syntax table of A of FIG. 66, the cross-chroma residual prediction enabled flag chroma_resi_pred_enabled_flag is transmitted only in a case where the cross-component prediction enabled flag ccp_enabled_flag is "1" (true), that is, only in a case where cross-component linear prediction is permitted. In a case where no cross-component linear prediction is performed, no cross-chroma residual prediction is also performed. Accordingly, in a case where cross-component linear prediction is not permitted (or prohibited), the value of the cross-chroma residual prediction enabled flag chroma_resi_pred_enabled_flag is clearly "0." Thus, the transmission thereof is unnecessary.

That is, as described above, only in a case where the cross-component prediction enabled flag ccp_enabled_flag is "1" (true), the cross-chroma residual prediction enabled flag chroma_resi_pred_enabled_flag is transmitted, thereby making it possible to reduce redundant information and suppress reduction in the coding efficiency.

FIG. 65 is referred to again. The respective processes of steps S364 to S371 are executed similarly to the respective processes of steps S131 to S138 of FIG. 19.

In step S372, the decoding unit 111 determines whether or not condition 6 in the following expression (22) is satisfied.

Condition 6: chroma_resi_pred_enabled_flag==1 (22)

That is, it is determined whether the cross-chroma residual prediction enabled flag chroma_resi_pred_enabled_flag is "1" (true). In a case where it is determined that expression (22) is satisfied (i.e., the cross-chroma residual prediction enabled flag chroma_resi_pred_enabled_flag is "1" (true)), the process proceeds to step S373.

In step S373, the decoding unit 111 parses the cross-chroma residual prediction flag chroma_resi_pred_flag included in encoded data, and decodes the parsed parses the cross-chroma residual prediction flag chroma_resi_pred_flag. When the cross-chroma residual prediction flag chroma_resi_pred_flag is acquired, the process returns to FIG. 64, the decoding process is finished, and the process returns to FIG. 17.

In addition, in a case where it is determined in step S372 of FIG. 65 that expression (22) is not satisfied (i.e., the cross-chroma residual prediction enabled flag chroma_resi_pred_enabled_flag is "0" (false)), the process proceeds to step S374.

The decoding unit 111 skips parsing the cross-chroma residual prediction flag chroma_resi_pred_flag, and sets the value "0" (false) (chroma_resi_pred_flag=0) in step S374. When the process of step S374 is finished, the process returns to FIG. 64, the decoding process is finished, and the process returns to FIG. 17.

That is, as in the syntax table of B of FIG. 66, the cross-chroma residual prediction flag chroma_resi_pred_flag is transmitted only in a case where the cross-chroma residual prediction enabled flag chroma_resi_pred_enabled_flag is "1" (true), that is, only in a case where cross-chroma residual prediction is permitted. In a case where cross-chroma residual prediction is not permitted (or prohibited), the value of the cross-chroma residual prediction flag chroma_resi_pred_flag is clearly "0." Thus, the transmission thereof is unnecessary.

That is, as described above, only in a case where the cross-chroma residual prediction enabled flag chroma_resi_pred_enabled_flag is "1" (true), the cross-chroma residual prediction flag chroma_resi_pred_flag is transmitted, thereby making it possible to reduce redundant information and suppress reduction in the coding efficiency.

It is to be noted that this decoding process may also have the processing order of the respective steps or the contents of the processes changed within a practical range.

Performing a decoding process in this way causes the cross-chroma residual prediction enabled flag chroma_resi_pred_enabled_flag to be decoded in units of pieces of header information (VPS/SPS/PPS/SH/CTU) as illustrated in A of FIG. 66. That is, in a case where cross-component prediction is executed and no delay is permitted, setting the cross-chroma residual prediction enabled flag chroma_resi_pred_enabledf_flag at "0" and prohibiting cross-chroma residual prediction make it possible to break the dependence between Cb/Cr. Thus, in this case, it is possible to decode the Cr component without waiting for the Cb component to be decoded. That is, it is possible to reduce delay in cross-component prediction.

In addition, decoding the cross-chroma residual prediction flag chroma_resi_pred_flag allows the CC prediction section 134 to control cross-chroma residual prediction on the basis of the cross-chroma residual prediction flag chroma_resi_pred_flag. That is, it is possible to execute cross-chroma residual prediction only when the cross-chroma residual prediction is effective. This improves the coding efficiency. In addition, it is possible to suppress increase in loads.

<CC Prediction Section>

Figure 67:
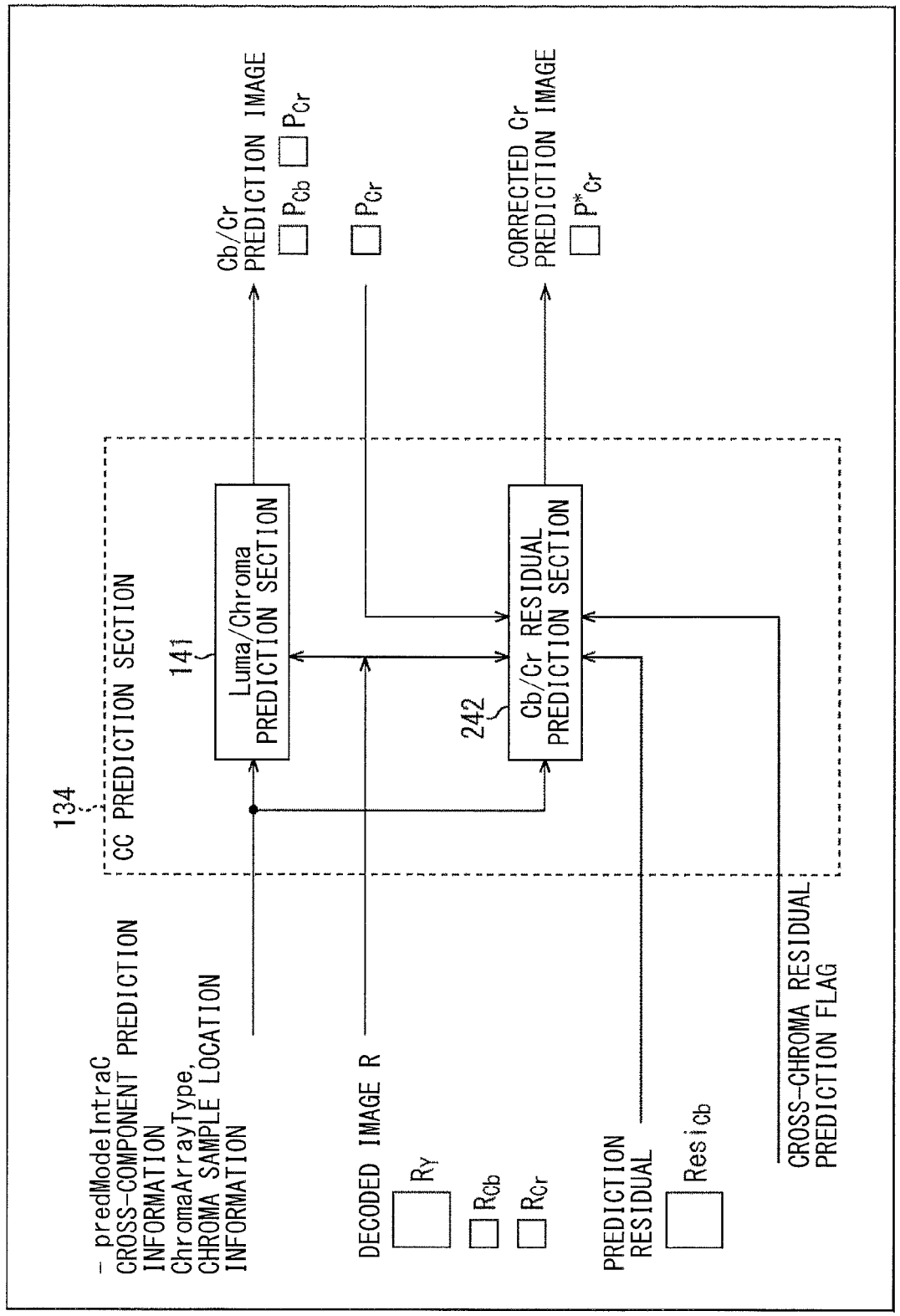
FIG. 67 is a block diagram illustrating an example of a main component of the CC prediction section.

FIG. 67 is a block diagram illustrating an example of main components of the CC prediction section 134 in this case. As illustrated in FIG. 67, the CC prediction section 134 in this case includes the Luma/Chroma prediction section 141 similarly to a case of the example of FIG. 31. In addition, the CC prediction section 134 in this case includes a Cb/Cr residual prediction section 242 instead of the Cb/Cr residual prediction section 142 in the example of FIG. 31.

The Luma/Chroma prediction section 141 predicts the prediction image $Pred_X$ (X=Cb or Cr) of a chroma component (Cb/Cr) from a luma component, and generates the prediction image $Pred_X$ (X=Cb or Cr) similarly to a case of FIG. 31.

The Cb/Cr residual prediction section 242 acquires and refers to the cross-chroma residual prediction flag chroma_resi_pred_flag. In a case where the flag indicates that cross-chroma residual prediction is applied, the Cb/Cr residual prediction section 242 corrects the prediction image $Pred_{Cr}$ of a Cr component by cross-chroma residual prediction, and generates the corrected Cr prediction image $Pred^*_{Cb}$. In a case where the flag indicates that no cross-chroma residual prediction is applied, the cross-chroma residual prediction (correction of the prediction image $Pred_{Cr}$ of a Cr component) is skipped.

<Flow of Cross-Component Linear Prediction Process>

An example of the flow of the cross-component linear prediction process executed by the CC prediction section 134 in this case is described with reference to the flowchart of FIG. 68. This flowchart corresponds to the flowchart of FIG. 35 in the first embodiment.

When the cross-component linear prediction process is started, the Luma/Chroma prediction section 141 performs a luma-to-chroma prediction process in step S391 to predict a prediction image of a chroma component from a luma component.

In step S392, the Cb/Cr residual prediction section 242 refers to the cross-chroma residual prediction flag chroma_resi_pred_flag, and determines whether or not the value is "1" (true). In a case where it is determined that the value of the cross-chroma residual prediction flag chroma_resi_pred_flag is "1" (true), the process proceeds to step S393.

In step S393, the Cb/Cr residual prediction section 242 performs a cross-chroma residual prediction process to correct a prediction image of a Cr component by using a Cb component. When the process of step S393 is finished, the cross-component linear prediction process is finished and the process returns to FIG. 34.

Figure 68:
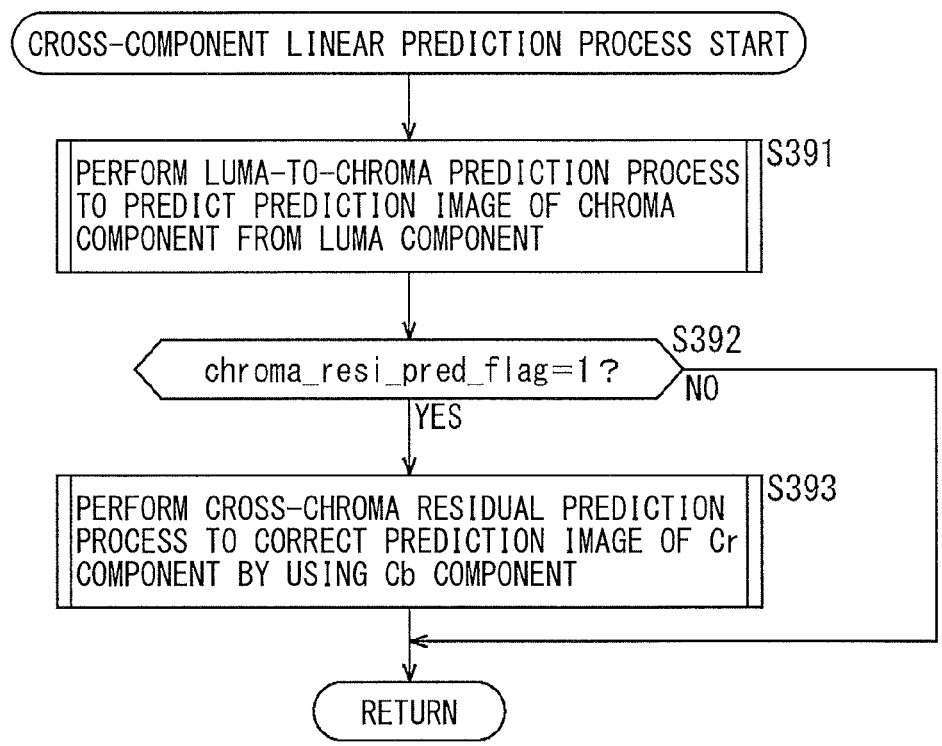
FIG. 68 is a flowchart describing an example of the flow of the cross-component linear prediction process.

In addition, in a case where it is determined in step S392 of FIG. 68 that the value of the cross-chroma residual prediction flag chroma_resi_pred_flag is "0" (false), the process of step S393 is skipped, the cross-component linear prediction process is finished, and the process returns to FIG. 34.

Performing the process in this manner makes it possible to control cross-chroma residual prediction on the basis of the cross-chroma residual prediction flag chroma_resi_pred_flag. That is, it is possible to execute cross-chroma residual prediction only when the cross-chroma residual prediction is effective (i.e., cross-chroma residual prediction is omitted when sufficient effects are not expectable), making it possible to suppress reduction in the coding efficiency. In addition, it is possible to suppress increase in loads and process time caused by cross-chroma residual prediction.

<Flow of CU-Level Decoding Process>

Figure 69:
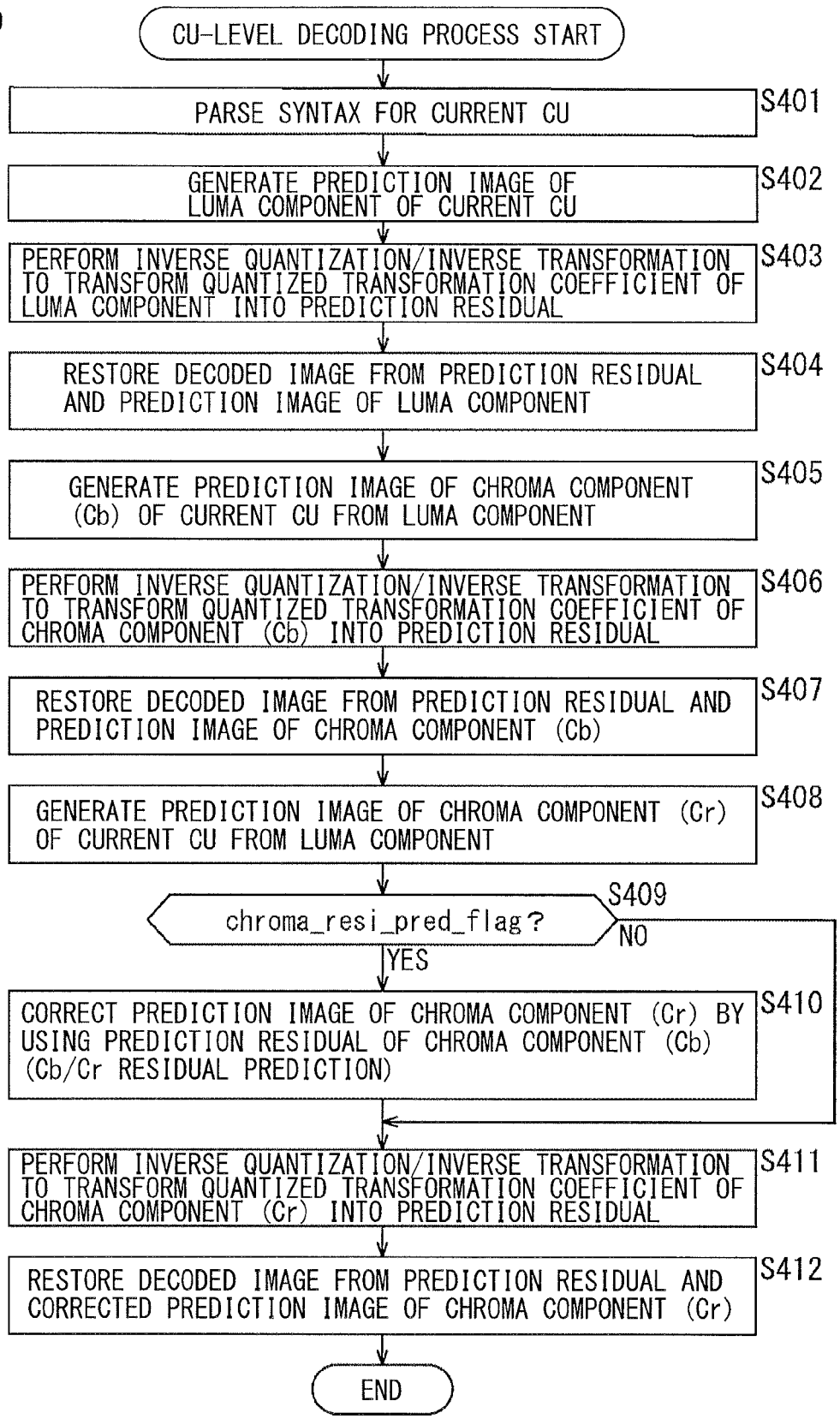
FIG. 69 is a flowchart describing an example of the flow of the CU-level decoding process.

The flow of the image decoding process (CU-level decoding process) as described above on one CU in this case is described with reference to the flowchart of FIG. 69.

Figure 54:
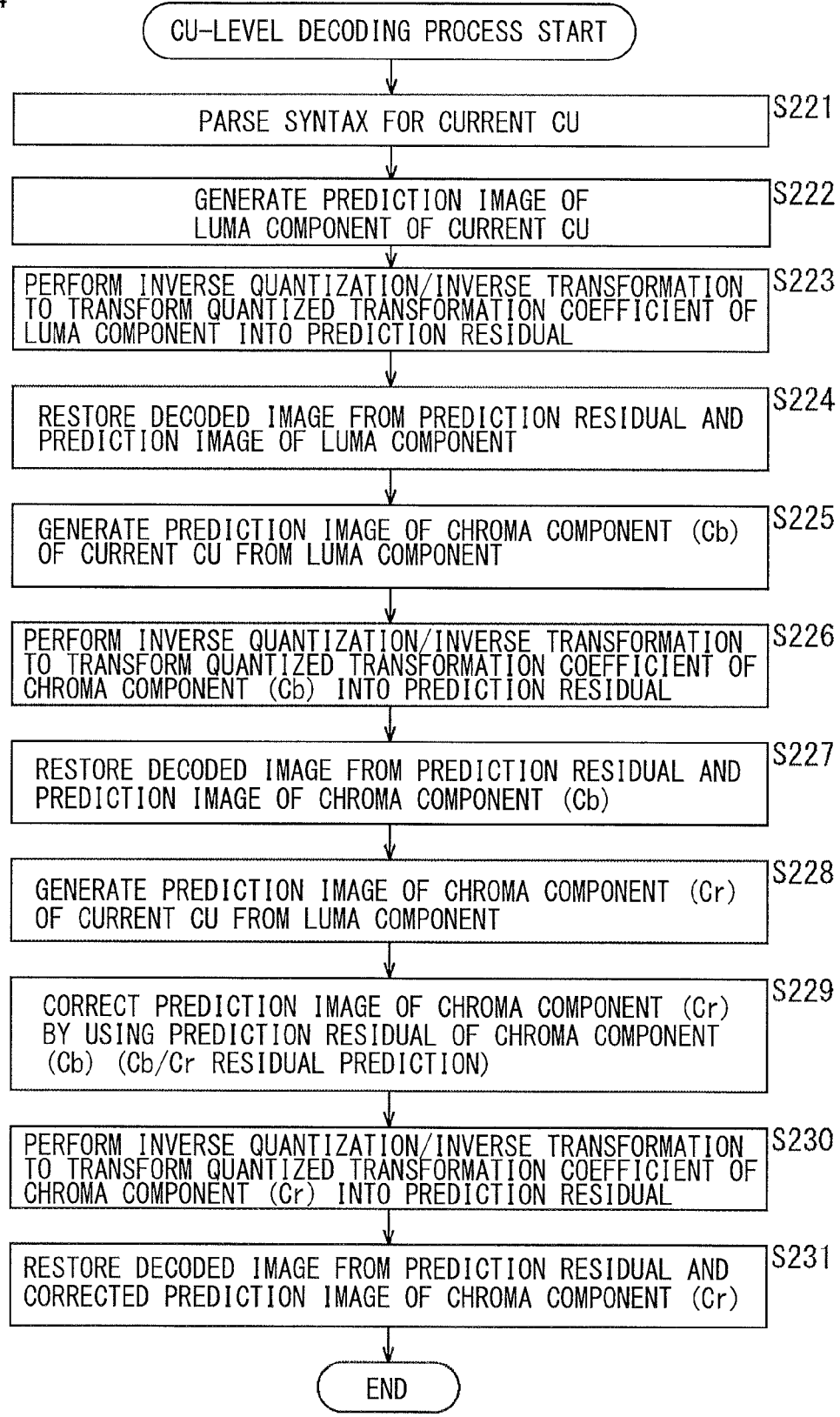
FIG. 54 is a flowchart describing an example of a flow of a CU-level decoding process.

When the CU-level decoding process is started, the respective processes of steps S401 to S408 are executed similarly to the respective processes of steps S221 to S228 of FIG. 54.

In step S409, the prediction unit 114 refers to the cross-chroma residual prediction flag chroma_resi_pred_flag, and determines whether or not the value is "1" (true). In a case where it is determined that the value of the cross-chroma residual prediction flag chroma_resi_pred_flag is "1" (true), the process proceeds to step S410.

In step S410, the prediction unit 114 performs cross-chroma residual prediction (Cb/Cr residual prediction), and corrects the prediction image of the chroma component (Cr) of the current CU obtained in the process of step S408 by using the prediction residual of the chroma component (Cb). When the process of step S410 is finished, the process proceeds to step S411.

In addition, in a case where it is determined in step S409 that the value of the cross-chroma residual prediction flag chroma_resi_pred_flag is "0" (false), the process of step S410 is skipped and the process proceeds to step S411.

In step S411, the inverse quantization unit 112 and the inverse transformation unit 113 perform inverse quantization/inverse transformation to transform the quantized transformation coefficient of the chroma component (Cr) of the current CU obtained by decoding the encoded data by decoding unit 111 into a prediction residual.

In step S412, the calculation unit 115 uses the prediction residual of the chroma component (Cr) obtained in the process of step S229 and the corrected prediction image of the chroma component (Cr) obtained in the process of step S230 to restore the decoded image of the chroma component (Cr) of the current CU.

When the process of step S412 is finished, the CU-level decoding process is finished.

Executing the CU-level decoding process as described above for each CU allows the image decoding device 100 to acquire a decoded image of each CU by using the cross-component linear prediction process and the cross-chroma residual prediction. In addition, it is possible to control the execution of cross-chroma residual prediction.

5. Fourth Embodiment

<Encoding of Cross-Component Prediction Information>

A process of the image encoding device 200 corresponding to the image decoding device 100 according to the third embodiment is described.

In this case, the image encoding device 200 encodes control information for controlling cross-chroma residual prediction in accordance with the syntax table illustrated in FIG. 66, and transmits the encoded control information to the image decoding device 100.

For example, as illustrated in A of FIG. 66, the image encoding device 200 encodes and transmits the cross-chroma residual prediction enabled flag chroma_re-si_pred_enabled_flag only in a case where the cross-component prediction enabled flag ccp_enabled_flag is "1" (true), that is, only in a case where cross-component linear prediction is permitted.

In addition, for example, as illustrated in B of FIG. 66, the image encoding device 200 encodes and transmits the cross-chroma residual prediction flag chroma_resi_pred_flag only in a case where the cross-chroma residual prediction enabled flag chroma_resi_pred_enabled_flag is "1" (true), that is, only in a case where cross-chroma residual prediction is permitted.

This makes it possible to suppress reduction in the coding efficiency as described above in the third embodiment.

<Flow of Encoding Process>

Examples of the flows of an encoding process of control information (cross-component prediction information CCInfo) and the chroma intra prediction mode IntraPred-ModeC of cross-component prediction, and an encoding process of related syntax and the like (coding_unit ( )) that are executed by the image encoding device 200 in this case in step S250 of FIG. 56 are described with reference to the flowcharts of FIGS. 70 and 71.

Figure 70:
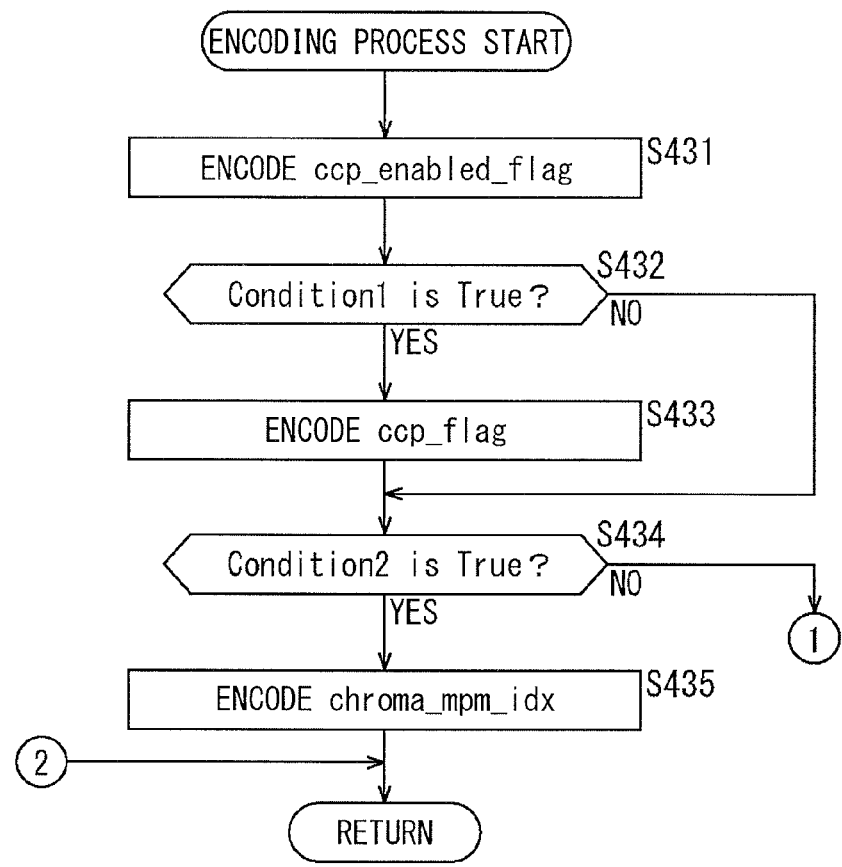
FIG. 70 is a flowchart describing an example of the flow of the encoding process.

When the encoding process is started, the respective processes of steps S431 to S435 of FIG. 70 are executed similarly to the respective processes of steps S261 to S265 of FIG. 57.

Figure 71:
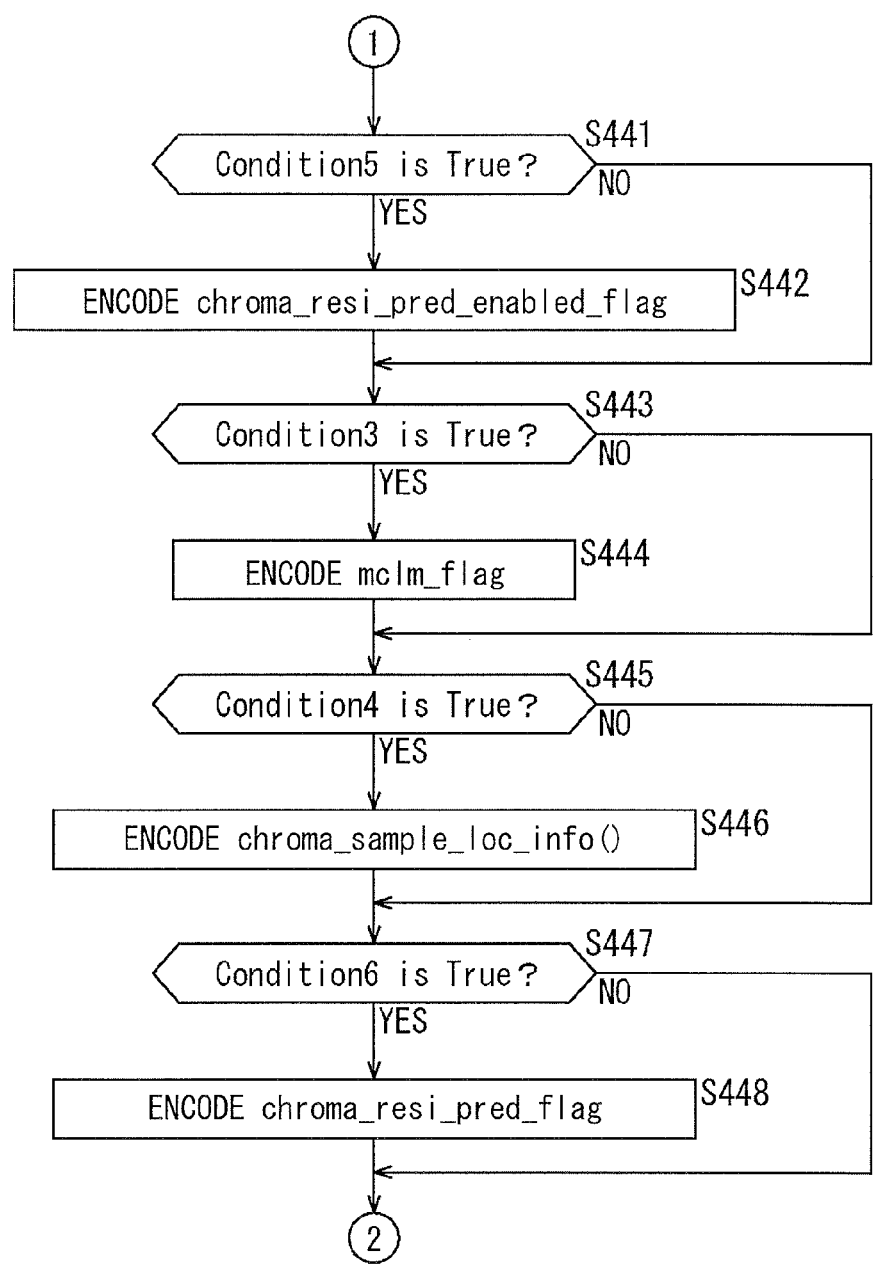
FIG. 71 is a flowchart describing an example of a flow of an encoding process subsequent to FIG. 70.

In addition, in a case where it is determined in step S434 that expression (14) above is not satisfied (in a case where it is determined that ccp_flag is 1 (true)), the process proceeds to FIG. 71.

In step S441, the encoding unit 220 determines whether or not condition 5 in expression (21) above is satisfied. That is, it is determined whether the cross-component prediction enabled flag ccp_enabled_flag is "1" (true). In a case where it is determined that expression (21) is satisfied (i.e., the cross-component prediction enabled flag ccp_enabled_flag is "1" (true)), the process proceeds to step S442.

In step S442, the encoding unit 220 encodes the cross-chroma residual prediction enabled flag chroma_re-si_pred_enabled_flag, and adds the encoded cross-chroma residual prediction enabled flag chroma_resi_pred_enabled_ flag to encoded data. When the cross-chroma residual prediction enabled flag chroma_resi_pred_enabled_flag is added to the encoded data, the process proceeds to step S443.

In addition, in a case where it is determined in step S441 that expression (21) is not satisfied (i.e., the cross-component prediction enabled flag ccp_enabled_flag is "0" (false)), the process of step S442 is omitted and the process proceeds to step S443.

The respective processes of steps S443 to S446 are executed similarly to the respective processes of steps S271 to S274 of FIG. 58.

In step S447, the encoding unit 220 determines whether or not condition 6 in expression (22) above is satisfied.

That is, it is determined whether the cross-chroma residual prediction enabled flag chroma_resi_pred_enabled_ flag is "1" (true). In a case where it is determined that expression (22) is satisfied (i.e., the cross-chroma residual prediction enabled flag chroma_resi_pred_enabled_flag is "1" (true)), the process proceeds to step S448.

In step S448, the encoding unit 220 encodes the cross-chroma residual prediction flag chroma_resi_pred_flag, and adds the encoded cross-chroma residual prediction flag chroma_resi_pred_flag to encoded data. When the cross-chroma residual prediction flag chroma_resi_pred_flag is added to the encoded data, the process returns to FIG. 70, the encoding process is finished, and the process returns to FIG. 56.

In addition, in a case where it is determined in step S447 of FIG. 71 that expression (22) is not satisfied (i.e., the cross-chroma residual prediction enabled flag chroma_re-si_pred_enabled_flag is "0" (false)), the process of step S448 is omitted, the process returns to FIG. 70, the encoding process is finished, and the process returns to 56.

Performing an encoding process in this way causes the cross-chroma residual prediction enabled flag chroma_re-si_pred_enabled_flag to be encoded in units of pieces of header information (VPS/SPS/PPS/SH/CTU) as illustrated in A of FIG. 66. That is, in a case where cross-component prediction is executed and no delay is permitted, setting the cross-chroma residual prediction enabled flag chroma_re-si_pred_enabledf_flag at "0" and prohibiting cross-chroma residual prediction make it possible to break the dependence between Cb/Cr. Accordingly, in this case, it is possible to encode the Cr component without waiting for the Cb component to be encoded. That is, it is possible to reduce delay in cross-component prediction.

In addition, encoding the cross-chroma residual prediction flag chroma_resi_pred_flag allows the CC prediction section 134 to control cross-chroma residual prediction on the basis of the cross-chroma residual prediction flag chroma_resi_pred_flag. That is, it is possible to execute cross-chroma residual prediction only when the cross-chroma residual prediction is effective. This improves the coding efficiency. In addition, it is possible to suppress increase in loads.

<Flow of CU-Level Encoding Process>

Examples of the flow of the image encoding process (CU-level encoding process) as described above on one CU in this case are described with reference to the flowcharts of FIGS. 72 and 73.

Figure 72:
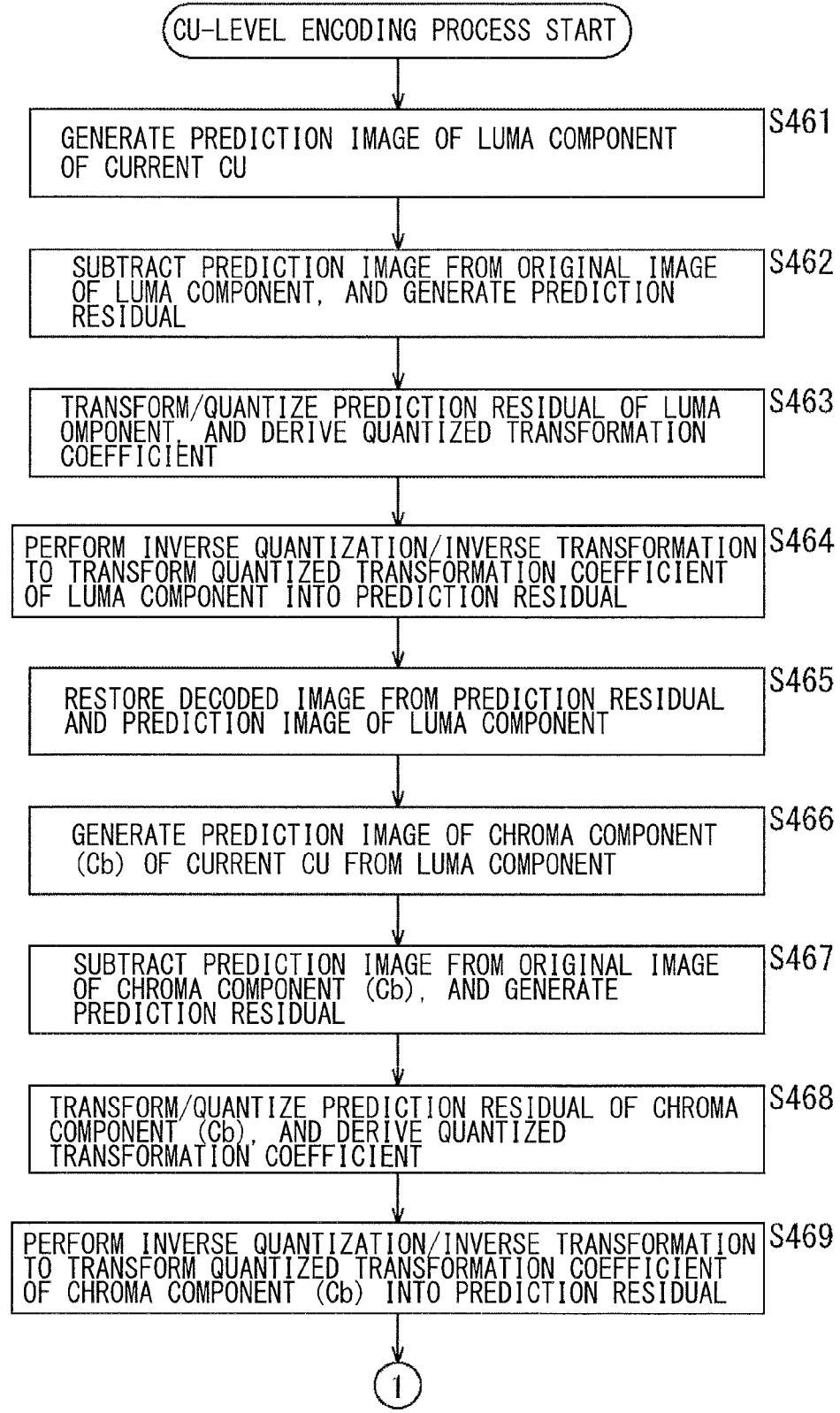
FIG. 72 is a flowchart describing an example of the flow of the CU-level encoding process.

When the CU-level encoding process is started, the respective processes of steps S461 to S469 of FIG. 72 are executed similarly to the respective processes of steps S321 to S329 of FIG. 62. When the process of step S469 is finished, the process proceeds to FIG. 73.

Figure 73:
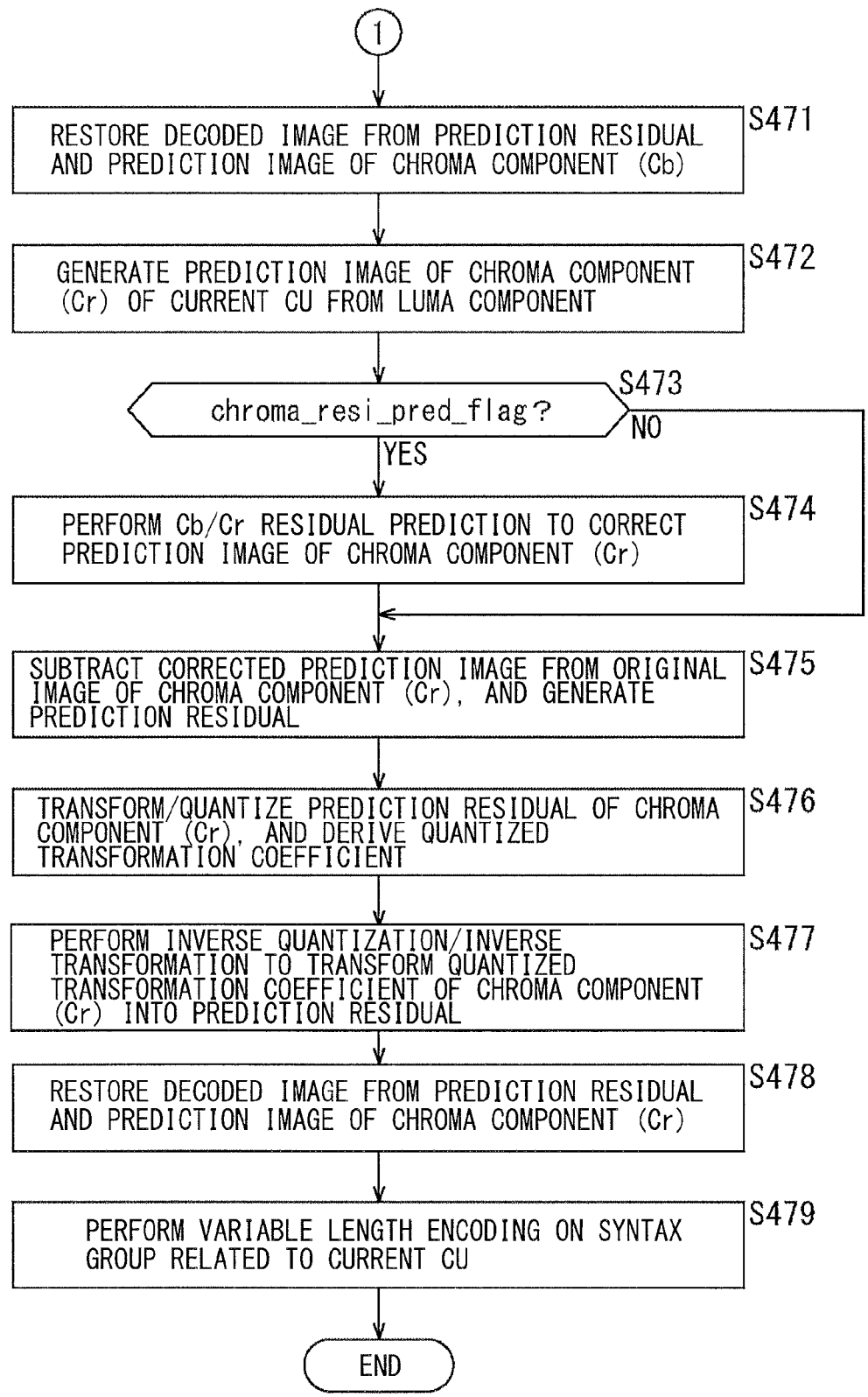
FIG. 73 is a flowchart describing an example of a flow of a CU-level encoding process subsequent to FIG. 72.

The respective processes of steps S471 and S472 of FIG. 73 are executed similarly to the respective processes of steps S331 and S332 of FIG. 63.

In step S473, the prediction unit 211 refers to the cross-chroma residual prediction flag chroma_resi_pred_flag, and determines whether or not the value is "1" (true). In a case where it is determined that the value of the cross-chroma residual prediction flag chroma_resi_pred_flag is "1" (true), the process proceeds to step S474.

In step S474, the prediction unit 211 performs cross-chroma residual prediction (Cb/Cr residual prediction), and corrects the prediction image of the chroma component (Cr) of the current CU obtained in the process of step S472 by using the prediction residual of the chroma component (Cb). When the process of step S474 is finished, the process proceeds to step S475.

In addition, in a case where it is determined in step S473 that the value of the cross-chroma residual prediction flag chroma_resi_pred_flag is "0" (false), the process of step S474 is skipped and the process proceeds to step S475.

The respective processes of steps S475 to S479 of FIG. 73 are executed similarly to the respective processes of steps S334 to S338 of FIG. 63.

When the process of step S479 is finished, the CU-level encoding process is finished.

Executing the CU-level encoding process as described above for each CU allows the image encoding device 200 to acquire an encoded image of each CU by using the cross-component linear prediction process and the cross-chroma residual prediction. In addition, it is possible to control the execution of cross-chroma residual prediction.

6. Conclusion

<Image Decoding Device 100 According to First Embodiment and Image Encoding Device 200 According to Second Embodiment>

The decoding unit 111/encoding unit 220 decodes/encodes the chroma sample location information indicating the sample location of the chroma component for a sample of a luma component as a portion of the cross-component prediction information CCInfo.

This makes it possible to select a downsampling filter that reduces a phase shift between a chroma component and a luma component, on the basis of the chroma array type and the chroma sample location information. This allows for cross-component prediction with the phase shift reduced, making it possible to suppress reduction in the coding efficiency.

In addition, on the basis of the chroma array type and the chroma sample location information in both the single-class mode and the multi-class mode, the Luma/Chroma prediction section 141 selects a downsampling filter that generates a luma sample having the same coordinates as the chroma sample location, thereby making possible to generate the reduced luma collocate adjacent pixel group $R'_{Y,n}$ in which a phase shift from the chroma component of the luma collocate adjacent pixel group $R_{Y,n}$ is reduced. A reduced phase shift thus makes it possible to derive more accurate prediction parameters ($\alpha$ and $\beta$).

On the basis of the chroma array type and the chroma sample location information in both the single-class mode and the multi-class mode, the Luma/Chroma prediction section 141 selects a downsampling filter that generates a luma sample having the same coordinates as the chroma sample location, thereby making it possible to generate the reduced luma collocate block pixel group $R'_{Y,col}$ in which a phase shift from the chroma component of the luma collocate block pixel group $R_{Y,col}$ is reduced.

This makes it possible to generate, in both the single-class mode and the multi-class mode, a more accurate prediction image as compared with the conventional technology from the reduced luma collocate block pixel group $R'_{Y,col}$ in which a phase shift is reduced by using more accurate prediction parameters ($\alpha$ and $\beta$). That is, the coding efficiency is improved.

Further, the chroma format of the Luma/Chroma prediction section 141 is not limited to the 420 format as compared with a case of the conventional technology, but it is possible to perform Luma/Chroma prediction compliant with the 422 format and the 444 format. That is, it is possible to apply Luma/Chroma prediction in the 422 format and the 444 format, and the coding efficiency is thus improved.

<Image Decoding Device 100 According to Third Embodiment and Image Encoding Device 200 According to Fourth Embodiment>

The image decoding device 100/image encoding device 200 decodes/encodes the cross-chroma residual prediction enabled flag chroma_resi_pred_enabled_flag. In addition, the image decoding device 100/image encoding device 200 decodes/encodes the cross-chroma residual prediction flag chroma_resi_pred_flag. This makes it possible to control cross-chroma residual prediction on the basis of the cross-chroma residual prediction flag chroma_resi_pred_flag. That is, it is possible to execute cross-chroma residual prediction only when the cross-chroma residual prediction is effective. This improves the coding efficiency.

In addition, in a case where the image decoding device 100/image encoding device 200 execute cross-component prediction and no delay is permitted, the cross-chroma residual prediction enabled flag chroma_resi_pred_enabledf_flag is set at 0, cross-chroma residual prediction is prohibited, and the dependence between Cb/Cr is broken. This allows the Cr component to be decoded/encoded in cross-component prediction without waiting for the Cb component to be decoded/encoded. That is, it is possible to reduce delay in cross-component prediction.

7. Others

<Data Unit of Information>

The above-described information regarding an image described above and information regarding image encoding/decoding are set with any data unit (or of the target data), and the example described above is not limitative. For example, these kinds of information may be each set for each TU (Transform Unit), TB (Transform Block), PU (Prediction Unit), PB (Prediction Block), CU (Coding Unit), LCU (Largest Coding Unit), subblock, block, tile, slice, picture, sequence, or component, or data of the data units may be targeted. Needless to say, this data unit is set for each piece of information. That is, all pieces of information do not have to be set (or targeted) in the same data unit. It should be noted that the information is stored in any place, and the information may be stored in the header of the above-described data unit, a parameter set, or the like. In addition, the information may be stored in a plurality of places.

<Control Information>

The control information regarding the present technology described in each of the embodiments described above may be transmitted from the encoding side to the decoding side. For example, control information (e.g., enabled_flag) for controlling whether or not to permit (or prohibit) the application of the present technology described above may be transmitted. In addition, for example, control information for designating an upper limit, a lower limit, or both of block size that permits (or prohibits) the application of the present technology described above may be transmitted.

<Encoding/Decoding>

The present technology is applicable to any image encoding/decoding scheme. That is, various processes for image encoding/decoding such as transformation (inverse transformation), quantization (inverse quantization), encoding (decoding), and prediction have any specifications, and the examples described above are not limitative. For example, with respect to transformation (inverse transformation), (inverse) transformation (i.e., three or more (inverse) transformations) other than (inverse) primary transformation and (inverse) secondary transformation may be performed. In addition, encoding (decoding) may be of a reversible scheme or an irreversible scheme. Further, quantization (inverse quantization), a loop filter process, and the like may be omitted.

<Application Field of the Present Technology>

For example, the system, device, processing unit, or the like to which the present technology is applied is usable in any field such as traffic, medical care, crime prevention, agriculture, animal husbandry, mining industry, beauty, factory, home appliances, weather, or natural surveillance. In addition, they have any use.

For example, the present technology is applicable to a system or a device used to provide viewing content or the like. In addition, for example, the present technology is also applicable to a system or a device for traffic use such as traffic condition administration or automated driving control. Furthermore, for example, the present technology is also applicable to a system or a device for security. In addition, for example, the present technology is applicable to a system or a device for automated control for machinery and the like. Furthermore, for example, the present technology is also applicable to a system or a device for agriculture and livestock industry. In addition, for example, the present technology is also applicable to a system or a device for monitoring conditions of nature such as volcanoes, forests, and oceans, wildlife, and the like. Furthermore, for example, the present technology is also applicable to a system or a device for sports.

<Application to Multi-View Image Encoding/Decoding System>

The series of processes described above is applicable to a multi-view image encoding/decoding system that encodes/decodes a multi-view image including images of a plurality of viewpoints (views (views)). In this case, the present technology may be applied to encoding/decoding of each viewpoint (view (view)).

<Application to Hierarchical Image Encoding/Decoding System>

Further, the series of processes described above is applicable to a hierarchical image encoding (scalable encoding)/decoding system that encodes/decodes a hierarchical image layered (hierarchized) in a plurality of layers (hierarchies) so as to have a scalability (scalability) function in regard to a predetermined parameter. In this case, the present technology may be applied to encoding/decoding of each hierarchy (layer).

<Computer>

It is possible to cause hardware to execute the series of processes described above, and it is also possible to cause software to execute the series of processes described above. When the series of processes is executed with software, a program included in the software is installed in a computer.

Here, the computer includes a computer incorporated in dedicated hardware, a general-purpose personal computer that is able to execute, for example, various functions by installing various programs, and the like.

Figure 74:
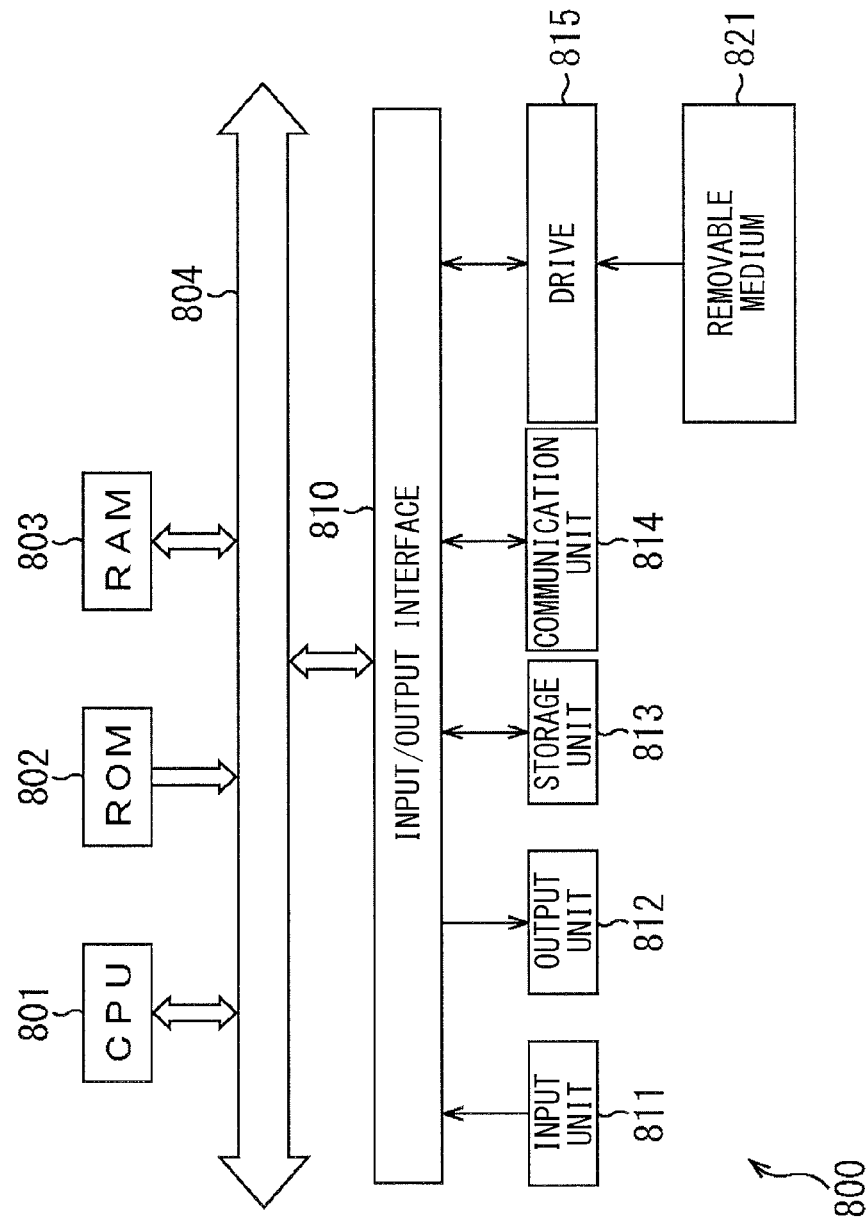
FIG. 74 is a block diagram illustrating an example of a main component of a computer.

FIG. 74 is a block diagram illustrating a configuration example of the hardware of a computer that executes the series of processes described above by using a program.

In a computer 800 illustrated in FIG. 74, CPU (Central Processing Unit) 801, ROM (Read Only Memory) 802, and RAM (Random Access Memory) 803 are coupled to each other via a bus 804.

An input/output interface 810 is also coupled to the bus 804. An input unit 811, an output unit 812, a storage unit 813, a communication unit 814, and a drive 815 are coupled to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disc, a magneto-optical disk, or a semiconductor memory.

In the computer configured as described above, the CPU 801 loads a program stored, for example, in the storage unit 813 into the RAM 803 via the input/output interface 810 and the bus 804, and executes the program to perform the series of processes described above. Data and so the like necessary upon execution of various processes by the CPU 801 are also stored as appropriate in the RAM 803.

It is possible to record and apply the program executed by the computer (CPU 801), for example, into the removable medium 821 that is a package medium or the like. In this case, it is possible to install the program in the storage unit 813 via the input/output interface 810 by mounting the removable medium 821 on the drive 815.

Further, it is also possible to provide this program via a wired or wireless transmission medium such as a local area network, the Internet, or digital satellite broadcasting. In this case, it is possible to receive the program by the communication unit 814 and install the received program in the storage unit 813.

In addition, it is possible to install this program in advance in the ROM 802 or the storage unit 813.

<Application of the Present Technology>

The image encoding device 200 or the image decoding device 100 according to the embodiment described hereinabove may be applied, for example, to various electronic devices such as transmitters or receivers for satellite broadcasting, wired broadcasting such as cable TV, distribution on the Internet, distribution to a terminal through cellular communication, and the like, or recording devices that record images on a medium such as an optical disc, a magnetic disk, or a flash memory, reproduction devices that reproduce images from these storage media, and the like.

<First Application Example: Television Receiver>

Figure 75:
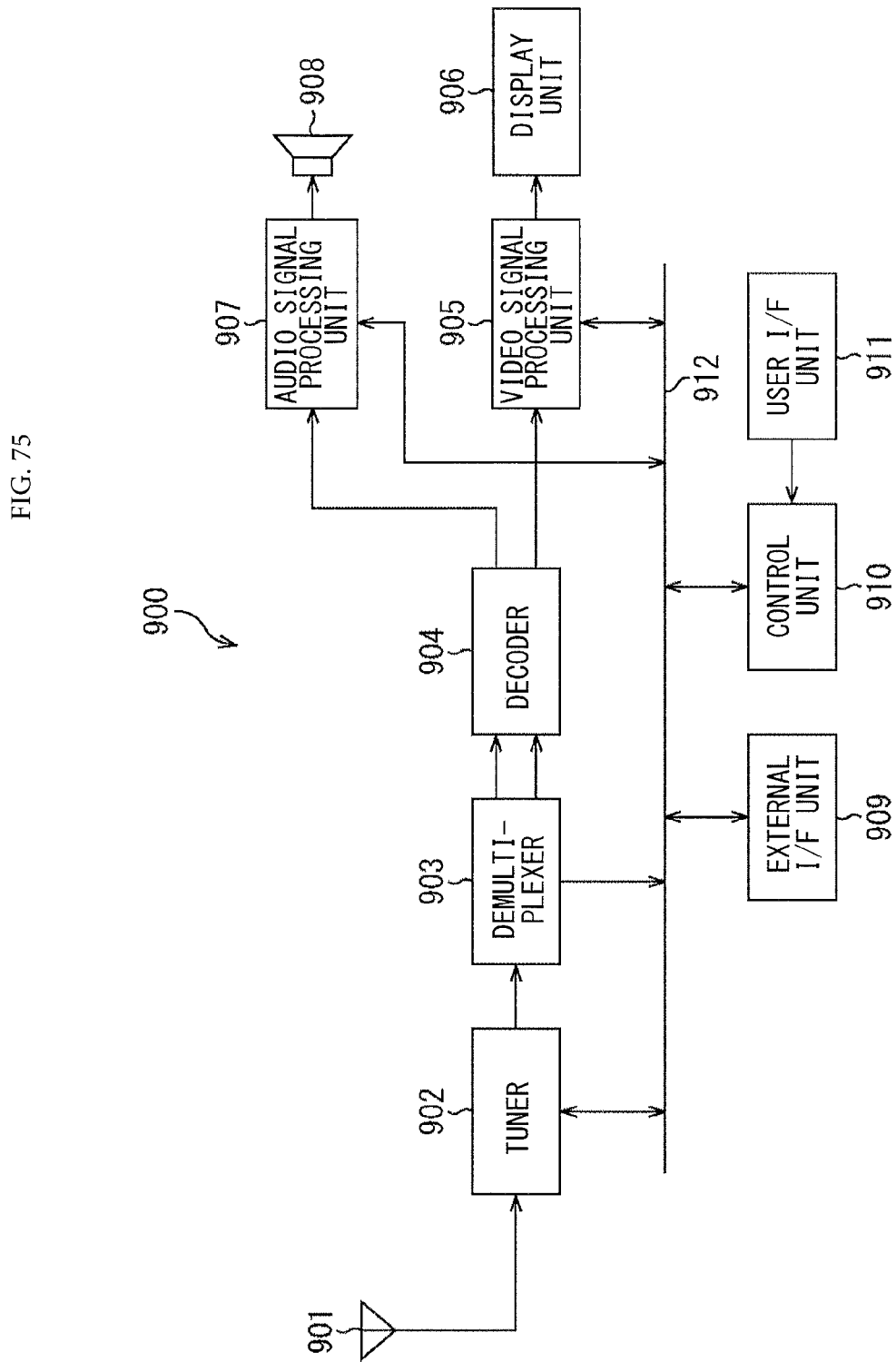
FIG. 75 is a block diagram illustrating an example of a schematic configuration of a television apparatus.

FIG. 75 illustrates an example of a schematic configuration of a television apparatus to which the embodiment described above is applied. A television apparatus 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcasting signal received via the antenna 901, and demodulates the extracted signal. Then, the tuner 902 outputs an encoded bit stream obtained from the demodulation to the demultiplexer 903. That is, the tuner 902 has a role as a transmission unit in the television apparatus 900. The transmission unit receives an encoded stream in which an image is encoded.

The demultiplexer 903 demultiplexes a video stream and an audio stream of a program to be viewed and listened to from an encoded bit stream, and outputs the demultiplexed streams to the decoder 904. In addition, the demultiplexer 903 extracts auxiliary data such as EPG (Electronic Program Guide) from the encoded bit stream, and supplies the extracted data to the control unit 910. It should be noted that, in a case where the encoded bit stream is scrambled, the demultiplexer 903 may perform descrambling.

The decoder 904 decodes the video stream and the audio stream inputted from the demultiplexer 903. Then, the decoder 904 outputs video data generated in a decoding process to the video signal processing unit 905. In addition, the decoder 904 outputs audio data generated in a decoding process to the audio signal processing unit 907.

The video signal processing unit 905 reproduces the video data inputted from the decoder 904 to cause the display unit 906 to display a video. In addition, the video signal processing unit 905 may cause the display unit 906 to display an application screen supplied via a network. In addition, the video signal processing unit 905 may perform an additional process, for example, noise reduction or the like, on the video data in accordance with the setting. Further, the video signal processing unit 905 may generate an image of GUI (Graphical User Interface), for example, such as a menu, a button, or a cursor, and superimpose the generated image on an output image.

The display unit 906 is driven by a driving signal supplied from the video signal processing unit 905, and displays a video or an image on a video face of a display device (e.g., a liquid crystal display, a plasma display, OELD (Organic ElectroLuminescence Display) (organic EL display), or the like).

The audio signal processing unit 907 performs a reproduction process such as D/A conversion and amplification on the audio data inputted from the decoder 904, and causes the speaker 908 to output a sound. In addition, the audio signal processing unit 907 may perform an additional process such as noise reduction on the audio data.

The external interface unit 909 is an interface for coupling the television apparatus 900, and an external apparatus or a network to each other. For example, a video stream or an audio stream received via the external interface unit 909 may be decoded by the decoder 904. That is, the external interface unit 909 also has a role as a transmission unit in the television apparatus 900. The transmission unit receives an encoded stream in which an image is encoded.

The control unit 910 includes a processor such as CPU, and a memory such as RAM and ROM. The memory stores a program executed by the CPU, program data, EPG data, data acquired via a network, and the like. The program stored in the memory is read and executed by the CPU, for example, when the television apparatus 900 is started. The CPU executes the program to control the operation of the television apparatus 900 in accordance with an operation signal inputted, for example, from the user interface unit 911.

The user interface unit 911 is coupled to the control unit 910. The user interface unit 911 includes a button and a switch for allowing, for example, a user to operate the television apparatus 900, a reception unit for a remote controlling signal, and the like. The user interface unit 911 detects an operation by the user via these components and generates an operation signal, and outputs the generated operation signal to the control unit 910.

The bus 912 couples the tuner 902, the demultiplexer 903, the decoder 904, the video signal processing unit 905, the audio signal processing unit 907, the external interface unit 909, and the control unit 910 to each other.

In the television apparatus 900 configured in this manner, the decoder 904 may have a function of the image decoding device 100 described above. That is, the decoder 904 may decode encoded data in a method described in each of the embodiments described above. This allows the television apparatus 900 to obtain effects similar to those of each of the embodiments described above with reference to FIGS. 1 to 73.

In addition, in the television apparatus 900 configured in this manner, the video signal processing unit 905 may be able, for example, to encode image data supplied from the decoder 904 and output the obtained encoded data to the outside of the television apparatus 900 via the external interface unit 909. The video signal processing unit 905 may then have the function of the image encoding device 200 described above. That is, the video signal processing unit 905 may encode image data supplied from the decoder 904 in the method described in each of the embodiments described above. This allows the television apparatus 900 to obtain effects similar to those of each of the embodiments described above with reference to FIGS. 1 to 73.

<Second Application Example: Mobile Phone>

Figure 76:
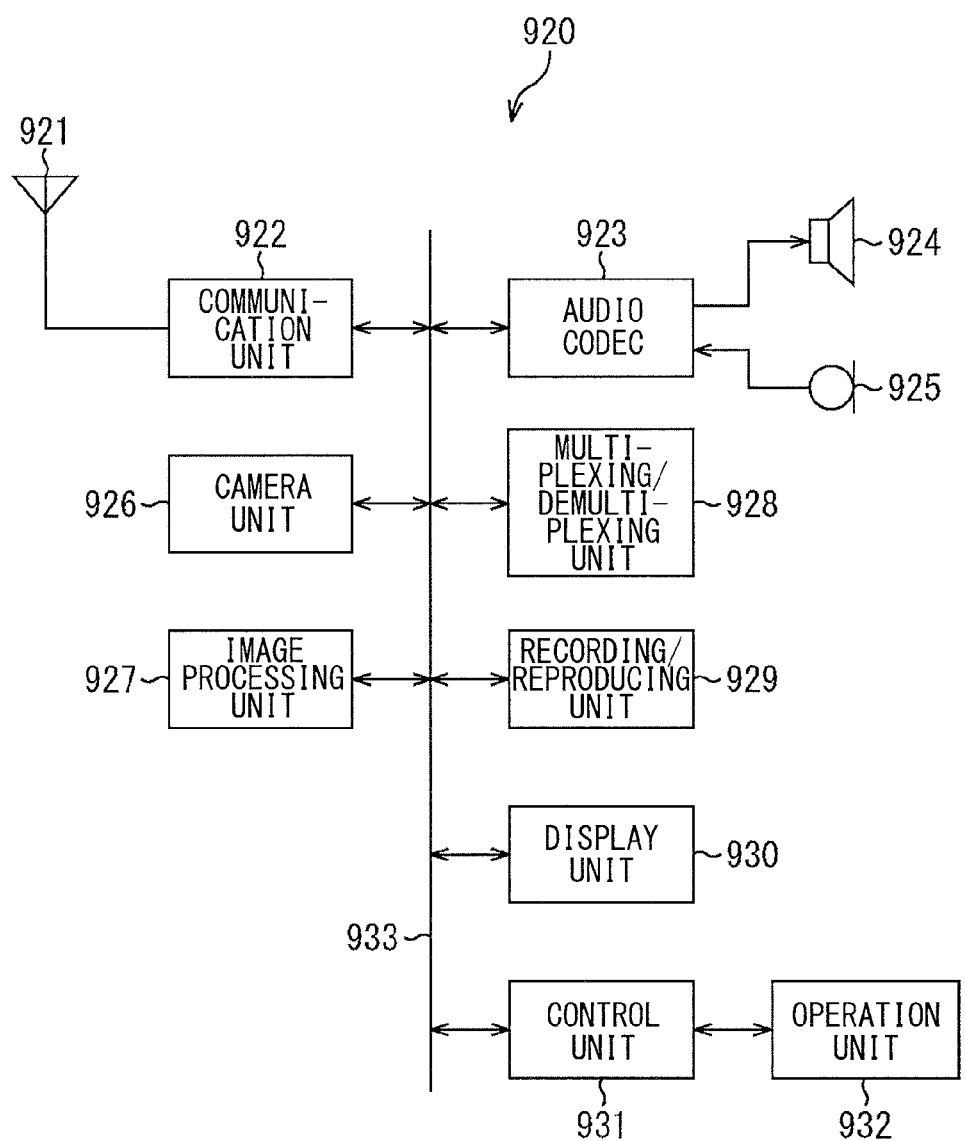
FIG. 76 is a block diagram illustrating an example of a schematic configuration of a mobile phone.

FIG. 76 illustrates an example of a schematic configuration of a mobile phone to which the embodiment described above is applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is coupled to the communication unit 922. The speaker 924 and the microphone 925 are coupled to the audio codec 923. The operation unit 932 is coupled to the control unit 931. The bus 933 coupled the communication unit 922, the audio codec 923, the camera unit 926, the image processing unit 927, the multiplexing/demultiplexing unit 928, the recording/reproducing unit 929, the display unit 930, and the control unit 931 to each other.

The mobile phone 920 performs an operation such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the audio data. The audio codec 923 then outputs the compressed audio data to the communication unit 922. The communication unit 922 encodes and modulates the audio data to generate a transmission signal. Then, the communication unit 922 transmits the generated transmission signal to a base station (not illustrated) via the antenna 921. In addition, the communication unit 922 amplifies a wireless signal received via the antenna 921, converts the frequency of the wireless signal, and acquires a reception signal. The communication unit 922 then demodulates and decodes the reception signal to generate the audio data, and outputs the generated audio data to the audio codec 923. The audio codec 923 expands the audio data, performs D/A conversion on the audio data, and generates an analog audio signal. The audio codec 923 then supplies the generated audio signal to the speaker 924 to output a sound.

In addition, in the data communication mode, for example, the control unit 931 generates character data included in an electronic mail, in accordance with an operation performed by a user via the operation unit 932. In addition, the control unit 931 causes the display unit 930 to display a character. In addition, the control unit 931 generates electronic mail data in accordance with a transmission instruction issued from a user via the operation unit 932, and outputs the generated electronic mail data to the communication unit 922. The communication unit 922 encodes and modulates the electronic mail data to generate a transmission signal. Then, the communication unit 922 transmits the generated transmission signal to a base station (not illustrated) via the antenna 921. In addition, the communication unit 922 amplifies a wireless signal received via the antenna 921, converts the frequency of the wireless signal, and acquires a reception signal. The communication unit 922 then demodulates and decodes the reception signal to restore the electronic mail data, and outputs the restored electronic mail data to the control unit 931. The control unit 931 causes the display unit 930 to display the contents of the electronic mail, and supplies the electronic mail data to the recording/reproducing unit 929 to cause the electronic data to be written into a storage medium thereof.

The recording/reproducing unit 929 includes any storage medium that is readable and writable. For example, the storage medium may be a built-in storage medium such as RAM or a flash memory or an externally attached storage medium such as a hard disk, a magnetic disk, a magneto-optical disk, an optical disc, a USB (Universal Serial Bus) memory, or a memory card.

In addition, the photography mode, for example, the camera unit 926 images an object to generate image data, and outputs the generated image data to the image processing unit 927. The image processing unit 927 encodes the image data inputted from the camera unit 926, and supplies the encoded stream to the recording/reproducing unit 929 to cause the supplied encoded stream to be written into a storage medium thereof.

Further, in the image display mode, the recording/reproducing unit 929 reads an encoded stream recorded on the storage medium and outputs the read encoded stream to the image processing unit 927. The image processing unit 927 decodes the encoded stream inputted from the recording/reproducing unit 929, and supplies the image data to the display unit 930 to cause the image to be displayed.

In addition, in the videophone mode, for example, the multiplexing/demultiplexing unit 928 multiplexes a video stream encoded by the image processing unit 927 and an audio stream inputted from the audio codec 923, and outputs the multiplexed streams to the communication unit 922. The communication unit 922 encodes and modulates the stream to generate a transmission signal. Then, the communication unit 922 transmits the generated transmission signal to a base station (not illustrated) via the antenna 921. In addition, the communication unit 922 amplifies a wireless signal received via the antenna 921, converts the frequency of the wireless signal, and acquires a reception signal. These transmission signal and reception signal may include encoded bit streams. Then, the communication unit 922 demodulates and decodes the reception signal to restore the stream, and outputs the restored stream to the multiplexing/demultiplexing unit 928. The multiplexing/demultiplexing unit 928 demultiplexes the video stream and the audio stream from the inputted stream, and outputs the video stream and the audio stream to the image processing unit 927 and the audio codec 923, respectively. The image processing unit 927 decodes the video stream to generate video data. The video data is supplied to the display unit 930, and the display unit 930 displays a series of images. The audio codec 923 expands the audio stream, performs D/A conversion on the audio data, and generates an analog audio signal. The audio codec 923 then supplies the generated audio signal to the speaker 924 to output a sound.

In the mobile phone 920 configured in this manner, for example, the image processing unit 927 may have the function of the image encoding device 200 described above. That is, the image processing unit 927 may encode image data in a method described in each of the embodiments described above. This allows the mobile phone 920 to obtain effects similar to those of each of the embodiments described above with reference to FIGS. 1 to 73.

In addition, in the mobile phone 920 configured in this manner, for example, the image processing unit 927 may have the function of the image decoding device 100 described above. That is, the image processing unit 927 may decode encoded data in a method described in each of the embodiments described above. This allows the mobile phone 920 to obtain effects similar to those of each of the embodiments described above with reference to FIGS. 1 to 73.

<Third Application Example: Recording/Reproducing Apparatus>

Figure 77:
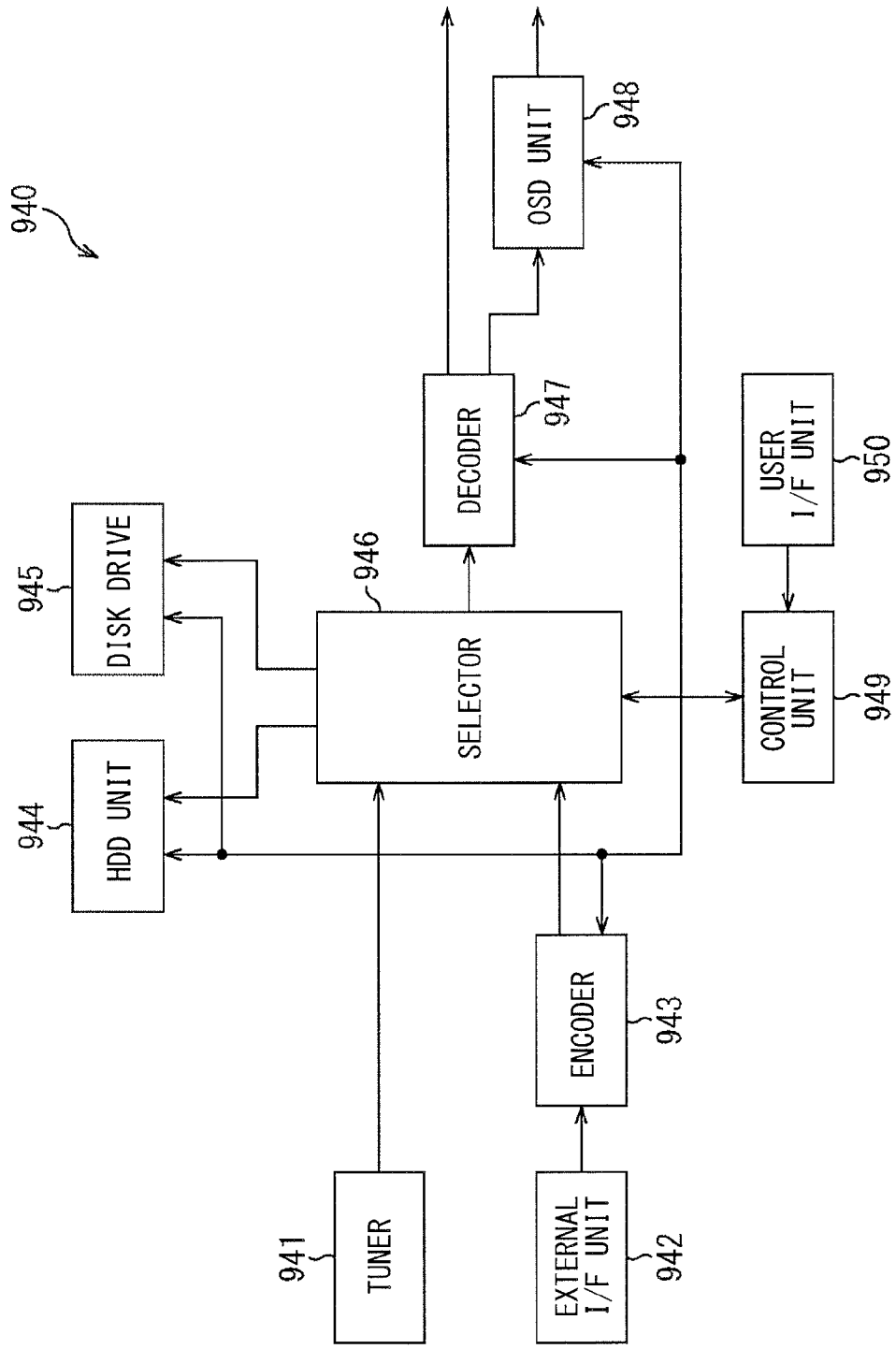
FIG. 77 is a block diagram illustrating an example of a schematic configuration of a recording/reproducing apparatus.

FIG. 77 illustrates an example of a schematic configuration of a recording/reproducing apparatus to which the embodiment described above is applied. A recording/reproducing apparatus 940 encodes audio data and video data of a received broadcast program, and records the encoded data into a recording medium, for example. In addition, the recording/reproducing apparatus 940 may encode audio data and video data acquired from another apparatus, and record the encoded data into the recording medium, for example. In addition, the recording/reproducing apparatus 940 reproduces the data recorded in the recording medium on a monitor and a speaker, for example, in accordance with an instruction of a user. At this time, the recording/reproducing apparatus 940 decodes the audio data and the video data.

The recording/reproducing apparatus 940 includes a tuner 941, an external interface (I/F) unit 942, an encoder 943, an HDD (Hard Disk Drive) unit 944, a disk drive 945, a selector 946, a decoder 947, an OSD (On-Screen Display) unit 948, a control unit 949, and a user interface (I/F) 950.

The tuner 941 extracts a signal of a desired channel from a broadcasting signal received via an antenna (not illustrated), and demodulates the extracted signal. Then, the tuner 941 outputs an encoded bit stream obtained from the demodulation to the selector 946. In other words, the tuner 941 has a role as the transmission unit in the recording/reproducing apparatus 940.

The external interface unit 942 is an interface for coupling the recording/reproducing apparatus 940, and an external apparatus or a network to each other. The external interface unit 942 may be, for example, an IEEE (Institute of Electrical and Electronic Engineers) 1394 interface, a network interface, a USB interface, a flash memory interface, or the like. For example, video data and audio data received via the external interface unit 942 are inputted to the encoder 943.

In other words, the external interface unit 942 has a role as the transmission unit in the recording/reproducing apparatus 940.

In a case where video data and audio data inputted from the external interface unit 942 are not encoded, the encoder 943 encodes the video data and the audio data. The encoder 943 then outputs an encoded bit stream to the selector 946.

The HDD unit 944 records an encoded bit stream in which content data of videos, sounds, and the like is compressed, various programs, and other data on an internal hard disk. Further, the HDD unit 944 reads such data from the hard disk when videos and sounds are reproduced.

The disk drive 945 records and reads data on and from a recording medium mounted thereon. The recording medium to be mounted on the disk drive 945 may be, for example, a DVD (Digital Versatile Disc) disk (DVD-Video, DVD-RAM (DVD-Random Access Memory), DVD-R (DVD-Recordable), DVD-RW (DVD-Rewritable), DVD+R (DVD+Recordable), DVD+RW (DVD+Rewritable), and the like), a Blu-ray (registered trademark) disk, or the like.

When videos and sounds are recorded, the selector 946 selects an encoded bit stream inputted from the tuner 941 or the encoder 943, and outputs the selected encoded bit stream to the HDD unit 944 or the disk drive 945. In addition, when videos and sounds are reproduced, the selector 946 outputs the encoded bit stream inputted from the HDD unit 944 or the disk drive 945 to the decoder 947.

The decoder 947 decodes the encoded bit stream to generate video data and audio data. Then, the decoder 947 outputs the generated video data to the OSD unit 948. In addition, the decoder 947 outputs the generated audio data to the external speaker.

The OSD unit 948 reproduces the video data inputted from the decoder 947 to display a video. In addition, the OSD unit 948 may superimpose an image of GUI such as, for example, a menu, a button, or a cursor on the displayed video.

The control unit 949 includes a processor such as CPU, and a memory such as RAM and ROM. The memory stores a program executed by the CPU, program data, and the like. The program stored in the memory is read and executed by the CPU, for example, when the recording/reproducing apparatus 940 is started. The CPU executes the program to control the operation of the recording/reproducing apparatus 940 in accordance with an operation signal inputted, for example, from the user interface unit 950.

The user interface unit 950 is coupled to the control unit 949. The user interface unit 950 includes a button and a switch for allowing, for example, a user to operate the recording/reproducing apparatus 940, a reception unit for a remote controlling signal, and the like. The user interface unit 950 detects an operation by the user via these components and generates an operation signal, and outputs the generated operation signal to the control unit 949.

In the recording/reproducing apparatus 940 configured in this manner, for example, the encoder 943 may have the function of the image encoding device 200 described above. That is, the encoder 943 may encode image data in a method described in each of the embodiments described above. This allows the recording/reproducing apparatus 940 to obtain effects similar to those of each of the embodiments described above with reference to FIGS. 1 to 73.

In addition, in the recording/reproducing apparatus 940 configured in this manner, for example, the decoder 947 may have the function of the image decoding device 100 described above. That is, the decoder 947 may decode encoded data in a method described in each of the embodiments described above. This allows the recording/reproducing apparatus 940 to obtain effects similar to those of each of the embodiments described above with reference to FIGS. 1 to 73.

<Fourth Application Example: Imaging Apparatus>

Figure 78:
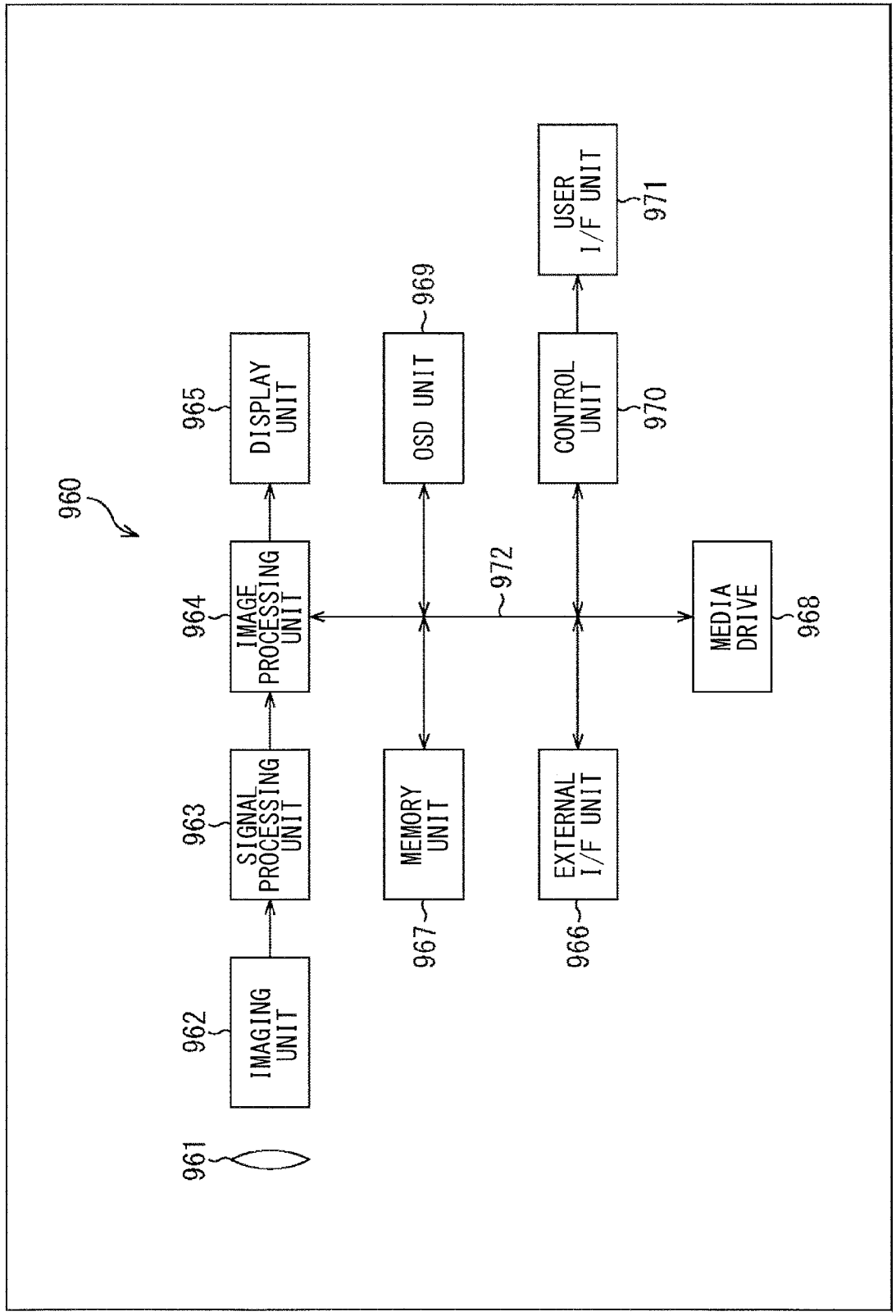
FIG. 78 is a block diagram illustrating an example of a schematic configuration of an imaging apparatus.

FIG. 78 illustrates an example of a schematic configuration of an imaging apparatus to which the embodiment described above is applied. An imaging apparatus 960 images an object to generate an image, encodes image data, and records the image data on a recording medium.

The imaging apparatus 960 includes an optical block 961, an imaging unit 962, a signal processing unit 963, an image processing unit 964, a display unit 965, an external interface (I/F) unit 966, a memory unit 967, a media drive 968, an OSD unit 969, a control unit 970, a user interface (I/F) unit 971, and a bus 972.

The optical block 961 is coupled to the imaging unit 962. The imaging unit 962 is coupled to the signal processing unit 963. The display unit 965 is coupled to the image processing unit 964. The user interface unit 971 is coupled to the control unit 970. The bus 972 coupled the image processing unit 964, the external interface unit 966, the memory unit 967, the media drive 968, the OSD unit 969, and the control unit 970 to each other.

The optical block 961 includes a focus lens, a diaphragm mechanism, and the like. The optical block 961 forms an optical image of an object on an imaging surface of the imaging unit 962. The imaging unit 962 includes an image sensor such as CCD (Charge Coupled Device) or CMOS (Complementary Metal Oxide Semiconductor), and converts an optical image formed on the imaging surface into an image signal in the form of an electric signal by photoelectric conversion. The imaging unit 962 then outputs the image signal to the signal processing unit 963.

The signal processing unit 963 performs various kinds of camera signal processing such as knee correction, gamma correction, and color correction on the image signal inputted from the imaging unit 962. The signal processing unit 963 outputs the image data subjected the camera signal processing to the image processing unit 964.

The image processing unit 964 encodes the image data inputted from the signal processing unit 963, and generates encoded data. Then, the image processing unit 964 outputs the generated encoded data to the external interface unit 966 or the media drive 968. In addition, the image processing unit 964 decodes encoded data inputted from the external interface unit 966 or the media drive 968 to generate image data. The image processing unit 964 then outputs the generated image data to the display unit 965. In addition, the image processing unit 964 may output the image data inputted from the signal processing unit 963 to the display unit 965 to cause the image to be displayed. In addition, the image processing unit 964 may superimpose display data acquired from the OSD unit 969 on the image to be outputted to the display unit 965.

The OSD unit 969 generates an image of GUI such as, for example, a menu, a button, or a cursor, and outputs the generated image to the image processing unit 964.

The external interface unit 966 is configured, for example, as a USB input/output terminal. The external interface unit 966 couples the imaging apparatus 960 and a printer to each other, for example, when an image is printed. In addition, a drive is coupled as necessary to the external interface unit 966. For example, a removable medium such as a magnetic disk or an optical disc is mounted on the drive, and a program read from the removable medium may be installed in the imaging apparatus 960. Further, the external interface unit 966 may be configured as a network interface coupled to a network such as LAN or the Internet. In other words, the external interface unit 966 has a role as the transmission unit in the imaging apparatus 960.

The recording medium mounted on the media drive 968 may be, for example, any readable and writable removable medium such as a magnetic disk, a magneto-optical disk, an optical disc, or a semiconductor memory. In addition, the recording medium may be fixedly mounted on the media drive 968, and a non-transportable storage unit such as a built-in hard disk drive or SSD (Solid State Drive) is configured, for example.

The control unit 970 includes a processor such as CPU, and a memory such as RAM and ROM. The memory stores a program executed by the CPU, program data, and the like. The program stored in the memory is read and executed by the CPU, for example, when the imaging apparatus 960 is started. The CPU executes the program to control the operation of the imaging apparatus 960 in accordance with an operation signal inputted, for example, from the user interface unit 971.

The user interface unit 971 is coupled to the control unit 970. The user interface unit 971 includes, for example, a button, a switch, and the like for allowing a user to operate the imaging apparatus 960. The user interface unit 971 detects an operation by the user via these components and generates an operation signal, and outputs the generated operation signal to the control unit 970.

In the imaging apparatus 960 configured in this manner, for example, the image processing unit 964 may have the function of the image encoding device 200 described above. That is, the image processing unit 964 may encode image data in a method described in each of the embodiments described above. This allows the imaging apparatus 960 to obtain effects similar to those of each of the embodiments described above with reference to FIGS. 1 to 73.

In addition, in the imaging apparatus 960 configured in this manner, for example, the image processing unit 964 may have the function of the image decoding device 100 described above. That is, the image processing unit 964 may decode encoded data in a method described in each of the embodiments described above. This allows the imaging apparatus 960 to obtain effects similar to those of each of the embodiments described above with reference to FIGS. 1 to 73.

<Fifth Application Example: Video Set>

Figure 79:
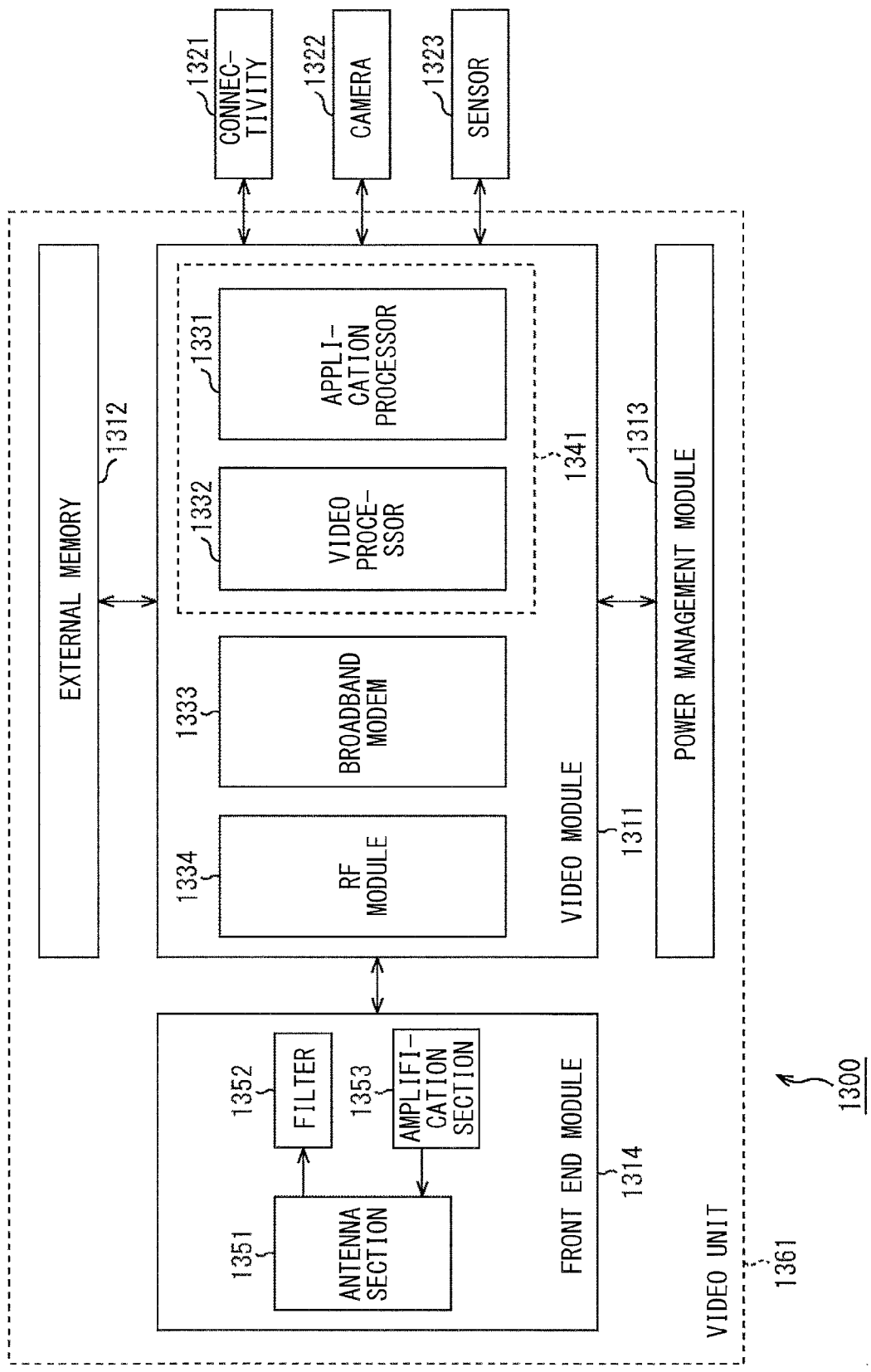
FIG. 79 is a block diagram illustrating an example of a schematic configuration of a video set.

In addition, it is also possible to carry out the present technology as any component to be incorporated in any apparatus or in an apparatus included in a system, for example, a processor as system LSI (Large Scale Integration) or the like, a module that uses a plurality of processors or the like, a unit that uses a plurality of modules or the like, a set in which another function is added to a unit (i.e., some components of an apparatus), and the like. FIG. 79 illustrates an example of a schematic configuration of a video set to which the present technology is applied.

In recent years, an electronic apparatus has been multi-functionalized. In a case where, in development or manufacture, some components thereof are carried out as sales, provision, or the like, they are each carried out not only as a component having one function, but also as one set having a plurality of functions resulting from a combination of a plurality of components having functions associated with each other in many cases.

A video set 1300 illustrated in FIG. 79 is such a multi-functionalized component, and is a combination of a device having a function or functions related to image encoding and decoding (one or both of the image encoding and decoding) and a device having another function related to the function or functions.

As illustrated in FIG. 79, the video set 1300 includes a module group including a video module 1311, an external memory 1312, a power management module 1313, a front end module 1314, and the like, and a device having related functions such as a connectivity 1321, a camera 1322, a sensor 1323, and the like.

A module is a part in which several part functions related to each other are collected for coherent functions. In spite of any specific physical configuration, for example, a configuration is conceivable in which electronic circuit elements such as a plurality of processors, registers, or capacitors having respective functions, other devices, and the like are disposed on a wiring board or the like and integrated. In addition, it is conceivable to combine a module with another module, a process, or the like to form a new module.

In a case of the example of FIG. 79, the video module 1311 is a combination of components having functions related to image processing, and includes an application processor, a video processor, a broadband modem 1333, and an RF module 1334.

Processor each includes components having predetermined functions that are integrated on a semiconductor chip by SoC (System On a Chip), and some of the processors are referred to, for example, as system LSI (Large Scale Integration) or the like. The components having predetermined functions may be logic circuits (hardware components), CPUs, ROMs, RAMs, and the like and a program (software component) executed using them (software configuration), or may be a combination of both of them. For example, a processor may include a logic circuit, and CPU, ROM, RAM, and the like, and a portion of functions may be achieved by a logic circuit (hardware component), and the other functions may be achieved by a program (software component) executed by the CPU.

The application processor 1331 of FIG. 79 is a processor that executes an application related to image processing. The application executed by this application processor 1331 is able to not only execute an arithmetic process to achieve a predetermined function, but also control a component, for example, the video processor 1332 and the like inside and outside the video module 1311 as necessary.

The video processor 1332 is a processor having a function related to image encoding/decoding (one or both thereof).

The broadband modem 1333 performs digital modulation or the like on data (digital signal) to be transmitted through wired or wireless (or both wired and wireless) broadband communication performed via a broadband line such as the Internet or a public telephone network to convert the data into an analog signal, or demodulates an analog signal received through the broadband communication to convert the analog signal into data (digital signal). The broadband modem 1333 processes any information such as, for example, image data to be processed by the video processor 1332, a stream in which image data is encoded, an application program, or setting data.

The RF module 1334 is a module that performs frequency conversion, modulation and demodulation, amplification, a filter process, and the like on an RF (Radio Frequency) signal to be transmitted or received via an antenna. For example, the RF module 1334 performs frequency conversion and the like on a baseband signal generated by the broadband modem 1333 to generate an RF signal. In addition, for example, the RF module 1334 performs frequency conversion and the like on an RF signal received via the front end module 1314 to generate a baseband signal.

It is to be noted that, as illustrated by a broken line 1341 in FIG. 79, the application processor 1331 and the video processor 1332 may be integrated to be configured as one processor.

The external memory 1312 is a module provided outside the video module 1311 and having a storage device used by the video module 1311. Although this storage device of the external memory 1312 may be achieved by any physical component, the storage device is generally used for storage of a large amount of data such as image data in units of frames in many cases. Accordingly, it is desirable to achieve the storage device by a semiconductor memory that relatively costs less and has a large capacity like DRAM (Dynamic Random Access Memory).

The power management module 1313 manages and controls power supply to the video module 1311 (each component in the video module 1311).

The front end module 1314 is a module that provides a front end function (circuit at a transmission/reception end of the antenna side) to the RF module 1334. As illustrated in FIG. 79, the front end module 1314 includes, for example, an antenna section 1351, a filter 1352, and an amplification section 1353.

The antenna section 1351 includes an antenna for transmitting and receiving a wireless signal, and a peripheral component. The antenna section 1351 transmits a signal supplied from the amplification section 1353 as a wireless signal, and supplies a received wireless signal as an electric signal (RF signal) to the filter 1352. The filter 1352 performs a filter process and the like on an RF signal received via the antenna section 1351, and supplies the processed RF signal to the RF module 1334. The amplification section 1353 amplifies the RF signal supplied from the RF module 1334, and supplies the antenna section 1351.

The connectivity 1321 is a module having a function related to coupling to the outside. The connectivity 1321 includes any physical component. For example, the connectivity 1321 includes a component, an external input/output terminal, and the like having a communication function according to a standard other than a communication standard with which the broadband modem 1333 is compatible.

For example, the connectivity 1321 may include a module having a communication function that complies with a wireless communication standard such as Bluetooth (registered trademark), IEEE 802.11 (e.g., Wi-Fi (Wireless Fidelity, registered trademark)), NFC (Near Field Communication), or IrDA (InfraRed Data Association), an antenna for transmitting and receiving a signal that complies with the standard, and the like. In addition, for example, the connectivity 1321 may include a module having a communication function that complies with a wired communication standard such as USB (Universal Serial Bus) or HDMI (registered trademark) (High-Definition Multimedia Interface), a terminal that complies with the standard, and the like. Further, for example, the connectivity 1321 may have other data (signal) transmission functions and the like such as an analog input/output terminal.

It is to be noted that the connectivity 1321 may include a device of a transmission destination of data (signal). For example, the connectivity 1321 may include a drive (including not only a drive for a removable medium, but also a hard disk, SSD (Solid State Drive), NAS (Network Attached Storage), and the like) for reading and writing of data from and into a recording medium such as a magnetic disk, an optical disc, a magneto-optical disk, or a semiconductor memory. In addition, the connectivity 1321 may include an output device (such as a monitor or a speaker) of an image or a sound.

The camera 1322 is a module having a function of imaging object to obtain image data of the object. The image data obtained by imaging of the camera 1322 is, for example, supplied to the video processor 1332 and encoded.

The sensor 1323 is a module having any sensor function such as, for example, an audio sensor, an ultrasonic sensor, an optical sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, or a temperature sensor. Data detected by the sensor 1323 is supplied, for example, to the application processor 1331, and is used by an application or the like.

The component described above as a module may be achieved as a processor, and conversely, the component described as a processor may be achieved as a module.

In the video set 1300 configured as described above, the present technology is applicable to the video processor 1332 as described below. Accordingly, it is possible to carry out the video set 1300 as a set to which the present technology is applied.

<Configuration Example of Video Processor>

Figure 80:
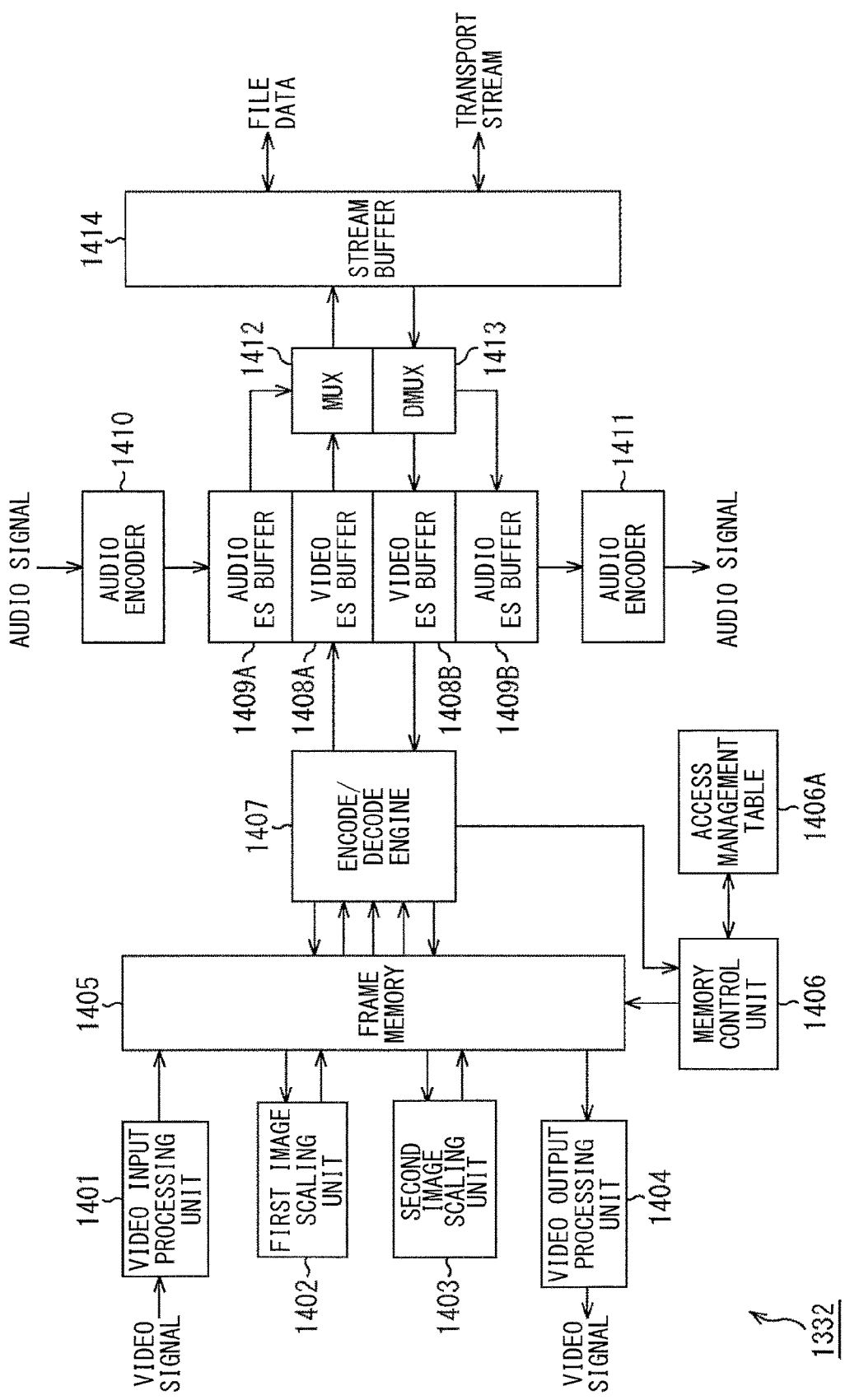
FIG. 80 is a block diagram illustrating an example of a schematic configuration of a video processor.

FIG. 80 illustrates an example of a schematic configuration of the video processor 1332 (FIG. 79) to which the present technology is applied.

In a case of the example of FIG. 80, the video processor 1332 has a function of receiving the input of a video signal and an audio signal and encoding them in a predetermined scheme, and a function of decoding encoded video data and audio data and reproducing and outputting a video signal and an audio signal.

As illustrated in FIG. 80, the video processor 1332 includes a video input processing unit 1401, a first image scaling unit 1402, a second image scaling unit 1403, a video output processing unit 1404, a frame memory 1405, and a memory control unit 1406. In addition, the video processor 1332 includes an encode/decode engine 1407, video ES (Elementary Stream) buffers 1408A and 1408B, and audio ES buffers 1409A and 1409B. Further, the video processor 1332 includes an audio encoder 1410, an audio decoder 1411, a multiplexing unit (MUX (Multiplexer)) 1412, a demultiplexing unit (DMUX (Demultiplexer)) 1413, and a stream buffer 1414.

The video input processing unit 1401 acquires a video signal inputted, for example, from the connectivity 1321 (FIG. 79) or the like, and converts the acquired video signal into digital image data. The first image scaling unit 1402 performs format conversion, an image scaling process, and the like on image data. The second image scaling unit 1403 performs an image scaling process on image data in accordance with a format at an outputting designation via the video output processing unit 1404, and performs format conversion, an image scaling process, and the like similar to those by the first image scaling unit 1402 on image data. The video output processing unit 1404 performs format conversion, conversion into an analog signal, and the like on image data, and outputs the resulting analog signal as a reproduced video signal, for example, to the connectivity 1321 and the like.

The frame memory 1405 is a memory for image data shared by the video input processing unit 1401, the first image scaling unit 1402, the second image scaling unit 1403, the video output processing unit 1404, and the encode/ decode engine 1407. The frame memory 1405 is achieved as a semiconductor memory such as, for example, DRAM.

The memory control unit 1406 receives a synchronizing signal from the encode/decode engine 1407 and controls writing/reading access to the frame memory 1405 in accordance with the schedule of access to the frame memory 1405 written in an access management table 1406A. The access management table 1406A is updated by the memory control unit 1406 in accordance with a process executed by the encode/decode engine 1407, the first image scaling unit 1402, the second image scaling unit 1403, or the like.

The encode/decode engine 1407 performs an encoding process of image data and a decoding process of a video stream that is data obtained by encoding image data. For example, the encode/decode engine 1407 encodes image data read from the frame memory 1405, and successively writes the encoded image data as a video stream into the video ES buffer 1408A. In addition, for example, the encode/decode engine 1407 successively reads and decodes video streams from the video ES buffer 1408B, and successively writes the decoded video streams as image data into the frame memory 1405. The encode/decode engine 1407 uses the frame memory 1405 as a working area in the encoding and decoding. In addition, the encode/decode engine 1407 outputs a synchronizing signal to the memory control unit 1406 at timing at which, for example, a process for each macro-block is started.

The video ES buffer 1408A buffers a video stream generated by the encode/decode engine 1407, and supplies the multiplexing unit (MUX) 1412. The video ES buffer 1408B buffers a video stream supplied from the demultiplexing unit (DMUX) 1413, and supplies the encode/decode engine 1407.

The audio ES buffer 1409A buffers an audio stream generated by the audio encoder 1410, and supplies the multiplexing unit (MUX) 1412. The audio ES buffer 1409B buffers an audio stream supplied from the demultiplexing unit (DMUX) 1413, and supplies the audio decoder 1411.

The audio encoder 1410, for example, digitally converts an audio signal inputted, for example, from the connectivity 1321 or the like, and encodes the digital audio signal in a predetermined scheme such as, for example, an MPEG audio scheme or an AC3 (Audio Code number 3) scheme. The audio encoder 1410 successively writes audio streams that are data obtained by encoding audio signals into the audio ES buffer 1409A. The audio decoder 1411 decodes an audio stream supplied from the audio ES buffer 1409B, performs, for example, conversion into an analog signal or the like, and supplies, for example, the connectivity 1321 or the like as a reproduced audio signal.

The multiplexing unit (MUX) 1412 multiplexes a video stream and an audio stream. This multiplexing is performed in any method (i.e., format of a bit stream to be generated by the multiplexing). In addition, upon this multiplexing, it is also possible for the multiplexing unit (MUX) 1412 to add predetermined header information and the like to the bit stream. In other words, the multiplexing unit (MUX) 1412 is able to convert the format of the stream by the multiplexing. For example, the multiplexing unit (MUX) 1412 multiplexes a video stream and an audio stream to convert the streams into a transport stream that is a bit stream of a format for transfer. In addition, for example, the multiplexing unit (MUX) 1412 multiplexes a video stream and an audio stream to convert the streams into data (file data) of a file format for recording.

The demultiplexing unit (DMUX) 1413 demultiplexes a bit stream in which a video stream and an audio stream are multiplexed in a method corresponding to that of the multiplexing by the multiplexing unit (MUX) 1412. That is, the demultiplexing unit (DMUX) 1413 extracts a video stream and an audio stream from a bit stream read from the stream buffer 1414 (demultiplexes a video stream and an audio stream from each other). In short, the demultiplexing unit (DMUX) 1413 is able to convert (inverse conversion to the conversion by the multiplexing unit (MUX) 1412) the format of a stream by demultiplexing. For example, the demultiplexing unit (DMUX) 1413 is able to convert a transport stream supplied, for example, from the connectivity 1321, the broadband modem 1333, or the like into a video stream and an audio stream by acquiring the transport stream via the stream buffer 1414 and demultiplexing the transport stream. In addition, for example, the demultiplexing unit (DMUX) 1413 is able to convert file data read from various recording media, for example, by the connectivity 1321 into a video stream and an audio stream by acquiring the file data via the stream buffer 1414 and demultiplexing the file data.

The stream buffer 1414 buffers the bitstream. For example, the stream buffer 1414 buffers a transport stream supplied from the multiplexing unit (MUX) 1412, and supplies, for example, the connectivity 1321, the broadband modem 1333, and the like at predetermined timing or on the basis of a request from the outside or the like.

In addition, for example, the stream buffer 1414 buffers file data supplied from the multiplexing unit (MUX) 1412, and supplies, for example, the connectivity 1321 and the like at predetermined timing or on the basis of a request from the outside or the like to cause the file data to be recorded on various recording media.

Further, the stream buffer 1414 buffers a transport stream acquired, for example, via the connectivity 1321, broadband modem 1333, or the like, and supplies the demultiplexing unit (DMUX) 1413 at predetermined timing or on the basis of a request from the outside or the like.

In addition, the stream buffer 1414 buffers file data read from various recording media, for example, by the connectivity 1321 or the like, and supplies the demultiplexing unit (DMUX) 1413 at predetermined timing or on the basis of a request from the outside or the like.

Next, an example of the operation of the video processor 1332 configured in this manner is described. For example, a video signal inputted from the connectivity 1321 or the like to the video processor 1332 is converted into digital image data in a predetermined scheme such as a 4:2:2 Y/Cb/Cr scheme by the video input processing unit 1401, and is successively written into the frame memory 1405. This digital image data is read into the first image scaling unit 1402 or the second image scaling unit 1403, subjected to format conversion to that of a predetermined scheme such as the 4;2;0 Y/Cb/Cr scheme and a scaling process, and then written into the frame memory 1405 again. This image data is encoded by the encode/decode engine 1407, and written as a video stream into the video ES buffer 1408A.

In addition, an audio signal inputted from the connectivity 1321 or the like to the video processor 1332 is encoded by the audio encoder 1410, and written as an audio stream into the audio ES buffer 1409A.

The video stream of the video ES buffer 1408A and the audio stream of the audio ES buffer 1409A are read to and multiplexed by the multiplexing unit (MUX) 1412 to be converted into a transport stream, file data, or the like. The transport stream generated by the multiplexing unit (MUX) 1412 is buffered by the stream buffer 1414, and then is outputted to an external network, for example, via the connectivity 1321, broadband modem 1333, or the like. In addition, the file data generated by the multiplexing unit (MUX) 1412 is buffered by the stream buffer 1414, outputted, for example, to the connectivity 1321 or the like, and then recorded on various recording media.

In addition, a transport stream inputted from an external network to the video processor 1332, for example, via the connectivity 1321, the broadband modem 1333, and the like is buffered by the stream buffer 1414, and then demultiplexed by the demultiplexing unit (DMUX) 1413. In addition, file data read from various recording media, for example, by the connectivity 1321 or the like and inputted to the video processor 1332 is buffered by the stream buffer 1414, and then demultiplexed by the demultiplexing unit (DMUX) 1413. That is, a transport stream or file data inputted to the video processor 1332 is demultiplexed into a video stream and an audio stream by the demultiplexing unit (DMUX) 1413.

The audio stream is supplied via the audio ES buffer 1409B to and decoded by the audio decoder 1411 to reproduce an audio signal. In addition, the video streams are successively read, after written into the video ES buffer 1408B, and decoded by the encode/decode engine 1407 and written into the frame memory 1405. The decoded image data is subjected to a scaling process by the second image scaling unit 1403 and is written into the frame memory 1405. Then, the decoded image data is read into the video output processing unit 1404 and subjected to format conversion to a predetermined format such as the 4:2:2 Y/Cb/Cr scheme. The decoded image data is further converted into an analog signal, and a video signal is reproduced and outputted.

In a case where the present technology is applied to the video processor 1332 configured in this manner as described above, the present technology according to the respective embodiments described above may be applied to the encode/decode engine 1407. That is, for example, the encode/decode engine 1407 may have the function of the image encoding device 200 or the function of the image decoding device 100 described above or both of them. This allows the video processor 1332 to obtain effects similar to those of each of the embodiments described above with reference to FIGS. 1 to 73.

It should be noted that, in the encode/decode engine 1407, the present technology (i.e., the function of the image encoding device 200 or the function of the image decoding device 100 or both of them) may be achieved by hardware such as a logic circuit or by software such as an incorporated program or may be achieved by both of them.

<Another Configuration Example of Video Processor>

Figure 81:
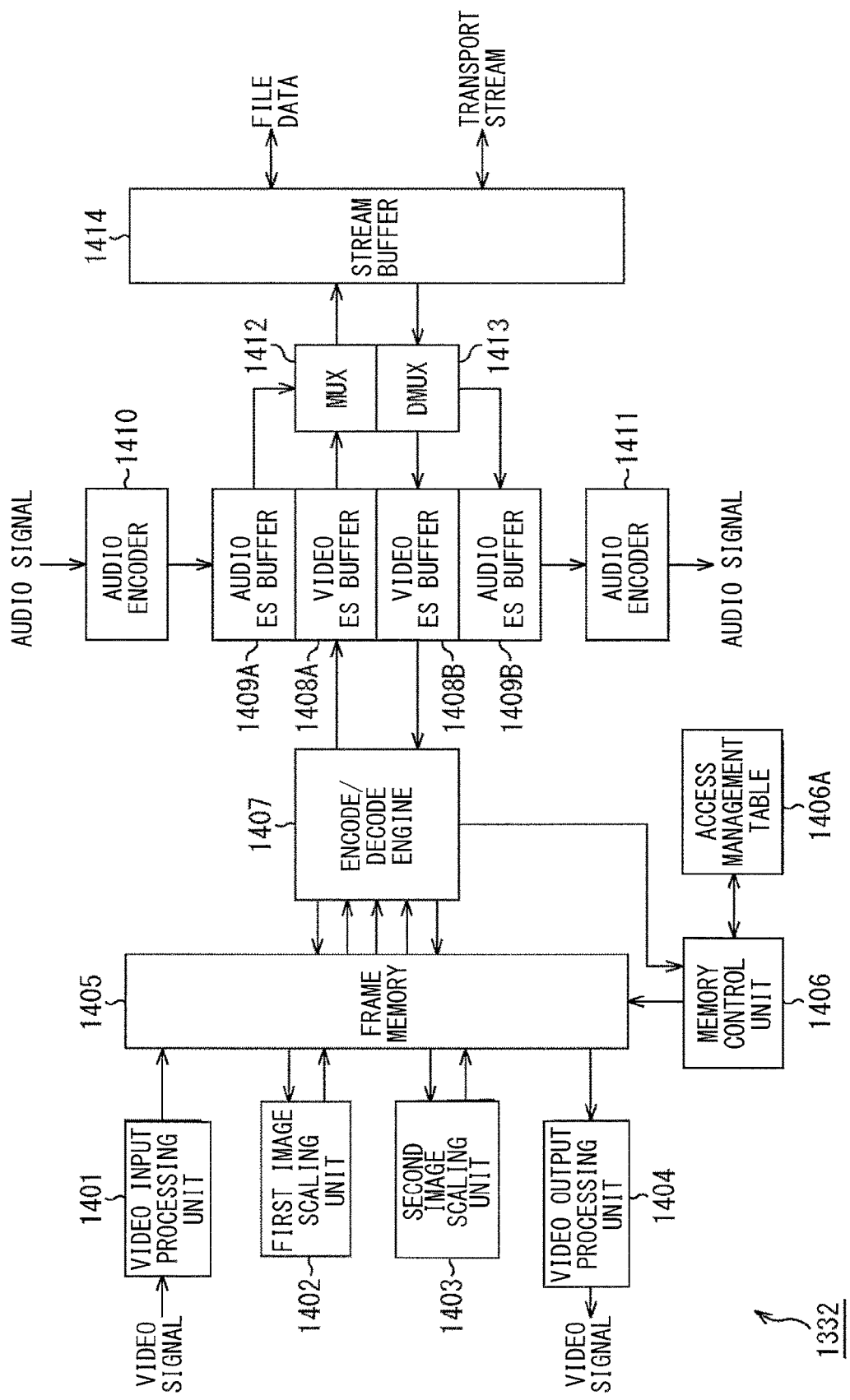
FIG. 81 is a block diagram illustrating another example of the schematic configuration of the video processor.

FIG. 81 illustrates another example of the schematic configuration of the video processor 1332 to which the present technology is applied. In a case of the example of FIG. 81, the video processor 1332 has a function of encoding/decoding video data in a predetermined scheme.

More specifically, as illustrated in FIG. 81, the video processor 1332 includes a control unit 1511, a display interface 1512, a display engine 1513, an image processing engine 1514, and an internal memory 1515. In addition, the video processor 1332 includes a codec engine 1516, a memory interface 1517, a multiplexing/demultiplexing unit (MUX DMUX) 1518, a network interface 1519, and a video interface 1520.

The control unit 1511 controls the operation of the respective processing units in the video processor 1332 such as the display interface 1512, the display engine 1513, the image processing engine 1514, and the codec engine 1516.

As illustrated in FIG. 81, the control unit 1511 includes, for example, main CPU 1531, sub-CPU 1532, and a system controller 1533. The main CPU 1531 executes a program and the like for controlling the operation of the respective processing units in the video processor 1332. The main CPU 1531 generates a control signal in accordance with the program and the like, and supplies the respective processing units (i.e., controls the operation of the respective processing units). The sub-CPU 1532 plays an auxiliary role of the main CPU 1531. For example, the sub-CPU 1532 executes a child process, a subroutine, or the like of the program or the like executed by the main CPU 1531. The system controller 1533 controls the operation of the main CPU 1531 and the sub-CPU 1532 such as designating programs to be executed by the main CPU 1531 and the sub-CPU 1532.

The display interface 1512 outputs image data, for example, to the connectivity 1321 and the like under the control of the control unit 1511. For example, the display interface 1512 converts image data in the form of digital data into an analog signal, and outputs the image data as a reproduced video signal, or the image data of digital data as it is, to a monitor or the like of the connectivity 1321.

The display engine 1513 performs various conversion processes such as format conversion, size conversion, and color region conversion on the image data under the control of the control unit 1511 to match the hardware specifications of a monitor or the like on which an image thereof is to be displayed.

The image processing engine 1514 performs predetermined image processing such as, for example, a filter process to improve the image quality on the image data under the control of the control unit 1511.

The internal memory 1515 is a memory that is provided in the inside of the video processor 1332 and shared by the display engine 1513, the image processing engine 1514, and the codec engine 1516. The internal memory 1515 is used for transfer of data performed, for example, between the display engine 1513, the image processing engine 1514, and the codec engine 1516. For example, the internal memory 1515 stores data supplied from the display engine 1513, the image processing engine 1514, or the codec engine 1516, and supplies, as necessary (e.g., in accordance with a request), the data to the display engine 1513, the image processing engine 1514, or the codec engine 1516. Although this internal memory 1515 may be achieved by any storage device, it is generally used for storage of a small amount of data such as image data in units of blocks or parameters in many cases. Accordingly, it is desirable that the internal memory 1515 be achieved by a semiconductor memory that has a relatively (e.g., in comparison with the external memory 1312) small capacity, but is high in response speed like, for example, SRAM (Static Random Access Memory).

The codec engine 1516 performs a process for encoding or decoding image data. This codec engine 1516 is compatible with any encoding/decoding scheme, and may be compatible with one or a plurality of schemes. For example, the codec engine 1516 may have codec functions of a plurality of encoding and decoding schemes, and encode image data or decode encoded data by a codec function selected from the codec functions.

In the example illustrated in FIG. 81, the codec engine 1516 includes, as functional blocks for a process for the codec, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551.

The MPEG-2 Video 1541 is a functional block that encodes or decodes image data in the MPEG-2 scheme. The AVC/H.264 1542 is a functional block that encodes or decodes image data in the AVC scheme. The HEVC/H.265 1543 is a functional block that encodes or decodes image data in the HEVC scheme. The HEVC/H.265 (Scalable) 1544 is a functional block that scalably encodes or scalably decodes image data in the HEVC scheme. The HEVC/H.265 (Multi-view) 1545 is a functional block that multi-visually encodes or multi-visually decodes image data in the HEVC scheme.

The MPEG-DASH 1551 is a functional block that transmits and receives image data in the MPEG-DASH (MPEG-Dynamic Adaptive Streaming over HTTP) scheme. MPEG-DASH is a technology for performing streaming of a video by using the HTTP (HyperText Transfer Protocol), and has one of characteristics in that appropriate encoded data is selected and transmitted in units of segments from among a plurality of pieces of encoded data that are prepared in advance and are different from each other in resolution and the like. The MPEG-DASH 1551 performs generation of a stream that complies with the standard, transmission control of the stream, and the like, and for encoding/decoding of image data, the MPEG-2 Video 1541 to HEVC/H.265 (Multi-view) 1545 described above are used.

The memory interface 1517 is an interface for the external memory 1312. Data supplied from the image processing engine 1514 or the codec engine 1516 is supplied to the external memory 1312 via the memory interface 1517. In addition, data read from the external memory 1312 is supplied to the video processor 1332 (image processing engine 1514 or codec engine 1516) via the memory interface 1517.

The multiplexing/demultiplexing unit (MUX DMUX) 1518 multiplexes and demultiplexes of various kinds of data related to an image such as a bit stream of encoded data, image data, and a video signal. This multiplexing/demultiplexing is performed in any method. For example, upon multiplexing, the multiplexing/demultiplexing unit (MUX DMUX) 1518 is able to not only collect a plurality of pieces of data into one piece of data, but also add predetermined header information and the like to the data. In addition, upon demultiplexing, the multiplexing/demultiplexing unit (MUX DMUX) 1518 is able to not only partition one piece of data into a plurality of pieces of data, but also add predetermined header information and the like to each of the partitioned pieces of data. That is, the multiplexing/demultiplexing unit (MUX DMUX) 1518 is able to convert the format of data by multiplexing/demultiplexing. For example, the multiplexing/demultiplexing unit (MUX DMUX) 1518 is able to perform conversion into a transport stream that is a bit stream in a format for transfer or data (file data) in a file format for recording by multiplexing bit streams. Naturally, demultiplexing also allows for inverse conversion.

The network interface 1519 is an interface, for example, for the broadband model 1333, the connectivity 1321, and the like. The video interface 1520 is an interface, for example, for the connectivity 1321, the camera 1322, and the like.

Next, an example of the operation of the video processor 1332 like this is described. For example, when a transport stream is received from an external network via the connectivity 1321, the broadband modem 1333, or the like, the transport stream is supplied via the network interface 1519 to and demultiplexed by the multiplexing/demultiplexing unit (MUX DMUX) 1518 and is decoded by the codec engine 1516. Image data obtained by decoding of the codec engine 1516 is subjected, for example, to predetermined image processing by the image processing engine 1514, subjected to predetermined conversion by the display engine 1513, supplied, for example, to the connectivity 1321 or the like via the display interface 1512, and an image thereof is displayed on the monitor. In addition, for example, the image data obtained by decoding of the codec engine 1516 is re-encoded by the codec engine 1516, multiplexed by the multiplexing/demultiplexing unit (MUX DMUX) 1518 for conversion into file data, outputted, for example, to the connectivity 1321 or the like via the video interface 1520, and recorded on various recording media.

Further, file data of encoded data obtained by encoding image data and read from a recording medium not illustrated, for example, by the connectivity 1321 or the like is supplied via the video interface 1520 to and demultiplexed by the multiplexing/demultiplexing unit (MUX DMUX) 1518, and decoded by the codec engine 1516. Image data obtained by decoding of the codec engine 1516 is subjected to predetermined image processing by the image processing engine 1514, subjected to predetermined conversion by the display engine 1513, supplied, for example, to the connectivity 1321 or the like via the display interface 1512, and an image thereof is displayed on the monitor. In addition, for example, the image data obtained by decoding of the codec engine 1516 is re-encoded by the codec engine 1516, multiplexed by the multiplexing/demultiplexing unit (MUX DMUX) 1518 for conversion into a transport stream, supplied, for example, to the connectivity 1321, the broadband modem 1333, and the like via the network interface 1519, and transmitted to another apparatus not illustrated.

It should be noted that image data or other data is transferred between the respective processing units in the video processor 1332, for example, by using the internal memory 1515 or the external memory 1312. In addition, the power management module 1313 controls power supply, for example, to the control unit 1511.

In a case where the present technology is applied to the video processor 1332 configured in this manner as described above, the present technology according to the respective embodiments described above may be applied to the codec engine 1516. That is, for example, the codec engine 1516 may have the function of the image encoding device 200 or the function of the image decoding device 100 described above or both of them. This allows the video processor 1332 to obtain effects similar to those of each of the embodiments described above with reference to FIGS. 1 to 73.

It should be noted that, in the codec engine 1516, the present technology (i.e., the function of the image encoding device 200) may be achieved by hardware such as a logic circuit or by software such as an incorporated program or may be achieved by both of them.

While two examples of the configuration of the video processor 1332 are demonstrated above, the video processor 1332 may have any configuration and have a configuration other than the two examples described above. In addition, although this video processor 1332 may be configured as one semiconductor chip, the video processor 1332 may also be configured as a plurality of semiconductor chips. The video processor 1332 may be, for example, three-dimensional stacked LSI in which a plurality of semiconductors is stacked. In addition, the video processor 1332 may be achieved by a plurality of LSIs.

<Example of Application to Apparatus>

It is possible to incorporate the video set 1300 into various apparatuses that process image data. For example, it is possible to incorporate the video set 1300 into the television apparatus 900 (FIG. 75), the mobile phone 920 (FIG. 76), the recording/reproducing apparatus 940 (FIG. 77), the imaging apparatus 960 (FIG. 78), and the like. Incorporating the video set 1300 into an apparatus allows the apparatus to obtain effects similar to those of the respective embodiments described above with reference to FIGS. 1 to 73.

It should be noted that it is possible to carry out even a portion of the respective components of the video set 1300 described above as a component to which the present technology is applied as long as the component includes the video processor 1332. For example, it is possible to carry out the video processor 1332 alone as a video processor to which the present technology is applied. In addition, for example, it is possible to carry out the processor indicated by the broken line 1341, the video module 1311, or the like as a processor, a module, or the like to which the present technology is applied as described above. Further, for example, it is possible to carry out the video module 1311, the external memory 1312, the power management module 1313, and the front end module 1314 in combination as a video unit 1361 to which the present technology is applied. In a case of any of the configurations, it is possible to obtain effects similar to those of the embodiments described above with reference to FIGS. 1 to 73.

That is, it is possible to incorporate any component into various apparatuses that process image data similarly to a case of the video set 1300 as long as the component includes the video processor 1332. For example, it is possible to incorporate the video processor 1332, the processor indicated by the broken line 1341, the video module 1311, or the video unit 1361 into the television apparatus 900 (FIG. 75), the mobile phone 920 (FIG. 76), the recording/reproducing apparatus 940 (FIG. 77), the imaging apparatus 960 (FIG. 78), and the like. Incorporating any of the components to which the present technology is applied into an apparatus then allows the apparatus to obtain effects similar to those of the respective embodiments described above with reference to FIGS. 1 to 73 similarly to a case of the video set 1300.

<Sixth Application Example: Network System>

In addition, the present technology is also applicable to a network system including a plurality of apparatuses. FIG. 82 illustrates an example of a schematic configuration of a network system to which the present technology is applied.

A network system 1600 illustrated in FIG. 82 is a system in which apparatuses transfer information regarding an image (moving image) via a network therebetween. A cloud service 1601 of this network system 1600 is a system that provides a service regarding an image (moving image) to terminals such as a computer 1611, an AV (Audio Visual) apparatus 1612, a portable information processing terminal 1613, and an IoT (Internet of Things) device 1614 coupled to the cloud service 1601 to allow for communication. For example, the cloud service 1601 provides a supplying service of content of an image (moving image) like so-called video distribution (on-demand or live distribution) to a terminal. In addition, for example, the cloud service 1601 provides a backup service for receiving content of an image (moving image) from a terminal for storage. In addition, for example, the cloud service 1601 provides a service for mediating transfer of content of an image (moving image) between terminals.

The cloud service 1601 includes any physical component. For example, the cloud service 1601 may include various servers such as a server that stores and manages moving images, a server that distributes a moving image to a terminal, a server that acquires a moving image from a terminal, and a server that manage users (terminals) or accounting, or any network such as the Internet or LAN.

The computer 1611 includes an information processing apparatus such as, for example, a personal computer, a server, or a work station. The AV apparatus 1612 includes an image processing apparatus such as, for example, a television receiver, a hard disk recorder, a game console, or a camera. The portable information processing terminal 1613 includes a portable information processing apparatus such as, for example, a notebook personal computer, a tablet terminal, a mobile phone, or a smartphone. The IoT device 1614 includes any entity that performs a process for an image such as, for example, a machine, a home appliance, furniture, another article, an IC tag, and a card type device. Those terminals each have a communication function, and are each able to couple (establish a session) to the cloud service 1601 and transfer information (i.e., communicate) with the cloud service 1601. In addition, each terminal is also able to communicate with another terminal. Communication between terminals may be performed via the cloud service 1601 or may be performed without the intervention of the cloud service 1601.

The present technology may be applied to the network system 1600 as described above to, when data of an image (moving image) is transferred between terminals or between a terminal and the cloud service 1601, encode/decode the image data as described above in the respective embodiments. That is, the terminals (computer 1611 to IoT device 1614) and the cloud service 1601 may each have the functions of the image encoding device 200 or the image decoding device 100 described above. This allows the terminals (computer 1611 to IoT device 1614) and the cloud service 1601 between which image data is transferred to obtain effects similar to those of the respective embodiments described above with reference to FIGS. 1 to 73.

<Supplement>

It should be noted that the "flag" herein is information for identifying a plurality of states, and includes not only information used to identify the two states of true (1) or false (0), but also information for allowing three or more states to be identified. Thus, this "flag" may have a binary value, for example, I/O, or a trinary or more value. That is, this "flag" may include any number of bits, and include one bit or a plurality of bits. In addition, as the identification information (including the flag), not only a bit stream including the identification information, but also a bit stream including difference information of identification information for certain criterial information are assumed. Accordingly, the "flag" and the "identification information" herein include not only the information, but also criterial difference information.

In addition, various kinds of information (such as metadata) regarding the encoded data (bit stream) may be transmitted or recorded in any manner as long as the information is associated with the encoded data. Here, the term "associate" means that, when one of pieces of data is, for example, to be processed, the other piece of data may be used (linked). That is, the pieces of data that are associated with each other may be collected as one piece of data or may be made individual pieces of data. For example, information associated with encoded data (image) may be transmitted on a transmission path different from that for the encoded data (image). In addition, for example, information associated with encoded data (image) may be recorded on a recording medium (or into a different recording area of the same recording medium) different from that for the encoded data (image). It should be noted that this "association" does not have to be exerted on the entire data, but a portion of the data. For example, an image and information corresponding to the image may be associated with each other in any units such as a plurality of frames, one frame, or a portion of a frame.

In addition, the terms "synthesize," "multiplex," "add," "integrate," "include," "store," "place into," "fit into," and "insert," and the like mean herein that a plurality of things is collected into one thing such as, for example, collecting encoded data and metadata into one, and means one method of "associate" described above.

In addition, embodiments of the present technology are not limited to the embodiments described above, but various alterations may occur insofar as they are within the scope of the present technology.

In addition, for example, it is also possible to carry out the present technology as any component included in an apparatus or a system, for example, a processor as system LSI (Large Scale Integration) or the like, a module that uses a plurality of processors or the like, a unit that uses a plurality of modules or the like, a set in which another function is added to a unit (i.e., some components of an apparatus), and the like.

It should be noted that the system means herein a set of plurality of components (such as apparatuses and modules (parts)), but it does not matter whether or not all components are placed in the same housing. Therefore, the system includes both a plurality of apparatuses stored in different housings and coupled to each other via a network, and one apparatus having a plurality of modules stored in one housing.

In addition, for example, a component described as one apparatus (or one processing unit) may be divided into and configured as a plurality of apparatuses (or processing units). Conversely, components described above as a plurality of apparatuses (or processing units) may be collected and configured as one apparatus (or processing unit). In addition, needless to say, a component other than those have been described may be added to the components of each apparatus (or each processing unit). Further, if the configuration or operation is substantially the same as the entire system, a portion of the components of a certain apparatus (or a certain processing unit) may be included in a component of another apparatus (or another processing unit).

In addition, for example, the present technology is able to adopt a cloud computing configuration in which one function is shared and processed in cooperation by a plurality of apparatuses via a network.

In addition, for example, the program described above is executable in any apparatus. In this case, it is sufficient if the apparatus has a necessary function (such as a functional block) and allows necessary information to be acquired.

Further, for example, it is possible to not only execute the respective steps described in the flowcharts described above in one apparatus, but also distribute the respective steps to a plurality of apparatuses for execution. Further, in a case where a plurality of processes is included in one step, it is possible to not only execute the plurality of processes included in the one step in one apparatus, but also distribute the plurality of processes to a plurality of apparatuses for execution. In other words, it is also possible to execute a plurality of processes included in one step as the processes of a plurality of steps. Conversely, it is also possible to collectively execute processes described as a plurality of steps as one step.

It should be noted that the processes of the steps described in the program to be executed by the computer may be executed chronologically in the order as described in the present specification or executed in parallel or executed individually at necessary timing, for example, when the process is called. That is, as long as there is no inconsistency, the processes of the respective steps may be executed in order different from the order described above. Further, the processes of the steps that describe the program may be executed in parallel with the processes of another program or may be executed in combination with the processes of another program.

It should be noted that it is possible to solely and independently carry out the plurality of present technologies described in the present specification unless inconsistency occurs. Naturally, it is also possible to carry out any number of the plurality of present technologies in combination. For example, it is also possible to carry out a portion or the entirety of the present technology described in any of the embodiments in combination with a portion or the entirety of the present technology described in another embodiment. In addition, it is also possible to carry out a portion or the entirety of any of the present technologies described above in combination with another technology that is not described above.

It should be noted that the present technology is also able to adopt the following configurations.

(1)

An image processing device including:

a prediction unit that predicts a pixel value of a chroma component by linear prediction from a pixel value of a reference image of a luma component whose pixel location is changed by using a filter, and generates a prediction image of the chroma component, the filter being selected on the basis of information regarding a pixel location of the chroma component and information regarding a color format; and a decoding unit that decodes, by using the prediction image, a chroma component of encoded data in which an image is encoded, the prediction image being generated by the prediction unit.

(2)

The image processing device according to (1), further including a filter selection unit that selects a filter on the basis of the information regarding the pixel location of the chroma component and the information regarding color format, the filter changing the pixel location of the reference image of the luma component, in which the prediction unit is configured to predict the pixel value of the chroma component by linear prediction from the pixel value of the reference image of the luma component whose pixel location is changed by using the filter, and generate the prediction image of the chroma component, the filter being selected by the filter selection unit.

(3)

The image processing device according to (2), in which the filter selection unit selects a candidate in a candidate group as the filter, the candidate group supporting a plurality of color formats, the candidate corresponding to a color format and the information regarding the pixel location of the chroma component, the color format including a format designated by the information regarding the color format.

(4)

The image processing device according to (3), in which the candidate group includes a candidate supporting a color format of a 420 format and a candidate supporting a color format of a 422 format, and the filter selection unit is configured to select, as the filter, a candidate that is also compliant with the information regarding the pixel location of the chroma component among candidates supporting the color format of the 420 format in a case where the information regarding the color format designates the color format of the 420 format, and select, as the filter, a candidate that is also compliant with the information regarding the pixel location of the chroma component among candidates supporting the color format of the 422 format in a case where the information regarding the color format designates the color format of the 422 format.

(5)

The image processing device according to (4), in which
the candidate group further includes a candidate supporting a color format of a 444 format, and
the filter selection unit is configured to select, as the filter, a candidate that is also compliant with the information regarding the pixel location of the chroma component among candidates supporting the color format of the 444 format in a case where the information regarding the color format designates the color format of the 444 format.

(6)

The image processing device according to any of (2) to (5), in which the filter selection unit selects the filter on the basis of linear prediction mode information, the information regarding the pixel location of the chroma component, and the information regarding the color format, the linear prediction mode information including information regarding a mode of the linear prediction.

(7)

The image processing device according to (6), in which the filter selection unit selects, as the filter, a candidate in a candidate group supporting a plurality of modes of the linear prediction, the candidate corresponding to a mode designated by the linear prediction mode information, the information regarding the pixel location of the chroma component, and the information regarding the color format.

(8)

The image processing device according to (7), in which
the candidate group includes a candidate supporting a single-class mode and a candidate supporting a multi-class mode, and
the filter selection unit is configured to select, as the filter, a candidate that is also compliant with the information regarding the pixel location of the chroma component and the information regarding the color format among candidates supporting linear prediction in the single-class mode in a case where the linear prediction mode information designates the single-class mode as a mode of the linear prediction, and select, as the filter, a candidate that is also compliant with the information regarding the pixel location of the chroma component and the information regarding the color format among candidates supporting linear prediction in the multi-class mode in a case where the linear prediction mode information designates the multi-class mode as the mode of the linear prediction.

(9)

The image processing device according to any of (2) to (8), further including a filter processing unit that changes the pixel location of the reference image of the luma component by using the filter selected by the filter selection unit, in which
the prediction unit is configured to predict the pixel value of the chroma component by linear prediction from the pixel value of the reference image of the luma component whose location is changed by the filter processing unit, and generate the prediction image of the chroma component.

(10)

The image processing device according to (9), in which the filter processing unit changes a pixel location of a collocate block of a luma component corresponding to a block of the chroma component that is to be processed, and a pixel location of an adjacent pixel adjacent to the collocate block.

(11)

The image processing device according to (10), further including a derivation unit that derives a linear prediction parameter on the basis of the adjacent pixel of the luma component whose pixel location is changed by the filter processing unit, and the adjacent pixel adjacent to the block of the chroma component that is to be processed, the linear prediction parameter including a parameter used for the linear prediction, in which the prediction unit is configured to perform the linear prediction by using the linear prediction parameter derived by the derivation unit to predict the pixel value of the chroma component, and generate the prediction image of the chroma component.

(12)

The image processing device according to any of (1) to (11), in which
the chroma component includes a Cb component and a Cr component, and
the image processing device further includes a cross-chroma residual prediction section that corrects a prediction image of the Cr component by using a collocate block of the Cb component, the prediction image of the Cr component being generated by the prediction unit, the collocate block corresponding to the prediction image of the Cr component.

(13)

The image processing device according to (12), further including a residual prediction parameter derivation section that derives a residual prediction parameter on the basis of the adjacent pixel adjacent to the prediction image of the Cr component and the adjacent pixel adjacent to the collocate block of the Cb component, the residual prediction parameter including a parameter used to correct the prediction image of the Cr component, in which
the cross-chroma residual prediction section corrects the prediction image of the Cr component by using the residual prediction parameter derived by the residual prediction parameter derivation section, and the collocate block of the Cb component.

(14)

The image processing device according to any of (1) to (13), in which
the decoding unit acquires the information regarding the pixel location of the chroma component included in the encoded data, and
the prediction unit generates the prediction image of the chroma component by the linear prediction by using the pixel value of the reference image of the luma component whose pixel location is changed on the basis of the information regarding the pixel location of the chroma component, the information regarding the pixel location of the chroma component being acquired by the decoding unit.

(15)

The image processing device according to (14), in which
the information regarding the pixel location of the chroma component includes a chroma sample location type identifier, the chroma sample location type identifier including an identifier for identifying a type of the pixel location of the chroma component, and
the prediction unit generates the prediction image of the chroma component by the linear prediction by using a pixel value of a reference image of a luma component whose pixel location is changed on the basis of the type of the pixel location indicated by the chroma sample location type identifier.

(16)

The image processing device according to (15), in which the information regarding the pixel location of the chroma component includes information indicating whether or not the type of the pixel location of the chroma component has an initial value, and includes the chroma sample location type identifier only in a case where the type of the pixel location of the chroma component does not have the initial value, and the prediction unit generates the prediction image of the chroma component by the linear prediction by using a pixel value of a reference image of a luma component whose pixel location is changed on the basis of the initial value or the type of the pixel location indicated by the chroma sample location type identifier.

(17)

The image processing device according to any of (14) to (16), in which the decoding unit acquires the information regarding the pixel location of the chroma component included in the encoded data in a case where the information regarding the color format designates the color format of the 420 format or the color format of the 422 format.

(18)

The image processing device according to any of (1) to (17), in which the decoding unit acquires cross-component prediction information indicating whether to perform cross-component prediction for predicting the pixel value of the chroma component by linear prediction from the pixel value of the reference image of the luma component, the cross-component prediction information being included in the encoded data.

(19)

The image processing device according to (18), in which the decoding unit acquires cross-component prediction enabled information indicating whether the cross-component prediction information is enabled, and acquires the cross-component prediction information included in the encoded data in a case where the cross-component prediction enabled information indicates that the cross-component prediction information is enabled, the cross-component prediction enabled information being included in the encoded data.

(20)

The image processing device according to (18) or (19), in which the decoding unit acquires the linear prediction mode information including the information regarding the mode of the linear prediction in a case where the cross-component prediction information indicates that the cross-component prediction is performed, the linear prediction mode information being included in the encoded data.

(21)

The image processing device according to (20), in which the decoding unit acquires the linear prediction mode information included in the encoded data in a case where the cross-component prediction information indicates that the cross-component prediction is performed and size the block of the chroma component that is to be processed falls within a predetermined range.

(22)

The image processing device according to any of (1) to (21), in which the decoding unit acquires cross-chroma residual prediction information indicating whether to correct a prediction image of a Cr component by using a collocate block of a Cb component corresponding to the prediction image of the Cr component, the cross-chroma residual prediction information being included in the encoded data.

(23)

The image processing device according to (22), in which the decoding unit acquires cross-chroma residual prediction enabled information indicating whether or not the cross-chroma residual prediction information is enabled, and acquires the cross-chroma residual prediction information included in the encoded data in a case where the cross-chroma residual prediction enabled information indicates that the cross-chroma residual prediction information is enabled, the cross-chroma residual prediction enabled information being included in the encoded data.

(24)

The image processing device according to any of (1) to (23), in which the filter includes a downsampling filter that reduces a number of pixels.

(25)

An image processing method including:

predicting a pixel value of a chroma component by linear prediction from a pixel value of a reference image of a luma component whose pixel location is changed by using a filter, and generating a prediction image of the chroma component, the filter being selected on the basis of information regarding a pixel location of the chroma component and information regarding a color format; and decoding, by using the generated prediction image, a chroma component of encoded data in which an image is encoded.

(31)

An image processing device including:

a prediction unit that predicts a pixel value of a chroma component by linear prediction from a pixel value of a reference image of a luma component whose pixel location is changed by using a filter, and generates a prediction image of the chroma component, the filter being selected on the basis of information regarding a pixel location of the chroma component and information regarding a color format; and an encoding unit that encodes, by using the prediction image, a chroma component of an image, the prediction image being generated by the prediction unit.

(32)

The image processing device according to (31), further including a filter selection unit that selects a filter on the basis of the information regarding the pixel location of the chroma component and the information regarding color format, the filter changing the pixel location of the reference image of the luma component, in which the prediction unit is configured to predict the pixel value of the chroma component by linear prediction from the pixel value of the reference image of the luma component whose pixel location is changed by using the filter, and generate the prediction image of the chroma component, the filter being selected by the filter selection unit.

(33)

The image processing device according to (32), in which the filter selection unit selects a candidate in a candidate group as the filter, the candidate group supporting a plurality of color formats, the candidate corresponding to a color format and the information regarding the pixel location of the chroma component, the color format including a format designated by the information regarding the color format.

(34)

The image processing device according to (33), in which the candidate group includes a candidate supporting a color format of a 420 format and a candidate supporting a color format of a 422 format, and the filter selection unit is configured to select, as the filter, a candidate that is also compliant with the information regarding the pixel location of the chroma component among candidates supporting the color format of the 420 format in a case where the information regarding the color format designates the color format of the 420 format, and select, as the filter, a candidate that is also compliant with the information regarding the pixel location of the chroma component among candidates supporting the color format of the 422 format in a case where the information regarding the color format designates the color format of the 422 format.

(35)

The image processing device according to (34), in which the candidate group further includes a candidate supporting a color format of a 444 format, and the filter selection unit is configured to select, as the filter, a candidate that is also compliant with the information regarding the pixel location of the chroma component among candidates supporting the color format of the 444 format in a case where the information regarding the color format designates the color format of the 444 format.

(36)

The image processing device according to any of (32) to (35), in which the filter selection unit selects the filter on the basis of linear prediction mode information, the information regarding the pixel location of the chroma component, and the information regarding the color format, the linear prediction mode information including information regarding a mode of the linear prediction.

(37)

The image processing device according to (36), in which the filter selection unit selects, as the filter, a candidate in a candidate group supporting a plurality of modes of the linear prediction, the candidate corresponding to a mode designated by the linear prediction mode information, the information regarding the pixel location of the chroma component, and the information regarding the color format.

(38)

The image processing device according to (37), in which the candidate group includes a candidate supporting a single-class mode and a candidate supporting a multi-class mode, and the filter selection unit is configured to select, as the filter, a candidate that is also compliant with the information regarding the pixel location of the chroma component and the information regarding the color format among candidates supporting linear prediction in the single-class mode in a case where the linear prediction mode information designates the single-class mode as a mode of the linear prediction, and select, as the filter, a candidate that is also compliant with the information regarding the pixel location of the chroma component and the information regarding the color format among candidates supporting linear prediction in the multi-class mode in a case where the linear prediction mode information designates the multi-class mode as the mode of the linear prediction.

(39)

The image processing device according to any of (32) to (38), further including a filter processing unit that changes the pixel location of the reference image of the luma component by using the filter selected by the filter selection unit, in which the prediction unit is configured to predict the pixel value of the chroma component by linear prediction from the pixel value of the reference image of the luma component whose location is changed by the filter processing unit, and generate the prediction image of the chroma component.

(40)

The image processing device according to (39), in which the filter processing unit changes a pixel location of a collocate block of a luma component corresponding to a block of the chroma component that is to be processed, and a pixel location of an adjacent pixel adjacent to the collocate block.

(41)

The image processing device according to (40), further including a derivation unit that derives a linear prediction parameter on the basis of the adjacent pixel of the luma component whose pixel location is changed by the filter processing unit, and the adjacent pixel adjacent to the block of the chroma component that is to be processed, the linear prediction parameter including a parameter used for the linear prediction, in which the prediction unit is configured to perform the linear prediction by using the linear prediction parameter derived by the derivation unit to predict the pixel value of the chroma component, and generate the prediction image of the chroma component.

(42)

The image processing device according to any of (31) to (41), in which the chroma component includes a Cb component and a Cr component, and the image processing device further includes a cross-chroma residual prediction section that corrects a prediction image of the Cr component by using a collocate block of the Cb component, the prediction image of the Cr component being generated by the prediction unit, the collocate block corresponding to the prediction image of the Cr component.

(43)

The image processing device according to (42), further including a residual prediction parameter derivation section that derives a residual prediction parameter on the basis of the adjacent pixel adjacent to the prediction image of the Cr component and the adjacent pixel adjacent to the collocate block of the Cb component, the residual prediction parameter including a parameter used to correct the prediction image of the Cr component, in which the cross-chroma residual prediction section corrects the prediction image of the Cr component by using the residual prediction parameter derived by the residual prediction parameter derivation section, and the collocate block of the Cb component.

(44)

The image processing device according to any of (31) to (43), in which the encoding unit adds the information regarding the pixel location of the chroma component to encoded data.

(45)

The image processing device according to (44), in which the information regarding the pixel location of the chroma component includes a chroma sample location type identifier, the chroma sample location type identifier including an identifier for identifying a type of the pixel location of the chroma component.

(46)

The image processing device according to (45), in which the information regarding the pixel location of the chroma component includes information indicating whether or not the type of the pixel location of the chroma component has an initial value, and includes the chroma sample location type identifier only in a case where the type of the pixel location of the chroma component does not have the initial value.

(47)

The image processing device according to any of (44) to (46), in which the encoding unit adds the information regarding the pixel location of the chroma component to the encoded data in a case where the information regarding the color format designates the color format of the 420 format or the color format of the 422 format.

(48)

The image processing device according to any of (31) to (47), in which the encoding unit adds cross-component prediction information to encoded data, the cross-component prediction information indicating whether to perform cross-component prediction for predicting the pixel value of the chroma component by linear prediction from the pixel value of the reference image of the luma component.

(49)

The image processing device according to (48), in which the encoding unit adds cross-component prediction enabled information to the encoded data, and adds the cross-component prediction information to the encoded data in a case where the cross-component prediction enabled information indicates that the cross-component prediction information is enabled, the cross-component prediction enabled information indicating whether the cross-component prediction information is enabled.

(50)

The image processing device according to (48), in which the encoding unit adds the linear prediction mode information to the encoded data in a case where the cross-component prediction information indicates that the cross-component prediction is performed, the linear prediction mode information including the information regarding the mode of the linear prediction.

(51)

The image processing device according to (50), in which the encoding unit adds the linear prediction mode information to the encoded data in a case where the cross-component prediction information indicates that the cross-component prediction is performed and size of the block of the chroma component that is to be processed falls within a predetermined range.

(52)

The image processing device according to any of (31) to (51), in which the encoding unit adds cross-chroma residual prediction information to encoded data, the cross-chroma residual prediction information indicating whether to correct a prediction image of a Cr component by using a collocate block of a Cb component corresponding the prediction image of the Cr component.

(53)

The image processing device according to (52), in which the encoding unit adds cross-chroma residual prediction enabled information to the encoded data, and adds the cross-chroma residual prediction information to the encoded data in a case where the cross-chroma residual prediction enabled information indicates that the cross-chroma residual prediction information is enabled, the cross-chroma residual prediction enabled information indicating whether or not the cross-chroma residual prediction information is enabled.

(54)

The image processing device according to any of (31) to (53), in which the filter includes a downsampling filter that reduces a number of pixels.

(55)

An image processing method including:

predicting a pixel value of a chroma component by linear prediction from a pixel value of a reference image of a luma component whose pixel location is changed by using a filter, and generating a prediction image of the chroma component, the filter being selected on the basis of information regarding a pixel location of the chroma component and information regarding a color format; and encoding, by using the generated prediction image, a chroma component of an image.

REFERENCE SIGNS LIST

100 Image decoding device, 111 Decoding unit, 112 Inverse quantization unit, 113 Inverse transformation unit, 114 Prediction unit, 115 Calculation unit, 116 Frame memory, 117 Loop filter unit, 121 Intra prediction section, 122 Inter prediction section, 131 DC prediction section, 132 Planar prediction section, 133 Angular prediction section, 134 CC prediction section, 141 Luma/Chroma prediction section, 142 Cb/Cr residual prediction section, 151 Reduced image generation section, 152 Prediction parameter derivation section, 153 Chroma prediction image generation section, 161 Downsampling filter selection section, 162 Luma collocate block pixel group reduction section, 163 Luma collocate adjacent pixel group reduction section, 171 Residual prediction parameter derivation section, 172 Chroma prediction image correction section, 200 Image encoding device, 201 Control unit, 211 Prediction unit, 212 Calculation unit, 213 Transformation unit, 214 Quantization unit, 215 Inverse quantization unit, 216 Inverse transformation unit, 217 Calculation unit, 218 Frame memory, 219 Loop filter unit, 220 Encoding unit, 231 Intra prediction section, 232 Inter prediction section, 233 Prediction image selection section, 242 Cb/Cr residual prediction section

The invention claimed is:

1. An image processing device comprising:
circuitry configured to
predict a pixel value of a chroma component of encoded data by linear prediction from a pixel value of a luma component of the encoded data at a pixel location of the luma component that is determined using a filter selected on a basis of information regarding a pixel location of the chroma component and information regarding a color format of the encoded data;
generate a prediction image of the chroma component based on the predicted pixel value of the chroma component; and
decode the chroma component of the encoded data using the prediction image.

2. The image processing device according to claim 1, wherein the circuitry is configured to:
select a filter on the basis of the information regarding the pixel location of the chroma component and the information regarding color format, the filter changing the pixel location of the luma component,
predict the pixel value of the chroma component by linear prediction from the pixel value of the luma component whose pixel location is changed by the filter, and
generate the prediction image of the chroma component based on the predicted pixel value of the chroma component.

3. The image processing device according to claim 2, wherein the circuitry is configured to select a candidate in a candidate group as the filter, the candidate group supporting a plurality of color formats, the candidate corresponding to a color format and the information regarding the pixel location of the chroma component, the color format including a format designated by the information regarding the color format.

4. The image processing device according to claim 2, wherein the circuitry is configured to select the filter on a basis of linear prediction mode information, the information regarding the pixel location of the chroma component, and the information regarding the color format, the linear prediction mode information including information regarding a mode of the linear prediction.

5. The image processing device according to claim 2, wherein the circuitry is configured to
change the pixel location of the luma component by using the filter,
predict the pixel value of the chroma component by linear prediction from the pixel value of the luma component whose location is changed, and
generate the prediction image of the chroma component based on the predicted pixel value of the chroma component.

6. The image processing device according to claim 1, wherein
the chroma component includes a Cb component and a Cr component, and
the circuitry is configured to correct the prediction image of the Cr component by using a collocate block of the Cb component, the collocate block corresponding to the prediction image of the Cr component.

7. The image processing device according to claim 1, wherein the circuitry is configured to
acquire the information regarding the pixel location of the chroma component included in the encoded data, and
generate the prediction image of the chroma component by the linear prediction by using the pixel value of the luma component whose pixel location is changed on a basis of the information regarding the pixel location of the chroma component.

8. The image processing device according to claim 1, wherein the circuitry is configured to acquire cross-chroma residual prediction information indicating whether to correct a prediction image of a Cr component by using a collocate block of a Cb component corresponding to the prediction image of the Cr component, the cross-chroma residual prediction information being included in the encoded data.

9. The image processing device according to claim 8, wherein the circuitry is configured to
acquire cross-chroma residual prediction enabled information indicating whether or not the cross-chroma residual prediction information is enabled, and
acquire the cross-chroma residual prediction information included in the encoded data on condition that the cross-chroma residual prediction enabled information indicates that the cross-chroma residual prediction information is enabled, the cross-chroma residual prediction enabled information being included in the encoded data.

10. An image processing method comprising:
predicting a pixel value of a chroma component of encoded data by linear prediction from a pixel value of a luma component of the encoded data at a pixel location of the luma component that is determined using a filter selected on a basis of information regarding a pixel location of the chroma component and information regarding a color format of the encoded data;
generating a prediction image of the chroma component based on the predicted pixel value of the chroma component; and
decoding the chroma component of the encoded data using the prediction image.

11. An image processing device comprising:
circuitry configured to
predict a pixel value of a chroma component of an image by linear prediction from a pixel value of a luma component of the image at a pixel location of the luma component that is determined using a filter selected on a basis of information regarding a pixel location of the chroma component and information regarding a color format of the image;
generate a prediction image of the chroma component based on the predicted pixel value of the chroma component; and
encode the chroma component of the image using the prediction image.

12. The image processing device according to claim 11, wherein the circuitry is configured to:
select a filter on the basis of the information regarding the pixel location of the chroma component and the information regarding color format, the filter changing the pixel location of the luma component,
predict the pixel value of the chroma component by linear prediction from the pixel value of the luma component whose pixel location is changed by the filter, and
generate the prediction image of the chroma component based on the predicted pixel value of the chroma component.

13. The image processing device according to claim 12, wherein the circuitry is configured to select a candidate in a candidate group as the filter, the candidate group supporting a plurality of color formats, the candidate corresponding to a color format and the information regarding the pixel location of the chroma component, the color format including a format designated by the information regarding the color format.

14. The image processing device according to claim 12, wherein the circuitry is configured to select the filter on a basis of linear prediction mode information, the information regarding the pixel location of the chroma component, and the information regarding the color format, the linear prediction mode information including information regarding a mode of the linear prediction.

15. The image processing device according to claim 12, wherein the circuitry is configured to
change the pixel location of the luma component by using the filter,
predict the pixel value of the chroma component by linear prediction from the pixel value of the luma component whose location is changed, and
generate the prediction image of the chroma component based on the predicted pixel value of the chroma component.

16. The image processing device according to claim 11, wherein
the chroma component includes a Cb component and a Cr component, and
the circuitry is configured to correct the prediction image of the Cr component by using a collocate block of the Cb component, the collocate block corresponding to the prediction image of the Cr component.

17. The image processing device according to claim 11, wherein the circuitry is configured to add the information regarding the pixel location of the chroma component to the encoded chroma component.

18. The image processing device according to claim 11, wherein the circuitry is configured to add cross-chroma residual prediction information to encoded data, the cross-chroma residual prediction information indicating whether to correct a prediction image of a Cr component by using a collocate block of a Cb component corresponding the prediction image of the Cr component.

19. The image processing device according to claim 18, wherein the circuitry is configured to add cross-chroma residual prediction enabled information to the encoded data, and adds the cross-chroma residual prediction information to the encoded data in a case where the cross-chroma residual prediction enabled information indicates that the cross-chroma residual prediction information is enabled, the cross-chroma residual prediction enabled information indicating whether or not the cross-chroma residual prediction information is enabled.

20. An image processing method comprising:
predicting a pixel value of a chroma component of an image by linear prediction from a pixel value of a luma component of the image at a pixel location of the luma component determined using a filter selected on a basis of information regarding a pixel location of the chroma component and information regarding a color format of the image;
generating a prediction image of the chroma component based on the predicted pixel value of the chroma component; and
encoding the chroma component of the image using the generated prediction image.

* * * * *